US012700949B2

(12) United States Patent
Huang et al.

(10) Patent No.: US 12,700,949 B2
(45) Date of Patent: Aug. 4, 2026

(54) DATA PROCESSING METHOD AND DATA PROCESSING APPARATUS

(71) Applicant: HUAWEI TECHNOLOGIES CO., LTD., Shenzhen (CN)

(72) Inventors: Kechao Huang, Shenzhen (CN); Ji Luo, Shenzhen (CN); Xiaoling Yang, Shenzhen (CN); Huixiao Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/307,910

(22) Filed: Aug. 22, 2025

(65) Prior Publication Data

US 2025/0392408 A1    Dec. 25, 2025

Related U.S. Application Data

(63) Continuation of application No. PCT/CN2024/078100, filed on Feb. 22, 2024.

(30) Foreign Application Priority Data

Feb. 25, 2023    (CN) ......................... 202310206681.6
Mar. 28, 2023    (CN) ......................... 202310359894.2

(Continued)

(51) Int. Cl.
*H04L 1/00*          (2006.01)
(52) U.S. Cl.
CPC ................................. *H04L 1/0071* (2013.01)
(58) Field of Classification Search
None
See application file for complete search history.

(56) References Cited

U.S. PATENT DOCUMENTS 10,069,519 B1 *    9/2018    Millar ................... H04L 1/0042
10,601,517 B1 *    3/2020    Kim .................. H03M 13/6522
(Continued)

FOREIGN PATENT DOCUMENTS

CN          105122689 A      12/2015
CN          110535802 A      12/2019
(Continued)

OTHER PUBLICATIONS

Yang et al., "An RS-BCH Concatenated FEC Code for Beyond 400 GB/s Networking," Paper, Presented at Proceedings of the 2022 IEEE Computer Society Annual Symposium on VLSI (ISVLSI), Jul. 4-6, 2022, 5 pages.

(Continued)

*Primary Examiner* — Andrew C Oh
(74) *Attorney, Agent, or Firm* — Fish & Richardson P.C.

(57)          ABSTRACT

In an example method, probabilistic constellation shaping (PCS) processing is performed on a first bit set in k bits, to obtain a second bit set. Forward error correction (FEC) encoding is performed on the second bit set and a third bit set in the k bits excluding the first bit set, to obtain a fourth bit set. The fourth bit set includes $m_0$ first bit subsets, and each of the first bit subsets includes $F_0$ bits. First interleaving processing is performed on the fourth bit set to obtain a fifth bit set. The fifth bit set includes $m_0$ second bit subsets, each of the second bit subsets includes $F_0$ bits, $F_0/2$ bits in each of the second bit subsets are from the second bit set, and the other $F_0/2$ bits in each of the second bit subsets are from the third bit set and/or parity bits of the FEC encoding.

30 Claims, 40 Drawing Sheets

(30)     Foreign Application Priority Data

| Apr. 28, 2023 | (CN) | ......................... | 202310491179.4 |
| Aug. 18, 2023 | (CN) | ......................... | 202311055979.8 |

(56)     References Cited

U.S. PATENT DOCUMENTS

| | | | | |
|---|---|---|---|---|
| 10,848,269 | B2 * | 11/2020 | Ebrahimzad | ........... H04B 10/58 |
| 10,848,629 | B2 * | 11/2020 | Utoh | .................. H04N 1/00209 |
| 11,012,187 | B1 * | 5/2021 | Kim | ..................... H04L 1/0047 |
| 2008/0109707 | A1 | 5/2008 | Dell et al. | |
| 2018/0198554 | A1 | 7/2018 | Wang et al. | |
| 2019/0215077 | A1 * | 7/2019 | Chien | ................. H04L 27/3488 |
| 2019/0280809 | A1 * | 9/2019 | Cho | .................. H04L 25/03343 |
| 2019/0363738 | A1 | 11/2019 | Strobel et al. | |
| 2020/0119840 | A1 * | 4/2020 | Ebrahimzad | .......... H04L 1/0042 |
| 2020/0177307 | A1 * | 6/2020 | Pan | ........................ H04L 1/0045 |
| 2020/0313773 | A1 | 10/2020 | Torbatian et al. | |
| 2021/0099249 | A1 | 4/2021 | Li et al. | |
| 2022/0014300 | A1 | 1/2022 | Torbatian et al. | |
| 2022/0045765 | A1 * | 2/2022 | Bisplinghoff | ......... H04L 27/366 |
| 2022/0283943 | A1 | 9/2022 | Grayver et al. | |
| 2023/0023258 | A1 * | 1/2023 | Laursen | .............. H04J 14/0209 |
| 2023/0033774 | A1 * | 2/2023 | Koike-Akino | ........ H04L 1/0065 |
| 2023/0084537 | A1 * | 3/2023 | Pan | ....................... H04L 1/0045 |
| | | | | 714/755 |
| 2023/0231649 | A1 * | 7/2023 | Ebrahimzad | .......... H04L 1/0042 |
| | | | | 714/776 |
| 2024/0406052 | A1 * | 12/2024 | Xiao | ..................... H04L 1/0045 |
| 2025/0247169 | A1 * | 7/2025 | Xiao | .................. H04L 27/0012 |

FOREIGN PATENT DOCUMENTS

| | | | | |
|---|---|---|---|---|
| CN | 114430278 | A | 5/2022 | |
| WO | WO-1996010299 | A1 * | 4/1996 | .......... H04L 1/0071 |
| WO | 2022261845 | A1 | 12/2022 | |

OTHER PUBLICATIONS

Sun, "Research on Probabilistic Shaping and Other Key Techniques for High Order Modulation Optical Communication System Based on LDPC Code," Thesis for the degree of Master of Engineering, Beijing University of Posts and Telecommunications, Jun. 2019, 77 pages (with English translation).

Technical Editor, "Implementation Agreement for 800ZR Coherent Interfaces," Physical and Link Layer (PLL) Working Group, Jun. 8, 2021, 95 pages.

International Search Report and Written Opinion in International Appln. No. PCT/CN2024/078100,2024, 19 pages (with English translation).

Zhang et al., "Real-Time FPGA Investigation of Interplay Between Probabilistic Shaping and Forward Error Correction," Journal of Lightwave Technology, Mar. 1, 2022, 40(5):1339-1345.

Extended European Search Report in European Appin. No. 24759733.9, mailed on Apr. 23, 2026, 10 pages.

* cited by examiner

Column

| Row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 7

| $T_{0,0}$ | $T_{0,1}$ | $T_{0,2}$ | $T_{0,3}$ | $T_{0,4}$ | $T_{0,5}$ | $T_{0,6}$ | $T_{0,7}$ |
|---|---|---|---|---|---|---|---|
| $T_{1,0}$ | $T_{1,1}$ | $T_{1,2}$ | $T_{1,3}$ | $T_{1,4}$ | $T_{1,5}$ | $T_{1,6}$ | $T_{1,7}$ |

FIG. 8

A shadowed bit is from a PCS processed bit

| Column \ Row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 213 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 9(a)

A shadowed bit is from a PCS processed bit

| Row \ Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 9(b)

Bits in a shadowed block are from PCS processed bits

| $B_{0,0}$ | $B_{0,1}$ | $B_{0,2}$ | $B_{0,3}$ | $B_{0,4}$ | $B_{0,5}$ | $B_{0,6}$ | $B_{0,7}$ |
|---|---|---|---|---|---|---|---|
| $B_{1,0}$ | $B_{1,1}$ | $B_{1,2}$ | $B_{1,3}$ | $B_{1,4}$ | $B_{1,5}$ | $B_{1,6}$ | $B_{1,7}$ |

FIG. 11(a)

Bits in a shadowed block are from PCS processed bits

| $B_{0,0}$ | $B_{0,1}$ | $B_{0,2}$ | $B_{0,3}$ | $B_{0,4}$ | $B_{0,5}$ | $B_{0,6}$ | $B_{0,7}$ |
|---|---|---|---|---|---|---|---|
| $B_{1,0}$ | $B_{1,1}$ | $B_{1,2}$ | $B_{1,3}$ | $B_{1,4}$ | $B_{1,5}$ | $B_{1,6}$ | $B_{1,7}$ |

FIG. 11(b)

Half of bits in such a shadowed block are from PCS processed bits

Half of bits in such a shadowed block are from PCS processed bits

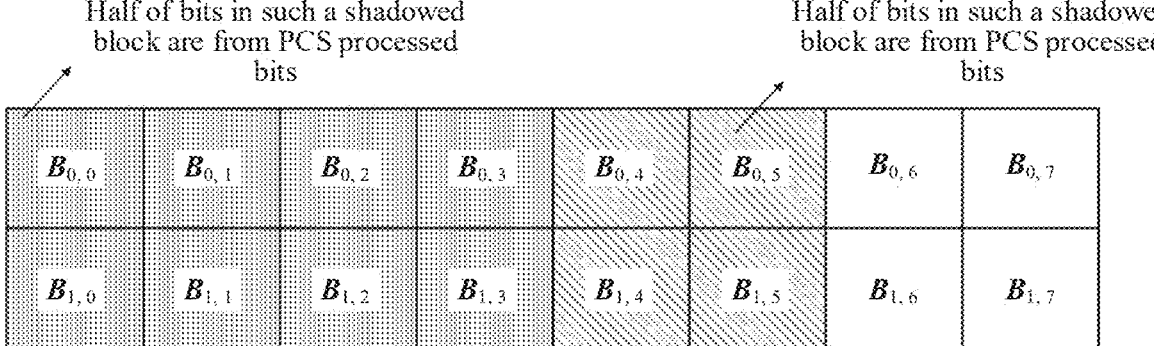

| $B_{0,0}$ | $B_{0,1}$ | $B_{0,2}$ | $B_{0,3}$ | $B_{0,4}$ | $B_{0,5}$ | $B_{0,6}$ | $B_{0,7}$ |
|---|---|---|---|---|---|---|---|
| $B_{1,0}$ | $B_{1,1}$ | $B_{1,2}$ | $B_{1,3}$ | $B_{1,4}$ | $B_{1,5}$ | $B_{1,6}$ | $B_{1,7}$ |

FIG. 11(c)

| (0,0) | (1,1) | (2,2) | (3,3) | (4,4) | (5,5) | (6,6) | (7,7) | (8,8) | (9,9) | (10,10) | (11,11) | (12,12) | (13,13) | (14,14) | (15,15) |
|---|---|---|---|---|---|---|---|---|---|---|---|---|---|---|---|
| (14,15) | (15,0) | (0,1) | (1,2) | (2,3) | (3,4) | (4,5) | (5,6) | (6,7) | (7,8) | (8,9) | (9,10) | (10,11) | (11,12) | (12,13) | (13,14) |
| (12,14) | (13,15) | (14,0) | (15,1) | (0,2) | (1,3) | (2,4) | (3,5) | (4,6) | (5,7) | (6,8) | (7,9) | (8,10) | (9,11) | (10,12) | (11,13) |
| (10,13) | (11,14) | (12,15) | (13,0) | (14,1) | (15,2) | (0,3) | (1,4) | (2,5) | (3,6) | (4,7) | (5,8) | (6,9) | (7,10) | (8,11) | (9,12) |
| (8,12) | (9,13) | (10,14) | (11,15) | (12,0) | (13,1) | (14,2) | (15,3) | (0,4) | (1,5) | (2,6) | (3,7) | (4,8) | (5,9) | (6,10) | (7,11) |
| (6,11) | (7,12) | (8,13) | (9,14) | (10,15) | (11,0) | (12,1) | (13,2) | (14,3) | (15,4) | (0,5) | (1,6) | (2,7) | (3,8) | (4,9) | (5,10) |
| (4,10) | (5,11) | (6,12) | (7,13) | (8,14) | (9,15) | (10,0) | (11,1) | (12,2) | (13,3) | (14,4) | (15,5) | (0,6) | (1,7) | (2,8) | (3,9) |
| (2,9) | (3,10) | (4,11) | (5,12) | (6,13) | (7,14) | (8,15) | (9,0) | (10,1) | (11,2) | (12,3) | (13,4) | (14,5) | (15,6) | (0,7) | (1,8) |
| (15,7) | (0,8) | (1,9) | (2,10) | (3,11) | (4,12) | (5,13) | (6,14) | (7,15) | (8,0) | (9,1) | (10,2) | (11,3) | (12,4) | (13,5) | (14,6) |
| (13,6) | (14,7) | (15,8) | (0,9) | (1,10) | (2,11) | (3,12) | (4,13) | (5,14) | (6,15) | (7,0) | (8,1) | (9,2) | (10,3) | (11,4) | (12,5) |
| (11,5) | (12,6) | (13,7) | (14,8) | (15,9) | (0,10) | (1,11) | (2,12) | (3,13) | (4,14) | (5,15) | (6,0) | (7,1) | (8,2) | (9,3) | (10,4) |
| (9,4) | (10,5) | (11,6) | (12,7) | (13,8) | (14,9) | (15,10) | (0,11) | (1,12) | (2,13) | (3,14) | (4,15) | (5,0) | (6,1) | (7,2) | (8,3) |
| (7,3) | (8,4) | (9,5) | (10,6) | (11,7) | (12,8) | (13,9) | (14,10) | (15,11) | (0,12) | (1,13) | (2,14) | (3,15) | (4,0) | (5,1) | (6,2) |
| (5,2) | (6,3) | (7,4) | (8,5) | (9,6) | (10,7) | (11,8) | (12,9) | (13,10) | (14,11) | (15,12) | (0,13) | (1,14) | (2,15) | (3,0) | (4,1) |
| (3,1) | (4,2) | (5,3) | (6,4) | (7,5) | (8,6) | (9,7) | (10,8) | (11,9) | (12,10) | (13,11) | (14,12) | (15,13) | (0,14) | (1,15) | (2,0) |
| (1,0) | (2,1) | (3,2) | (4,3) | (5,4) | (6,5) | (7,6) | (8,7) | (9,8) | (10,9) | (11,10) | (12,11) | (13,12) | (14,13) | (15,14) | (0,15) |

FIG. 14

| $I_{0,0}$ | $I_{0,1}$ | $I_{0,2}$ | $I_{0,3}$ | $I_{0,4}$ | $I_{0,5}$ | $I_{0,6}$ |
| $I_{1,0}$ | $I_{1,1}$ | $I_{1,2}$ | $I_{1,3}$ | $I_{1,4}$ | $I_{1,5}$ | $I_{1,6}$ |

| $I_{0,0}$ | $I_{0,1}$ | $I_{0,2}$ | $I_{0,3}$ | $I_{0,4}$ | $I_{0,5}$ | $I_{0,6}$ |
| $I_{1,0}$ | $I_{1,1}$ | $I_{1,2}$ | $I_{1,3}$ | $I_{1,4}$ | $I_{1,5}$ | $I_{1,6}$ |

| $I_{0,0}$ | $I_{0,1}$ | $I_{0,2}$ | $I_{0,3}$ | $I_{0,4}$ | $I_{0,5}$ | $I_{0,6}$ |
| $I_{1,0}$ | $I_{1,1}$ | $I_{1,2}$ | $I_{1,3}$ | $I_{1,4}$ | $I_{1,5}$ | $I_{1,6}$ |

Half of bits in such a shadowed block are from PCS processed bits 9 bits in each row of such a shadowed block are from PCS processed bits All bits in such a shadowed block are from PCS processed bits A shadowed bit is from a PCS processed bit

| Column | 0 | 1 | 2 | 3 | 4 | 5 | 6 | 7 | 8 | 9 | 10 | 11 | 12 | 13 | 14 | 15 |
|--------|---|---|---|---|---|---|---|---|---|---|----|----|----|----|----|----|
| Row 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 24(a)

A shadowed bit is from a PCS processed bit

| Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Row | | | | | | | | | | | | | | | | |
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 142 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 24(b)

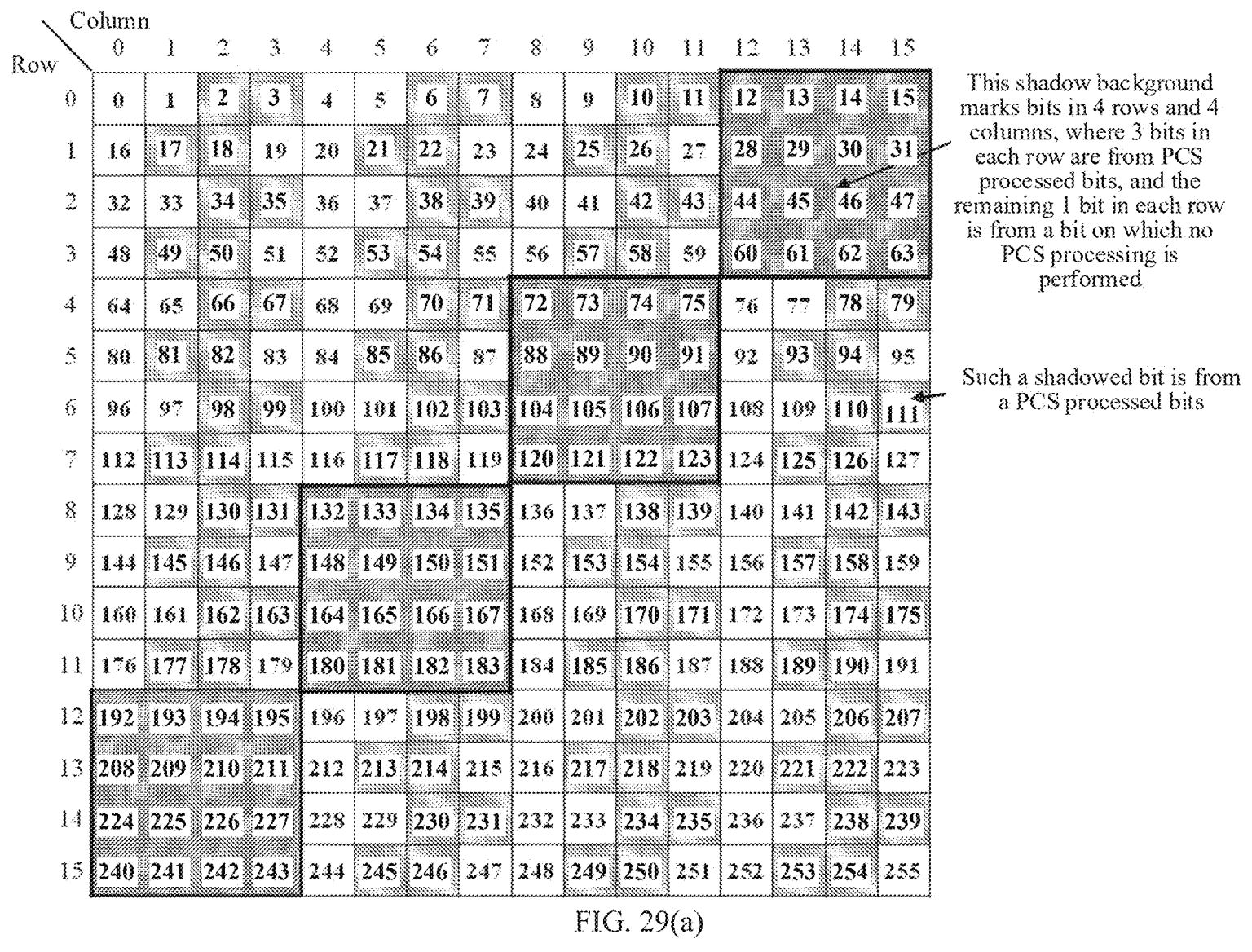

This shadow background marks bits in 4 rows and 4 columns, where 3 bits in each row are from PCS processed bits, and the remaining 1 bit in each row is from a bit on which no PCS processing is performed Such a shadowed bit is from a PCS processed bits

| Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Row 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 29(a)

A shadowed bit is from a PCS processed bit

| Row\Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 29(b)

A shadowed bit is from a
PCS processed bit

| Column Row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 29(c)

A shadowed bit is from a PCS processed bit

| Row \ Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 16 | 32 | 48 | 64 | 80 | 96 | 112 | 128 | 144 | 160 | 176 | 192 | 208 | 224 | 240 |
| 1 | 1 | 17 | 33 | 49 | 65 | 81 | 97 | 113 | 129 | 145 | 161 | 177 | 193 | 209 | 225 | 241 |
| 2 | 2 | 18 | 34 | 50 | 66 | 82 | 98 | 114 | 130 | 146 | 162 | 178 | 194 | 210 | 226 | 242 |
| 3 | 3 | 19 | 35 | 51 | 67 | 83 | 99 | 115 | 131 | 147 | 163 | 179 | 195 | 211 | 227 | 243 |
| 4 | 4 | 20 | 36 | 52 | 68 | 84 | 100 | 116 | 132 | 148 | 164 | 180 | 196 | 212 | 228 | 244 |
| 5 | 5 | 21 | 37 | 53 | 69 | 85 | 101 | 117 | 133 | 149 | 165 | 181 | 197 | 213 | 229 | 245 |
| 6 | 6 | 22 | 38 | 54 | 70 | 86 | 102 | 118 | 134 | 150 | 166 | 182 | 198 | 214 | 230 | 246 |
| 7 | 7 | 23 | 39 | 55 | 71 | 87 | 103 | 119 | 135 | 151 | 167 | 183 | 199 | 215 | 231 | 247 |
| 8 | 8 | 24 | 40 | 56 | 72 | 88 | 104 | 120 | 136 | 152 | 168 | 184 | 200 | 216 | 232 | 248 |
| 9 | 9 | 25 | 41 | 57 | 73 | 89 | 105 | 121 | 137 | 153 | 169 | 185 | 201 | 217 | 233 | 249 |
| 10 | 10 | 26 | 42 | 58 | 74 | 90 | 106 | 122 | 138 | 154 | 170 | 186 | 202 | 218 | 234 | 250 |
| 11 | 11 | 27 | 43 | 59 | 75 | 91 | 107 | 123 | 139 | 155 | 171 | 187 | 203 | 219 | 235 | 251 |
| 12 | 12 | 28 | 44 | 60 | 76 | 92 | 108 | 124 | 140 | 156 | 172 | 188 | 204 | 220 | 236 | 252 |
| 13 | 13 | 29 | 45 | 61 | 77 | 93 | 109 | 125 | 141 | 157 | 173 | 189 | 205 | 221 | 237 | 253 |
| 14 | 14 | 30 | 46 | 62 | 78 | 94 | 110 | 126 | 142 | 158 | 174 | 190 | 206 | 222 | 238 | 254 |
| 15 | 15 | 31 | 47 | 63 | 79 | 95 | 111 | 127 | 143 | 159 | 175 | 191 | 207 | 223 | 239 | 255 |

FIG. 29(d)

A shadowed bit is from a PCS processed bit

| Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Row 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 29(e)

A shadowed bit is from a PCS processed bit

| Row\Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 29(f)

This shadow background marks bits in 16 rows and 4 columns, where 3 bits in each row are from PCS processed bits, and the remaining 1 bit in each row is from a bit on which no PCS processing is performed

| Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Row 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 30(a)

A shadowed bit is from a PCS processed bit

| Row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 30(b)

A shadowed bit is from a PCS processed bit

| Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 30(c)

A shadowed bit is from a PCS processed bit

| Row \ Column | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 30(d)

A shadowed bit is from a
PCS processed bit

| Column | 0 | 1 | 2 | 3 | 4 | 5 | 6 | 7 | 8 | 9 | 10 | 11 | 12 | 13 | 14 | 15 |
|--------|---|---|---|---|---|---|---|---|---|---|----|----|----|----|----|----|
| Row 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | 100 | 101 | 102 | 103 | 104 | 105 | 106 | 107 | 108 | 109 | 110 | 111 |
| 7 | 112 | 113 | 114 | 115 | 116 | 117 | 118 | 119 | 120 | 121 | 122 | 123 | 124 | 125 | 126 | 127 |
| 8 | 128 | 129 | 130 | 131 | 132 | 133 | 134 | 135 | 136 | 137 | 138 | 139 | 140 | 141 | 142 | 143 |
| 9 | 144 | 145 | 146 | 147 | 148 | 149 | 150 | 151 | 152 | 153 | 154 | 155 | 156 | 157 | 158 | 159 |
| 10 | 160 | 161 | 162 | 163 | 164 | 165 | 166 | 167 | 168 | 169 | 170 | 171 | 172 | 173 | 174 | 175 |
| 11 | 176 | 177 | 178 | 179 | 180 | 181 | 182 | 183 | 184 | 185 | 186 | 187 | 188 | 189 | 190 | 191 |
| 12 | 192 | 193 | 194 | 195 | 196 | 197 | 198 | 199 | 200 | 201 | 202 | 203 | 204 | 205 | 206 | 207 |
| 13 | 208 | 209 | 210 | 211 | 212 | 213 | 214 | 215 | 216 | 217 | 218 | 219 | 220 | 221 | 222 | 223 |
| 14 | 224 | 225 | 226 | 227 | 228 | 229 | 230 | 231 | 232 | 233 | 234 | 235 | 236 | 237 | 238 | 239 |
| 15 | 240 | 241 | 242 | 243 | 244 | 245 | 246 | 247 | 248 | 249 | 250 | 251 | 252 | 253 | 254 | 255 |

FIG. 30(e)

A shadowed bit is from a PCS processed bit

FIG. 30(f)

DATA PROCESSING METHOD AND DATA PROCESSING APPARATUS

CROSS-REFERENCE TO RELATED APPLICATIONS

This application is a continuation of International Application No. PCT/CN2024/078100, filed on Feb. 22, 2024, which claims priorities to Chinese Patent Application No. 202310206681.6, filed on Feb. 25, 2023, Chinese Patent Application No. 202310359894.2, filed on Mar. 28, 2023, Chinese Patent Application No. 202310491179.4, filed on Apr. 28, 2023, and Chinese Patent Application No. 202311055979.8, filed on Aug. 18, 2023. All of the aforementioned patent applications are hereby incorporated by reference in their entireties.

TECHNICAL FIELD

This application relates to the communication field, and in particular, to a data processing method and a data processing apparatus.

BACKGROUND

Under continuous promotion of 5G, cloud computing, big data, artificial intelligence, and other technologies, high-speed optical transport networks are becoming high capacity, packet-based, and intelligent. A coherent optical communication system uses amplitudes, phases, polarization, and frequencies of light waves to carry information. To resist optical signal distortion caused by dispersion, polarization-dependent impairment, noise, a non-linear effect, and other factors during transmission and maintain long-distance transmission, the coherent optical communication system typically needs to use an efficient forward error correction (Forward Error Correction, FEC) code to resist optical impairment during optical transmission, to ensure a bit error rate low enough during long-distance transmission. For example, an open FEC (OpenFEC) code, which is referred to as an OFEC code for short, currently adopted in 400ZR+ and 800ZR has an overhead (overhead, OH) of 15.3%. When soft-decision decoding is used, performance is approximately 2.0E-2 of performance before correction.

To improve spectral efficiency, multi-level quadrature amplitude modulation (Quadrature Amplitude Modulation, QAM), for example, 16QAM, 32QAM, 64QAM, or even higher-order QAM is usually used. Constellation points (constellation points) on a signal constellation diagram corresponding to conventional QAM modulation appear at a same probability. A probabilistic constellation shaping (Probabilistic Constellation Shaping, PCS) technology changes an occurrence probability of a constellation point while a position of the constellation point remains unchanged, so that constellation points are not evenly distributed, to improve system transmission performance. As a modulation format optimization technology, the PCS technology has been widely studied and applied due to advantages such as approaching the Shannon limit and being flexible. Because an existing data processing and transmission method using OFEC encoding mainly uses conventional QAM modulation, the existing data processing and transmission method is not applicable to future scenarios in which the PCS technology is used. This is a problem to be urgently resolved in the future.

SUMMARY

Embodiments of this application provide a data processing method and a data processing apparatus, to use FEC encoding in combination with a PCS technology for a longer transmission distance. In this way, an overall data processing operation is simpler, complexity is lower, and power consumption is lower. Therefore, overall performance is improved.

According to a first aspect, an embodiment of this application provides a data processing method. The data processing method includes the following steps: performing PCS processing on a first bit set in k bits, to obtain a second bit set, where k is an integer greater than 1; performing FEC encoding on the second bit set and a third bit set in the k bits excluding the first bit set, to obtain a fourth bit set, where the fourth bit set includes $m_0$ first bit subsets, each of the first bit subsets includes $F_0$ bits, $m_0$ is an integer greater than 1, and $F_0$ is an even number greater than 1; and performing first interleaving processing on the fourth bit set to obtain a fifth bit set, where the fifth bit set includes $m_0$ second bit subsets, each of the second bit subsets includes $F_0$ bits, $F_0/2$ bits in each of the second bit subsets are from the second bit set, and the other $F_0/2$ bits in each of the second bit subsets are from the third bit set and/or parity bits of the FEC encoding.

In this implementation, for future metro telecommunication transmission and metro DCI interconnection scenarios, FEC encoding is used in combination with a PCS technology to satisfy a requirement for a longer transmission distance. Due to introduction of the PCS processing, during symbol mapping, sign bits (sign bits) being 0 and 1 mapped to one modulation symbol need to be equiprobable, and amplitude bits (amplitude bits) being 0 and 1 mapped to one modulation symbol need to be non-equiprobable. OFEC encoding is specifically used as an example for FEC encoding. To avoid impact on existing OFEC encoding and OFEC interleavers, a new interleaver needs to be introduced after OFEC encoding and before a symbol mapping operation, so that a PCS processed bit that is non-equiprobable in being 0 and 1 can be mapped to an amplitude bit of a modulation symbol. In this way, an occurrence probability of a constellation point is changed while a position of the constellation point remains unchanged, so that constellation points are not evenly distributed, to improve overall performance, so as to satisfy a requirement for a longer transmission distance in the future. In addition, an implementation is simple, complexity is low, and power consumption is low.

In some possible implementations, where $F_0$ bits in each of the second bit subsets are distributed in $F_1$ rows and $F_1$ columns, $F_1/2$ bits of $F_1$ bits in each row of the second bit subset are from the second bit set, the second bit set includes $m_0 \times F_0/2$ bits, and the other $F_1/2$ bits of the $F_1$ bits in each row of the second bit subset are from the third bit set and/or the parity bits of the FEC encoding.

In some possible implementations, $F_0=256$, $F_1=16$, and a bit in row $i_2$ and column $$\left(\left\lfloor \frac{j_2}{2} \right\rfloor \times 4 + j_2 \% 2 + i_2 + 2\right) \% 16$$

of the second bit subset is from the second bit set, where $0 \leq i_2 < 16$ and $0 \leq j_2 < 8$; or a bit in row $i_2$ and column $(j_2 \times 2 - i_2 \% 2 + 1)$ of the second bit subset is from the second bit set, where $0 \leq i_2 < 16$ and $0 \leq j_2 < 8$, where $\lfloor a \rfloor$ represents performing a floor operation on a, and b % c represents b modulo c.

In some possible implementations, $F_0=256$, a total of $m_1 \times 256$ bits in my first bit subsets in the fourth bit set are from the second bit set, and $m_0 = m_1 \times 2$.

In some possible implementations, $F_0=256$, $m_0\times256$ bits in the fourth bit set are distributed in 32 rows and $m_0\times8$ columns, $m_0\times256$ bits in the fifth bit set are distributed in 32 rows and $m_0\times8$ columns, and $m_0\times8$ bits in row $r_1$ of the fifth bit set are from $m_0\times8$ bits in row $r_0$ of the fourth bit set, where $0\leq r_0<32$ and $0\leq r_1<32$.

In some possible implementations, the $m_0$ first bit subsets are distributed in two rows and $m_1$ columns, where first bit subset $B_{0,m_2}$ in row 0 and column $m_2$ and first bit subset $B_{1,m_2}$ in row 1 and column $m_2$ are from the second bit set, and $0\leq m_2<m_1/2$.

In some possible implementations, bit $$\left(\left\lfloor\frac{\tilde{c}_0}{2}\right\rfloor\times4+\tilde{c}_0\%2+(r_1+2)\%4\right)\%(m_0\times8)$$

in $m_0\times8$ bits in row $r_1$ of the fifth bit set is from 1 bit in bit 0 to bit $(m_0\times4-1)$ in row $r_0$ of the fourth bit set, where $0\leq\tilde{c}_0<(m_0\times4)$, $\lfloor a\rfloor$ represents performing a floor operation on a, and $b\%c$ represents b modulo c.

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1=(c\%\theta+(r_1+4\times\Delta)\%\beta)\%\theta+\left\lfloor\frac{c}{\theta}\right\rfloor\times\theta,$$

where $0\leq c_0<(m_0\times8)$, $0\leq c_1<(m_0\times8)$, $\theta$ is an integer multiple of 4 and $m_0\times8$ is exactly divisible by $\theta$, $\Delta$ is an integer, $\beta$ is an integer multiple of 4, and $$c=\left\lfloor\frac{c_0\%(m_0\times4)}{2}\right\rfloor\times4+c_0\%2+2\times\left(1-\left\lfloor\frac{c_0}{(m_0\times4)}\right\rfloor\right).$$

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1=(c\%\theta+(r_1+2+4\times\Delta)\%\beta)\%\theta+\left\lfloor\frac{c}{\theta}\right\rfloor\times\theta,$$

where $0\leq c_0<(m_0\times8)$, $0\leq c_1<(m_0\times8)$, $\theta$ is an integer multiple of 4 and $m_0\times8$ is exactly divisible by $\theta$, $\Delta$ is an integer, $\beta$ is an integer multiple of 4, and $$c=\left\lfloor\frac{c_0\%(m_0\times4)}{2}\right\rfloor\times4+c_0\%2+2\times\left\lfloor\frac{c_0}{(m_0\times4)}\right\rfloor.$$

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1=(c\%\theta+(r_1+4\times\Delta)\%\beta)\%\theta+\left\lfloor\frac{c}{\theta}\right\rfloor\times\theta,$$

where $0\leq c_0<(m_0\times8)$, $0\leq c_1<(m_0\times8)$, $\theta$ is an integer multiple of 4 and $m_0\times8$ is exactly divisible by $\theta$, $\Delta$ is an integer, $\beta$ is an integer multiple of 4, and $$c=\left\lfloor\frac{c_0\%8}{2}\right\rfloor\times4+c_0\%2+2\times\left(1-\left\lfloor\frac{c_0}{(m_0\times4)}\right\rfloor\right)+$$
$$\left\lfloor\frac{c_0\%(m_0\times4)}{16}\right\rfloor\times16+\left\lfloor\frac{c_0\%16}{8}\right\rfloor\times(m_0\times4).$$

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1=(c\%\theta+(r_1+2+4\times\Delta)\%\beta)\%\theta+\left\lfloor\frac{c}{\theta}\right\rfloor\times\theta,$$

where $0\leq c_0<(m_0\times8)$, $0\leq c_1<(m_0\times8)$, $\theta$ is an integer multiple of 4 and $m_0\times8$ is exactly divisible by $\theta$, $\Delta$ is an integer, $\beta$ is an integer multiple of 4, and $$c=\left\lfloor\frac{c_0\%8}{2}\right\rfloor\times4+c_0\%2+2\times\left\lfloor\frac{c_0}{(m_0\times4)}\right\rfloor+$$
$$\left\lfloor\frac{c_0\%(m_0\times4)}{16}\right\rfloor\times16+\left\lfloor\frac{c_0\%16}{8}\right\rfloor\times(m_0\times4).$$

In some possible implementations, bit $(\tilde{c}_0\times2-i_2\%2+1)$ in $m_0\times8$ bits in row $r_1$ of the fifth bit set is from 1 bit in bit 0 to bit $(m_0\times4-1)$ in row $r_0$ of the fourth bit set, where $0\leq\tilde{c}_0<(m_0\times4)$.

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1=(c\%\theta+(r_1+2\times\Delta)\%\beta)\%\theta+\left\lfloor\frac{c}{\theta}\right\rfloor\times\theta,$$

where $0\leq c_0<(m_0\times8)$, $0\leq c_1<(m_0\times8)$, $\theta$ is an integer multiple of 4 and $m_0\times8$ is exactly divisible by $\theta$, $\Delta$ is an integer, $\beta$ is an integer multiple of 2, and $$c=c_0\%(m_0\times4)\times2+\left(1-\left\lfloor\frac{c_0}{(m_0\times4)}\right\rfloor\right).$$

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1=(c\%\theta+(r_1+1+2\times\Delta)\%\beta)\%\theta+\left\lfloor\frac{c}{\theta}\right\rfloor\times\theta,$$

where $0\leq c_0<(m_0\times8)$, $0\leq c_1<(m_0\times8)$, $\theta$ is an integer multiple of 4 and $m_0\times8$ is exactly divisible by $\theta$, $\Delta$ is an integer, $\beta$ is an integer multiple of 2, and $$c=c_0\%(m_0\times4)\times2+\left\lfloor\frac{c_0}{(m_0\times4)}\right\rfloor.$$

In some possible implementations, bit $c_1$ in the $m_0\times8$ bits in row $r_1$ of the fifth bit set is from bit $c_0$ in $m_0\times8$ bits in row $r_0$ of the fourth bit set; and $$c_1 = (c \ \% \ \theta + (r_1 + 2 \times \Delta)\% \ \beta)\% \ \theta + \left\lfloor \frac{c}{\theta} \right\rfloor \times \theta,$$

where $0 \leq c_0 < (m_0 \times 8)$, $0 \leq c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = (c_0 \ \%8) \times 2 + \left(1 - \left\lfloor \frac{c_0}{(m_0 \times 4)} \right\rfloor\right) +$$
$$16 \times \left\lfloor \frac{c_0 \ \%(m_0 \times 4)}{16} \right\rfloor + (m_0 \times 4) \times \left\lfloor \frac{c_0 \ \%16}{8} \right\rfloor.$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 1 + 2 \times \Delta)\% \ \beta)\% \ \theta + \left\lfloor \frac{c}{\theta} \right\rfloor \times \theta,$$

where $0 \leq c_0 < (m_0 \times 8)$, $0 \leq c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = (c_0 \ \%8) \times 2 + \left\lfloor \frac{c_0}{(m_0 \times 4)} \right\rfloor + 16 \times \left\lfloor \frac{c_0 \ \%(m_0 \times 4)}{16} \right\rfloor + (m_0 \times 4) \times \left\lfloor \frac{c_0 \ \%16}{8} \right\rfloor.$$

In some possible implementations, the performing FEC encoding on the second bit set and a third bit set in the k bits excluding the first bit set, to obtain a fourth bit set includes: performing pre-encoding interleaving processing on the second bit set and the third bit set to obtain a sixth bit set, where a quantity of bits in the sixth bit set is equal to a sum of a quantity of bits in the second bit set and a quantity of bits in the third bit set, the sixth bit set includes $m_3$ third bit subsets, the $m_3$ third bit subsets are distributed in two rows and $m_4$ columns, $m_3 = 2 \times m_4$, and $m_3$ is an integer greater than 1 and less than $m_0$, where some third bit subsets each includes $F_0$ bits, the other third bit subsets each includes $F_2$ bits, and $F_2$ is an even number greater than 1 and less than $F_0$; and performing the FEC encoding on the sixth bit set to obtain the fourth bit set.

In some possible implementations, $m_3 = 14$, $m_4 = 7$, $F_0 = 256$, and $F_2 = 240$, each third bit subset in column 0 to column 5 includes 16 bits in 16 rows and 16 columns, and each third bit subset in column 6 includes bits in 16 rows and 15 columns, where bits in the third bit subset in column 0, the third bit subset in column 1, the third bit subset in column 4, and the third bit subset in column 5 are from the second bit set; and bits in the third bit subset in column 2, the third bit subset in column 3, and the third bit subset in column 6 are from the third bit set.

In some possible implementations, the $m_0$ first bit subsets are distributed in two rows and $m_1$ columns, $m_0 = 16$, and $m_1 = 8$, where first bit subset $B_{0,0}$ in row 0 and column 0, first bit subset $B_{0,1}$ in row 0 and column 1, first bit subset $B_{0,4}$ in row 0 and column 4, first bit subset $B_{0,5}$ in row 0 and column 5, first bit subset $B_{1,0}$ in row 1 and column 0, first bit subset $B_{1,1}$ in row 1 and column 1, first bit subset $B_{1,4}$ in row 1 and column 4, and first bit subset $B_{1,5}$ in row 1 and column 5 are from the second bit set.

In some possible implementations, bit $$\left(\left\lfloor \frac{\tilde{c}_0}{2} \right\rfloor \times 4 + \tilde{c}_0 \ \%2 + (r_1 + 2)\%4 \right)\%128$$

in 128 bits in row $r_1$ of the fifth bit set is from 1 bit in bit 0 to bit 31 or bit 64 to bit 95 in row $r_0$ of the fourth bit set, where $0 \leq \tilde{c}_0 < 64$, $\lfloor a \rfloor$ represents performing a floor operation on a, and b % c represents b modulo c.

In some possible implementations, bit $c_1$ in the 128 bits in row $r_1$ of the fifth bit set is from bit $c_0$ in 128 bits in row $r_0$ of the fourth bit set; and $$c_1 = (c \ \% \ \theta + (r_1 + 4 \times \Delta)\% \ \beta)\% \ \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \%32}{2} \right\rfloor \times 4 + c_0 \ \%2 + \left(1 - \left\lfloor \frac{c_0}{32} \right\rfloor \%2\right) \times 2 + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c \ \% \ \theta + (r_1 + 2 + 4 \times \Delta)\% \ \beta)\% \ \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \%32}{2} \right\rfloor \times 4 + c_0 \ \%2 + \left(\left\lfloor \frac{c_0}{32} \right\rfloor \%2\right) \times 2 + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c \ \% \ \theta + (r_1 + 4 \times \Delta)\% \ \beta)\% \ \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \% \ 8}{2} \right\rfloor \times 4 + c_0 \ \% \ 2 + \left(1 - \left\lfloor \frac{c_0}{32} \right\rfloor \ \% \ 2\right) \times 2 + \left\lfloor \frac{c_0}{64} \right\rfloor \times 64 + \left\lfloor \frac{c_0 \ \% \ 16}{8} \right\rfloor \times 32 + \left(\left\lfloor \frac{c_0}{16} \right\rfloor \ \% \ 2\right) \times 16.$$

In some possible implementations, bit $c_1$ in the 128 bits in row $r_1$ of the fifth bit set is from bit $c_0$ in 128 bits in row $r_0$ of the fourth bit set; and $$c_1 = (c \ \% \ \theta + (r_1 + 2 + 4 \times \Delta) \ \% \ \beta) \ \% \ \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \% 8}{2} \right\rfloor \times 4 + c_0 \% 2 + \left( \left\lfloor \frac{c_0}{32} \right\rfloor \% 2 \right) \times 2 +$$

$$\left\lfloor \frac{c_0}{64} \right\rfloor \times 64 + \left\lfloor \frac{c_0 \% 16}{8} \right\rfloor \times 32 + \left( \left\lfloor \frac{c_0}{16} \right\rfloor \% 2 \right) \times 16.$$

In some possible implementations, bit $(\tilde{c}_0 \times 2 - i_2 \% 2 + 1)$ in 128 bits in row $r_1$ of the fifth bit set is from 1 bit in bit 0 to bit 31 or bit 64 to bit 95 in row $r_0$ of the fourth bit set, where $0 \leq \tilde{c}_0 < 64$.

In some possible implementations, bit $c_1$ in the 128 bits in row $r_1$ of the fifth bit set is from bit $c_0$ in 128 bits in row $r_0$ of the fourth bit set; and $$c_1 = (c \% \theta + (r_1 + 2 \times \Delta) \% \beta) \% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% 32) \times 2 + \left( 1 - \left( \left\lfloor \frac{c_0}{32} \right\rfloor \% 2 \right) \right) + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c \% \theta + (r_1 + 1 + 2 \times \Delta) \% \beta) \% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% 32) \times 2 + \left( \left\lfloor \frac{c_0}{32} \right\rfloor \% 2 \right) + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c \% \theta + (r_1 + 2 \times \Delta) \% \beta) \% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% 8) \times 2 + \left( 1 - \left( \left\lfloor \frac{c_0}{32} \right\rfloor \% 2 \right) \right) +$$

$$\left\lfloor \frac{c_0}{64} \right\rfloor \times 64 + \left\lfloor \frac{c_0 \% 16}{8} \right\rfloor \times 32 + \left( \left\lfloor \frac{c_0}{16} \right\rfloor \% 2 \right) \times 16.$$

In some possible implementations, bit $c_1$ in the 128 bits in row $r_1$ of the fifth bit set is from bit $c_0$ in 128 bits in row $r_0$ of the fourth bit set; and $$c_1 = (c \% \theta + (r_1 + 1 + 2 \times \Delta) \% \beta) \% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% 8) \times 2 + \left( \left\lfloor \frac{c_0}{32} \right\rfloor \% 2 \right) +$$

$$\left\lfloor \frac{c_0}{64} \right\rfloor \times 64 + \left\lfloor \frac{c_0 \% 16}{8} \right\rfloor \times 32 + \left( \left\lfloor \frac{c_0}{16} \right\rfloor \% 2 \right) \times 16.$$

In some possible implementations, $m_3 = 14$, $m_4 = 7$, $F_0 = 256$, $F_2 = 240$, each third bit subset in column 0 to column 5 includes bits in 16 rows and 16 columns, each third bit subset in column 6 includes bits in 16 rows and 15 columns, $F_0/2$ bits in each third bit subset in column 0 to column 3 are from the second bit set, the other $F_0/2$ bits in each third bit subset in column 0 to column 3 are from the third bit set, $F_0$ bits in each third bit subset in column 4 and column 5 are from the second bit set, and $F_2$ bits in each third bit subset in column 6 are from the third bit set.

In some possible implementations, a bit in row $i_1$ and column $$\left( \left\lfloor \frac{j_1}{2} \right\rfloor \times 4 + j_1 \% 2 + 2 - i_1 \% 2 \right)$$

in a third bit subset in row $i_0$ and column $j_0$ is from the second bit set; or a bit in row $i_1$ and column $(j_1 \times 2)$ in a third bit subset in row $i_0$ and column $j_0$ is from the second bit set, where $0 \leq i_0 < 2$, $0 \leq j_0 < 4$, $0 \leq i_1 < 16$, $0 \leq j_1 < 8$, $\lfloor a \rfloor$ represents performing a floor operation on a, and b % c represents b modulo c.

In some possible implementations, the $m_0$ first bit subsets are distributed in two rows and $m_1$ columns, $m_0 = 16$, $m_1 = 8$, where $F_0/2$ bits in each first bit subset in column 0 to column 3 are from the second bit set, and the other $F_0/2$ bits in each first bit subset in column 0 to column 3 are from the third bit set; $F_0$ bits in each first bit subset in column 4 and column 5 are from the second bit set; and $F_0$ bits in each first bit subset in column 6 and column 7 are from the third bit set and/or the parity bits of the FEC encoding.

In some possible implementations, the performing first interleaving processing on the fourth bit set to obtain a fifth bit set includes: performing first interleaving processing on first bit subsets in column 4 to column 7 of the fourth bit set to obtain corresponding second bit subsets in column 4 to column 7 in the fifth bit set.

In some possible implementations, bit $$64 + \left( \left\lfloor \frac{\tilde{c}_0}{2} \right\rfloor \times 4 + \tilde{c}_0 \% 2 + (r_1 + 2) \% 4 \right)$$

in 128 bits in row $r_1$ of the fifth bit set is from 1 bit in bit 64 to bit 95 in row $r_0$ of the fourth bit set, where $0 \leq \tilde{c}_0 < 31$, $\lfloor a \rfloor$ represents performing a floor operation on a, and b % c represents b modulo c.

In some possible implementations, when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c \% \theta + (r_1 + 4 \times \Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( 1 - \left\lfloor \frac{c_0}{32} \right\rfloor \% 2 \right) \times 2 + 64;$$

or when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c \% \theta + (r_1 + 2 + 4 \times \Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( \left\lfloor \frac{c_0}{32} \right\rfloor \% 2 \right) \times 2 + 64;$$

or when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c \% \theta + (r_1 + 4 \times \Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 8}{2} \right\rfloor \times 4 + c_0 \% 2 + \left( 1 - \left\lfloor \frac{c_0}{32} \right\rfloor \% 2 \right) \times 2 + 64 + \left\lfloor \frac{c_0 \% 16}{8} \right\rfloor \times 32 + \left( \left\lfloor \frac{c_0}{16} \right\rfloor \% 2 \right) \times 16;$$

or when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c \% \theta + (r_1 + 2 + 4 \times \Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 8}{2} \right\rfloor \times 4 + c_0 \% 2 + \left( \left\lfloor \frac{c_0}{32} \right\rfloor \% 2 \right) \times 2 + 64 + \left\lfloor \frac{c_0 \% 16}{8} \right\rfloor \times 32 + \left( \left\lfloor \frac{c_0}{16} \right\rfloor \% 2 \right) \times 16.$$

In some possible implementations, $m_3 = 14$, $m_4 = 7$, $F_0 = 256$, and $F_2 = 240$, each third bit subset in column 0 to column 5 includes bits in 16 rows and 16 columns, and each third bit subset in column 6 includes bits in 16 rows and 15 columns; $F_0/2$ bits in each third bit subset in column 0 to column 4 are from the second bit set; the other $F_0/2$ bits in each third bit subset in column 0 to column 4 are from the third bit set; third bit subset $I_{0,5}$ in row 0 and column 5, third bit subset $I_{1,5}$ in row 1 and column 5, bits in column 0 to column 7 in third bit subset $I_{0,6}$ in row 0 and column 6, and bits in column 0 to column 7 in third bit subset $I_{1,6}$ in row 1 and column 6 are from the second bit set; and bits in column 8 to column 14 in third bit subset $I_{0,6}$ in row 0 and column 6, and bits in column 8 to column 14 in third bit subset $I_{1,6}$ in row 1 and column 6 are from the third bit set.

In some possible implementations, a bit in row $i_1$ and column $$\left( \left\lfloor \frac{j_1}{2} \right\rfloor \times 4 + j_1 \% 2 + 2 - i_1 \% 2 \right)$$

in a third bit subset in row $i_0$ and column $j_0$ is from the second bit set; or a bit in row $i_1$ and column $(j_1 \times 2)$ in a third bit subset in row $i_0$ and column $j_0$ is from the second bit set, where $0 \leq i_0 < 2$, $0 \leq j_0 < 5$, $0 \leq i_1 < 16$, $0 \leq j_1 < 8$, $\lfloor a \rfloor$ represents performing a floor operation on $a$, and $b \% c$ represents $b$ modulo $c$.

In some possible implementations, the $m_0$ first bit subsets are distributed in two rows and $m_1$ columns, $m_0 = 16$, $m_1 = 8$, where $F_0/2$ bits in each first bit subset in column 0 to column 4 are from the second bit set, and the other $F_0/2$ bits in each first bit subset in column 0 to column 4 are from the third bit set; first bit subset $B_{0,5}$ in row 0 and column 5, first bit subset $B_{1,5}$ in row 1 and column 5, $8 \times 8$ bits in row 0 to row 7 and column 0 to column 7 in first bit subset $B_{0,6}$ in row 0 and column 6, $8 \times 8$ bits in row 8 to row 15 and column 8 to column 15 in first bit subset $B_{0,6}$ in row 0 and column 6, $8 \times 8$ bits in row 0 to row 7 and column 0 to column 7 in first bit subset $B_{1,6}$ in row 1 and column 6, and $8 \times 8$ bits in row 8 to row 15 and column 8 to column 15 in first bit subset $B_{1,6}$ in row 1 and column 6 are from the second bit set; and first bit subset $B_{0,7}$ in row 0 and column 7, first bit subset $B_{1,7}$ in row 1 and column 7, $8 \times 8$ bits in row 0 to row 7 and column 8 to column 15 in first bit subset $B_{0,6}$ in row 0 and column 6, $8 \times 8$ bits in row 8 to row 15 and column 0 to column 7 in first bit subset $B_{0,6}$ in row 0 and column 6, $8 \times 8$ bits in row 0 to row 7 and column 8 to column 15 in first bit subset $B_{1,6}$ in row 1 and column 6, and $8 \times 8$ bits in row 8 to row 15 and column 0 to column 7 in first bit subset $B_{1,6}$ in row 1 and column 6 are from the third bit set and/or the parity bits of the FEC encoding.

In some possible implementations, the performing first interleaving processing on the fourth bit set to obtain a fifth bit set includes: performing first interleaving processing on first bit subsets in column 5 to column 7 of the fourth bit set to obtain corresponding second bit subsets in column 5 to column 7 in the fifth bit set.

In some possible implementations, when $$0 \le \left\lfloor \frac{r_0}{16} \right\rfloor < 8, \text{ bit } 80 + \left( \left\lfloor \frac{z_0}{2} \right\rfloor \times 4 + z_0 \text{ \% } 2 + (r_1 + 2)\% \text{ } 4 \right) \text{ \% } 48$$

in 128 bits in row $r_1$ of the fifth bit set is from 1 bit in bit 80 to bit 103 in row $r_0$ of the fourth bit set; or when $$8 \le \left\lfloor \frac{r_0}{16} \right\rfloor < 16, \text{ bit } 80 + \left( \left\lfloor \frac{z_0}{2} \right\rfloor \times 4 + z_0 \text{ \% } 2 + (r_1 + 2)\% \text{ } 4 \right) \text{ \% } 48$$

in 128 bits in row $r_1$ of the fifth bit set is from 1 bit in bit 80 to bit 95 and bit 104 to bit 111 in row $r_0$ of the fourth bit set $$8 \le \left\lfloor \frac{r_0}{16} \right\rfloor < 16,$$

where $0 \le z_0 < 24$, $\lfloor a \rfloor$ represents performing a floor operation on a, and b % c represents b modulo c.

In some possible implementations, when $0 \le c_1 < 80$, bit $c_1$ in the 128 bits in row $r_1$ of the fifth bit set is from bit $c_1$ in 128 bits in row $r_0$ of the fourth bit set; or when $80 \le c_1 < 128$, bit $c_1$ in the 128 bits in row $r_1$ of the fifth bit set is from bit $80+c_0$ in 128 bits in row $r_0$ of the fourth bit set; and $$c_1 = 80 + (c \text{ \% } \theta + (r_1 + 4 \times \Delta)\% \text{ } \beta)\% \text{ } \theta) + \left\lfloor \frac{c}{\theta} \right\rfloor \times \theta,$$

where $0 \le c_0 < 48$, $80 \le c_1 < 128$, $\theta$ is an integer multiple of 4 and 48 is exactly divisible by $\theta$, $\Delta$ is an integer, $\beta$ is an integer multiple of 4, and $$c = \left\lfloor \frac{c_2 \text{ \% } 24}{2} \right\rfloor \times 4 + c_2 \text{ \% } 2 + \left(1 - \left\lfloor \frac{c_2}{24} \right\rfloor\right) \times 2, \, c_2 = (r_0 \text{ \% } 16)^\wedge c_0;$$

or when $0 \le c_1 < 80$, bit $c_1$ in the 128 bits in row $r_1$ of the fifth bit set is from bit cy in 128 bits in row $r_0$ of the fourth bit set; or when $80 \le c_1 < 128$, bit $c_1$ in the 128 bits in row $r_1$ of the fifth bit set is from bit $80+c_0$ in 128 bits in row $r_0$ of the fourth bit set; and $$c_1 = 80 + (c \text{ \% } \theta + (r_1 + 4 \times \Delta)\% \text{ } \beta)\% \text{ } \theta) + \left\lfloor \frac{c}{\theta} \right\rfloor \times \theta,$$

where $0 \le c_0 < 48$, $80 \le c_1 < 128$, $\theta$ is an integer multiple of 4 and 48 is exactly divisible by $\theta$, $\Delta$ is an integer, $\beta$ is an integer multiple of 4, and $$c = \left\lfloor \frac{c_2 \text{ \% } 24}{2} \right\rfloor \times 4 + c_2 \text{ \% } 2 + \left(\left\lfloor \frac{c_2}{24} \right\rfloor\right) \times 2, \, c_2 = (r_0 \text{ \% } 16)^\wedge c_\theta.$$

In some possible implementations, $m_3=14$, $m_4=7$, $F_0=256$, and $F_2=240$; each third bit subset in column 0 to column 5 includes bits in 16 rows and 16 columns, and each third bit subset in column 6 includes bits in 16 rows and 15 columns; $F_0/2$ bits in each third bit subset in column 0 to column 4 are from the second bit set, and the other $F_0/2$ bits in each third bit subset in column 0 to column 4 are from the third bit set; 9 bits in each row of each third bit subset in column 5 are from the second bit set, and the other 7 bits in each row of each third bit subset in column 5 are from the third bit set; and $F_2$ bits in each third bit subset in column 6 are from the second bit set.

In some possible implementations, the $m_0$ first bit subsets are distributed in two rows and $m_1$ columns, $m_0=16$, and $m_1=8$, where $F_0/2$ bits in each first bit subset in column 0 to column 4 are from the second bit set, and the other $F_0/2$ bits in each first bit subset in column 0 to column 4 are from the third bit set; 9 bits in each row of each first bit subset in column 5 are from the second bit set, and the other 7 bits in each row of each first bit subset in column 5 are from the third bit set; a bit in row $i_1$ and column $15-i_1$ of each first bit subset in column 6 is from the parity bits of the FEC encoding, and remaining bits in each first bit subset in column 6 other than the bit in row $i_1$ and column $15-i_1$ are from the second bit set, where $0 \le i_1 \le 15$; and $F_0$ bits in each first bit subset in column 7 are from the parity bits of the FEC encoding.

In some possible implementations, the performing first interleaving processing on the fourth bit set to obtain a fifth bit set includes: performing the first interleaving processing on column C to column 15 of first bit subset $B_{0,5}$ in row 0 and column 5, column C to column 15 of first bit subset $B_{1,5}$ in row 0 and column 5, first bit subset $B_{0,6}$ in row 0 and column 6, first bit subset $B_{0,7}$ in row 0 and column 7, first bit subset $B_{1,6}$ in row 1 and column 6, and first bit subset $B_{1,6}$ in row 1 and column 6, to obtain corresponding column C to column 15 of second bit subset $T_{0,5}$ in row 0 and column 5, column C to column 15 of second bit subset $T_{1,5}$ in row 0 and column 5, second bit subset $T_{0,6}$ in row 0 and column 6, second bit subset $T_{0,7}$ in row 0 and column 7, second bit subset $T_{1,6}$ in row 1 and column 6, and second bit subset $T_{1,6}$ in row 1 and column 6, where $0 \le C \le 15$.

In some possible implementations, $r_0=r_1$.

In some possible implementations, $F_0$ bits in each of the second bit subsets are distributed in $F_1$ rows and $F_1$ columns, and $F_1$ bits in each row of the second bit subset are from two first bit subsets.

In some possible implementations, $F_0$ bits in each first bit subset are distributed in $F_1$ rows and $F_1$ columns, $F_1/2$ bits in $F_1$ bits in each row of the second bit subset are from one row of one first bit subset, and the other $F_1/2$ bits in the $F_1$ bits in each row of the second bit subset are from one row of another first bit subset.

In some possible implementations, $F_0=256$, $m_0 \times 256$ bits in the fourth bit set are distributed in 32 rows and $m_0 \times 8$ columns, $m_0 \times 256$ bits in the fifth bit set are distributed in 32 rows and $m_0 \times 8$ columns, and 32 bits in each column of the fifth bit set are from two first bit subsets.

In some possible implementations, 256 bits in each first bit subset are distributed in 16 rows and 16 columns, 16 bits in 32 bits in each column of the fifth bit subset are from one column of one first bit subset, and the other 16 bits in the 32 bits in each column of the fifth bit subset are from one column of another first bit subset.

In some possible implementations, the 16 bits in the 32 bits in each column of the fifth bit set are from column $c_1$% 16 of one first bit subset, and the other 16 bits in the 32 bits in each column of the fifth bit set are from column $c_1\% 16$ of another first bit subset, where $0 \leq c_1 < (m_0 \times 8)$.

In some possible implementations, $m_0=16$, and the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,4}$ in row 0 and column 4;

a total of 512 bits in second bit subset $T_{0,1}$ in row 0 and column 1 and second bit subset $T_{1,1}$ in row 1 and column 1 are from a total of 512 bits in first bit subset $B_{1,0}$ in row 1 and column 0 and first bit subset $B_{1,4}$ in row 1 and column 4;

a total of 512 bits in second bit subset $T_{0,2}$ in row 0 and column 2 and second bit subset $T_{1,2}$ in row 1 and column 2 are from a total of 512 bits in first bit subset $B_{0,1}$ in row 0 and column 1 and first bit subset $B_{0,5}$ in row 0 and column 5;

a total of 512 bits in second bit subset $T_{0,3}$ in row 0 and column 3 and second bit subset $T_{1,3}$ in row 1 and column 3 are from a total of 512 bits in first bit subset $B_{1,1}$ in row 1 and column 1 and first bit subset $B_{1,5}$ in row 1 and column 5;

a total of 512 bits in second bit subset $T_{0,4}$ in row 0 and column 4 and second bit subset $T_{1,4}$ in row 1 and column 4 are from a total of 512 bits in first bit subset $B_{0,2}$ in row 0 and column 2 and first bit subset $B_{0,6}$ in row 0 and column 6;

a total of 512 bits in second bit subset $T_{0,5}$ in row 0 and column 5 and second bit subset $T_{1,5}$ in row 1 and column 5 are from a total of 512 bits in first bit subset $B_{1,2}$ in row 0 and column 2 and first bit subset $B_{1,6}$ in row 0 and column 6;

a total of 512 bits in second bit subset $T_{0,6}$ in row 0 and column 6 and second bit subset $T_{1,6}$ in row 1 and column 6 are from a total of 512 bits in first bit subset $B_{0,3}$ in row 0 and column 3 and first bit subset $B_{0,7}$ in row 0 and column 7; and a total of 512 bits in second bit subset $T_{0,7}$ in row 0 and column 7 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

In some possible implementations, $m_0=16$, and the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,4}$ in row 0 and column 4;

a total of 512 bits in second bit subset $T_{0,1}$ in row 0 and column 1 and second bit subset $T_{1,1}$ in row 1 and column 1 are from a total of 512 bits in first bit subset $B_{0,1}$ in row 0 and column 1 and first bit subset $B_{0,5}$ in row 0 and column 5;

a total of 512 bits in second bit subset $T_{0,2}$ in row 0 and column 2 and second bit subset $T_{1,2}$ in row 1 and column 2 are from a total of 512 bits in first bit subset $B_{0,2}$ in row 0 and column 2 and first bit subset $B_{0,6}$ in row 0 and column 6;

a total of 512 bits in second bit subset $T_{0,3}$ in row 0 and column 3 and second bit subset $T_{1,3}$ in row 1 and column 3 are from a total of 512 bits in first bit subset $B_{0,3}$ in row 0 and column 3 and first bit subset $B_{0,7}$ in row 0 and column 7;

a total of 512 bits in second bit subset $T_{0,4}$ in row 0 and column 4 and second bit subset $T_{1,4}$ in row 1 and column 4 are from a total of 512 bits in first bit subset $B_{1,0}$ in row 1 and column 0 and first bit subset $B_{1,4}$ in row 1 and column 4;

a total of 512 bits in second bit subset $T_{0,5}$ in row 0 and column 5 and second bit subset $T_{1,5}$ in row 1 and column 5 are from a total of 512 bits in first bit subset $B_{1,1}$ in row 1 and column 1 and first bit subset $B_{1,5}$ in row 1 and column 5;

a total of 512 bits in second bit subset $T_{0,6}$ in row 0 and column 6 and second bit subset $T_{1,6}$ in row 1 and column 6 are from a total of 512 bits in first bit subset $B_{1,2}$ in row 1 and column 2 and first bit subset $B_{1,6}$ in row 1 and column 6; and a total of 512 bits in second bit subset $T_{0,7}$ in row 0 and column 7 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

In some possible implementations, $m_0=16$, and the 16 second bit subsets are distributed in two rows and eight columns, where a total of 512 bits in second bit subset $T_{0,0}$ in row 0 and column 0 and second bit subset $T_{0,1}$ in row 0 and column 1 are from a total of 512 bits in first bit subset $B_{0,0}$ in row 0 and column 0 and first bit subset $B_{0,4}$ in row 0 and column 4;

a total of 512 bits in second bit subset $T_{0,2}$ in row 0 and column 2 and second bit subset $T_{0,3}$ in row 0 and column 3 are from a total of 512 bits in first bit subset $B_{0,1}$ in row 0 and column 1 and first bit subset $B_{0,5}$ in row 0 and column 5;

a total of 512 bits in second bit subset $T_{0,4}$ in row 0 and column 4 and second bit subset $T_{0,5}$ in row 0 and column 5 are from a total of 512 bits in first bit subset $B_{0,2}$ in row 0 and column 2 and first bit subset $B_{0,6}$ in row 0 and column 6;

a total of 512 bits in second bit subset $T_{0,6}$ in row 0 and column 6 and second bit subset $T_{0,7}$ in row 0 and column 7 are from a total of 512 bits in first bit subset $B_{0,3}$ in row 0 and column 3 and first bit subset $B_{0,7}$ in row 0 and column 7;

a total of 512 bits in second bit subset $T_{1,0}$ in row 1 and column 0 and second bit subset $T_{1,1}$ in row 1 and column 1 are from a total of 512 bits in first bit subset $B_{1,0}$ in row 1 and column 0 and first bit subset $B_{1,4}$ in row 1 and column 4;

a total of 512 bits in second bit subset $T_{1,2}$ in row 1 and column 2 and second bit subset $T_{1,3}$ in row 1 and column 3 are from a total of 512 bits in first bit subset $B_{1,1}$ in row 1 and column 1 and first bit subset $B_{1,5}$ in row 1 and column 5;

a total of 512 bits in second bit subset $T_{1,4}$ in row 1 and column 4 and second bit subset $T_{1,5}$ in row 1 and column 5 are from a total of 512 bits in first bit subset $B_{1,2}$ in row 1 and column 2 and first bit subset $B_{1,6}$ in row 1 and column 6; and a total of 512 bits in second bit subset $T_{1,6}$ in row 1 and column 6 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

In some possible implementations, the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,2}$ in row 0 and column 2;

a total of 512 bits in second bit subset $T_{0,1}$ in row 0 and column 1 and second bit subset $T_{1,1}$ in row 1 and column 1 are from a total of 512 bits in first bit subset $B_{1,0}$ in row 1 and column 0 and first bit subset $B_{1,2}$ in row 1 and column 2;

a total of 512 bits in second bit subset $T_{0,2}$ in row 0 and column 2 and second bit subset $T_{1,2}$ in row 1 and column 2 are from a total of 512 bits in first bit subset $B_{0,1}$ in row 0 and column 1 and first bit subset $B_{0,3}$ in row 0 and column 3;

a total of 512 bits in second bit subset $T_{0,3}$ in row 0 and column 3 and second bit subset $T_{1,3}$ in row 1 and column 3 are from a total of 512 bits in first bit subset $B_{1,1}$ in row 1 and column 1 and first bit subset $B_{1,3}$ in row 1 and column 3;

a total of 512 bits in second bit subset $T_{0,4}$ in row 0 and column 4 and second bit subset $T_{1,4}$ in row 1 and column 4 are from a total of 512 bits in first bit subset $B_{0,4}$ in row 0 and column 4 and first bit subset $B_{0,6}$ in row 0 and column 6;

a total of 512 bits in second bit subset $T_{0,5}$ in row 0 and column 5 and second bit subset $T_{1,5}$ in row 1 and column 5 are from a total of 512 bits in first bit subset $B_{1,4}$ in row 1 and column 4 and first bit subset $B_{1,6}$ in row 1 and column 6;

a total of 512 bits in second bit subset $T_{0,6}$ in row 0 and column 6 and second bit subset $T_{1,6}$ in row 1 and column 6 are from a total of 512 bits in first bit subset $B_{0,5}$ in row 0 and column 5 and first bit subset $B_{0,7}$ in row 0 and column 7; and a total of 512 bits in second bit subset $T_{0,7}$ in row 0 and column 7 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

In some possible implementations, the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,2}$ in row 0 and column 2;

a total of 512 bits in second bit subset $T_{0,1}$ in row 0 and column 1 and second bit subset $T_{1,1}$ in row 1 and column 1 are from a total of 512 bits in first bit subset $B_{0,1}$ in row 0 and column 1 and first bit subset $B_{0,3}$ in row 0 and column 3;

a total of 512 bits in second bit subset $T_{0,2}$ in row 0 and column 2 and second bit subset $T_{1,2}$ in row 1 and column 2 are from a total of 512 bits in first bit subset $B_{0,4}$ in row 0 and column 4 and first bit subset $B_{0,6}$ in row 0 and column 6;

a total of 512 bits in second bit subset $T_{0,3}$ in row 0 and column 3 and second bit subset $T_{1,3}$ in row 1 and column 3 are from a total of 512 bits in first bit subset $B_{0,5}$ in row 0 and column 5 and first bit subset $B_{0,7}$ in row 0 and column 7;

a total of 512 bits in second bit subset $T_{0,4}$ in row 0 and column 4 and second bit subset $T_{1,4}$ in row 1 and column 4 are from a total of 512 bits in first bit subset $B_{1,0}$ in row 1 and column 0 and first bit subset $B_{1,2}$ in row 1 and column 2;

a total of 512 bits in second bit subset $T_{0,5}$ in row 0 and column 5 and second bit subset $T_{1,5}$ in row 1 and column 5 are from a total of 512 bits in first bit subset $B_{1,1}$ in row 1 and column 1 and first bit subset $B_{1,3}$ in row 1 and column 3;

a total of 512 bits in second bit subset $T_{0,6}$ in row 0 and column 6 and second bit subset $T_{1,6}$ in row 1 and column 6 are from a total of 512 bits in first bit subset $B_{1,4}$ in row 1 and column 4 and first bit subset $B_{1,6}$ in row 1 and column 6; and a total of 512 bits in second bit subset $T_{0,7}$ in row 0 and column 7 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

In some possible implementations, $m_0=16$, and the 16 second bit subsets are distributed in two rows and eight columns, where a total of 512 bits in second bit subset $T_{0,0}$ in row 0 and column 0 and second bit subset $T_{0,1}$ in row 0 and column 1 are from a total of 512 bits in first bit subset $B_{0,0}$ in row 0 and column 0 and first bit subset $B_{0,2}$ in row 0 and column 2;

a total of 512 bits in second bit subset $T_{0,2}$ in row 0 and column 2 and second bit subset $T_{0,3}$ in row 0 and column 3 are from a total of 512 bits in first bit subset $B_{0,1}$ in row 0 and column 1 and first bit subset $B_{0,3}$ in row 0 and column 3;

a total of 512 bits in second bit subset $T_{0,4}$ in row 0 and column 4 and second bit subset $T_{0,5}$ in row 0 and column 5 are from a total of 512 bits in first bit subset $B_{0,4}$ in row 0 and column 4 and first bit subset $B_{0,6}$ in row 0 and column 6;

a total of 512 bits in second bit subset $T_{0,6}$ in row 0 and column 6 and second bit subset $T_{0,7}$ in row 0 and column 7 are from a total of 512 bits in first bit subset $B_{0,5}$ in row 0 and column 5 and first bit subset $B_{0,7}$ in row 0 and column 7;

a total of 512 bits in second bit subset $T_{1,0}$ in row 1 and column 0 and second bit subset $T_{1,1}$ in row 1 and column 1 are from a total of 512 bits in first bit subset $B_{1,0}$ in row 1 and column 0 and first bit subset $B_{1,2}$ in row 1 and column 2;

a total of 512 bits in second bit subset $T_{1,2}$ in row 1 and column 2 and second bit subset $T_{1,3}$ in row 1 and column 3 are from a total of 512 bits in first bit subset $B_{1,1}$ in row 1 and column 1 and first bit subset $B_{1,3}$ in row 1 and column 3;

a total of 512 bits in second bit subset $T_{1,4}$ in row 1 and column 4 and second bit subset $T_{1,5}$ in row 1 and column 5 are from a total of 512 bits in first bit subset $B_{1,4}$ in row 1 and column 4 and first bit subset $B_{1,6}$ in row 1 and column 6; and a total of 512 bits in second bit subset $T_{1,6}$ in row 1 and column 6 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

In some possible implementations, $m_0=12$ or 16.

In some possible implementations, after the performing interleaving processing on the fourth bit set to obtain a fifth bit set, the method further includes: performing second interleaving processing on every two first bit streams in L first bit streams to obtain a total of L/2 second bit streams, where each first bit stream includes a plurality of fifth bit sets, and L is an even number greater than 0; performing symbol mapping and polarization distribution on the L/2 second bit streams to obtain one dual-polarization symbol stream, where t bits are mapped to one dual-polarization symbol through the symbol mapping and the polarization distribution, and t is an integer greater than 0; and performing digital signal processing (Digital Signal Processing, DSP) framing on the dual-polarization symbol stream.

In some possible implementations, an amplitude bit in the dual-polarization symbol is from the second bit set.

In some possible implementations, t=8, and the dual-polarization symbol is a dual-polarization DP-16QAM symbol.

In some possible implementations, the performing DSP framing on the dual-polarization symbol stream includes: performing framing processing on every 172032 dual-polarization DP-16QAM symbols to obtain one DSP super-frame, where the super-frame includes 175104 dual-polarization symbols.

According to a second aspect, this application provides a data processing method. The data processing method includes the following steps: obtaining first data from a data frame, where the first data includes bits in r rows and q columns, r is an integer greater than 0, and q is an integer greater than 0; performing cyclic redundancy check CRC and/or pad bit insertion on the first data to obtain second data, where the second data includes $d_{CRC}$ parity bits inserted through the CRC and/or $d_{PAD}$ pad bits, $d_{CRC}$ is an integer greater than or equal to 0, and $d_{PAD}$ is an integer greater than or equal to 0; scrambling the second data to obtain third data, where a quantity of bits of the third data is $d_{scr}=r\times q+d_{CP}$, and $d_{CP}=d_{CRC}+d_{PAD}$; obtaining k bits in the third data, where k is an integer greater than 1, and $d_{scr}$ is an integer multiple of k; performing probabilistic constellation shaping PCS processing on a first bit set in the k bits, to obtain a second bit set; and performing FEC encoding on the second bit set and a third bit set in the k bits excluding the first bit set, to obtain a fourth bit set.

In this implementation, for future metro telecommunication transmission and metro DCI interconnection scenarios, FEC encoding is used in combination with a PCS technology to satisfy a requirement for a longer transmission distance. Due to introduction of PCS processing, a length of PCS processed and FEC encoded information bits is no longer 3552, but a smaller value. In this case, a quantity of rows of data obtained from a data frame needs to be redesigned, and CRC check and a quantity of inserted pad bits need to be redesigned, so that an overall data processing operation is simpler, complexity is lower, and power consumption is lower.

In some possible implementations, the performing FEC encoding on the second bit set and a third bit set in the k bits excluding the first bit set, to obtain a fourth bit set includes: performing pre-encoding interleaving processing on the second bit set and the third bit set to obtain a sixth bit set, where a quantity of bits in the sixth bit set is equal to a sum of a quantity of bits in the second bit set and a quantity of bits in the third bit set, the sixth bit set includes $m_3$ third bit subsets, the $m_3$ third bit subsets are distributed in two rows and $m_4$ columns, $m_3=2\times m_4$, and $m_3$ is an integer greater than 1 and less than $m_0$, where some third bit subsets each includes $F_0$ bits, the other third bit subsets each includes $F_2$ bits, and $F_2$ is an even number greater than 1 and less than $F_0$; and performing the FEC encoding on the sixth bit set to obtain the fourth bit set.

In some possible implementations, a quantity of bits in the first bit set is an integer multiple of 2, 4, 8, or 16, the second bit set includes 2048 bits, the third bit set includes 1504 bits, and the fourth bit set includes 4096 bits.

In some possible implementations, $d_{scr}$ is an integer multiple of $4\times k$, and q=10280.

In some possible implementations, overhead of the CRC and/or the pad bit insertion is $(d_{CRC}+d_{PAD})/(r\times q)$, and $(d_{CRC}+d_{PAD})/(r\times q)\leq 0.001$.

In some possible implementations, r=79, $d_{CP}$=328, and k=3224;

r=83, $d_{CP}$=32, and k=3386;

r=83, $d_{CP}$=536, and k=3388;

r=87, $d_{CP}$=72, and k=2662;

r=87, $d_{CP}$=744, and k=2664;

r=87, $d_{CP}$=3432, and k=2672;

r=104, $d_{CP}$=704, and k=3184;

r=104, $d_{CP}$=3392, and k=3192;

r=105, $d_{CP}$=504, and k=3214;

r=105, $d_{CP}$=1176, and k=3216;

r=109, $d_{CP}$=40, and k=2668;

r=109, $d_{CP}$=880, and k=2670;

r=110, $d_{CP}$=176, and k=3366;

r=110, $d_{CP}$=848, and k=3368;

r=110, $d_{CP}$=3536, and k=3376;

r=111, $d_{CP}$=648, and k=3398;

r=131, $d_{CP}$=8, and k=2672;

r=131, $d_{CP}$=1016, and k=2674;

r=131, $d_{CP}$=680, and k=3208;

r=132, $d_{CP}$=480, and k=3232;

r=132, $d_{CP}$=1320, and k=3234;

r=137, $d_{CP}$=320, and k=3354;

r=137, $d_{CP}$=1160, and k=3356;

r=138, $d_{CP}$=120, and k=3378;

r=138, $d_{CP}$=960, and k=3380;

r=152, $d_{CP}$=344, and k=2658;

r=152, $d_{CP}$=1520, and k=2660;

r=153, $d_{CP}$=648, and k=2676;

r=157, $d_{CP}$=856, and k=3204;

r=158, $d_{CP}$=656, and k=3224;

r=165, $d_{CP}$=264, and k=3366;

r=165, $d_{CP}$=1272, and k=3368;

r=166, $d_{CP}$=64, and k=3386;

r=166, $d_{CP}$=1072, and k=3388;

r=174, $d_{CP}$=144, and k=2662;

r=174, $d_{CP}$=1488, and k=2664;

r=175, $d_{CP}$=616, and k=2678;

r=183, $d_{CP}$=360, and k=3200;

r=183, $d_{CP}$=1536, and k=3202;

r=184, $d_{CP}$=664, and k=3218;

r=184, $d_{CP}$=1840, and k=3220;

r=185, $d_{CP}$=968, and k=3236;

r=192, $d_{CP}$=744, and k=3358;

r=192, $d_{CP}$=1920, and k=3360;

r=193, $d_{CP}$=1048, and k=3376;

r=194, $d_{CP}$=176, and k=3392;

r=194, $d_{CP}$=1352, and k=3394;

r=196, $d_{CP}$=616, and k=2666;

r=209, $d_{CP}$=536, and k=3198;

r=209, $d_{CP}$=1880, and k=3200;

r=210, $d_{CP}$=1008, and k=3214;

r=211, $d_{CP}$=136, and k=3228;

r=211, $d_{CP}$=1480, and k=3230;

r=217, $d_{CP}$=280, and k=2656;

r=217, $d_{CP}$=1960, and k=2658;

r=218, $d_{CP}$=80, and k=2668;

r=218, $d_{CP}$=1760, and k=2670;

r=219, $d_{CP}$=1224, and k=3352;
r=220, $d_{CP}$=352, and k=3366;
r=220, $d_{CP}$=1696, and k=3368;
r=221, $d_{CP}$=824, and k=3382;
r=221, $d_{CP}$=2168, and k=3384;
r=222, $d_{CP}$=1296, and k=3398;
r=235, $d_{CP}$=376, and k=3196;
r=235, $d_{CP}$=1888, and k=3198;
r=236, $d_{CP}$=680, and k=3210;
r=236, $d_{CP}$=2192, and k=3212;
r=237, $d_{CP}$=984, and k=3224;
r=238, $d_{CP}$=1288, and k=3238;
r=239, $d_{CP}$=920, and k=2660;
r=240, $d_{CP}$=1728, and k=2672;
r=247, $d_{CP}$=1000, and k=3360;
r=247, $d_{CP}$=2512, and k=3362;
r=248, $d_{CP}$=1304, and k=3374;
r=249, $d_{CP}$=96, and k=3386;
r=249, $d_{CP}$=1608, and k=3388;
r=250, $d_{CP}$=400, and k=3400;
r=250, $d_{CP}$=1912, and k=3402;
r=261, $d_{CP}$=216, and k=2662;
r=261, $d_{CP}$=2232, and k=2664;
r=261, $d_{CP}$=1560, and k=3196;
r=262, $d_{CP}$=16, and k=2672;
r=262, $d_{CP}$=2032, and k=2674;
r=262, $d_{CP}$=1360, and k=3208;
r=263, $d_{CP}$=1160, and k=3220;
r=264, $d_{CP}$=960, and k=3232;
r=264, $d_{CP}$=2640, and k=3234;
r=274, $d_{CP}$=640, and k=3354;
r=274, $d_{CP}$=2320, and k=3356;
r=275, $d_{CP}$=440, and k=3366;
r=275, $d_{CP}$=2120, and k=3368;
r=276, $d_{CP}$=240, and k=3378;
r=276, $d_{CP}$=1920, and k=3380;
r=277, $d_{CP}$=40, and k=3390;
r=277, $d_{CP}$=1720, and k=3392;
r=283, $d_{CP}$=2032, and k=2666;
r=284, $d_{CP}$=488, and k=2674;
r=284, $d_{CP}$=2672, and k=2676;
r=287, $d_{CP}$=896, and k=3194;
r=287, $d_{CP}$=2744, and k=3196;
r=288, $d_{CP}$=1704, and k=3206;
r=289, $d_{CP}$=664, and k=3216;
r=289, $d_{CP}$=2512, and k=3218;
r=290, $d_{CP}$=1472, and k=3228;
r=291, $d_{CP}$=432, and k=3238;
r=291, $d_{CP}$=2280, and k=3240;
r=302, $d_{CP}$=80, and k=3360;
r=302, $d_{CP}$=1928, and k=3362;
r=303, $d_{CP}$=888, and k=3372;
r=303, $d_{CP}$=2736, and k=3374;
r=304, $d_{CP}$=688, and k=2658;
r=304, $d_{CP}$=3040, and k=2660;
r=304, $d_{CP}$=1696, and k=3384;
r=305, $d_{CP}$=2168, and k=2668;
r=305, $d_{CP}$=656, and k=3394;
r=305, $d_{CP}$=2504, and k=3396;
r=306, $d_{CP}$=1296, and k=2676;
r=313, $d_{CP}$=1912, and k=3194;
r=314, $d_{CP}$=1712, and k=3204;
r=315, $d_{CP}$=1512, and k=3214;
r=316, $d_{CP}$=1312, and k=3224;
r=317, $d_{CP}$=1112, and k=3234;
r=317, $d_{CP}$=3128, and k=3236;
r=326, $d_{CP}$=320, and k=2660;

r=326, $d_{CP}$=2840, and k=2662;
r=327, $d_{CP}$=120, and k=2668;
r=327, $d_{CP}$=2640, and k=2670;
r=328, $d_{CP}$=2440, and k=2678;
r=329, $d_{CP}$=728, and k=3356;
r=329, $d_{CP}$=2744, and k=3358;
r=330, $d_{CP}$=528, and k=3366;
r=330, $d_{CP}$=2544, and k=3368;
r=331, $d_{CP}$=328, and k=3376;
r=331, $d_{CP}$=2344, and k=3378;
r=332, $d_{CP}$=128, and k=3386;
r=332, $d_{CP}$=2144, and k=3388;
r=333, $d_{CP}$=1944, and k=3398;
r=339, $d_{CP}$=744, and k=3192;
r=339, $d_{CP}$=2928, and k=3194;
r=340, $d_{CP}$=1384, and k=3202;
r=341, $d_{CP}$=2024, and k=3212;
r=342, $d_{CP}$=480, and k=3220;
r=342, $d_{CP}$=2664, and k=3222;
r=343, $d_{CP}$=1120, and k=3230;
r=343, $d_{CP}$=3304, and k=3232;
r=344, $d_{CP}$=1760, and k=3240;
r=348, $d_{CP}$=288, and k=2662;
r=348, $d_{CP}$=2976, and k=2664;
r=349, $d_{CP}$=760, and k=2670;
r=349, $d_{CP}$=3448, and k=2672;
r=350, $d_{CP}$=1232, and k=2678;
r=356, $d_{CP}$=704, and k=3352;
r=356, $d_{CP}$=2888, and k=3354;
r=357, $d_{CP}$=1344, and k=3362;
r=357, $d_{CP}$=3528, and k=3364;
r=358, $d_{CP}$=1984, and k=3372;
r=359, $d_{CP}$=440, and k=3380;
r=359, $d_{CP}$=2624, and k=3382;
r=360, $d_{CP}$=1080, and k=3390;
r=360, $d_{CP}$=3264, and k=3392;
r=361, $d_{CP}$=1720, and k=3400;
r=365, $d_{CP}$=1592, and k=3192;
r=366, $d_{CP}$=720, and k=3200;
r=366, $d_{CP}$=3072, and k=3202;
r=367, $d_{CP}$=2200, and k=3210;
r=368, $d_{CP}$=1328, and k=3218;
r=368, $d_{CP}$=3680, and k=3220;
r=369, $d_{CP}$=2304, and k=2658;
r=369, $d_{CP}$=456, and k=3226;
r=369, $d_{CP}$=2808, and k=3228;
r=370, $d_{CP}$=592, and k=2664;
r=370, $d_{CP}$=3448, and k=2666;
r=370, $d_{CP}$=1936, and k=3236;
r=371, $d_{CP}$=1736, and k=2672;
r=384, $d_{CP}$=1488, and k=3358;
r=384, $d_{CP}$=3840, and k=3360;
r=385, $d_{CP}$=616, and k=3366;
r=385, $d_{CP}$=2968, and k=3368;
r=386, $d_{CP}$=2096, and k=3376;
r=387, $d_{CP}$=1224, and k=3384;
r=387, $d_{CP}$=3576, and k=3386;
r=388, $d_{CP}$=352, and k=3392;
r=388, $d_{CP}$=2704, and k=3394;
r=389, $d_{CP}$=1832, and k=3402;
r=391, $d_{CP}$=2440, and k=2660;
r=392, $d_{CP}$=1232, and k=2666;
r=392, $d_{CP}$=2240, and k=3200;
r=393, $d_{CP}$=24, and k=2672;
r=393, $d_{CP}$=3048, and k=2674;
r=393, $d_{CP}$=2040, and k=3208;
r=394, $d_{CP}$=1840, and k=3216;

$r=395$, $d_{CP}=1640$, and $k=3224$;
$r=396$, $d_{CP}=1440$, and $k=3232$;
$r=396$, $d_{CP}=3960$, and $k=3234$;
$r=397$, $d_{CP}=1240$, and $k=3240$;
$r=397$, $d_{CP}=3760$, and $k=3242$;
$r=411$, $d_{CP}=960$, and $k=3354$;
$r=411$, $d_{CP}=3480$, and $k=3356$;
$r=412$, $d_{CP}=760$, and $k=3362$;
$r=412$, $d_{CP}=3280$, and $k=3364$;
$r=413$, $d_{CP}=2912$, and $k=2662$;
$r=413$, $d_{CP}=560$, and $k=3370$;
$r=413$, $d_{CP}=3080$, and $k=3372$;
$r=414$, $d_{CP}=2208$, and $k=2668$;
$r=414$, $d_{CP}=360$, and $k=3378$;
$r=414$, $d_{CP}=2880$, and $k=3380$;
$r=415$, $d_{CP}=1504$, and $k=2674$;
$r=415$, $d_{CP}=160$, and $k=3386$;
$r=415$, $d_{CP}=2680$, and $k=3388$;
$r=416$, $d_{CP}=2480$, and $k=3396$;
$r=418$, $d_{CP}=1072$, and $k=3198$;
$r=418$, $d_{CP}=3760$, and $k=3200$;
$r=419$, $d_{CP}=1544$, and $k=3206$;
$r=419$, $d_{CP}=4232$, and $k=3208$;
$r=420$, $d_{CP}=2016$, and $k=3214$;
$r=421$, $d_{CP}=2488$, and $k=3222$;
$r=422$, $d_{CP}=272$, and $k=3228$;
$r=422$, $d_{CP}=2960$, and $k=3230$;
$r=423$, $d_{CP}=744$, and $k=3236$;
$r=423$, $d_{CP}=3432$, and $k=3238$;
$r=434$, $d_{CP}=560$, and $k=2656$;
$r=434$, $d_{CP}=3920$, and $k=2658$;
$r=435$, $d_{CP}=360$, and $k=2662$;
$r=435$, $d_{CP}=3720$, and $k=2664$;
$r=436$, $d_{CP}=160$, and $k=2668$;
$r=436$, $d_{CP}=3520$, and $k=2670$;
$r=437$, $d_{CP}=3320$, and $k=2676$;
$r=438$, $d_{CP}=2448$, and $k=3352$;
$r=439$, $d_{CP}=232$, and $k=3358$;
$r=439$, $d_{CP}=2920$, and $k=3360$;
$r=440$, $d_{CP}=704$, and $k=3366$;
$r=440$, $d_{CP}=3392$, and $k=3368$;
$r=441$, $d_{CP}=1176$, and $k=3374$;
$r=441$, $d_{CP}=3864$, and $k=3376$;
$r=442$, $d_{CP}=1648$, and $k=3382$;
$r=442$, $d_{CP}=4336$, and $k=3384$;
$r=443$, $d_{CP}=2120$, and $k=3390$;
$r=444$, $d_{CP}=2424$, and $k=3198$;
$r=444$, $d_{CP}=2592$, and $k=3398$;
$r=445$, $d_{CP}=712$, and $k=3204$;
$r=445$, $d_{CP}=3568$, and $k=3206$;
$r=446$, $d_{CP}=1856$, and $k=3212$;
$r=447$, $d_{CP}=144$, and $k=3218$;
$r=447$, $d_{CP}=3000$, and $k=3220$;
$r=448$, $d_{CP}=1288$, and $k=3226$;
$r=448$, $d_{CP}=4144$, and $k=3228$;
$r=449$, $d_{CP}=2432$, and $k=3234$;
$r=456$, $d_{CP}=1032$, and $k=2658$;
$r=456$, $d_{CP}=4560$, and $k=2660$;
$r=457$, $d_{CP}=1336$, and $k=2664$;
$r=458$, $d_{CP}=1640$, and $k=2670$;
$r=459$, $d_{CP}=1944$, and $k=2676$;
$r=466$, $d_{CP}=1888$, and $k=3356$;
$r=466$, $d_{CP}=4744$, and $k=3358$;
$r=467$, $d_{CP}=176$, and $k=3362$;
$r=467$, $d_{CP}=3032$, and $k=3364$;
$r=468$, $d_{CP}=1320$, and $k=3370$;
$r=468$, $d_{CP}=4176$, and $k=3372$;

$r=469$, $d_{CP}=2464$, and $k=3378$;
$r=470$, $d_{CP}=752$, and $k=3196$;
$r=470$, $d_{CP}=3776$, and $k=3198$;
$r=470$, $d_{CP}=752$, and $k=3384$;
$r=470$, $d_{CP}=3608$, and $k=3386$;
$r=471$, $d_{CP}=2568$, and $k=3204$;
$r=471$, $d_{CP}=1896$, and $k=3392$;
$r=471$, $d_{CP}=4752$, and $k=3394$;
$r=472$, $d_{CP}=1360$, and $k=3210$;
$r=472$, $d_{CP}=4384$, and $k=3212$;
$r=472$, $d_{CP}=184$, and $k=3398$;
$r=472$, $d_{CP}=3040$, and $k=3400$;
$r=473$, $d_{CP}=152$, and $k=3216$;
$r=473$, $d_{CP}=3176$, and $k=3218$;
$r=474$, $d_{CP}=1968$, and $k=3224$;
$r=475$, $d_{CP}=760$, and $k=3230$;
$r=475$, $d_{CP}=3784$, and $k=3232$;
$r=476$, $d_{CP}=2576$, and $k=3238$;
$r=478$, $d_{CP}=1840$, and $k=2660$;
$r=479$, $d_{CP}=2648$, and $k=2666$;
$r=480$, $d_{CP}=3456$, and $k=2672$;
$r=481$, $d_{CP}=568$, and $k=2676$;
$r=481$, $d_{CP}=4264$, and $k=2678$;
$r=493$, $d_{CP}=184$, and $k=3352$;
$r=493$, $d_{CP}=3208$, and $k=3354$;
$r=494$, $d_{CP}=2000$, and $k=3360$;
$r=494$, $d_{CP}=5024$, and $k=3362$;
$r=495$, $d_{CP}=792$, and $k=3366$;
$r=495$, $d_{CP}=3816$, and $k=3368$;
$r=496$, $d_{CP}=1936$, and $k=3196$;
$r=496$, $d_{CP}=2608$, and $k=3374$;
$r=497$, $d_{CP}=1232$, and $k=3202$;
$r=497$, $d_{CP}=4424$, and $k=3204$;
$r=497$, $d_{CP}=1400$, and $k=3380$;
$r=497$, $d_{CP}=4424$, and $k=3382$;
$r=498$, $d_{CP}=528$, and $k=3208$;
$r=498$, $d_{CP}=3720$, and $k=3210$;
$r=498$, $d_{CP}=192$, and $k=3386$;
$r=498$, $d_{CP}=3216$, and $k=3388$;
$r=499$, $d_{CP}=1672$, and $k=2656$;
$r=499$, $d_{CP}=3016$, and $k=3216$;
$r=499$, $d_{CP}=2008$, and $k=3394$;
$r=499$, $d_{CP}=5032$, and $k=3396$;
$r=500$, $d_{CP}=2984$, and $k=2662$;
$r=500$, $d_{CP}=2312$, and $k=3222$;
$r=500$, $d_{CP}=800$, and $k=3400$;
$r=500$, $d_{CP}=3824$, and $k=3402$;
$r=501$, $d_{CP}=432$, and $k=2666$;
$r=501$, $d_{CP}=4296$, and $k=2668$;
$r=501$, $d_{CP}=1608$, and $k=3228$;
$r=501$, $d_{CP}=4800$, and $k=3230$;
$r=502$, $d_{CP}=1744$, and $k=2672$;
$r=502$, $d_{CP}=904$, and $k=3234$;
$r=502$, $d_{CP}=4096$, and $k=3236$; or
$r=503$, $d_{CP}=3056$, and $k=2678$.

In some possible implementations, $d_{scr}=336 \times k$.

In some possible implementations, the performing CRC on the first data includes:

performing CRC-32 check on a total of $r \times q/p$ bits in every $r/p$ rows of the first data, to add 32 parity bits, where $d_{CRC}=32 \times p$, $r$ is divisible by $p$, and $p$ is an integer greater than 1; or performing CRC-32 check on a total of $q \times r_{F0}$ bits in every $r_{F0}$ rows in first $r_{F0} \times (p-1)$ rows of the first data to add 32 parity bits, and performing CRC-32 check on a total of $q \times r_{F1}$ bits in last $r_{F1}$ rows of the first data to add 32 parity bits, where $d_{CRC}=32 \times p$, $r$ is indivisible by $p$, $p$ is an integer greater than 1, $r_{F0} \times (p-1) + r_{F1} = r$, $r_{F0} > r_{F1}$, and $\lfloor a \rfloor$ represents performing a floor operation on a.

In some possible implementations, $q \times r_{F0} = 41120$.

In some possible implementations, $q = 2056$.

In some possible implementations, the performing CRC on the first data includes:

performing CRC-32 check on a total of $q \times r_{F0}$ bits in every $r_{F0}$ rows in the first $r_{F0} \times (p-1)$ rows of the first data to add 32 parity bits, and performing CRC-32 check on a total of $q \times r_{F1}$ bits in the last $r_{F1}$ rows of the first data to add 32 parity bits, where $d_{CRC} = 32 \times p$, r is indivisible by p, p is an integer greater than 1, $r_{F0} \times (p-1) + r_{F1} = r$, the integer $r_{F0}$ is greater than the integer $r_{F1}$, and $\lfloor a \rfloor$ represents performing a floor operation on a.

In some possible implementations, r=435.

In some possible implementations, p=22, $r_{F0}=20$, $r_{F1}=15$, and the performing CRC on the first data includes: performing CRC-32 check on a total of 41120 bits in every 20 rows in first 420 rows of the first data to add 32 parity bits, and performing CRC-32 check on a total of 30840 bits in last 15 rows of the first data to add 32 parity bits.

In some possible implementations, $d_{CP}=3432$ and k=2672, or $d_{CP}=744$ and k=2664.

In some possible implementations, r=546, $d_{CP}=1008$, and k=3344;

r=546, $d_{CP}=3696$, and k=3352;
r=547, $d_{CP}=1640$, and k=3352;
r=547, $d_{CP}=4328$, and k=3360;
r=548, $d_{CP}=2272$, and k=3360;
r=548, $d_{CP}=4960$, and k=3368;
r=549, $d_{CP}=216$, and k=3360;
r=549, $d_{CP}=2904$, and k=3368;
r=549, $d_{CP}=5592$, and k=3376;
r=550, $d_{CP}=848$, and k=3368;
r=550, $d_{CP}=3536$, and k=3376;
r=551, $d_{CP}=1480$, and k=3376;
r=551, $d_{CP}=4168$, and k=3384;
r=552, $d_{CP}=2112$, and k=3384;
r=552, $d_{CP}=4800$, and k=3392;
r=553, $d_{CP}=56$, and k=3384;
r=553, $d_{CP}=2744$, and k=3392;
r=553, $d_{CP}=5432$, and k=3400;
r=554, $d_{CP}=688$, and k=3392;
r=554, $d_{CP}=3376$, and k=3400;
r=555, $d_{CP}=1320$, and k=3400;
r=555, $d_{CP}=4008$, and k=3408;
r=556, $d_{CP}=1952$, and k=3408;
r=556, $d_{CP}=4640$, and k=3416;
r=557, $d_{CP}=2584$, and k=3416;
r=557, $d_{CP}=5272$, and k=3424;
r=558, $d_{CP}=528$, and k=3416;
r=558, $d_{CP}=3216$, and k=3424;
r=559, $d_{CP}=1160$, and k=3424;
r=559, $d_{CP}=3848$, and k=3432;
r=560, $d_{CP}=1792$, and k=3432;
r=560, $d_{CP}=4480$, and k=3440;
r=561, $d_{CP}=2424$, and k=3440;
r=561, $d_{CP}=5112$, and k=3448;
r=562, $d_{CP}=368$, and k=3440;
r=562, $d_{CP}=3056$, and k=3448; or
r=562, $d_{CP}=5744$, and k=3456.

In some possible implementations, r=520, $d_{CP}=704$, and k=3184;

r=520, $d_{CP}=3392$, and k=3192;
r=520, $d_{CP}=6080$, and k=3200;
r=521, $d_{CP}=1336$, and k=3192;
r=521, $d_{CP}=4024$, and k=3200;

r=522, $d_{CP}=1968$, and k=3200;
r=522, $d_{CP}=4656$, and k=3208;
r=523, $d_{CP}=2600$, and k=3208;
r=523, $d_{CP}=5288$, and k=3216;
r=524, $d_{CP}=544$, and k=3208;
r=524, $d_{CP}=3232$, and k=3216;
r=525, $d_{CP}=1176$, and k=3216;
r=525, $d_{CP}=3864$, and k=3224;
r=526, $d_{CP}=1808$, and k=3224;
r=526, $d_{CP}=4496$, and k=3232;
r=527, $d_{CP}=2440$, and k=3232;
r=527, $d_{CP}=5128$, and k=3240;
r=528, $d_{CP}=384$, and k=3232;
r=528, $d_{CP}=3072$, and k=3240;
r=528, $d_{CP}=5760$, and k=3248;
r=529, $d_{CP}=1016$, and k=3240;
r=529, $d_{CP}=3704$, and k=3248;
r=530, $d_{CP}=1648$, and k=3248;
r=530, $d_{CP}=4336$, and k=3256;
r=531, $d_{CP}=2280$, and k=3256;
r=531, $d_{CP}=4968$, and k=3264;
r=532, $d_{CP}=2912$, and k=3264;
r=532, $d_{CP}=224$, and k=3256;
r=533, $d_{CP}=856$, and k=3264;
r=533, $d_{CP}=3544$, and k=3272;
r=534, $d_{CP}=1488$, and k=3272;
r=534, $d_{CP}=4176$, and k=3280;
r=535, $d_{CP}=2120$, and k=3280; or
r=535, $d_{CP}=4808$, and k=3288.

In some possible implementations, after the performing FEC encoding on the second bit set and a third bit set, to obtain a fourth bit set, the method further includes: performing first interleaving processing on the fourth bit set to obtain a fifth bit set, where the fifth bit set includes $m_0$ second bit subsets, each of the second bit subsets includes 256 bits, 128 bits in each of the second bit subsets are from the second bit set, and the other 128 bits in each of the second bit subsets are from the third bit set and/or parity bits of the FEC encoding; performing second interleaving processing on every two first bit streams in L first bit streams to obtain a total of L/2 second bit streams, where each first bit stream includes a plurality of fifth bit sets, and L is an even number greater than 0; performing symbol mapping and polarization distribution on the L/2 second bit streams to obtain one dual-polarization symbol stream, where t bits are mapped to one dual-polarization symbol through the symbol mapping and the polarization distribution, and t is an integer greater than 0; and performing DSP framing on the dual-polarization symbol stream.

In some possible implementations, an amplitude bit in the dual-polarization symbol is from the second bit set.

In some possible implementations, t=8, and the dual-polarization symbol is a dual-polarization DP-16QAM symbol.

In some possible implementations, the performing DSP framing on the dual-polarization symbol stream includes: performing framing processing on every 172032 dual-polarization DP-16QAM symbols to obtain one DSP super-frame, where the super-frame includes 175104 dual-polarization symbols.

In some possible implementations, the obtaining first data from a data frame includes: obtaining $F_{Frame}$ pieces of first data from the data frame, to obtain $F_{Frame} \times r \times q$ bits, where $F_{Frame}$ is an integer greater than 0, and $d_{scr} \times F_{Frame} = 336 \times k \times F_{DSP}$, where $F_{DSP}$ represents a quantity of DSP super-frames, the $F_{DSP}$ DSP super-frames are obtained by processing the $F_{Frame}$ pieces of first data, and $F_{DSP}$ is an integer greater than 0.

In some possible implementations, $F_{DSP}>1$, a plurality of consecutive symbols in a first DSP super-frame of the $F_{DSP}$ DSP super-frames are a first marker, and a plurality of consecutive symbols in each DSP super-frame of the $F_{DSP}$ DSP super-frames except the first DSP super-frame are a second marker.

According to a third aspect, an embodiment of this application provides a data processing method. The data processing method includes the following steps: performing first PCS processing on a first bit set in a first group of k bits, to obtain a second bit set, where the second bit set includes $m_0 \times 128$ bits, k is an integer greater than 1, and $m_0$ is an integer greater than 1; performing first FEC encoding on the second bit set and a third bit set in the first group of k bits excluding the first bit set, to obtain a fourth bit set, where the fourth bit set includes $m_0$ first square blocks, and each of the first square blocks includes a total of 256 bits distributed in 16 rows and 16 columns; performing second PCS processing on a fifth bit set in a second group of k bits, to obtain a sixth bit set; performing second FEC encoding on the sixth bit set and a seventh bit set in the second group of k bits excluding the fifth bit set, to obtain an eighth bit set, where the eighth bit set includes $m_0$ second square blocks, and each of the second square blocks includes a total of 256 bits distributed in 16 rows and 16 columns; inputting 21 fourth bit sets and 21 eighth bit sets into an interleaver buffer, where the interleaver buffer includes a total of $84 \times m_1$ buffer units distributed in 84 rows and $m_1$ columns, $m_0=m_1 \times 2$, each of the buffer units is configured to buffer a total of 256 bits in 16 rows and 16 columns, $42 \times m_1$ first square blocks are input into even-numbered rows of the interleaver buffer, $42 \times m_1$ second square blocks are input into odd-numbered rows of the interleaver buffer, and the interleaver buffer includes a first buffer subset and a second buffer subset, where the first buffer subset includes $42 \times m_1$ buffer units, the second buffer subset includes $42 \times m_1$ buffer units, bits input into the first buffer subset are from the second bit set and the sixth bit set, and bits input into the second buffer subset are from the third bit set, the seventh bit set, parity bits of the first FEC encoding, and parity bits of the second FEC encoding; and performing symbol mapping and polarization distribution on every 8 bits in the interleaver buffer to obtain one dual-polarization DP-16QAM symbol, where 2 amplitude bits in 4 bits corresponding to a 16QAM symbol of the DP-16QAM symbol in a target polarization direction are from one column in a first buffer unit of the first buffer subset; and 2 sign bits in the 4 bits corresponding to the 16QAM symbol of the DP-16QAM symbol in the target polarization direction are from one column in a second buffer unit of the second buffer subset.

In this implementation, compared with the data processing method described in the first aspect, the data processing method provided in the third aspect of this application provides third interleaving processing with similar complexity to the second interleaving processing in the first aspect. The third interleaving processing is an operation implemented by using the interleaver buffer in the third aspect, and buffer sizes used for the third interleaving processing and the second interleaving processing are similar or the same. It is equivalent to that the third interleaving processing replaces the first interleaving processing and the second interleaving processing in the first aspect, and achieves an effect similar to that in the first aspect, so that a PCS processed bit that is non-equiprobable in being 0 and 1 may be mapped to an amplitude bit of a modulation symbol, and an occurrence probability of a constellation point is changed while a position of the constellation point remains unchanged, so that constellation points are not evenly distributed, and overall performance is improved to satisfy a requirement for a longer transmission distance in the future. In addition, the data processing method provided in the third aspect has lower complexity.

In some possible implementations, 4 of the 8 bits are from one column in the first buffer unit of the first buffer subset, and the other 4 of the 8 bits are from one column in the second buffer unit of the second buffer subset.

In some possible implementations, the $m_0$ first square blocks are distributed in two rows and $m_1$ columns, where a first square block in row 0 and column $m_2$ and a first square block in row 1 and column $m_2$ are from the second bit set; and the $m_0$ second square blocks are distributed in two rows and $m_1$ columns, where a second square block in row 0 and column $m_2$ and a second square block in row 1 and column $m_2$ are from the sixth bit set, and $0 \leq m_2 < m_1/2$.

In some possible implementations, $m_0=16$, the first buffer subset includes a total of 336 buffer units in column 0, column 1, column 2, and column 3 in the interleaver buffer, and the second buffer subset includes a total of 336 buffer units in column 4, column 5, column 6, and column 7 in the interleaver buffer; or $m_0=12$, the first buffer subset includes a total of 252 buffer units in column 0, column 1, and column 2 in the interleaver buffer, and the second buffer subset includes a total of 252 buffer units in column 3, column 4, and column 5 in the interleaver buffer.

In some possible implementations, $m_0=16$ and $m_1=8$, where the $m_0$ first square blocks are distributed in two rows and $m_1$ columns, where a first square block in row 0 and column 0, a first square block in row 0 and column 1, a first square block in row 0 and column 4, a first square block in row 0 and column 5, a first square block in row 1 and column 0, a first square block in row 1 and column 1, a first square block in row 1 and column 4, and a first square block in row 1 and column 5 are from the second bit set; and the $m_0$ second square blocks are distributed in two rows and $m_1$ columns, where a second square block in row 0 and column 0, a second square block in row 0 and column 1, a second square block in row 0 and column 4, a second square block in row 0 and column 5, a second square block in row 1 and column 0, a second square block in row 1 and column 1, a second square block in row 1 and column 4, and a second square block in row 1 and column 5 are from the sixth bit set.

In some possible implementations, the first buffer subset includes a total of 336 buffer units in column 0, column 1, column 4, and column 5 in the interleaver buffer, and the second buffer subset includes a total of 336 buffer units in column 2, column 3, column 6, and column 7 in the interleaver buffer.

According to a fourth aspect, an embodiment of this application provides a data processing apparatus. The data processing apparatus includes a PCS unit, an FEC encoding unit, and a first interleaving processing unit. The PCS unit is configured to perform PCS processing on a first bit set in k bits, to obtain a second bit set, where k is an integer greater than 1. The FEC unit is configured to perform FEC encoding on the second bit set and a third bit set in the k bits excluding the first bit set, to obtain a fourth bit set, where the fourth bit set includes $m_0$ first bit subsets, each of the first bit subsets includes $F_0$ bits, $m_0$ is an integer greater than 1, and $F_0$ is an even number greater than 1. The first interleaving processing unit is configured to perform first interleaving processing on the fourth bit set to obtain a fifth bit set, where the fifth bit set includes $m_0$ second bit subsets, each of the second bit subsets includes $F_0$ bits, $F_0/2$ bits in each of the second bit subsets are from the second bit set, and the other $F_0/2$ bits in each of the second bit subsets are from the third bit set and/or parity bits of the FEC encoding.

In some possible implementations, where $F_0$ bits in each of the second bit subsets are distributed in $F_1$ rows and $F_1$ columns, $F_1/2$ bits of $F_1$ bits in each row of the second bit subset are from the second bit set, the second bit set includes $m_0 \times F_0/2$ bits, and the other $F_1/2$ bits of the $F_1$ bits in each row of the second bit subset are from the third bit set and/or the parity bits of the FEC encoding.

In some possible implementations, $F_0=256$, $F_1=16$, and a bit in row $i_2$ and column $$\left( \left\lfloor \frac{j_1}{2} \right\rfloor \times 4 + j_2 \ \% \ 2 + i_2 + 2 \right) \ \% \ 16$$

of the second bit subset is from the second bit set, where $0 \le i_2 < 16$ and $0 \le j_2 < 8$; or a bit in row $i_2$ and column $(j_2 \times 2 - i_2 \% 2 + 1)$ of the second bit subset is from the second bit set, where $0 \le i_2 < 16$ and $0 \le j_2 < 8$, where $\lfloor a \rfloor$ represents performing a floor operation on a, and b % c represents b modulo c.

In some possible implementations, $F_0=256$, a total of $m_1 \times 256$ bits in my first bit subsets in the fourth bit set are from the second bit set, and $m_0 = m_1 \times 2$.

In some possible implementations, $F_0=256$, $m_0 \times 256$ bits in the fourth bit set are distributed in 32 rows and $m_0 \times 8$ columns, $m_0 \times 256$ bits in the fifth bit set are distributed in 32 rows and $m_0 \times 8$ columns, and $m_0 \times 8$ bits in row $r_1$ of the fifth bit set are from $m_0 \times 8$ bits in row $r_0$ of the fourth bit set, where $0 \le r_0 < 32$ and $0 \le i_1 < 32$.

In some possible implementations, the $m_0$ first bit subsets are distributed in two rows and $m_1$ columns, where first bit subset $B_{0,m_2}$ in row 0 and column $m_2$ and first bit subset $B_{1,m_2}$ in row 1 and column $m_2$ are from the second bit set, and $0 \le m_2 < m_1/2$.

In some possible implementations, bit $$\left( \left\lfloor \frac{\tilde{c}_0}{2} \right\rfloor \times 4 + \tilde{c}_0 \ \% 2 + (r_1 + 2)\% 4 \right)\%(m_0 \times 8)$$

in $m_0 \times 8$ bits in row $r_1$ of the fifth bit set is from 1 bit in bit 0 to bit $(m_0 \times 4 - 1)$ in row $r_0$ of the fourth bit set, where $0 \le \tilde{c}_0 < (m_0 \times 4)$, $\lfloor a \rfloor$ represents performing a floor operation on a, and b % c represents b modulo c.

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 4 \times \Delta)\% \ \beta)\% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \%(m_0 \times 4)}{2} \right\rfloor \times 4 + c_0 \ \% 2 + 2 \times \left( 1 - \left\lfloor \frac{c_0}{(m_0 \times 4)} \right\rfloor \right).$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 2 + 4 \times \Delta)\% \ \beta)\% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \%(m_0 \times 4)}{2} \right\rfloor \times 4 + c_0 \ \% 2 + 2 \times \left\lfloor \frac{c_0}{(m_0 \times 4)} \right\rfloor.$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 4 \times \Delta)\% \ \beta)\% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \%8}{2} \right\rfloor \times 4 + c_0 \ \% 2 + 2 \times \left( 1 - \left\lfloor \frac{c_0}{(m_0 \times 4)} \right\rfloor \right) + \left\lfloor \frac{c_0 \ \%(m_0 \times 4)}{16} \right\rfloor \times 16 + \left\lfloor \frac{c_0\% \ 16}{8} \right\rfloor \times (m_0 \times 4).$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 2 + 4 \times \Delta)\% \ \beta)\% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \ \%8}{2} \right\rfloor \times 4 + c_0 \ \% 2 + 2 \times \left\lfloor \frac{c_0}{(m_0 \times 4)} \right\rfloor + \left\lfloor \frac{c_0 \ \%(m_0 \times 4)}{16} \right\rfloor \times 16 + \left\lfloor \frac{c_0 \ \%16}{8} \right\rfloor \times (m_0 \times 4).$$

In some possible implementations, bit $(\tilde{c}_0 \times 2 - i_2 \% \ 2 + 1)$ in $m_0 \times 8$ bits in row $r_1$ of the fifth bit set is from 1 bit in bit 0 to bit $(m_0 \times 4 - 1)$ in row $r_0$ of the fourth bit set, where $0 \le \tilde{c}_0 < (m_0 \times 4)$.

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 2 \times \Delta)\% \ \beta)\% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = c_0 \ \% (m_0 \times 4) \times 2 + \left(1 - \left\lfloor \frac{c_0}{(m_0 \times 4)} \right\rfloor \right).$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 1 + 2 \times \Delta) \% \ \beta) \% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, 4 is an integer, $\beta$ is an integer multiple of 2, and $$c = c_0 \ \% (m_0 \times 4) \times 2 + \left\lfloor \frac{c_0}{(m_0 \times 4)} \right\rfloor.$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \ \% \ \theta + (r_1 + 2 \times \Delta) \% \ \beta) \% \ \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = (c_0 \ \% 8) \times 2 + \left(1 - \left\lfloor \frac{c_0}{(m_0 \times 4)} \right\rfloor \right) + \\ 16 \times \left\lfloor \frac{c_0 \ \% (m_0 \times 4)}{16} \right\rfloor + (m_0 \times 4) \times \left\lfloor \frac{c_0 \ \% 16}{8} \right\rfloor.$$

In some possible implementations, bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c \% \theta + (r_1 + 1 + 2 \times \Delta) \% \beta) \% \theta + \left\lfloor \frac{c}{\theta} \right\rfloor \times \theta,$$

where $0 \le c_0 < (m_0 \times 8)$, $0 \le c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = (c_0 \% 8) \times 2 + \left\lfloor \frac{c_0}{(m_0 \times 4)} \right\rfloor + 16 \times \left\lfloor \frac{c_0 \% (m_0 \times 4)}{16} \right\rfloor + (m_0 \times 4) \times \left\lfloor \frac{c_0 \% 16}{8} \right\rfloor.$$

In some possible implementations, the data processing apparatus further includes a pre-encoding interleaving unit. The pre-encoding interleaving unit is configured to perform pre-encoding interleaving processing on the second bit set and the third bit set to obtain a sixth bit set, where a quantity of bits in the sixth bit set is equal to a sum of a quantity of bits in the second bit set and a quantity of bits in the third bit set, the sixth bit set includes $m_3$ third bit subsets, the $m_3$ third bit subsets are distributed in two rows and $m_4$ columns, $m_3 = 2 \times m_4$, and $m_3$ is an integer greater than 1 and less than $m_0$, where some third bit subsets each includes $F_0$ bits, the other third bit subsets each includes $F_2$ bits, and $F_2$ is an even number greater than 1 and less than $F_0$; and the FEC unit is configured to perform the FEC encoding on the sixth bit set to obtain the fourth bit set.

In some possible implementations, $m_3 = 14$, $m_4 = 7$, $F_0 = 256$, and $F_2 = 240$, each third bit subset in column 0 to column 5 includes 16 bits in 16 rows and 16 columns, and each third bit subset in column 6 includes bits in 16 rows and 15 columns, where bits in the third bit subset in column 0, the third bit subset in column 1, the third bit subset in column 4, and the third bit subset in column 5 are from the second bit set; and bits in the third bit subset in column 2, the third bit subset in column 3, and the third bit subset in column 6 are from the third bit set.

In some possible implementations, the $m_0$ first bit subsets are distributed in two rows and $m_1$ columns, $m_0 = 16$, and $m_1 = 8$, where first bit subset $B_{0,0}$ in row 0 and column 0, first bit subset $B_{0,1}$ in row 0 and column 1, first bit subset $B_{0,4}$ in row 0 and column 4, first bit subset $B_{0,5}$ in row 0 and column 5, first bit subset $B_{1,0}$ in row 1 and column 0, first bit subset $B_{1,1}$ in row 1 and column 1, first bit subset $B_{1,4}$ in row 1 and column 4, and first bit subset $B_{1,5}$ in row 1 and column 5 are from the second bit set.

In some possible implementations, bit $$\left( \left\lfloor \frac{\tilde{c}_0}{2} \right\rfloor \times 4 + \tilde{c}_0 \% 2 + (r_1 + 2) \% 4 \right) \% 128$$

in 128 bits in row $r_1$ of the fifth bit set is from 1 bit in bit 0 to bit 31 or bit 64 to bit 95 in row $r_0$ of the fourth bit set, where $0 \le \tilde{c}_0 < 64$, $\lfloor a \rfloor$ represents performing a floor operation on a, and b % c represents b modulo c.

In some possible implementations, bit $c_1$ in the 128 bits in row $r_1$ of the fifth bit set is from bit $c_0$ in 128 bits in row $r_0$ of the fourth bit set; and $$c_1 = (c \% \theta + (r_1 + 4 \times \Delta) \% \beta) \% \theta + \left\lfloor \frac{c}{\theta} \right\rfloor \times \theta,$$

where $0 \le c_0 < 128$, $0 \le c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left(1 - \left\lfloor \frac{c_0}{32} \right\rfloor \% 2 \right) \times 2 + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c \% \theta + (r_1 + 2 + 4 \times \Delta) \% \beta) \% \theta + \left\lfloor \frac{c}{\theta} \right\rfloor \times \theta,$$

where $0 \le c_0 < 128$, $0 \le c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( \left\lfloor \frac{c_0}{32} \right\rfloor \% 2 \right) \times 2 + \left\lfloor \frac{c_0}{64} \right\rfloor \times 64.$$

In some possible implementations, bit $c_1$ in the 128 bits in row 1 of the fifth bit set is from bit $c_0$ in 128 bits in row $r_0$ of the fourth bit set; and $$c_1 = (c\%\theta + (r_1 + 4 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0\%8}{2} \right\rfloor \times 4 + c_0\%2 + \left(1 - \left\lfloor \frac{c_0}{32} \right\rfloor\%2\right) \times 2 + \left\lfloor \frac{c_0}{64} \right\rfloor \times 64 + \left\lfloor \frac{c_0\%16}{8} \right\rfloor \times 32 + \left(\left\lfloor \frac{c_0}{16} \right\rfloor\%2\right) \times 16.$$

In some possible implementations, bit $c_1$ in the 128 bits in row $r_1$ of the fifth bit set is from bit $c_0$ in 128 bits in row $r_0$ of the fourth bit set; and $$c_1 = (c\%\theta + (r_1 + 2 + 4 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0\%8}{2} \right\rfloor \times 4 + c_0\%2 + \left(\left\lfloor \frac{c_0}{32} \right\rfloor\%2\right) \times 2 + \left\lfloor \frac{c_0}{64} \right\rfloor \times 64 + \left\lfloor \frac{c_0\%16}{8} \right\rfloor \times 32 + \left(\left\lfloor \frac{c_0}{16} \right\rfloor\%2\right) \times 16.$$

In some possible implementations, bit $(\tilde{c}_0 \times 2 - i_2\% \, 2 + 1)$ in 128 bits in row $r_1$ of the fifth bit set is from 1 bit in bit 0 to bit 31 or bit 64 to bit 95 in row $r_0$ of the fourth bit set, where $0 \leq \tilde{c}_0 < 64$.

In some possible implementations, bit $c_1$ in the 128 bits in row $r_1$ of the fifth bit set is from bit $c_0$ in 128 bits in row $r_0$ of the fourth bit set; and $$c_1 = (c\%\theta + (r_1 + 2 \times \Delta)\%\beta)\%\theta + \left\lfloor \frac{c}{\theta} \right\rfloor \times \theta,$$

where $0 \leq c_0 < 128$, $0 < << 128$, $\theta$ is an integer multiple of 4 and $m_0 \times 8$ is exactly divisible by $\theta$, $\Delta$ is an integer, $\beta$ is an integer multiple of 2, and $$c = (c_0\%32) \times 2 + \left(1 - \left(\left\lfloor \frac{c_0}{32} \right\rfloor\%2\right)\right) + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c\%\theta + (r_1 + 1 + 2 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0\%32) \times 2 + \left(\left\lfloor \frac{c_0}{32} \right\rfloor\%2\right) + \left\lfloor \frac{c_0}{64} \right\rfloor \times 64.$$

In some possible implementations, bit $c_1$ in the 128 bits in row $r_1$ of the fifth bit set is from bit $c_0$ in 128 bits in row $r_0$ of the fourth bit set; and $$c_1 = (c\%\theta + (r_1 + 2 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0\%8) \times 2 + \left(1 - \left(\left\lfloor \frac{c_0}{32} \right\rfloor\%2\right)\right) + \left\lfloor \frac{c_0}{64} \right\rfloor \times 64 + \left\lfloor \frac{c_0\%16}{8} \right\rfloor \times 32 + \left(\left\lfloor \frac{c_0}{16} \right\rfloor\%2\right) \times 16.$$

In some possible implementations, bit $c_1$ in the 128 bits in row $r_1$ of the fifth bit set is from bit $c_0$ in 128 bits in row $r_0$ of the fourth bit set; and $$c_1 = (c\%\theta + (r_1 + 1 + 2 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0\%8) \times 2 + \left(\left\lfloor \frac{c_0}{32} \right\rfloor\%2\right) + \left\lfloor \frac{c_0}{64} \right\rfloor \times 64 + \left\lfloor \frac{c_0\%16}{8} \right\rfloor \times 32 + \left(\left\lfloor \frac{c_0}{16} \right\rfloor\%2\right) \times 16.$$

In some possible implementations, $m_3 = 14$, $m_4 = 7$, $F_0 = 256$, $F_2 = 240$, each third bit subset in column 0 to column 5 includes bits in 16 rows and 16 columns, each third bit subset in column 6 includes bits in 16 rows and 15 columns, $F_0/2$ bits in each third bit subset in column 0 to column 3 are from the second bit set, the other $F_0/2$ bits in each third bit subset in column 0 to column 3 are from the third bit set, $F_0$ bits in each third bit subset in column 4 and column 5 are from the second bit set, and $F_2$ bits in each third bit subset in column 6 are from the third bit set.

In some possible implementations, a bit in row $i_1$ and column $$\left(\left\lfloor \frac{j_1}{2} \right\rfloor \times 4 + j_1\%2 + 2 - i_1\%2\right)$$

in a third bit subset in row $i_0$ and column $j_0$ is from the second bit set; or a bit in row $i_1$ and column $(j_1 \times 2)$ in a third bit subset in row $i_0$ and column $j_0$ is from the second bit set, where $0 \leq i_0 < 2$, $0 \leq j_0 < 4$, $0 \leq i_1 < 16$, $0 \leq j_1 < 8$, $\lfloor a \rfloor$ represents performing a floor operation on a, and b % c represents b modulo c.

In some possible implementations, the $m_0$ first bit subsets are distributed in two rows and $m_1$ columns, $m_0 = 16$, $m_1 = 8$, where $F_0/2$ bits in each first bit subset in column 0 to column 3 are from the second bit set, and the other $F_0/2$ bits in each first bit subset in column 0 to column 3 are from the third bit set; $F_0$ bits in each first bit subset in column 4 and column 5 are from the second bit set; and $F_0$ bits in each first bit subset in column 6 and column 7 are from the third bit set and/or the parity bits of the FEC encoding.

In some possible implementations, the first interleaving processing unit is specifically configured to: perform first interleaving processing on first bit subsets in column 4 to column 7 of the fourth bit set to obtain corresponding second bit subsets in column 4 to column 7 of the fifth bit set.

In some possible implementations, bit $$64 + \left( \left\lfloor \frac{\tilde{c}_0}{2} \right\rfloor \times 4 + \tilde{c}_0 \% 2 + (r_1 + 2)\%4 \right)\%64$$

in 128 bits in row 1 of the fifth bit set is from 1 bit in bit 64 to bit 95 in row $r_0$ of the fourth bit set, where $0 \leq \tilde{c}_0 < 31$, $\lfloor a \rfloor$ represents performing a floor operation on a, and b % c represents b modulo c.

In some possible implementations, when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c\%\theta + (r_1 + 4 \times \Delta)\%\beta)\%\theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left(1 - \left\lfloor \frac{c_0}{32} \right\rfloor \%2 \right) \times 2 + 64;$$

or
when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c\%\theta + (r_1 + 2 + 4 \times \Delta)\%\beta)\%\theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( \left\lfloor \frac{c_0}{32} \right\rfloor \%2 \right) \times 2 + 64;$$

or
when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c\%\theta + (r_1 + 4 \times \Delta)\%\beta)\%\theta + \left\lfloor \frac{c}{\theta} \right\rfloor \times \theta,$$

where $64 \leq c_0 < 128$, $64 \leq 1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 8}{2} \right\rfloor \times 4 + c_0 \% 2 + \\ \left(1 - \left\lfloor \frac{c_0}{32} \right\rfloor \%2 \right) \times 2 + 64 + \left\lfloor \frac{c_0 \% 16}{8} \right\rfloor \times 32 + \left( \left\lfloor \frac{c_0}{16} \right\rfloor \%2 \right) \times 16;$$

or
when $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set; and $$c_1 = (c\%\theta + (r_1 + 2 + 4 \times \Delta)\%\beta)\%\theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \\ \left\lfloor \frac{c_0 \% 8}{2} \right\rfloor \times 4 + c_0 \% 2 + \left( \left\lfloor \frac{c_0}{32} \right\rfloor \%2 \right) \times 2 + 64 + \left\lfloor \frac{c_0 \% 16}{8} \right\rfloor \times 32 + \left( \left\lfloor \frac{c_0}{16} \right\rfloor \%2 \right) \times 16.$$

In some possible implementations, $m_3 = 14$, $m_4 = 7$, $F_0 = 256$, and $F_2 = 240$, each third bit subset in column 0 to column 5 includes bits in 16 rows and 16 columns, and each third bit subset in column 6 includes bits in 16 rows and 15 columns; $F_0/2$ bits in each third bit subset in column 0 to column 4 are from the second bit set; the other $F_0/2$ bits in each third bit subset in column 0 to column 4 are from the third bit set; third bit subset $I_{0,5}$ in row 0 and column 5, third bit subset $I_{1,5}$ in row 1 and column 5, bits in column 0 to column 7 in third bit subset $I_{0,6}$ in row 0 and column 6, and bits in column 0 to column 7 in third bit subset $I_{1,6}$ in row 1 and column 6 are from the second bit set; and bits in column 8 to column 14 in third bit subset $I_{0,6}$ in row 0 and column 6, and bits in column 8 to column 14 in third bit subset $I_{1,6}$ in row 1 and column 6 are from the third bit set.

In some possible implementations, a bit in row $i_1$ and column $$\left( \left\lfloor \frac{j_1}{2} \right\rfloor \times 4 + j_1 \% 2 + 2 - i_1 \% 2 \right)$$

in a third bit subset in row $i_0$ and column $j_0$ is from the second bit set; or
a bit in row $i_1$ and column $(j_1 \times 2)$ in a third bit subset in row $i_0$ and column $j_0$ is from the second bit set, where $0 \leq i_0 < 2$, $0 \leq j_0 < 5$, $0 \leq i_1 < 16$, $0 \leq j_1 < 8$, $\lfloor a \rfloor$ represents performing a floor operation on a, and b % c represents b modulo c.

In some possible implementations, the $m_0$ first bit subsets are distributed in two rows and $m_1$ columns, $m_0 = 16$, $m_1 = 8$, where $F_0/2$ bits in each first bit subset in column 0 to column 4 are from the second bit set, and the other $F_0/2$ bits in each first bit subset in column 0 to column 4 are from the third bit set; first bit subset $B_{0,5}$ in row 0 and column 5, first bit subset $B_{1,5}$ in row 1 and column 5, 8×8 bits in row 0 to row 7 and column 0 to column 7 in first bit subset $B_{0,6}$ in row 0 and column 6, 8×8 bits in row 8 to row 15 and column 8 to column 15 in first bit subset $B_{0,6}$ in row 0 and column 6, 8×8 bits in row 0 to row 7 and column 0 to column 7 in first bit subset $B_{1,6}$ in row 1 and column 6, and 8×8 bits in row 8 to row 15 and column 8 to column 15 in first bit subset $B_{1,6}$ in row 1 and column 6 are from the second bit set; and first bit subset $B_{0,7}$ in row 0 and column 7, first bit subset $B_{1,7}$ in row 1 and column 7, 8×8 bits in row 0 to row 7 and column 8 to column 15 in first bit subset $B_{0,6}$ in row 0 and column 6, 8×8 bits in row 8 to row 15 and column 0 to column 7 in first bit subset $B_{0,6}$ in row 0 and column 6, 8×8 bits in row 0 to row 7 and column 8 to column 15 in first bit subset $B_{1,6}$ in row 1 and column 6, and 8×8 bits in row 8 to row 15 and column 0 to column 7 in first bit subset $B_{1,6}$ in row 1 and column 6 are from the third bit set and/or the parity bits of the FEC encoding.

In some possible implementations, the first interleaving processing unit is specifically configured to: perform first interleaving processing on first bit subsets in column 5 to column 7 of the fourth bit set to obtain corresponding second bit subsets in column 5 to column 7 of the fifth bit set.

In some possible implementations, when $$0 \leq \left\lfloor \frac{r_0}{16} \right\rfloor < 8,$$

bit $$80 + \left( \left\lfloor \frac{\tilde{c}_0}{2} \right\rfloor \times 4 + \tilde{c}_0 \,\%2 + (r_1 + 2)\,\%4 \right)\%48$$

in 128 bits in row $r_1$ of the fifth bit set is from 1 bit in bit 80 to bit 103 in row $r_0$ of the fourth bit set; or when $$8 \leq \left\lfloor \frac{r_0}{16} \right\rfloor < 16,$$

bit $$80 + \left( \left\lfloor \frac{\tilde{c}_0}{2} \right\rfloor \times 4 + \tilde{c}_0 \,\%2 + (r_1 + 2)\,\%4 \right)\%48$$

in 128 bits in row $r_1$ of the fifth bit set is from 1 bit in bit 80 to bit 95 and bit 104 to bit 111 in row $r_0$ of the fourth bit set $$8 \leq \left\lfloor \frac{r_0}{16} \right\rfloor < 16,$$

where $0 \leq \tilde{c}_0 < 24$, $\lfloor a \rfloor$ represents performing a floor operation on a, and b % c represents b modulo c.

In some possible implementations, when $0 \leq c_1 < 80$, bit $c_1$ in the 128 bits in row $r_1$ of the fifth bit set is from bit $c_1$ in 128 bits in row $r_0$ of the fourth bit set; or when $80 \leq c_1 < 128$, bit $c_1$ in the 128 bits in row $r_1$ of the fifth bit set is from bit $80 + c_0$ in 128 bits in row $r_0$ of the fourth bit set; and $$c_1 = 80 + (c \,\% \,\theta + (r_1 + 4 \times \Delta) \,\% \,\beta) \,\% \,\theta + \left\lfloor \frac{c}{\theta} \right\rfloor \times \theta,$$

where $0 \leq c_0 < 48$, $80 < c_1 < 128$, $\theta$ is an integer multiple of 4 and 48 is exactly divisible by $\theta$, $\Delta$ is an integer, $\beta$ is an integer multiple of 4, and $$c = \left\lfloor \frac{c_2 \,\%24}{2} \right\rfloor \times 4 + c_2 \,\%2 + \left(1 - \left\lfloor \frac{c_2}{24} \right\rfloor\right) \times 2, \ c_2 = (r_0 \,\%16)^\wedge c_0;$$

or when $0 \leq c_1 < 80$, bit $c_1$ in the 128 bits in row $r_1$ of the fifth bit set is from bit $c_1$ in 128 bits in row $r_0$ of the fourth bit set; or when $80 \leq c_1 < 128$, bit $c_1$ in the 128 bits in row $r_1$ of the fifth bit set is from bit $80 + c_0$ in 128 bits in row $r_0$ of the fourth bit set; and $$c_1 = 80 + (c \,\% \,\theta + (r_1 + 4 \times \Delta) \,\% \,\beta) \,\% \,\theta + \left\lfloor \frac{c}{\theta} \right\rfloor \times \theta,$$

where $0 < c_0 < 48$, $80 < c_1 < 128$, $\theta$ is an integer multiple of 4 and 48 is exactly divisible by $\theta$, $\Delta$ is an integer, $\beta$ is an integer multiple of 4, and $$c = \left\lfloor \frac{c_2 \,\%24}{2} \right\rfloor \times 4 + c_2 \,\%2 + \left(\left\lfloor \frac{c_2}{24} \right\rfloor\right) \times 2, \ c_2 = (r_0 \,\%16)^\wedge c_0.$$

In some possible implementations, $m_3=14$, $m_4=7$, $F_0=256$, and $F_2=240$; each third bit subset in column 0 to column 5 includes bits in 16 rows and 16 columns, each third bit subset in column 6 includes bits in 16 rows and 15 columns, $F_0/2$ bits in each third bit subset in column 0 to column 4 are from the second bit set, the other $F_0/2$ bits in each third bit subset in column 0 to column 4 are from the third bit set, 9 bits in each row of each third bit subset in column 5 are from the second bit set, the other 7 bits in each row of each third bit subset in column 5 are from the third bit set, and $F_2$ bits in each third bit subset in column 6 are from the second bit set. In some possible implementations, the $m_0$ first bit subsets are distributed in two rows and $m_1$ columns, $m_0=16$, and $m_1=8$, where $F_0/2$ bits in each first bit subset in column 0 to column 4 are from the second bit set, and the other $F_0/2$ bits in each first bit subset in column 0 to column 4 are from the third bit set; 9 bits in each row of each first bit subset in column 5 are from the second bit set, and the other 7 bits in each row of each first bit subset in column 5 are from the third bit set; a bit in row $i_1$ and column $15-i_1$ of each first bit subset in column 6 is from the parity bits of the FEC encoding, and remaining bits in each first bit subset in column 6 other than the bit in row $i_1$ and column $15-i_1$ are from the second bit set, where $0 \leq i_1 \leq 15$; and $F_0$ bits in each first bit subset in column 7 are from the parity bits of the FEC encoding.

In some possible implementations, the first interleaving processing unit is specifically configured to: perform the first interleaving processing on column C to column 15 of first bit subset $B_{0,5}$ in row 0 and column 5, column C to column 15 of first bit subset $B_{1,5}$ in row 0 and column 5, first bit subset $B_{0,6}$ in row 0 and column 6, first bit subset $B_{0,7}$ in row 0 and column 7, first bit subset $B_{1,6}$ in row 1 and column 6, and first bit subset $B_{1,6}$ in row 1 and column 6, to obtain corresponding column C to column 15 of second bit subset $T_{0,5}$ in row 0 and column 5, column C to column 15 of second bit subset $T_{1,5}$ in row 0 and column 5, second bit subset $T_{0,6}$ in row 0 and column 6, second bit subset $T_{0,7}$ in row 0 and column 7, second bit subset $T_{1,6}$ in row 1 and column 6, and second bit subset $T_{1,6}$ in row 1 and column 6, where $0 \leq C \leq 15$.

In some possible implementations, $r_0 = r_1$.

In some possible implementations, $F_0$ bits in each of the second bit subsets are distributed in $F_1$ rows and $F_1$ columns, and $F_1$ bits in each row of the second bit subset are from two first bit subsets.

In some possible implementations, $F_0$ bits in each first bit subset are distributed in $F_1$ rows and $F_1$ columns, $F_1/2$ bits in $F_1$ bits in each row of the second bit subset are from one row of one first bit subset, and the other $F_1/2$ bits in the $F_1$ bits in each row of the second bit subset are from one row of another first bit subset.

In some possible implementations, $F_0 = 256$, $m_0 \times 256$ bits in the fourth bit set are distributed in 32 rows and $m_0 \times 8$ columns, $m_0 \times 256$ bits in the fifth bit set are distributed in 32 rows and $m_0 \times 8$ columns, and 32 bits in each column of the fifth bit set are from two first bit subsets.

In some possible implementations, 256 bits in each first bit subset are distributed in 16 rows and 16 columns, 16 bits in 32 bits in each column of the fifth bit subset are from one column of one first bit subset, and the other 16 bits in the 32 bits in each column of the fifth bit subset are from one column of another first bit subset.

In some possible implementations, the 16 bits in the 32 bits in each column of the fifth bit set are from column $c_1\%$ 16 of one first bit subset, and the other 16 bits in the 32 bits in each column of the fifth bit set are from column $c_1\%$ 16 of another first bit subset, where $0 \leq c_1 < (m_0 \times 8)$.

In some possible implementations, $m_0 = 16$, and the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,4}$ in row 0 and column 4;

a total of 512 bits in second bit subset $T_{0,1}$ in row 0 and column 1 and second bit subset $T_{1,1}$ in row 1 and column 1 are from a total of 512 bits in first bit subset $B_{1,0}$ in row 1 and column 0 and first bit subset $B_{1,4}$ in row 1 and column 4;

a total of 512 bits in second bit subset $T_{0,2}$ in row 0 and column 2 and second bit subset $T_{1,2}$ in row 1 and column 2 are from a total of 512 bits in first bit subset $B_{0,1}$ in row 0 and column 1 and first bit subset $B_{0,5}$ in row 0 and column 5;

a total of 512 bits in second bit subset $T_{0,3}$ in row 0 and column 3 and second bit subset $T_{1,3}$ in row 1 and column 3 are from a total of 512 bits in first bit subset $B_{1,1}$ in row 1 and column 1 and first bit subset $B_{1,5}$ in row 1 and column 5;

a total of 512 bits in second bit subset $T_{0,4}$ in row 0 and column 4 and second bit subset $T_{1,4}$ in row 1 and column 4 are from a total of 512 bits in first bit subset $B_{0,2}$ in row 0 and column 2 and first bit subset $B_{0,6}$ in row 0 and column 6;

a total of 512 bits in second bit subset $T_{0,5}$ in row 0 and column 5 and second bit subset $T_{1,5}$ in row 1 and column 5 are from a total of 512 bits in first bit subset $B_{1,2}$ in row 1 and column 2 and first bit subset $B_{1,6}$ in row 1 and column 6;

a total of 512 bits in second bit subset $T_{0,6}$ in row 0 and column 6 and second bit subset $T_{1,6}$ in row 1 and column 6 are from a total of 512 bits in first bit subset $B_{0,3}$ in row 0 and column 3 and first bit subset $B_{0,7}$ in row 0 and column 7; and a total of 512 bits in second bit subset $T_{0,7}$ in row 0 and column 7 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

In some possible implementations, $m_0 = 16$, and the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,4}$ in row 0 and column 4;

a total of 512 bits in second bit subset $T_{0,1}$ in row 0 and column 1 and second bit subset $T_{1,1}$ in row 1 and column 1 are from a total of 512 bits in first bit subset $B_{0,1}$ in row 0 and column 1 and first bit subset $B_{0,5}$ in row 0 and column 5;

a total of 512 bits in second bit subset $T_{0,2}$ in row 0 and column 2 and second bit subset $T_{1,2}$ in row 1 and column 2 are from a total of 512 bits in first bit subset $B_{0,2}$ in row 0 and column 2 and first bit subset $B_{0,6}$ in row 0 and column 6;

a total of 512 bits in second bit subset $T_{0,3}$ in row 0 and column 3 and second bit subset $T_{1,3}$ in row 1 and column 3 are from a total of 512 bits in first bit subset $B_{0,3}$ in row 0 and column 3 and first bit subset $B_{0,7}$ in row 0 and column 7;

a total of 512 bits in second bit subset $T_{0,4}$ in row 0 and column 4 and second bit subset $T_{1,4}$ in row 1 and column 4 are from a total of 512 bits in first bit subset $B_{1,0}$ in row 1 and column 0 and first bit subset $B_{1,4}$ in row 1 and column 4;

a total of 512 bits in second bit subset $T_{0,5}$ in row 0 and column 5 and second bit subset $T_{1,5}$ in row 1 and column 5 are from a total of 512 bits in first bit subset $B_{1,1}$ in row 1 and column 1 and first bit subset $B_{1,5}$ in row 1 and column 5;

a total of 512 bits in second bit subset $T_{0,6}$ in row 0 and column 6 and second bit subset $T_{1,6}$ in row 1 and column 6 are from a total of 512 bits in first bit subset $B_{1,2}$ in row 1 and column 2 and first bit subset $B_{1,6}$ in row 1 and column 6; and a total of 512 bits in second bit subset $T_{0,7}$ in row 0 and column 7 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

In some possible implementations, $m_0 = 16$, and the 16 second bit subsets are distributed in two rows and eight columns, where a total of 512 bits in second bit subset $T_{0,0}$ in row 0 and column 0 and second bit subset $T_{0,1}$ in row 0 and column 1 are from a total of 512 bits in first bit subset $B_{0,0}$ in row 0 and column 0 and first bit subset $B_{0,4}$ in row 0 and column 4;

a total of 512 bits in second bit subset $T_{0,2}$ in row 0 and column 2 and second bit subset $T_{0,3}$ in row 0 and column 3 are from a total of 512 bits in first bit subset $B_{0,1}$ in row 0 and column 1 and first bit subset $B_{0,5}$ in row 0 and column 5;

a total of 512 bits in second bit subset $T_{0,4}$ in row 0 and column 4 and second bit subset $T_{0,5}$ in row 0 and column 5 are from a total of 512 bits in first bit subset $B_{0,2}$ in row 0 and column 2 and first bit subset $B_{0,6}$ in row 0 and column 6;

a total of 512 bits in second bit subset $T_{0,6}$ in row 0 and column 6 and second bit subset $T_{0,7}$ in row 0 and column 7 are from a total of 512 bits in first bit subset $B_{0,3}$ in row 0 and column 3 and first bit subset $B_{0,7}$ in row 0 and column 7;

a total of 512 bits in second bit subset $T_{1,0}$ in row 1 and column 0 and second bit subset $T_{1,1}$ in row 1 and column 1 are from a total of 512 bits in first bit subset $B_{1,0}$ in row 1 and column 0 and first bit subset $B_{1,4}$ in row 1 and column 4;

a total of 512 bits in second bit subset $T_{1,2}$ in row 1 and column 2 and second bit subset $T_{1,3}$ in row 1 and column 3 are from a total of 512 bits in first bit subset $B_{1,1}$ in row 1 and column 1 and first bit subset $B_{1,5}$ in row 1 and column 5;

a total of 512 bits in second bit subset $T_{1,4}$ in row 1 and column 4 and second bit subset $T_{1,5}$ in row 1 and column 5 are from a total of 512 bits in first bit subset $B_{1,2}$ in row 1 and column 2 and first bit subset $B_{1,6}$ in row 1 and column 6; and a total of 512 bits in second bit subset $T_{1,6}$ in row 1 and column 6 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

In some possible implementations, the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,2}$ in row 0 and column 2;

a total of 512 bits in second bit subset $T_{0,1}$ in row 0 and column 1 and second bit subset $T_{1,1}$ in row 1 and column 1 are from a total of 512 bits in first bit subset $B_{1,0}$ in row 1 and column 0 and first bit subset $B_{1,2}$ in row 1 and column 2;

a total of 512 bits in second bit subset $T_{0,2}$ in row 0 and column 2 and second bit subset $T_{1,2}$ in row 1 and column 2 are from a total of 512 bits in first bit subset $B_{0,1}$ in row 0 and column 1 and first bit subset $B_{0,3}$ in row 0 and column 3;

a total of 512 bits in second bit subset $T_{0,3}$ in row 0 and column 3 and second bit subset $T_{1,3}$ in row 1 and column 3 are from a total of 512 bits in first bit subset $B_{1,1}$ in row 1 and column 1 and first bit subset $B_{1,3}$ in row 1 and column 3;

a total of 512 bits in second bit subset $T_{0,4}$ in row 0 and column 4 and second bit subset $T_{1,4}$ in row 1 and column 4 are from a total of 512 bits in first bit subset $B_{0,4}$ in row 0 and column 4 and first bit subset $B_{0,6}$ in row 0 and column 6;

a total of 512 bits in second bit subset $T_{0,5}$ in row 0 and column 5 and second bit subset $T_{1,5}$ in row 1 and column 5 are from a total of 512 bits in first bit subset $B_{1,4}$ in row 1 and column 4 and first bit subset $B_{1,6}$ in row 1 and column 6;

a total of 512 bits in second bit subset $T_{0,6}$ in row 0 and column 6 and second bit subset $T_{1,6}$ in row 1 and column 6 are from a total of 512 bits in first bit subset $B_{0,5}$ in row 0 and column 5 and first bit subset $B_{0,7}$ in row 0 and column 7; and a total of 512 bits in second bit subset $T_{0,7}$ in row 0 and column 7 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

In some possible implementations, the 16 second bit subsets are distributed in two rows and eight columns, where a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,2}$ in row 0 and column 2;

a total of 512 bits in second bit subset $T_{0,1}$ in row 0 and column 1 and second bit subset $T_{1,1}$ in row 1 and column 1 are from a total of 512 bits in first bit subset $B_{0,1}$ in row 0 and column 1 and first bit subset $B_{0,3}$ in row 0 and column 3;

a total of 512 bits in second bit subset $T_{0,2}$ in row 0 and column 2 and second bit subset $T_{1,2}$ in row 1 and column 2 are from a total of 512 bits in first bit subset $B_{0,4}$ in row 0 and column 4 and first bit subset $B_{0,6}$ in row 0 and column 6;

a total of 512 bits in second bit subset $T_{0,3}$ in row 0 and column 3 and second bit subset $T_{1,3}$ in row 1 and column 3 are from a total of 512 bits in first bit subset $B_{0,5}$ in row 0 and column 5 and first bit subset $B_{0,7}$ in row 0 and column 7;

a total of 512 bits in second bit subset $T_{0,4}$ in row 0 and column 4 and second bit subset $T_{1,4}$ in row 1 and column 4 are from a total of 512 bits in first bit subset $B_{1,0}$ in row 1 and column 0 and first bit subset $B_{1,2}$ in row 1 and column 2;

a total of 512 bits in second bit subset $T_{0,5}$ in row 0 and column 5 and second bit subset $T_{1,5}$ in row 1 and column 5 are from a total of 512 bits in first bit subset $B_{1,1}$ in row 1 and column 1 and first bit subset $B_{1,3}$ in row 1 and column 3;

a total of 512 bits in second bit subset $T_{0,6}$ in row 0 and column 6 and second bit subset $T_{1,6}$ in row 1 and column 6 are from a total of 512 bits in first bit subset $B_{1,4}$ in row 1 and column 4 and first bit subset $B_{1,6}$ in row 1 and column 6; and a total of 512 bits in second bit subset $T_{0,7}$ in row 0 and column 7 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

In some possible implementations, $m_0=16$, and the 16 second bit subsets are distributed in two rows and eight columns, where a total of 512 bits in second bit subset $T_{0,0}$ in row 0 and column 0 and second bit subset $T_{0,1}$ in row 0 and column 1 are from a total of 512 bits in first bit subset $B_{0,0}$ in row 0 and column 0 and first bit subset $B_{0,2}$ in row 0 and column 2;

a total of 512 bits in second bit subset $T_{0,2}$ in row 0 and column 2 and second bit subset $T_{0,3}$ in row 0 and column 3 are from a total of 512 bits in first bit subset $B_{0,1}$ in row 0 and column 1 and first bit subset $B_{0,3}$ in row 0 and column 3;

a total of 512 bits in second bit subset $T_{0,4}$ in row 0 and column 4 and second bit subset $T_{0,5}$ in row 0 and column 5 are from a total of 512 bits in first bit subset $B_{0,4}$ in row 0 and column 4 and first bit subset $B_{0,6}$ in row 0 and column 6;

a total of 512 bits in second bit subset $T_{0,6}$ in row 0 and column 6 and second bit subset $T_{0,7}$ in row 0 and column 7 are from a total of 512 bits in first bit subset $B_{0,5}$ in row 0 and column 5 and first bit subset $B_{0,7}$ in row 0 and column 7;

a total of 512 bits in second bit subset $T_{1,0}$ in row 1 and column 0 and second bit subset $T_{1,1}$ in row 1 and column 1 are from a total of 512 bits in first bit subset $B_{1,0}$ in row 1 and column 0 and first bit subset $B_{1,2}$ in row 1 and column 2;

a total of 512 bits in second bit subset $T_{1,2}$ in row 1 and column 2 and second bit subset $T_{1,3}$ in row 1 and column 3 are from a total of 512 bits in first bit subset $B_{1,1}$ in row 1 and column 1 and first bit subset $B_{1,3}$ in row 1 and column 3;

a total of 512 bits in second bit subset $T_{1,4}$ in row 1 and column 4 and second bit subset $T_{1,5}$ in row 1 and column 5 are from a total of 512 bits in first bit subset $B_{1,4}$ in row 1 and column 4 and first bit subset $B_{1,6}$ in row 1 and column 6; and a total of 512 bits in second bit subset $T_{1,6}$ in row 1 and column 6 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

In some possible implementations, $m_0$=12 or 16.

In some possible implementations, the data processing apparatus further includes a second interleaving processing unit, a symbol mapping unit, a polarization distribution unit, and a DSP framing unit, where the second interleaving processing unit is configured to perform second interleaving processing on every two first bit streams in L first bit streams to obtain a total of L/2 second bit streams, where each first bit stream includes a plurality of fifth bit sets, and Lis an even number greater than 0; the symbol mapping unit and the polarization distribution unit are configured to perform symbol mapping and polarization distribution on the L/2 second bit streams to obtain one dual-polarization symbol stream, where t bits are mapped to one dual-polarization symbol through the symbol mapping and the polarization distribution, and t is an integer greater than 0; and the DSP framing unit is configured to perform DSP framing on the dual-polarization symbol stream.

In some possible implementations, an amplitude bit in the dual-polarization symbol is from the second bit set.

In some possible implementations, t=8, and the dual-polarization symbol is a dual-polarization DP-16QAM symbol.

In some possible implementations, the DSP framing unit is specifically configured to perform framing processing on every 172032 dual-polarization DP-16QAM symbols to obtain one DSP super-frame, where the super-frame includes 175104 dual-polarization symbols.

According to a fifth aspect, an embodiment of this application provides a data processing apparatus. The data processing apparatus includes a first processing unit, a second processing unit, a scrambling unit, a third processing unit, a PCS unit, and an FEC encoding unit, where the first processing unit is configured to obtain first data from a data frame, where the first data includes bits in r rows and q columns, r is an integer greater than 0, and q is an integer greater than 0; the second processing unit is configured to perform cyclic redundancy check CRC and/or pad bit insertion on the first data to obtain second data, where the second data includes $d_{CRC}$ parity bits inserted through the CRC and/or $d_{PAD}$ pad bits, $d_{CRC}$ is an integer greater than or equal to 0, and $d_{PAD}$ is an integer greater than or equal to 0; the scrambling unit is configured to scramble the second data to obtain third data, where a quantity of bits of the third data is $d_{scr}$=r×q+$d_{CP}$, and $d_{CP}$=$d_{CRC}$+$d_{PAD}$; the third processing unit is configured to obtain k bits in the third data, where k is an integer greater than 1, and $d_{scr}$ is an integer multiple of k; the PCS unit is configured to perform PCS processing on a first bit set in the k bits, to obtain a second bit set; and the FEC unit is configured to perform FEC encoding on the second bit set and a third bit set in the k bits excluding the first bit set, to obtain a fourth bit set.

In some possible implementations, the data processing apparatus further includes a pre-encoding interleaving unit, where the pre-encoding interleaving unit is configured to perform pre-encoding interleaving processing on the second bit set and the third bit set to obtain a sixth bit set, where a quantity of bits in the sixth bit set is equal to a sum of a quantity of bits in the second bit set and a quantity of bits in the third bit set, the sixth bit set includes $m_3$ third bit subsets, the $m_3$ third bit subsets are distributed in two rows and $m_4$ columns, $m_3$=2×$m_4$, and $m_3$ is an integer greater than 1 and less than $m_0$, where some third bit subsets each includes $F_0$ bits, the other third bit subsets each includes $F_2$ bits, and $F_2$ is an even number greater than 1 and less than $F_0$; and the FEC unit is configured to perform the FEC encoding on the sixth bit set to obtain the fourth bit set.

In some possible implementations, a quantity of bits in the first bit set is an integer multiple of 2, 4, 8, or 16, the second bit set includes 2048 bits, the third bit set includes 1504 bits, and the fourth bit set includes 4096 bits.

In some possible implementations, $d_{scr}$ is an integer multiple of 4×k, and q=10280.

In some possible implementations, overhead of the CRC and/or the pad bit insertion is ($d_{CRC}$+$d_{PAD}$)/(r×q), and ($d_{CRC}$+$d_{PAD}$)/(r×q)≤0.001.

In some possible implementations, r=79, $d_{CP}$=328, and k=3224;

r=83, $d_{CP}$=32, and k=3386;
r=83, $d_{CP}$=536, and k=3388;
r=87, $d_{CP}$=72, and k=2662;
r=87, $d_{CP}$=744, and k=2664;
r=87, $d_{CP}$=3432, and k=2672;
r=104, $d_{CP}$=704, and k=3184;
r=104, $d_{CP}$=3392, and k=3192;
r=105, $d_{CP}$=504, and k=3214;
r=105, $d_{CP}$=1176, and k=3216;
r=109, $d_{CP}$=40, and k=2668;
r=109, $d_{CP}$=880, and k=2670;
r=110, $d_{CP}$=176, and k=3366;
r=110, $d_{CP}$=848, and k=3368;
r=110, $d_{CP}$=3536, and k=3376;
r=111, $d_{CP}$=648, and k=3398;
r=131, $d_{CP}$=8, and k=2672;
r=131, $d_{CP}$=1016, and k=2674;
r=131, $d_{CP}$=680, and k=3208;
r=132, $d_{CP}$=480, and k=3232;
r=132, $d_{CP}$=1320, and k=3234;
r=137, $d_{CP}$=320, and k=3354;
r=137, $d_{CP}$=1160, and k=3356;
r=138, $d_{CP}$=120, and k=3378;
r=138, $d_{CP}$=960, and k=3380;
r=152, $d_{CP}$=344, and k=2658;
r=152, $d_{CP}$=1520, and k=2660;
r=153, $d_{CP}$=648, and k=2676;
r=157, $d_{CP}$=856, and k=3204;
r=158, $d_{CP}$=656, and k=3224;
r=165, $d_{CP}$=264, and k=3366;
r=165, $d_{CP}$=1272, and k=3368;
r=166, $d_{CP}$=64, and k=3386;
r=166, $d_{CP}$=1072, and k=3388;

r=174, $d_{CP}$=144, and k=2662;
r=174, $d_{CP}$=1488, and k=2664;
r=175, $d_{CP}$=616, and k=2678;
r=183, $d_{CP}$=360, and k=3200;
r=183, $d_{CP}$=1536, and k=3202;
r=184, $d_{CP}$=664, and k=3218;
r=184, $d_{CP}$=1840, and k=3220;
r=185, $d_{CP}$=968, and k=3236;
r=192, $d_{CP}$=744, and k=3358;
r=192, $d_{CP}$=1920, and k=3360;
r=193, $d_{CP}$=1048, and k=3376;
r=194, $d_{CP}$=176, and k=3392;
r=194, $d_{CP}$=1352, and k=3394;
r=196, $d_{CP}$=616, and k=2666;
r=209, $d_{CP}$=536, and k=3198;
r=209, $d_{CP}$=1880, and k=3200;
r=210, $d_{CP}$=1008, and k=3214;
r=211, $d_{CP}$=136, and k=3228;
r=211, $d_{CP}$=1480, and k=3230;
r=217, $d_{CP}$=280, and k=2656;
r=217, $d_{CP}$=1960, and k=2658;
r=218, $d_{CP}$=80, and k=2668;
r=218, $d_{CP}$=1760, and k=2670;
r=219, $d_{CP}$=1224, and k=3352;
r=220, $d_{CP}$=352, and k=3366;
r=220, $d_{CP}$=1696, and k=3368;
r=221, $d_{CP}$=824, and k=3382;
r=221, $d_{CP}$=2168, and k=3384;
r=222, $d_{CP}$=1296, and k=3398;
r=235, $d_{CP}$=376, and k=3196;
r=235, $d_{CP}$=1888, and k=3198;
r=236, $d_{CP}$=680, and k=3210;
r=236, $d_{CP}$=2192, and k=3212;
r=237, $d_{CP}$=984, and k=3224;
r=238, $d_{CP}$=1288, and k=3238;
r=239, $d_{CP}$=920, and k=2660;
r=240, $d_{CP}$=1728, and k=2672;
r=247, $d_{CP}$=1000, and k=3360;
r=247, $d_{CP}$=2512, and k=3362;
r=248, $d_{CP}$=1304, and k=3374;
r=249, $d_{CP}$=96, and k=3386;
r=249, $d_{CP}$=1608, and k=3388;
r=250, $d_{CP}$=400, and k=3400;
r=250, $d_{CP}$=1912, and k=3402;
r=261, $d_{CP}$=216, and k=2662;
r=261, $d_{CP}$=2232, and k=2664;
r=261, $d_{CP}$=1560, and k=3196;
r=262, $d_{CP}$=16, and k=2672;
r=262, $d_{CP}$=2032, and k=2674;
r=262, $d_{CP}$=1360, and k=3208;
r=263, $d_{CP}$=1160, and k=3220;
r=264, $d_{CP}$=960, and k=3232;
r=264, $d_{CP}$=2640, and k=3234;
r=274, $d_{CP}$=640, and k=3354;
r=274, $d_{CP}$=2320, and k=3356;
r=275, $d_{CP}$=440, and k=3366;
r=275, $d_{CP}$=2120, and k=3368;
r=276, $d_{CP}$=240, and k=3378;
r=276, $d_{CP}$=1920, and k=3380;
r=277, $d_{CP}$=40, and k=3390;
r=277, $d_{CP}$=1720, and k=3392;
r=283, $d_{CP}$=2032, and k=2666;
r=284, $d_{CP}$=488, and k=2674;
r=284, $d_{CP}$=2672, and k=2676;
r=287, $d_{CP}$=896, and k=3194;
r=287, $d_{CP}$=2744, and k=3196;
r=288, $d_{CP}$=1704, and k=3206;

r=289, $d_{CP}$=664, and k=3216;
r=289, $d_{CP}$=2512, and k=3218;
r=290, $d_{CP}$=1472, and k=3228;
r=291, $d_{CP}$=432, and k=3238;
r=291, $d_{CP}$=2280, and k=3240;
r=302, $d_{CP}$=80, and k=3360;
r=302, $d_{CP}$=1928, and k=3362;
r=303, $d_{CP}$=888, and k=3372;
r=303, $d_{CP}$=2736, and k=3374;
r=304, $d_{CP}$=688, and k=2658;
r=304, $d_{CP}$=3040, and k=2660;
r=304, $d_{CP}$=1696, and k=3384;
r=305, $d_{CP}$=2168, and k=2668;
r=305, $d_{CP}$=656, and k=3394;
r=305, $d_{CP}$=2504, and k=3396;
r=306, $d_{CP}$=1296, and k=2676;
r=313, $d_{CP}$=1912, and k=3194;
r=314, $d_{CP}$=1712, and k=3204;
r=315, $d_{CP}$=1512, and k=3214;
r=316, $d_{CP}$=1312, and k=3224;
r=317, $d_{CP}$=1112, and k=3234;
r=317, $d_{CP}$=3128, and k=3236;
r=326, $d_{CP}$=320, and k=2660;
r=326, $d_{CP}$=2840, and k=2662;
r=327, $d_{CP}$=120, and k=2668;
r=327, $d_{CP}$=2640, and k=2670;
r=328, $d_{CP}$=2440, and k=2678;
r=329, $d_{CP}$=728, and k=3356;
r=329, $d_{CP}$=2744, and k=3358;
r=330, $d_{CP}$=528, and k=3366;
r=330, $d_{CP}$=2544, and k=3368;
r=331, $d_{CP}$=328, and k=3376;
r=331, $d_{CP}$=2344, and k=3378;
r=332, $d_{CP}$=128, and k=3386;
r=332, $d_{CP}$=2144, and k=3388;
r=333, $d_{CP}$=1944, and k=3398;
r=339, $d_{CP}$=744, and k=3192;
r=339, $d_{CP}$=2928, and k=3194;
r=340, $d_{CP}$=1384, and k=3202;
r=341, $d_{CP}$=2024, and k=3212;
r=342, $d_{CP}$=480, and k=3220;
r=342, $d_{CP}$=2664, and k=3222;
r=343, $d_{CP}$=1120, and k=3230;
r=343, $d_{CP}$=3304, and k=3232;
r=344, $d_{CP}$=1760, and k=3240;
r=348, $d_{CP}$=288, and k=2662;
r=348, $d_{CP}$=2976, and k=2664;
r=349, $d_{CP}$=760, and k=2670;
r=349, $d_{CP}$=3448, and k=2672;
r=350, $d_{CP}$=1232, and k=2678;
r=356, $d_{CP}$=704, and k=3352;
r=356, $d_{CP}$=2888, and k=3354;
r=357, $d_{CP}$=1344, and k=3362;
r=357, $d_{CP}$=3528, and k=3364;
r=358, $d_{CP}$=1984, and k=3372;
r=359, $d_{CP}$=440, and k=3380;
r=359, $d_{CP}$=2624, and k=3382;
r=360, $d_{CP}$=1080, and k=3390;
r=360, $d_{CP}$=3264, and k=3392;
r=361, $d_{CP}$=1720, and k=3400;
r=365, $d_{CP}$=1592, and k=3192;
r=366, $d_{CP}$=720, and k=3200;
r=366, $d_{CP}$=3072, and k=3202;
r=367, $d_{CP}$=2200, and k=3210;
r=368, $d_{CP}$=1328, and k=3218;
r=368, $d_{CP}$=3680, and k=3220;
r=369, $d_{CP}$=2304, and k=2658;

r=369, $d_{CP}$=456, and k=3226;
r=369, $d_{CP}$=2808, and k=3228;
r=370, $d_{CP}$=592, and k=2664;
r=370, $d_{CP}$=3448, and k=2666;
r=370, $d_{CP}$=1936, and k=3236;
r=371, $d_{CP}$=1736, and k=2672;
r=384, $d_{CP}$=1488, and k=3358;
r=384, $d_{CP}$=3840, and k=3360;
r=385, $d_{CP}$=616, and k=3366;
r=385, $d_{CP}$=2968, and k=3368;
r=386, $d_{CP}$=2096, and k=3376;
r=387, $d_{CP}$=1224, and k=3384;
r=387, $d_{CP}$=3576, and k=3386;
r=388, $d_{CP}$=352, and k=3392;
r=388, $d_{CP}$=2704, and k=3394;
r=389, $d_{CP}$=1832, and k=3402;
r=391, $d_{CP}$=2440, and k=2660;
r=392, $d_{CP}$=1232, and k=2666;
r=392, $d_{CP}$=2240, and k=3200;
r=393, $d_{CP}$=24, and k=2672;
r=393, $d_{CP}$=3048, and k=2674;
r=393, $d_{CP}$=2040, and k=3208;
r=394, $d_{CP}$=1840, and k=3216;
r=395, $d_{CP}$=1640, and k=3224;
r=396, $d_{CP}$=1440, and k=3232;
r=396, $d_{CP}$=3960, and k=3234;
r=397, $d_{CP}$=1240, and k=3240;
r=397, $d_{CP}$=3760, and k=3242;
r=411, $d_{CP}$=960, and k=3354;
r=411, $d_{CP}$=3480, and k=3356;
r=412, $d_{CP}$=760, and k=3362;
r=412, $d_{CP}$=3280, and k=3364;
r=413, $d_{CP}$=2912, and k=2662;
r=413, $d_{CP}$=560, and k=3370;
r=413, $d_{CP}$=3080, and k=3372;
r=414, $d_{CP}$=2208, and k=2668;
r=414, $d_{CP}$=360, and k=3378;
r=414, $d_{CP}$=2880, and k=3380;
r=415, $d_{CP}$=1504, and k=2674;
r=415, $d_{CP}$=160, and k=3386;
r=415, $d_{CP}$=2680, and k=3388;
r=416, $d_{CP}$=2480, and k=3396;
r=418, $d_{CP}$=1072, and k=3198;
r=418, $d_{CP}$=3760, and k=3200;
r=419, $d_{CP}$=1544, and k=3206;
r=419, $d_{CP}$=4232, and k=3208;
r=420, $d_{CP}$=2016, and k=3214;
r=421, $d_{CP}$=2488, and k=3222;
r=422, $d_{CP}$=272, and k=3228;
r=422, $d_{CP}$=2960, and k=3230;
r=423, $d_{CP}$=744, and k=3236;
r=423, $d_{CP}$=3432, and k=3238;
r=434, $d_{CP}$=560, and k=2656;
r=434, $d_{CP}$=3920, and k=2658;
r=435, $d_{CP}$=360, and k=2662;
r=435, $d_{CP}$=3720, and k=2664;
r=436, $d_{CP}$=160, and k=2668;
r=436, $d_{CP}$=3520, and k=2670;
r=437, $d_{CP}$=3320, and k=2676;
r=438, $d_{CP}$=2448, and k=3352;
r=439, $d_{CP}$=232, and k=3358;
r=439, $d_{CP}$=2920, and k=3360;
r=440, $d_{CP}$=704, and k=3366;
r=440, $d_{CP}$=3392, and k=3368;
r=441, $d_{CP}$=1176, and k=3374;
r=441, $d_{CP}$=3864, and k=3376;
r=442, $d_{CP}$=1648, and k=3382;

r=442, $d_{CP}$=4336, and k=3384;
r=443, $d_{CP}$=2120, and k=3390;
r=444, $d_{CP}$=2424, and k=3198;
r=444, $d_{CP}$=2592, and k=3398;
r=445, $d_{CP}$=712, and k=3204;
r=445, $d_{CP}$=3568, and k=3206;
r=446, $d_{CP}$=1856, and k=3212;
r=447, $d_{CP}$=144, and k=3218;
r=447, $d_{CP}$=3000, and k=3220;
r=448, $d_{CP}$=1288, and k=3226;
r=448, $d_{CP}$=4144, and k=3228;
r=449, $d_{CP}$=2432, and k=3234;
r=456, $d_{CP}$=1032, and k=2658;
r=456, $d_{CP}$=4560, and k=2660;
r=457, $d_{CP}$=1336, and k=2664;
r=458, $d_{CP}$=1640, and k=2670;
r=459, $d_{CP}$=1944, and k=2676;
r=466, $d_{CP}$=1888, and k=3356;
r=466, $d_{CP}$=4744, and k=3358;
r=467, $d_{CP}$=176, and k=3362;
r=467, $d_{CP}$=3032, and k=3364;
r=468, $d_{CP}$=1320, and k=3370;
r=468, $d_{CP}$=4176, and k=3372;
r=469, $d_{CP}$=2464, and k=3378;
r=470, $d_{CP}$=752, and k=3196;
r=470, $d_{CP}$=3776, and k=3198;
r=470, $d_{CP}$=752, and k=3384;
r=470, $d_{CP}$=3608, and k=3386;
r=471, $d_{CP}$=2568, and k=3204;
r=471, $d_{CP}$=1896, and k=3392;
r=471, $d_{CP}$=4752, and k=3394;
r=472, $d_{CP}$=1360, and k=3210;
r=472, $d_{CP}$=4384, and k=3212;
r=472, $d_{CP}$=184, and k=3398;
r=472, $d_{CP}$=3040, and k=3400;
r=473, $d_{CP}$=152, and k=3216;
r=473, $d_{CP}$=3176, and k=3218;
r=474, $d_{CP}$=1968, and k=3224;
r=475, $d_{CP}$=760, and k=3230;
r=475, $d_{CP}$=3784, and k=3232;
r=476, $d_{CP}$=2576, and k=3238;
r=478, $d_{CP}$=1840, and k=2660;
r=479, $d_{CP}$=2648, and k=2666;
r=480, $d_{CP}$=3456, and k=2672;
r=481, $d_{CP}$=568, and k=2676;
r=481, $d_{CP}$=4264, and k=2678;
r=493, $d_{CP}$=184, and k=3352;
r=493, $d_{CP}$=3208, and k=3354;
r=494, $d_{CP}$=2000, and k=3360;
r=494, $d_{CP}$=5024, and k=3362;
r=495, $d_{CP}$=792, and k=3366;
r=495, $d_{CP}$=3816, and k=3368;
r=496, $d_{CP}$=1936, and k=3196;
r=496, $d_{CP}$=2608, and k=3374;
r=497, $d_{CP}$=1232, and k=3202;
r=497, $d_{CP}$=4424, and k=3204;
r=497, $d_{CP}$=1400, and k=3380;
r=497, $d_{CP}$=4424, and k=3382;
r=498, $d_{CP}$=528, and k=3208;
r=498, $d_{CP}$=3720, and k=3210;
r=498, $d_{CP}$=192, and k=3386;
r=498, $d_{CP}$=3216, and k=3388;
r=499, $d_{CP}$=1672, and k=2656;
r=499, $d_{CP}$=3016, and k=3216;
r=499, $d_{CP}$=2008, and k=3394;
r=499, $d_{CP}$=5032, and k=3396;
r=500, $d_{CP}$=2984, and k=2662;

r=500, $d_{CP}$=2312, and k=3222;
r=500, $d_{CP}$=800, and k=3400;
r=500, $d_{CP}$=3824, and k=3402;
r=501, $d_{CP}$=432, and k=2666;
r=501, $d_{CP}$=4296, and k=2668;
r=501, $d_{CP}$=1608, and k=3228;
r=501, $d_{CP}$=4800, and k=3230;
r=502, $d_{CP}$=1744, and k=2672;
r=502, $d_{CP}$=904, and k=3234;
r=502, $d_{CP}$=4096, and k=3236; or
r=503, $d_{CP}$=3056, and k=2678.

In some possible implementations, $d_{scr}$=336×k.

In some possible implementations, the second data processing unit is specifically configured to: perform CRC-32 check on a total of r×q/p bits in every r/p rows of the first data, to add 32 parity bits, where $d_{CRC}$=32×p, r is divisible by p, and p is an integer greater than 1; or perform CRC-32 check on a total of q×$r_{F0}$ bits in every $r_{F0}$ rows in first $r_{F0}$×(p–1) rows of the first data to add 32 parity bits, and perform CRC-32 check on a total of q×$r_{F1}$ bits in last $r_{F1}$ rows of the first data to add 32 parity bits, where $d_{CRC}$=32×p, r is indivisible by p, p is an integer greater than 1, $r_{F0}$×(p–1)+$r_{F1}$=r, $r_{F0}$>$r_{F1}$, and ⌊a⌋ represents performing a floor operation on a.

In some possible implementations, q× $r_{F0}$=41120.

In some possible implementations, q=2056.

In some possible implementations, the second data processing unit is specifically configured to: perform CRC-32 check on a total of q×$r_{F0}$ bits in every $r_{F0}$ rows in the first $r_{F0}$×(p–1) rows of the first data to add 32 parity bits, and perform CRC-32 check on a total of q×$F_{F1}$ bits in the last $r_{F1}$ rows of the first data to add 32 parity bits, where $d_{CRC}$=32×p, r is indivisible by p, p is an integer greater than 1, $r_{F0}$×(p–1)+$r_{F1}$=r, the integer $r_{F0}$ is greater than the integer $r_{F1}$, and ⌊a⌋ represents performing a floor operation on a.

In some possible implementations, r=435.

In some possible implementations, p=22, $r_{F0}$=20, $F_{F1}$=15, and the second data processing unit is specifically configured to: perform CRC-32 check on a total of 41120 bits in every 20 rows in first 420 rows of the first data to add 32 parity bits, and perform CRC-32 check on a total of 30840 bits in last 15 rows of the first data to add 32 parity bits.

In some possible implementations, $d_{CP}$=3432 and k=2672, or $d_{CP}$=744 and k=2664.

In some possible implementations, r=546, $d_{CP}$=1008, and k=3344;
r=546, $d_{CP}$=3696, and k=3352;
r=547, $d_{CP}$=1640, and k=3352;
r=547, $d_{CP}$=4328, and k=3360;
r=548, $d_{CP}$=2272, and k=3360;
r=548, $d_{CP}$=4960, and k=3368;
r=549, $d_{CP}$=216, and k=3360;
r=549, $d_{CP}$=2904, and k=3368;
r=549, $d_{CP}$=5592, and k=3376;
r=550, $d_{CP}$=848, and k=3368;
r=550, $d_{CP}$=3536, and k=3376;
r=551, $d_{CP}$=1480, and k=3376;
r=551, $d_{CP}$=4168, and k=3384;
r=552, $d_{CP}$=2112, and k=3384;
r=552, $d_{CP}$=4800, and k=3392;
r=553, $d_{CP}$=56, and k=3384;
r=553, $d_{CP}$=2744, and k=3392;
r=553, $d_{CP}$=5432, and k=3400;
r=554, $d_{CP}$=688, and k=3392;
r=554, $d_{CP}$=3376, and k=3400;
r=555, $d_{CP}$=1320, and k=3400;
r=555, $d_{CP}$=4008, and k=3408;

r=556, $d_{CP}$=1952, and k=3408;
r=556, $d_{CP}$=4640, and k=3416;
r=557, $d_{CP}$=2584, and k=3416;
r=557, $d_{CP}$=5272, and k=3424;
r=558, $d_{CP}$=528, and k=3416;
r=558, $d_{CP}$=3216, and k=3424;
r=559, $d_{CP}$=1160, and k=3424;
r=559, $d_{CP}$=3848, and k=3432;
r=560, $d_{CP}$=1792, and k=3432;
r=560, $d_{CP}$=4480, and k=3440;
r=561, $d_{CP}$=2424, and k=3440;
r=561, $d_{CP}$=5112, and k=3448;
r=562, $d_{CP}$=368, and k=3440;
r=562, $d_{CP}$=3056, and k=3448; or
r=562, $d_{CP}$=5744, and k=3456.

In some possible implementations, r=520, $d_{CP}$=704, and k=3184;
r=520, $d_{CP}$=3392, and k=3192;
r=520, $d_{CP}$=6080, and k=3200;
r=521, $d_{CP}$=1336, and k=3192;
r=521, $d_{CP}$=4024, and k=3200;
r=522, $d_{CP}$=1968, and k=3200;
r=522, $d_{CP}$=4656, and k=3208;
r=523, $d_{CP}$=2600, and k=3208;
r=523, $d_{CP}$=5288, and k=3216;
r=524, $d_{CP}$=544, and k=3208;
r=524, $d_{CP}$=3232, and k=3216;
r=525, $d_{CP}$=1176, and k=3216;
r=525, $d_{CP}$=3864, and k=3224;
r=526, $d_{CP}$=1808, and k=3224;
r=526, $d_{CP}$=4496, and k=3232;
r=527, $d_{CP}$=2440, and k=3232;
r=527, $d_{CP}$=5128, and k=3240;
r=528, $d_{CP}$=384, and k=3232;
r=528, $d_{CP}$=3072, and k=3240;
r=528, $d_{CP}$=5760, and k=3248;
r=529, $d_{CP}$=1016, and k=3240;
r=529, $d_{CP}$=3704, and k=3248;
r=530, $d_{CP}$=1648, and k=3248;
r=530, $d_{CP}$=4336, and k=3256;
r=531, $d_{CP}$=2280, and k=3256;
r=531, $d_{CP}$=4968, and k=3264;
r=532, $d_{CP}$=2912, and k=3264;
r=532, $d_{CP}$=224, and k=3256;
r=533, $d_{CP}$=856, and k=3264;
r=533, $d_{CP}$=3544, and k=3272;
r=534, $d_{CP}$=1488, and k=3272;
r=534, $d_{CP}$=4176, and k=3280;
r=535, $d_{CP}$=2120, and k=3280; or
r=535, $d_{CP}$=4808, and k=3288.

In some possible implementations, the data processing apparatus further includes a first interleaving unit, a second interleaving unit, a symbol mapping unit, a polarization distribution unit, and a DSP framing unit, where the first interleaving unit is configured to perform first interleaving processing on the fourth bit set to obtain a fifth bit set, where the fifth bit set includes $m_0$ second bit subsets, each of the second bit subsets includes 256 bits, 128 bits in each of the second bit subsets are from the second bit set, and the other 128 bits in each of the second bit subsets are from the third bit set and/or parity bits of the FEC encoding; the second interleaving unit is configured to perform second interleaving processing on every two first bit streams in L first bit streams to obtain a total of L/2 second bit streams, where each first bit stream includes a plurality of fifth bit sets, and L is an even number greater than 0; the symbol mapping unit and the polarization distribution unit are configured to perform symbol mapping and polarization distribution on the L/2 second bit streams to obtain one dual-polarization symbol stream, where t bits are mapped to one dual-polarization symbol through the symbol mapping and the polarization distribution, and t is an integer greater than 0; and the DSP framing unit is configured to perform DSP framing on the dual-polarization symbol stream.

In some possible implementations, an amplitude bit in the dual-polarization symbol is from the second bit set.

In some possible implementations, t=8, and the dual-polarization symbol is a dual-polarization DP-16QAM symbol.

In some possible implementations, the DSP framing unit is specifically configured to perform framing processing on every 172032 dual-polarization DP-16QAM symbols to obtain one DSP super-frame, where the super-frame includes 175104 dual-polarization symbols.

In some possible implementations, the first processing unit is specifically configured to obtain $F_{Frame}$ pieces of first data from the data frame, to obtain $F_{Frame} \times r \times q$ bits, where $F_{Frame}$ is an integer greater than 0; and $d_{scr} \times F_{Frame} = 336 \times k \times F_{DSP}$, where $F_{DSP}$ represents a quantity of DSP super-frames, the $F_{DSP}$ DSP super-frames are obtained by processing the $F_{Frame}$ pieces of first data, and $F_{DSP}$ is an integer greater than 0.

In some possible implementations, $F_{DSP} > 1$, a plurality of consecutive symbols in a first DSP super-frame of the $F_{DSP}$ DSP super-frames are a first marker, and a plurality of consecutive symbols in each DSP super-frame of the $F_{DSP}$ DSP super-frames except the first DSP super-frame are a second marker.

According to a sixth aspect, an embodiment of this application provides a data processing apparatus. The data processing apparatus includes a first PCS unit, a first FEC encoding unit, a second PCS unit, a second FEC unit, an interleaving processing unit, a symbol mapping unit, and a polarization distribution unit, where the first PCS unit is configured to perform first PCS processing on a first bit set in a first group of k bits, to obtain a second bit set, where the second bit set includes $m_0 \times 128$ bits, k is an integer greater than 1, and $m_\theta$ is an integer greater than 1; the first FEC encoding unit is configured to perform first forward error correction FEC encoding on the second bit set and a third bit set in the first group of k bits excluding the first bit set, to obtain a fourth bit set, where the fourth bit set includes $m_0$ first square blocks, and each of the first square blocks includes a total of 256 bits distributed in 16 rows and 16 columns; the second PCS unit is configured to perform second PCS processing on a fifth bit set in a second group of k bits, to obtain a sixth bit set; the second FEC encoding unit is configured to perform second FEC encoding on the sixth bit set and a seventh bit set in the second group of k bits excluding the fifth bit set, to obtain an eighth bit set, where the eighth bit set includes $m_0$ second square blocks, and each of the second square blocks includes a total of 256 bits distributed in 16 rows and 16 columns; the interleaving processing unit is configured to input 21 fourth bit sets and 21 eighth bit sets into an interleaver buffer, where the interleaver buffer includes a total of $84 \times m_1$ buffer units distributed in 84 rows and $m_1$ columns, $m_0 = m_1 \times 2$, each of the buffer units is configured to buffer a total of 256 bits in 16 rows and 16 columns, $42 \times m_1$ first square blocks are input into even-numbered rows of the interleaver buffer, $42 \times m_1$ second square blocks are input into odd-numbered rows of the interleaver buffer, and the interleaver buffer includes a first buffer subset and a second buffer subset, where the first buffer subset includes $42 \times m_1$ buffer units, the second buffer subset includes $42 \times m_1$ buffer units, bits input into the first buffer subset are from the second bit set and the sixth bit set, and bits input into the second buffer subset are from the third bit set, the seventh bit set, parity bits of the first FEC encoding, and parity bits of the second FEC encoding; and the symbol mapping unit and the polarization distribution unit are configured to perform symbol mapping and polarization distribution on every 8 bits in the interleaver buffer to obtain one dual-polarization DP-16QAM symbol, where 2 amplitude bits in 4 bits corresponding to a 16QAM symbol of the DP-16QAM symbol in a target polarization direction are from one column in a first buffer unit of the first buffer subset; and 2 sign bits in the 4 bits corresponding to the 16QAM symbol of the DP-16QAM symbol in the target polarization direction are from one column in a second buffer unit of the second buffer subset.

In some possible implementations, 4 of the 8 bits are from one column in the first buffer unit of the first buffer subset, and the other 4 of the 8 bits are from one column in the second buffer unit of the second buffer subset.

In some possible implementations, the $m_0$ first square blocks are distributed in two rows and $m_1$ columns, where a first square block in row 0 and column $m_2$ and a first square block in row 1 and column $m_2$ are from the second bit set; and the $m_0$ second square blocks are distributed in two rows and $m_1$ columns, where a second square block in row 0 and column $m_2$ and a second square block in row 1 and column $m_2$ are from the sixth bit set, and $0 \le m_2 < m_1/2$.

In some possible implementations, $m_0 = 16$, the first buffer subset includes a total of 336 buffer units in column 0, column 1, column 2, and column 3 in the interleaver buffer, and the second buffer subset includes a total of 336 buffer units in column 4, column 5, column 6, and column 7 in the interleaver buffer; or $m_0 = 12$, the first buffer subset includes a total of 252 buffer units in column 0, column 1, and column 2 in the interleaver buffer, and the second buffer subset includes a total of 252 buffer units in column 3, column 4, and column 5 in the interleaver buffer.

In some possible implementations, $m_0 = 16$ and $m_1 = 8$, where the $m_0$ first square blocks are distributed in two rows and $m_1$ columns, where a first square block in row 0 and column 0, a first square block in row 0 and column 1, a first square block in row 0 and column 4, a first square block in row 0 and column 5, a first square block in row 1 and column 0, a first square block in row 1 and column 1, a first square block in row 1 and column 4, and a first square block in row 1 and column 5 are from the second bit set; and the $m_0$ second square blocks are distributed in two rows and $m_1$ columns, where a second square block in row 0 and column 0, a second square block in row 0 and column 1, a second square block in row 0 and column 4, a second square block in row 0 and column 5, a second square block in row 1 and column 0, a second square block in row 1 and column 1, a second square block in row 1 and column 4, and a second square block in row 1 and column 5 are from the sixth bit set.

In some possible implementations, the first buffer subset includes a total of 336 buffer units in column 0, column 1, column 4, and column 5 in the interleaver buffer, and the second buffer subset includes a total of 336 buffer units in column 2, column 3, column 6, and column 7 in the interleaver buffer.

BRIEF DESCRIPTION OF DRAWINGS

FIG. 7 is a diagram of a first bit subset according to an embodiment of this application;

FIG. 8 is a diagram of a fifth bit set according to an embodiment of this application;

FIG. 9(a) is a diagram of a second bit subset according to an embodiment of this application;

FIG. 9(b) is another diagram of a second bit subset according to an embodiment of this application;

FIG. 11(a) is a diagram of distribution of a plurality of first bit subsets according to an embodiment of this application;

FIG. 11(b) is a diagram of other distribution of a plurality of first bit subsets according to an embodiment of this application;

FIG. 11(c) is a diagram of other distribution of a plurality of first bit subsets according to an embodiment of this application;

FIG. 14 is a diagram of intra-block interleaving according to an embodiment of this application;

FIG. 24(a) is a diagram of a third bit subset according to an embodiment of this application;

FIG. 24(b) is another diagram of a third bit subset according to an embodiment of this application;

FIG. 29(a) is a diagram of a third bit subset according to an embodiment of this application;

FIG. 29(b) is a diagram of a third bit subset according to an embodiment of this application;

FIG. 29(c) is a diagram of a third bit subset according to an embodiment of this application;

FIG. 29(d) is a diagram of a third bit subset according to an embodiment of this application;

FIG. 29(e) is a diagram of a third bit subset according to an embodiment of this application;

FIG. 29(f) is a diagram of a third bit subset according to an embodiment of this application;

FIG. 30(a) is a diagram of a first bit subset according to an embodiment of this application;

FIG. 30(b) is a diagram of a first bit subset according to an embodiment of this application;

FIG. 30(c) is a diagram of a first bit subset according to an embodiment of this application;

FIG. 30(d) is a diagram of a first bit subset according to an embodiment of this application;

FIG. 30(e) is a diagram of a first bit subset according to an embodiment of this application; and FIG. 30(f) is a diagram of a first bit subset according to an embodiment of this application.

DESCRIPTION OF EMBODIMENTS

Embodiments of this application provide a data processing method and a data processing apparatus, to use FEC encoding in combination with a PCS technology to satisfy a requirement for a longer transmission distance. In this way, an overall data processing operation is simpler, complexity is lower, and power consumption is lower. Therefore, overall performance is improved.

It should be noted that in the specification, claims, and the foregoing accompanying drawings of this application, the terms "first" and "second" are intended to distinguish between similar objects but do not limit a specific order or sequence. It should be understood that the foregoing terms are interchangeable in proper cases, so that embodiments described in this application can be implemented in an order other than that in content described in this application. In addition, the terms "include", "have", and any other variant thereof are intended to cover a non-exclusive inclusion. For example, a process, a method, a system, a product, or a device that includes a series of steps or units is not necessarily limited to those expressly listed steps or units, but may include other steps or units not expressly listed or inherent to the process, the method, the product, or the device.

Figure 1:
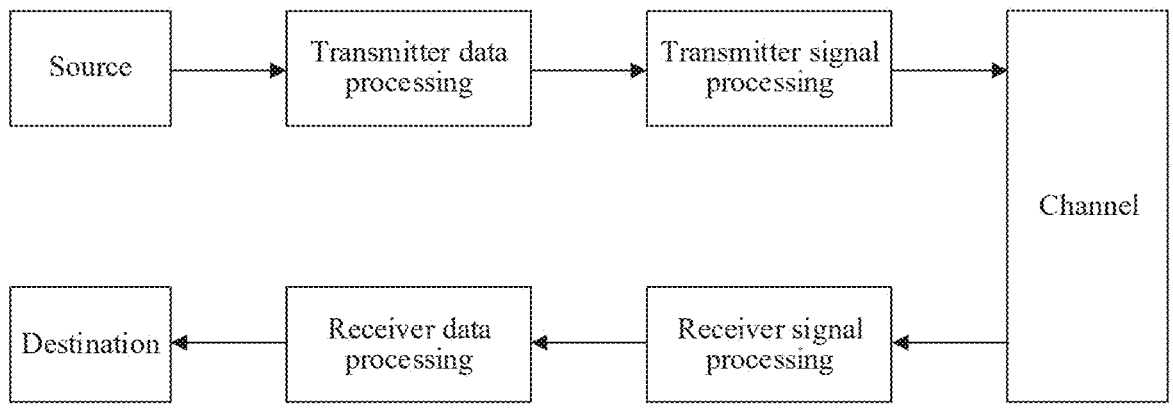
FIG. 1 is a diagram of a communication system to which an embodiment of this application is applied.

FIG. 1 is a diagram of a communication system to which an embodiment of this application is applied. As shown in FIG. 1, at a transmitter, a source provides a to-be-sent data stream, and a transmitter data processor receives the data stream. The transmitter data processor first performs data processing including encoding, interleaving, modulation, and DSP framing on the data stream to obtain a symbol data stream, and then sends the symbol data stream to a transmitter signal processor for signal processing, where a processed symbol data stream is transmitted to a receiver device over a channel. After receiving a signal with distortion resulting from noise on the channel or other impairments, the receiver device transmits the signal to a receiver signal processor for dispersion compensation, synchronization, phase recovery, and other operations. Then, the signal is sent to a receiver data processor for demodulation, de-interleaving, and decoding to restore original data, so as to transmit the restored data to a destination.

It should be noted that for some operation symbols in formulas in embodiments of this application, an $\lfloor a \rfloor$ operation in embodiments of this application indicates performing a floor operation on a, for example, $\lfloor 1.5 \rfloor = 1$, and $\lfloor -1.5 \rfloor = -2$; and a b % c operation in embodiments of this application indicates b modulo c. When b is a non-negative number, a value of b % c is a remainder obtained by dividing b by c. For example, 8% 3=2 and 2% 3=3. When b is a negative number, a value of b % c is obtained by performing a modulo operation on a positive integer obtained by adding an integer multiple of a to b. For example, −9% 16=7, and −10% 3=2. It should be further noted that the following uses OFEC encoding as a specific implementation of FEC encoding for description.

It should be noted that a bit set and a bit subset in the description and claims of this application are merely concepts introduced for ease of description. In an actual application, a data stream is a whole and there is no division cases, and each bit set and each bit subset may be considered as one or more bits in the data stream. It should be understood that the bit set and the bit subset may alternatively be presented in a form of a matrix, an array, or the like. This is not specifically limited herein.

Figure 2:
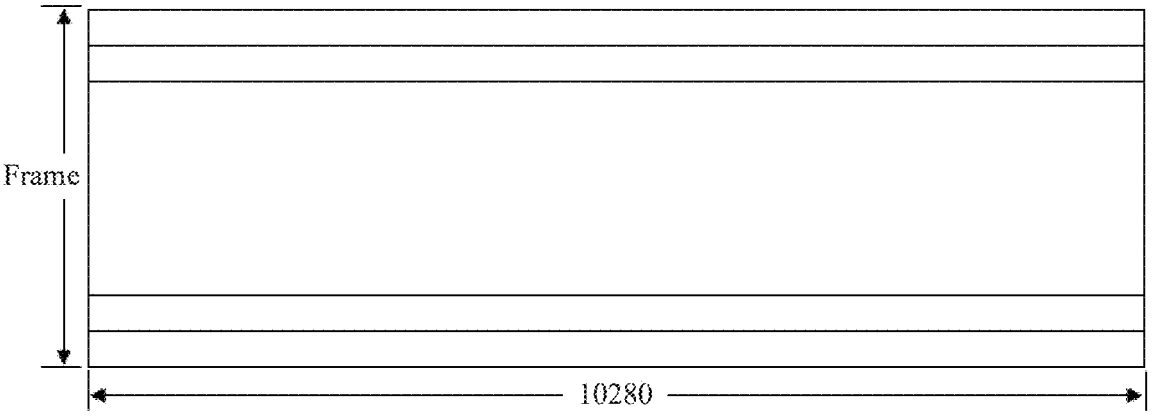
FIG. 2 is a diagram of a structure of a data frame.

FIG. 2 is a diagram of a structure of a data frame. As shown in FIG. 2, the data frame (frame) includes a plurality of rows of bits, and each row includes q bits, for example, q=10280. It should be understood that a specific type of the data frame is not limited in this application. In an example, an 800ZR frame, a FlexO-8 frame, or a FlexO-8e frame includes 512 rows, and each row includes 10280 bits. In another example, a FlexO-6 frame or a FlexO-6e frame includes 384 rows, and each row includes 10280 bits. In some specific applications, the integer q is an integer multiple of 257. Typically, q is 10280, 8224, 4112, 2056, or the like.

It should be noted that the data processing method provided in this application may be divided into three parts, which are denoted as "first data processing", "second data processing", and "third data processing". In a possible implementation, the first data processing may be performed before the second data processing. In another possible implementation, the first data processing may be performed before the third data processing. The following separately describes in detail the "first data processing", the "second data processing", and the "third data processing".

Figure 3:
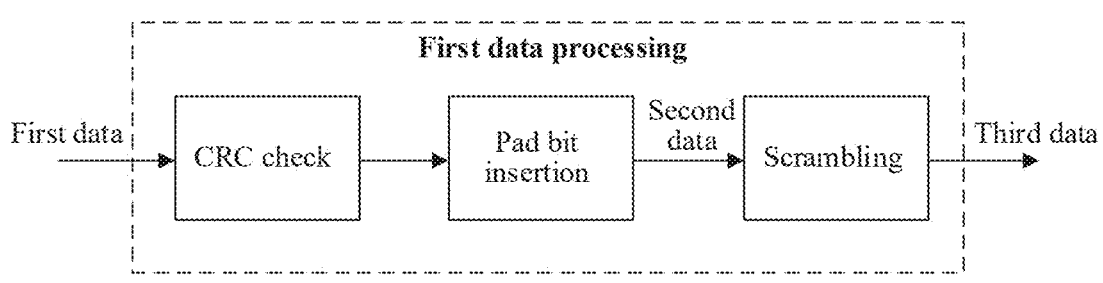
FIG. 3 is a diagram of an embodiment of first data processing in embodiments of this application.

FIG. 3 is a diagram of an embodiment of first data processing in embodiments of this application. As shown in FIG. 3, the first data processing includes cyclic redundancy check (Cyclic Redundancy Check, CRC), pad insertion (Pad Insertion), and scrambling (scrambling). In an actual application, at least one of CRC and pad insertion may be performed. Specifically, first data is obtained from a data frame, where the first data includes bits in r rows and q columns, r is an integer greater than 0, and q is an integer greater than 0. For ease of distinguishing between $r_0$, $r_1$, and the like below, $r_{Frame}$ is uniformly used to represent r rows included in the first data.

Using q=10280 as an example, a total of $d_{in}=10280 \times r_{Frame}$ bits are obtained. Then, CRC and/or pad bit insertion are/is performed on the first data, to obtain second data. $d_{CRC}$ CRC parity bits are added in the CRC operation, and $d_{PAD}$ pad (Pad) bits are inserted in the pad insertion operation. Further, the second data is scrambled to obtain third data, where a quantity of bits of the third data $d_{scr}=10280 \times r_{Frame} + d_{CRC} + d_{PAD}$ scrambled bits, where $d_{CRC}$ is an integer greater than or equal to 0, $d_{PAD}$ is an integer greater than or equal to 0, $d_{CP}=d_{CRC}+d_{PAD}$ may be denoted. In this case, overhead corresponding to the CRC check and the pad bit insertion is $$OH_{CP} = \frac{d_{scr}}{d_{in}} - 1 = (d_{CRC} + d_{PAD})/(10280 \times r_{Frame}).$$

In an example, when $d_{PAD}=0$, no pad bit is inserted into CRC-checked $10280 \times r_{Frame} + d_{CRC}$ bits, but scrambling is directly performed on the bits. In another example, to implement a lower delay and lower complexity, the CRC check is bypassed (bypassed) and replaced by a pad bit. In this case, $d_{CRC}=0$.

It should be noted that, in some specific application scenarios, CRC-32 is used for the CRC check. In this case, $d_{CRC}=32 \times p$, where p is an integer greater than 1 and the integer I Frame is exactly divisible by p. More specifically, for r Frame rows of data obtained from the data frame, CRC-32 is performed on a total of $10280 \times r_{Frame}/p$ bits in every $r_{Frame}/p$ rows to add 32 parity bits, and CRC-32 is repeatedly performed for p times to add a total of $d_{CRC}=32 \times p$ CRC parity bits.

It should be noted that, in some other specific application scenarios, CRC-32 is used for the CRC check. In this case, $d_{CRC}=32 \times p$, where p is an integer greater than 1 and the integer Frame is in divisible by p. In consideration of $r_{F0} \times (p-1) + r_{F1} = r_{Frame}$, where the integer $r_{F0}$ is greater than the integer $r_{F1}$. In some specific implementations, the integer $r_{F0}=\lfloor r_{Frame}/p \rfloor + 1$, the integer $r_{F1}=r_{Frame}-r_{F0} \times (p-1)$, and $r_{F0} > r_{F1}$. More specifically, for $r_{Frame}$ rows of data obtained from the data frame, CRC-32 is performed on a total of $q \times r_{F0}$ bits in every $r_{F0}$ rows in first $r_{F0} \times (p-1)$ rows to add 32 parity bits, to obtain a total of $32 \times (p-1)$ CRC parity bits, and CRC-32 is performed on a total of $q \times r_{F1}$ bits of last $r_{F1}$ rows to add 32 parity bits, to obtain a total of $d_{CRC}=32 \times p$ CRC parity bits. It should be noted that, in some specific implementations, $q \times r_{F0}=41120$, CRC-32 is performed on a total of $q \times r_{F0}$ bits in every $r_{F0}$ rows in the first $r_{F0} \times (p-1)$ rows of the $r_{Frame}$ rows of data. Operations in CRC-32 in the existing 800G ZR may be directly used as encoding and detection operations in the CRC-32, where the operations in the CRC-32 are performed on a total of 4×10280=41120 bits of data in four rows and 10280 columns in the existing 800G ZR.

Figure 4:
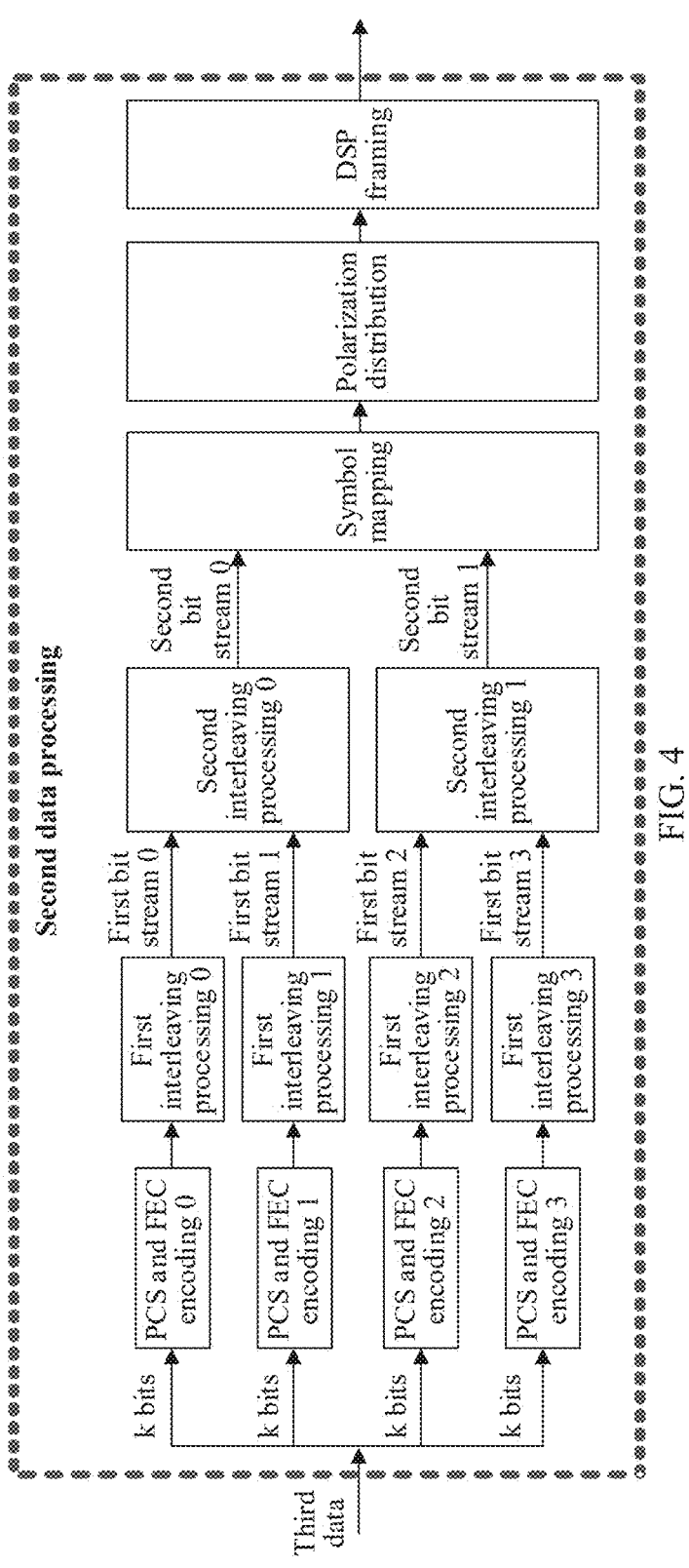
FIG. 4 is a diagram of an embodiment of second data processing in embodiments of this application.

FIG. 4 is a diagram of an embodiment of second data processing in embodiments of this application. As shown in FIG. 4, a plurality of bits are obtained from third data that is output through first data processing, and are sent to L PCS and FEC encoding in a round-robin fashion, where L is an even number greater than 0. Using FIG. 4 as an example, L=4. For ease of description, the following uses an example in which k bits are input into each PCS and FEC encoding, where k is an integer greater than 1. In other words, processing is performed by using k bits as a group in each PCS and FEC encoding. In an actual application, 2×k bits, 4×k bits, or the like may alternatively be input into each PCS and FEC encoding. This is not specifically limited herein. Specifically, PCS and FEC encoding are first separately performed on every k bits, and then first interleaving processing is separately performed to obtain L first bit streams. The FEC encoding may be specifically OFEC encoding. Then, second interleaving processing is performed on every two first bit streams in the L first bit streams to obtain a total of L/2 second bit streams. The second interleaving processing may be specifically OFEC interleaving. The following uses the OFEC interleaving as an example to describe the second interleaving processing. Next, symbol mapping (symbol mapping) and polarization distribution (Polarization distribution) are performed on the L/2 second bit streams to obtain one dual-polarization symbol stream. For example, t bits are mapped to one dual-polarization symbol through the symbol mapping and the polarization distribution, where t is an integer greater than 0. For example, when t=8, the dual-polarization symbol is a dual-polarization DP-16QAM symbol. Further, digital signal processing (Digital Signal Processing, DSP) framing is performed on the dual-polarization symbol stream. For example, the DSP framing is performed on every 172032 dual-polarization DP-16QAM symbols to obtain one DSP super-frame, where the super-frame includes 175104 dual-polarization symbols.

It should be noted that the second data processing may alternatively include six PCS and OFEC encoding. In this case, the corresponding second data processing includes six first interleaving processing and three second interleaving processing. Outputs of each PCS and OFEC encoding are sent to one first interleaving processing, outputs of every two first interleaving processing are sent to one second interleaving processing, and outputs of three second interleaving processing are sent to symbol mapping for symbol modulation and mapping. It should be further noted that the second data processing may alternatively include eight PCS and OFEC encoding. In this case, the corresponding second data processing includes eight first interleaving processing and four second interleaving processing. Outputs of each PCS and OFEC encoding are sent to one first interleaving processing, outputs of every two first interleaving processing are sent to one second interleaving processing, and outputs of four second interleaving processing are sent to symbol mapping for symbol modulation and mapping.

The following describes in detail each operation of the second data processing.

Figure 5:
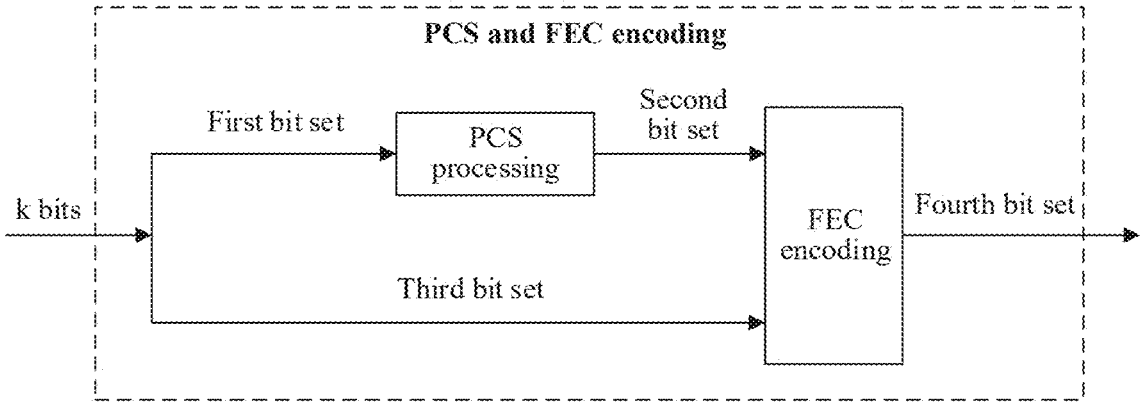
FIG. 5 is a diagram of an embodiment of PCS and OFEC encoding in embodiments of this application.

(1) PCS and FEC Encoding:

FIG. 5 is a diagram of an embodiment of PCS and FEC encoding in embodiments of this application. As shown in FIG. 5, a lane of k input bits are used as an example for description. PCS processing is performed on a first bit set in the k bits, to obtain a second bit set. OFEC encoding is performed on the second bit set and a third bit set in the k bits excluding the first bit set, to obtain a fourth bit set. The fourth bit set includes $m_0$ first bit subsets, each of the first bit subsets includes $F_0$ bits, $m_\theta$ is an integer greater than 1, and $F_0$ is an even number greater than 1. For example, $m_0$ may be 12 or 16, and $F_0$ may be 256. It should be noted that a quantity of bits in the second bit set is $m_0 \times F_0/2$, and a quantity of bits in the fourth bit set is $m_0 \times F_0$. It should be noted that an amplitude bit in a dual-polarization symbol is from the second bit set. For ease of description, $F_0=256$ is used as an example in the following descriptions.

In a possible implementation, $m_0=16$, a quantity of bits in the first bit set is k=1504, a quantity of bits in the second bit set is 2048, a quantity of bits in the third bit set is 1504, and a quantity of bits in the fourth bit set is 4096. In other words, k−1504 bits are sent to PCS processing, to obtain 2048 bits, and the 2048 bits are combined with the remaining 1504 bits that are in the k bits and that are not the bits sent to the PCS processing, so that a total of 2048+1504=3552 bits are sent to OFEC encoding for encoding to add 544 OFEC parity bits (parity bits), so as to obtain a total of 4096 OFEC-encoded bits. In this case, encoding overhead of the OFEC encoding is 4096/3552−1=15.3%.

In another possible implementation, $m_0=12$, a quantity of bits in the first bit set is k=992, a quantity of bits in the second bit set is 1536, a quantity of bits in the third bit set is 992, and a quantity of bits in the fourth bit set is 3072. In other words, k−992 bits are sent for PCS processing, to obtain 1536 bits, and the 1536 bits are combined with the remaining 992 bits that are in the k bits and that are not the bits sent to the PCS processing, so that a total of 1536+992=2528 bits are sent to FEC encoding for encoding to add 544 FEC parity bits (parity bits), so as to obtain a total of 3072 FEC-encoded bits. In this case, encoding overhead of the FEC encoding is 3072/2528−1=21.5%. A specific FEC code may be an FEC code, with the 21.5% OH, obtained through shortening (shortening) an OFEC code with the 15.3% OH. In some scenarios, a shortened OFEC code is also referred to as an OFEC code for short.

It should be noted that a quantity $d_{scr}$ of bits of third data output through first data processing is an integer multiple of L×k. In this case, after the $d_{scr}$ bits are output through the first data processing, processing on the $d_{scr}$ bits may be completed by performing one or more times of second data processing, and no more other processing such as buffering needs to be performed. This simplifies a specific hardware implementation of the overall data processing, and lowers power consumption.

It should be noted that, when $m_0=16$, a quantity $k_{PCS}=k-1504$ of input bits corresponding to the PCS processing is an integer multiple of 2, 4, 8, or 16. It is considered that a quantity of output bits corresponding to the PCS processing is 2048, Generally, in PCS processing, input $k_{LUT}$ bits are mapped by using a lookup table (lookup table, LUT), to output corresponding $n_{LUT}$ bits. The quantity $n_{LUT}$ of output bits of the PCS processing cannot be excessively small. Otherwise, performance of the overall PCS processing is deteriorated. The quantity $n_{LUT}$ of output bits of the PCS processing also cannot be too large. Otherwise, it is not conducive to a hardware implementation. In some specific hardware implementations, $n_{LUT}$ is 128, 256, 512, or 1024. When $n_{LUT}=128$, in PCS processing, LUT mapping is performed on $k_{LUT}=(k-1504)/16$ input bits each time to output corresponding $n_{LUT}=128$ bits, and after the LUT mapping is performed for 16 consecutive times, namely, the LUT mapping is performed on a total of k−1504 bits, corresponding 2048 bits are output. In some specific applications, the lookup table LUT processing may be implemented by including a plurality of lookup subtables, and quantities of input bits of the lookup subtables may be different and quantities of output bits of the lookup subtables may also be different. In this application, a specific implementation of the lookup table is not limited.

When $n_{LUT}=256$, in PCS processing, LUT mapping is performed on $k_{LUT}=(k-1504)/8$ input bits each time to output corresponding $n_{LUT}=256$ bits, and after the LUT mapping is performed for eight consecutive times, namely, the LUT mapping is performed on a total of $k-1504$ bits, corresponding 2048 bits are output. When $n_{LUT}=512$, in PCS processing, LUT mapping is performed on $k_{LUT}=(k-1504)/4$ input bits each time to output corresponding $n_{LUT}=128$ bits, and after the LUT mapping is performed for four consecutive times, namely, LUT mapping is performed on a total of $k-1504$ bits, corresponding 2048 bits are output. When $n_{LUT}=1024$, in PCS processing, LUT mapping is performed on $k_{LUT}=(k-1504)/2$ input bits each time to output corresponding $n_{LUT}=1024$ bits, and after the LUT mapping is performed for two consecutive times, namely, LUT mapping is performed on a total of $k-1504$ bits, corresponding 2048 bits are output. Therefore, when $m_0=16$, to facilitate a hardware implementation or implement better performance, the quantity $k-1504$ of input bits corresponding to the PCS processing is an integer multiple of 2, 4, 8, or 16.

It should be noted that, when $m_0=12$, a quantity $k_{PCS}=k-992$ of input bits corresponding to PCS processing is an integer multiple of 2, 3, 4, 6, 8, 12, or 16. It is considered that a quantity of output bits corresponding to the PCS processing is 1536. Generally, in PCS processing, input $k_{LUT}$ bits are mapped by using a lookup table (lookup table, LUT), to output corresponding $n_{LUT}$ bits. The quantity $n_{LUT}$ of output bits of the PCS processing cannot be excessively small. Otherwise, performance of the overall PCS processing is deteriorated. The quantity $n_{LUT}$ of output bits of the PCS processing also cannot be too large. Otherwise, it is not conducive to a hardware implementation. In some specific hardware implementations, $n_{LUT}$ is 96, 128, 192, 256, 384, 512, or 768. When $n_{LUT}=96$, in PCS processing, LUT mapping is performed on $k_{LUT}=(k-992)/16$ input bits each time to output corresponding $n_{LUT}=96$ bits, and after the LUT mapping is performed for 16 consecutive times, namely, LUT mapping is performed on a total of $k-992$ bits, corresponding 1536 bits are output. When $n_{LUT}=128$, in PCS processing, LUT mapping is performed on $k_{LUT}=(k-992)/12$ input bits each time to output corresponding $n_{LUT}=128$ bits, and after the LUT mapping is performed for 12 consecutive times, namely, LUT mapping is performed on a total of $k-992$ bits, corresponding 1536 bits are output. When $n_{LUT}=192$, in PCS processing, LUT mapping is performed on $k_{LUT}=(k-992)/8$ input bits each time to output corresponding $n_{LUT}=192$ bits, and after the LUT mapping is performed for eight consecutive times, namely, the LUT mapping is performed on a total of $k-992$ bits, corresponding 1536 bits are output. When $n_{LUT}=256$, in PCS processing, LUT mapping is performed on $k_{LUT}=(k-992)/6$ input bits each time to output corresponding $n_{LUT}=256$ bits, and after the LUT mapping is performed for six consecutive times, namely, the LUT mapping is performed on a total of $k-992$ bits, corresponding 1536 bits are output. When $n_{LUT}=384$, in PCS processing, LUT mapping is performed on $k_{LUT}=(k-992)/4$ input bits each time to output corresponding $n_{LUT}=384$ bits, and after the LUT mapping is performed for four consecutive times, namely, LUT mapping is performed on a total of $k-992$ bits, corresponding 1536 bits are output. When $n_{LUT}=512$, in PCS processing, LUT mapping is performed on $k_{LUT}=(k-992)/3$ input bits each time to output corresponding $n_{LUT}=512$ bits, and after the LUT mapping is performed for three consecutive times, namely, LUT mapping is performed on a total of $k-992$ bits, corresponding 1536 bits are output. When $n_{LUT}=768$, in PCS processing, LUT mapping is performed on $k_{LUT}=(k-992)/2$ input bits each time to output corresponding $n_{LUT}=768$ bits, and after the LUT mapping is performed for two consecutive times, namely, LUT mapping is performed on a total of $k-992$ bits, corresponding 1536 bits are output. Therefore, when $m_0=12$, to facilitate a hardware implementation or implement better performance, the quantity $k-992$ of input bits corresponding to the PCS processing is an integer multiple of 2, 3, 4, 6, 8, 12, or 16.

Figure 6:
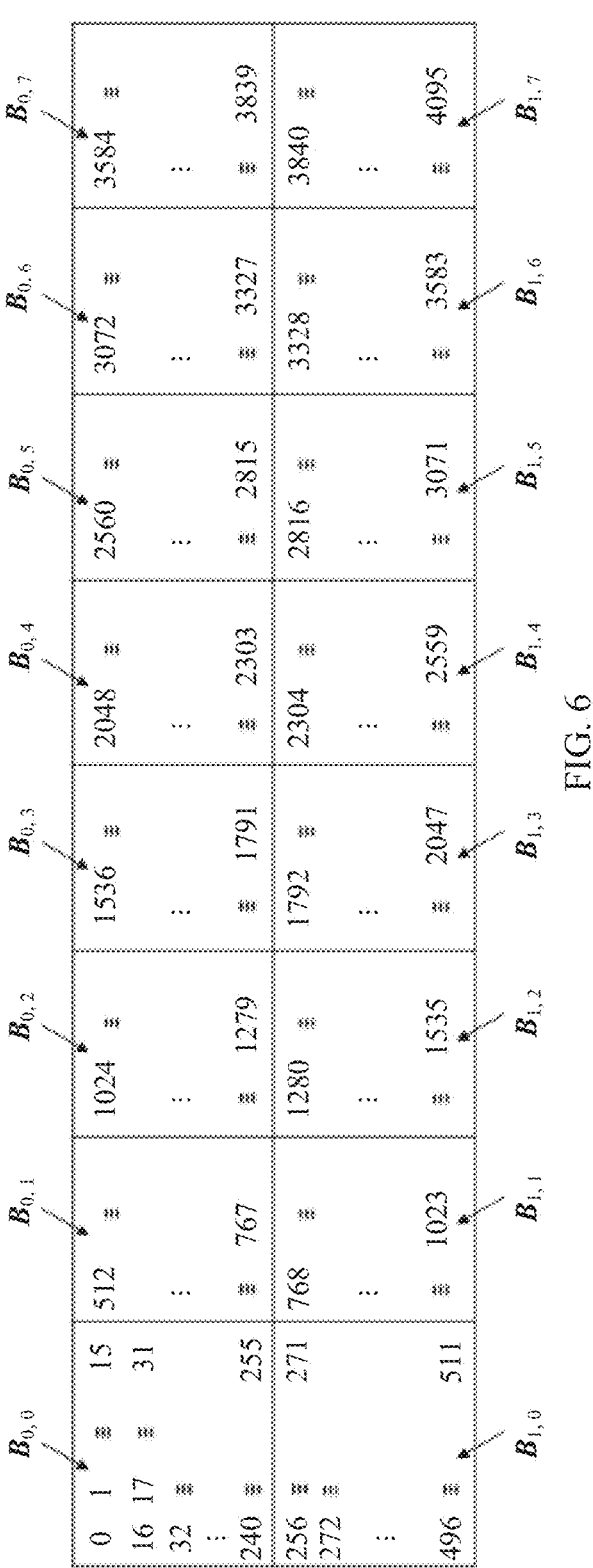
FIG. 6 is a diagram of a fourth bit set according to an embodiment of this application.

FIG. 6 is a diagram of a fourth bit set according to an embodiment of this application. As shown in FIG. 6, in some application scenarios, $m_0$ first bit subsets in the fourth bit set may be specifically presented in a form of a square block (square block). The square block may also be referred to as a block (block) for short, and each first bit subset may be referred to as a square block B. For example, as shown in FIG. 6, $m_0=16$ square blocks B are distributed in two rows and eight columns. A block in row $i_0$ and column $j_0$ includes 256 bits of the 4096 OFEC-encoded bits, where $0 \le i_0 < 2$ and $0 \le j_0 < 8$. For another example, $m_0=12$ square blocks B are distributed in two rows and six columns. A block in row $i_0$ and column $j_0$ includes 256 bits of the 3072 FEC-encoded bits, where $0 \le i_0 < 2$ and $0 \le j_0 < 6$. Further, 256 bits in each square block B may be distributed in $F_1$ rows and $F_1$ columns, and $F_1=16$ is used as an example below for description. For ease of description, $B_{i_0,j_0}$ represents a square block B in row $i_0$ and column $j_0$.

It should be understood that, in some specific scenarios, square blocks B in two rows and $m_1$ columns are also referred to as output blocks (output blocks) of the FEC encoding, where $m_0=2 \times m_1$. It should be further understood that the square blocks B in the two rows and the $m_1$ columns may also be considered as a bit matrix (matrix) of 32 rows and $m_0 \times 8$ columns, including 32 rows, and each row includes $m_0 \times 8$ bits. In this case, a bit in row $r_0$ and column $c_0$ of the bit matrix corresponds to a bit in row $i_1$ and column $j_1$ of square block $B_{i_0,j_0}$, where $i_0=[r_0/16]$, $j_0=[c_0/16]$, $i_1=r_0\%$ 16, $j_1=0\%$ 16, $0 \le r_0 < 32$, $0 \le c_0 < m_0 \times 8$, $0 \le i_0 < 2$, $0 \le j_0 < 8$, $0 \le i_1 < 16$, and $0 \le j_1 < 16$. In this application, in some cases, one row represents eight square blocks; in some cases, one row represents a total of 16 bits in one row of a square block; and in some cases, one row represents a total of $m_0 \times 8$ bits in one row in a set including $m_0$ square blocks. Specific cases may be distinguished based on context understanding.

In some specific applications, as shown in FIG. 6, block $B_{i_0,j_0}$ in row $i_0$ and column $j_0$ ($0 \le i_0 < 2$ and $0 \le j_0 < 8$) includes bit $512 \times j_0 + 256 \times i_0$ to bit $512 \times j_0 + 256 \times i_0 + 255$ in the fourth bit set. For example, block $B_{0,0}$ in row $i_0=0$ and column $j_0=0$ includes bit 0 to bit 255 in the fourth bit set. For another example, block $B_{1,7}$ in row $i_0=1$ and column $j_0=7$ includes bit 3840 to bit 4095 in the fourth bit set.

FIG. 7 is a diagram of a first bit subset according to an embodiment of this application. As shown in FIG. 7, each square block includes a total of 256 bits in 16 rows and 16 columns, and a bit in row $i_1$ and column $j_1$ ($0 \le i_1 < 16$ and $0 \le j_1 < 16$) in the square block corresponds to bit $16 \times i_1 + j_1$ in the 256 bits. For example, a bit in row $i_1=1$ and column $j_1=0$ in the square block corresponds to bit 16 in the 256 bits. For another example, a bit in row $i_1=2$ and column $j_1=3$ in the square block corresponds to bit 35 in the 256 bits.

More specifically, bit $B_{i_0,j_0}(i_1, j_1)$ in row $i_1$ and column $j_1$ ($0 \le i_1 < 16$ and $0 \le j_1 < 16$) in square block $B_{i_0,j_0}$ in row $i_0$ and column $j_0$ ($0 \le i_0 < 2$ and $0 \le j_0 < 8$) corresponds to bit $512 \times$ $j_0+256\times i_0+16\times i_1+j_1$ in the fourth bit set. For example, bit $B_{0,0}$ (1, 0) in row $i_1=1$ and column $j_1=0$ in square block $B_{0,0}$ in row $i_0=0$ and column $j_0=0$ corresponds to bit 16 in the fourth bit set. For another example, bit $B_{1,7}$ (2, 3) in row $i_1=2$ and column $j_1=3$ in square block $B_{1,7}$ in row $i_0=1$ and column $j_0=7$ corresponds to bit 3875 in the fourth bit set.

(2) First Interleaving Processing:

First interleaving processing is performed on a fourth bit set obtained through PCS processing and FEC encoding, to obtain a fifth bit set. Specifically, in the first interleaving processing, a bit sequence in the fourth bit set is reordered. The fifth bit set includes $m_0$ second bit subsets, and each of the second bit subsets includes 256 bits. It should be understood that, as shown in FIG. 4, each first bit stream sent to second interleaving processing may include a plurality of fifth bit sets.

FIG. 8 is a diagram of a fifth bit set according to an embodiment of this application. As shown in FIG. 8, $m_0=16$ is used as an example. Similar to the 16 first bit subsets in the fourth bit set, 16 second bit subsets in the fifth bit set may also be presented in a form of a square block (square block). Each second bit subset may be referred to as a square block T, and 256 bits in each square block T are distributed in 16 rows and 16 columns. For example, 16 square blocks T are distributed in two rows and eight columns. A block in row $i_0$ and column $j_0$ includes 256 bits of 4096 bits obtained through the first interleaving processing, where $0\le i_0<2$ and $0\le j_0<8$. For ease of description, $T_{i_0j_0}$ represents a block in row $i_0$ and column $j_0$. Similarly, square blocks T in two rows and $m_1$ columns may also be considered as a bit matrix (matrix) of 32 rows and $m_0\times8$ columns, including 32 rows, and each row includes $m_0\times8$ bits. In this case, a bit in row $r_1$ and column $c_1$ of the bit matrix corresponds to a bit in row $i_1$ and column $j_1$ of square block $T_{i_0j_0}$, where $i_0=\lfloor r_1/16\rfloor$, $j_0=\lfloor c_1/16\rfloor$, $i_1=r_1\%16$, $j_1=c_1\%16$, and $0\le r_1<32$, $0\le c_1<m_0\times8$, $0\le i_0<2$, $0\le j_0<8$, $0\le i_1<16$, and $0\le j_1<16$. It should be understood that, in some specific scenarios, the square blocks T in the two rows and the eight columns output through the first interleaving processing are also referred to as output blocks (output blocks) of the first interleaving processing.

It should be noted that 128 bits in each of the second bit subsets are from a second bit set, and the other 128 bits in each of the second bit subsets are from a third bit set and/or parity bits of OFEC encoding. In an example, first interleaving processing is performed after OFEC encoding is performed on 2048 bits obtained through PCS processing, and the 2048 bits are distributed in 16 square blocks T, and are distributed to 128 bits in each square block T including 256 bits.

In some specific applications, 8 bits in 16 bits in each row of the second bit subset are from the second bit set, and the other 8 bits in the 16 bits in each row of the second bit subset are from the third bit set and/or the parity bits of the OFEC encoding.

FIG. 9(a) is a diagram of a second bit subset according to an embodiment of this application. As shown in FIG. 9(a), in a possible implementation, a bit in row $i_2$ and column $$\left(\left\lfloor\frac{j_2}{2}\right\rfloor\times 4 + j_2\%2 + i_2 + 2\right)\%16$$

of the second bit subset is from a second bit set, where $0\le i_2<16$ and $0\le j_2<8$. In other words, a bit in a shadow part in FIG. 9(a) is from a bit in 2048 bits in the second bit set. FIG. 9(b) is another diagram of a second bit subset according to an embodiment of this application. As shown in FIG. 9(b), in another possible implementation, a bit in row $i_2$ and column $(j_2\times2-i_2\%2+1)$ of the second bit subset is from a second bit set, where $0\le2<16$ and $0\le j_2<8$. In other words, a bit in a shadow part in FIG. 9(b) is from a bit in 2048 bits in the second bit set.

It should be noted that, a total of $m_1\times256$ bits in my first bit subsets in the fourth bit set are from the second bit set, and $m_0=2\times m_1$. Refer to FIG. 6. $m_0=16$ and $m_1=8$ are used as an example. Eight square blocks B in a total of 16 square blocks B in two rows and eight columns are from 2048 bits in the second bit set. Further, bit 0 to bit 2047 in 4096 bits in the fourth bit set are from the 2048 bits in the second bit set.

In a possible implementation, $m_0\times256$ bits in the fourth bit set are distributed in 32 rows and $m_0\times8$ columns, $m_0\times256$ bits in the fifth bit set are distributed in 32 rows and $m_0\times8$ columns, and $m_0\times8$ bits in row $r_1$ of the fifth bit set are from $m_0\times8$ bits in row $r_0$ of the fourth bit set, where $0\le r_0<32$ and $0\le r_1<32$.

Figure 10:
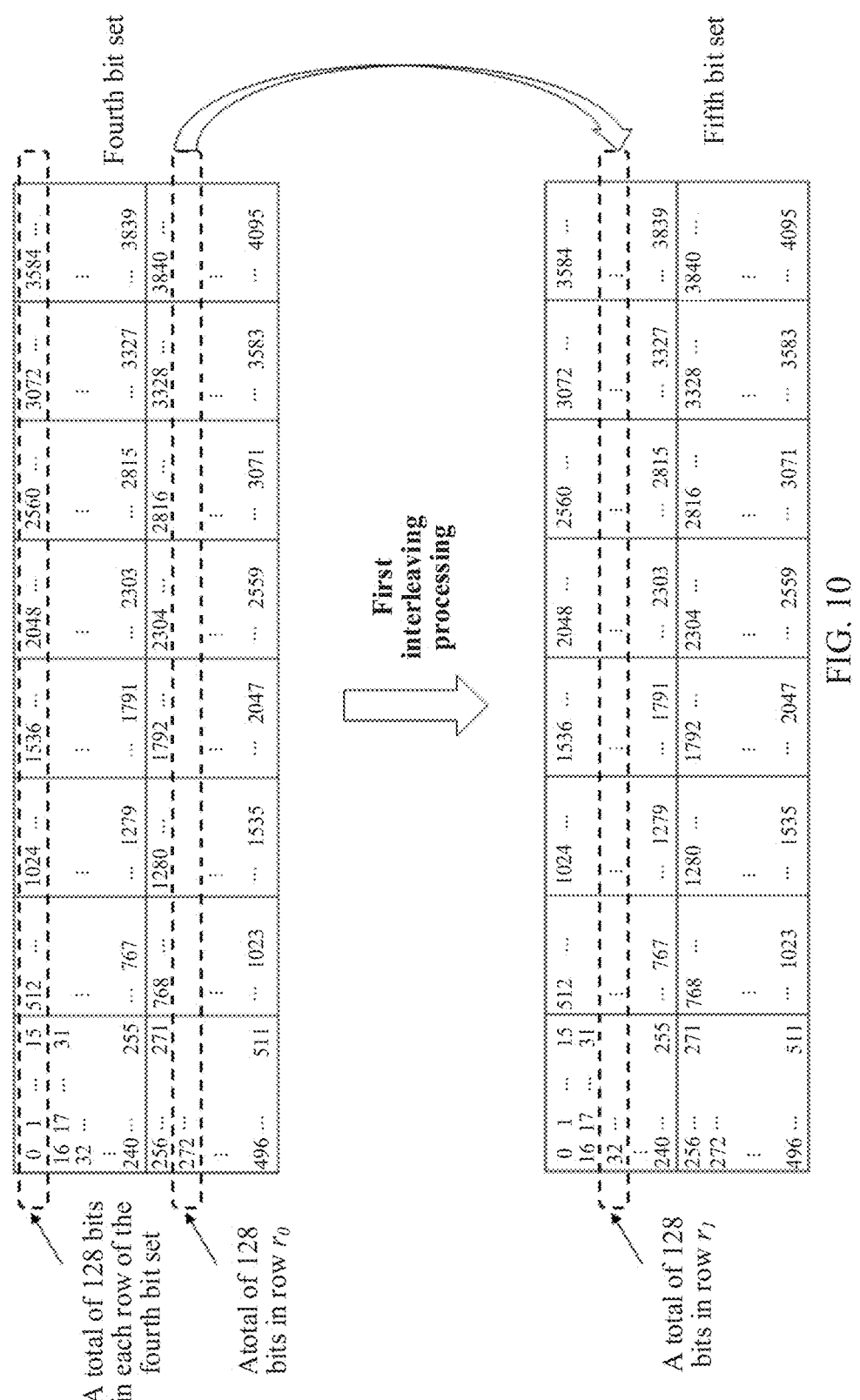
FIG. 10 is a diagram of a first implementation of first interleaving processing according to an embodiment of this application.

FIG. 10 is a diagram of a first implementation of first interleaving processing according to an embodiment of this application. As shown in FIG. 10, 4096 bits in a fourth bit set (including 16 square blocks B) are distributed in 32 rows and 128 columns, and 4096 bits in a fifth bit set (including 16 square blocks T) are distributed in 32 rows and 128 columns. 128 bits in row $r_1$ of the fifth bit set are from 128 bits in row $r_0$ of the fourth bit set. More specifically, when $r_1\%4=0$, bits 2, 3, 6, 7, 10, 11, 14, 15, . . . , 114, 115, 118, 119, 122, 123, 126, and 127, namely, a total of 64 bits, in the 128 bits in row $r_1$ of the fifth bit set are from 64 bits that are in the 128 bits in row $r_0$ of the fourth bit set and that are obtained through PCS processing. When $r_1\%4=1$, bits 0, 3, 4, 7, 8, 11, 12, 15, . . . , 112, 115, 116, 119, 120, 123, 124, and 127, namely, a total of 64 bits, in the 128 bits in row $r_1$ of the fifth bit set are from 64 bits that are in the 128 bits in row $r_0$ of the fourth bit set and that are obtained through PCS processing. When $r_1\%4=2$, bits 0, 1, 4, 5, 8, 9, 12, 13, . . . , 112, 113, 116, 117, 120, 121, 124, and 125, namely, a total of 64 bits, in the 128 bits in row $r_1$ of the fifth bit set are from 64 bits that are in the 128 bits in row $r_0$ of the fourth bit set and that are obtained through PCS processing. When $r_1\%4=3$, bits 1, 2, 5, 6, 9, 10, 13, 14, . . . , 113, 114, 117, 118, 121, 122, 125, and 126, namely, a total of 64 bits, in the 128 bits in row $r_1$ of the fifth bit set are from 64 bits that are in the 128 bits in row $r_0$ of the fourth bit set and that are obtained through PCS processing.

In an example, $m_0$ first bit subsets are distributed in two rows and $m_1$ columns, where first bit subset $B_{0,m_2}$ in row 0 and column $m_2$ and first bit subset $B_{1,m_2}$ in row 1 and column $m_2$ are from the second bit set, and $0\le m_2<m_1/2$.

FIG. 11(a) is a diagram of distribution of a plurality of first bit subsets according to an embodiment of this application. As shown in FIG. 11(a), $m_0=16$ is used as an example. Eight square blocks $B_{0,0}$, $B_{0,1}$, $B_{0,2}$, $B_{0,3}$, $B_{1,0}$, $B_{1,1}$, $B_{1,2}$, and $B_{1,3}$ with shadow backgrounds are from 2048 bits in a second bit set, and eight square blocks $B_{0,4}$, $B_{0,5}$, $B_{0,6}$, $B_{0,7}$, $B_{1,4}$, $B_{1,5}$, $B_{1,6}$, and $B_{1,7}$ without shadow backgrounds are 1504 bits on which PCS processing is not performed and 544 OFEC parity bits. 16 square blocks B are considered as a whole, the first 64 bits in 128 bits in row $r_0$ are 64 bits in the 2048 bits in the second bit set, where $0\le r_0<32$.

Using FIG. 11(a) as an example, a specific interleaving rule of the first interleaving processing is as follows: Bit $$\left(\left\lfloor\frac{\tilde{c}_0}{2}\right\rfloor\times 4+\tilde{c}_0\,\%2+(r_1+2)\,\%4\right)\%\,(m_0\times 8)$$

in $m_0\times 8$ bits in row $r_1$ of a fifth bit set (including $m_0$ square blocks T) is from 1 bit in bit 0 to bit $(m_0\times 4-1)$ in row $r_0$ of a fourth bit set (including $m_0$ square blocks B), where $0\leq\tilde{c}_0<(m_0\times 4)$. The following further provides several more specific examples.

Example 1: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\,\%\,\theta+(r_1+4\times\Delta)\,\%\,\beta)\,\%\,\theta+\left\lfloor\frac{c}{\theta}\right\rfloor\times\theta,$$

where $0\leq c_0<(m_0\times 8)$, $0\leq c_1<(m_0\times 8)$, $\theta$ is an integer multiple of 4 and $m_0\times 8$ is exactly divisible by $\theta$, $\Delta$ is an integer, $\beta$ is an integer multiple of 4, and $$c=\left\lfloor\frac{c_0\,\%\,(m_0\times 4)}{2}\right\rfloor\times 4+c_0\,\%2+2\times\left(1-\left\lfloor\frac{c_0}{(m_0\times 4)}\right\rfloor\right).$$

Example 2: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\,\%\,\theta+(r_1+2+4\times\Delta)\,\%\,\beta)\,\%\,\theta+\left\lfloor\frac{c}{\theta}\right\rfloor\times\theta,$$

where $0\leq c_0<(m_0\times 8)$, $0\leq c_1<(m_0\times 8)$, $\theta$ is an integer multiple of 4 and $m_0\times 8$ is exactly divisible by $\theta$, $\Delta$ is an integer, $\beta$ is an integer multiple of 4, and $$c=\left\lfloor\frac{c_0\,\%(m_0\times 4)}{2}\right\rfloor\times 4+c_0\,\%2+2\times\left\lfloor\frac{c_0}{(m_0\times 4)}\right\rfloor.$$

Example 3: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\%\theta+(r_1+4\times\Delta)\%\beta)\%\theta+\left\lfloor\frac{c}{\theta}\right\rfloor\times\theta,$$

where $0\leq c_0<(m_0\times 8)$, $0\leq c_1<(m_0\times 8)$, $\theta$ is an integer multiple of 4 and $m_0\times 8$ is exactly divisible by $\theta$, $\Delta$ is an integer, $\beta$ is an integer multiple of 4, and $$c=\left\lfloor\frac{c_0\%8}{2}\right\rfloor\times 4+c_0\%2+$$
$$2\times\left(1-\left\lfloor\frac{c_0}{(m_0\times 4)}\right\rfloor\right)+\left\lfloor\frac{c_0\%(m_0\times 4)}{16}\right\rfloor\times 16+\left\lfloor\frac{c_0\%16}{8}\right\rfloor\times m_0\times 4.$$

Example 4: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\%\theta+(r_1+2+4\times\Delta)\%\beta)\%\theta+\left\lfloor\frac{c}{\theta}\right\rfloor\times\theta,$$

where $0\leq c_0<(m_0\times 8)$, $0\leq c_1<(m_0\times 8)$, $\theta$ is an integer multiple of 4 and $m_0\times 8$ is exactly divisible by $\theta$, $\Delta$ is an integer, $\beta$ is an integer multiple of 4, and $$c=\left\lfloor\frac{c_0\%8}{2}\right\rfloor\times 4+c_0\%2+$$
$$2\times\left\lfloor\frac{c_0}{(m_0\times 4)}\right\rfloor+\left\lfloor\frac{c_0\%(m_0\times 4)}{16}\right\rfloor\times 16+\left\lfloor\frac{c_0\%16}{8}\right\rfloor\times m_0\times 4.$$

Using FIG. 11(a) as an example, another specific interleaving rule of the first interleaving processing is as follows: Bit $(\tilde{c}_0\times 2-i_2\%\,2+1)$ in $m_0\times 8$ bits in row $r_1$ of a fifth bit set (including $m_0$ square blocks T) is from 1 bit in bit 0 to bit $(m_0\times 4-1)$ in row $r_0$ of a fourth bit set (including $m_0$ square blocks B), where $0\leq\tilde{c}_0<(m_0\times 4)$. The following further provides several more specific examples.

Example 5: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\%\theta+(r_1+2\times\Delta)\%\beta)\%\theta+\left\lfloor\frac{c}{\theta}\right\rfloor\times\theta,$$

where $0\leq c_0<(m_0\times 8)$, $0\leq c_1<(m_0\times 8)$, $\theta$ is an integer multiple of 4 and $m_0\times 8$ is exactly divisible by $\theta$, $\Delta$ is an integer, $\beta$ is an integer multiple of 2, and $$c=c_0\%(m_0\times 4)*2+\left(1-\left\lfloor\frac{c_0}{(m_0\times 4)}\right\rfloor\right).$$

Example 6: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\%\theta+(r_1+1+2\times\Delta)\%\beta)\%\theta+\left\lfloor\frac{c}{\theta}\right\rfloor\times\theta,$$

where $0\leq c_0<(m_0\times 8)$, $0\leq c_1<(m_0\times 8)$, $\theta$ is an integer multiple of 4 and $m_0\times 8$ is exactly divisible by $\theta$, $\Delta$ is an integer, $\beta$ is an integer multiple of 2, and $$c=c_0\%(m_0\times 4)\times 2+\left\lfloor\frac{c_0}{(m_0\times 4)}\right\rfloor.$$

Example 7: Bit $c_1$ in the $m_0\times 8$ bits in row $r_1$ of the fifth bit set is from bit $c_0$ in $m_0\times 8$ bits in row $r_0$ of the fourth bit set; and $$c_1=(c\%\theta+(r_1+2\times\Delta)\%\beta)\%\theta+\left\lfloor\frac{c}{\theta}\right\rfloor\times\theta,$$

63 64 where $0 \leq c_0 < (m_0 \times 8)$, $0 \leq c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = (c_0 \% 8) \times 2 + \left(1 - \left\lfloor \frac{c_0}{(m_0 \times 4)} \right\rfloor \right) + 16 \times \left\lfloor \frac{c_0 \% (m_0 \times 4)}{16} \right\rfloor + (m_0 \times 4) \times \left\lfloor \frac{c_0 \% 16}{8} \right\rfloor.$$

Example 8: Bit $c_1$ in the $m_0 \times 8$ bits in row $r_1$ of the fifth bit set is from bit $c_0$ in $m_0 \times 8$ bits in row $r_0$ of the fourth bit set; and $$c_1 = (c\%\theta + (r_1 + 1 + 2 \times \Delta)\%\beta)\%\theta + \left\lfloor \frac{c}{\theta} \right\rfloor \times \theta,$$

where $0 \leq c_0 < (m_0 \times 8)$, $0 \leq c_1 < (m_0 \times 8)$, $\theta$ is an integer multiple of 4 and $m_0 \times 8$ is exactly divisible by $\theta$, $\Delta$ is an integer, $\beta$ is an integer multiple of 2, and $$c = (c_0 \% 8) \times 2 + \left\lfloor \frac{c_0}{(m_0 \times 4)} \right\rfloor + 16 \times \left\lfloor \frac{c_0 \% (m_0 \times 4)}{16} \right\rfloor + (m_0 \times 4) \times \left\lfloor \frac{c_0 \% 16}{8} \right\rfloor.$$

FIG. 11(a) is used as an example. In a possible implementation, the following conditions are satisfied:

a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,4}$ in row 0 and column 4;

a total of 512 bits in second bit subset $T_{0,1}$ in row 0 and column 1 and second bit subset $T_{1,1}$ in row 1 and column 1 are from a total of 512 bits in first bit subset $B_{1,0}$ in row 1 and column 0 and first bit subset $B_{1,4}$ in row 1 and column 4;

a total of 512 bits in second bit subset $T_{0,2}$ in row 0 and column 2 and second bit subset $T_{1,2}$ in row 1 and column 2 are from a total of 512 bits in first bit subset $B_{0,1}$ in row 0 and column 1 and first bit subset $B_{0,5}$ in row 0 and column 5;

a total of 512 bits in second bit subset $T_{0,3}$ in row 0 and column 3 and second bit subset $T_{1,3}$ in row 1 and column 3 are from a total of 512 bits in first bit subset $B_{1,1}$ in row 1 and column 1 and first bit subset $B_{1,5}$ in row 1 and column 5;

a total of 512 bits in second bit subset $T_{0,4}$ in row 0 and column 4 and second bit subset $T_{1,4}$ in row 1 and column 4 are from a total of 512 bits in first bit subset $B_{0,2}$ in row 0 and column 2 and first bit subset $B_{0,6}$ in row 0 and column 6;

a total of 512 bits in second bit subset $T_{0,5}$ in row 0 and column 5 and second bit subset $T_{1,5}$ in row 1 and column 5 are from a total of 512 bits in first bit subset $B_{1,2}$ in row 1 and column 2 and first bit subset $B_{1,6}$ in row 1 and column 6;

a total of 512 bits in second bit subset $T_{0,6}$ in row 0 and column 6 and second bit subset $T_{1,6}$ in row 1 and column 6 are from a total of 512 bits in first bit subset $B_{0,3}$ in row 0 and column 3 and first bit subset $B_{0,7}$ in row 0 and column 7; and a total of 512 bits in second bit subset $T_{0,7}$ in row 0 and column 7 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

FIG. 11(a) is used as an example. In another possible implementation, the following conditions are satisfied:

a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,4}$ in row 0 and column 4;

a total of 512 bits in second bit subset $T_{0,1}$ in row 0 and column 1 and second bit subset $T_{1,1}$ in row 1 and column 1 are from a total of 512 bits in first bit subset $B_{0,1}$ in row 0 and column 1 and first bit subset $B_{0,5}$ in row 0 and column 5;

a total of 512 bits in second bit subset $T_{0,2}$ in row 0 and column 2 and second bit subset $T_{1,2}$ in row 1 and column 2 are from a total of 512 bits in first bit subset $B_{0,2}$ in row 0 and column 2 and first bit subset $B_{0,6}$ in row 0 and column 6;

a total of 512 bits in second bit subset $T_{0,3}$ in row 0 and column 3 and second bit subset $T_{1,3}$ in row 1 and column 3 are from a total of 512 bits in first bit subset $B_{0,3}$ in row 0 and column 3 and first bit subset $B_{0,7}$ in row 0 and column 7;

a total of 512 bits in second bit subset $T_{0,4}$ in row 0 and column 4 and second bit subset $T_{1,4}$ in row 1 and column 4 are from a total of 512 bits in first bit subset $B_{1,0}$ in row 1 and column 0 and first bit subset $B_{1,4}$ in row 1 and column 4;

a total of 512 bits in second bit subset $T_{0,5}$ in row 0 and column 5 and second bit subset $T_{1,5}$ in row 1 and column 5 are from a total of 512 bits in first bit subset $B_{1,1}$ in row 1 and column 1 and first bit subset $B_{1,5}$ in row 1 and column 5;

a total of 512 bits in second bit subset $T_{0,6}$ in row 0 and column 6 and second bit subset $T_{1,6}$ in row 1 and column 6 are from a total of 512 bits in first bit subset $B_{1,2}$ in row 1 and column 2 and first bit subset $B_{1,6}$ in row 1 and column 6; and a total of 512 bits in second bit subset $T_{0,7}$ in row 0 and column 7 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

FIG. 11(a) is used as an example. In still another possible implementation, the following conditions are satisfied:

a total of 512 bits in second bit subset $T_{0,0}$ in row 0 and column 0 and second bit subset $T_{0,1}$ in row 0 and column 1 are from a total of 512 bits in first bit subset $B_{0,0}$ in row 0 and column 0 and first bit subset $B_{0,4}$ in row 0 and column 4;

a total of 512 bits in second bit subset $T_{0,2}$ in row 0 and column 2 and second bit subset $T_{0,3}$ in row 0 and column 3 are from a total of 512 bits in first bit subset $B_{0,1}$ in row 0 and column 1 and first bit subset $B_{0,5}$ in row 0 and column 5;

a total of 512 bits in second bit subset $T_{0,4}$ in row 0 and column 4 and second bit subset $T_{0,5}$ in row 0 and column 5 are from a total of 512 bits in first bit subset $B_{0,2}$ in row 0 and column 2 and first bit subset $B_{0,6}$ in row 0 and column 6;

a total of 512 bits in second bit subset $T_{0,6}$ in row 0 and column 6 and second bit subset $T_{0,7}$ in row 0 and column 7 are from a total of 512 bits in first bit subset $B_{0,3}$ in row 0 and column 3 and first bit subset $B_{0,7}$ in row 0 and column 7;

a total of 512 bits in second bit subset $T_{1,0}$ in row 1 and column 0 and second bit subset $T_{1,1}$ in row 1 and column 1 are from a total of 512 bits in first bit subset $B_{1,0}$ in row 1 and column 0 and first bit subset $B_{1,4}$ in row 1 and column 4;

a total of 512 bits in second bit subset $T_{1,2}$ in row 1 and column 2 and second bit subset $T_{1,3}$ in row 1 and column 3 are from a total of 512 bits in first bit subset $B_{1,1}$ in row 1 and column 1 and first bit subset $B_{1,5}$ in row 1 and column 5;

a total of 512 bits in second bit subset $T_{1,4}$ in row 1 and column 4 and second bit subset $T_{1,5}$ in row 1 and column 5 are from a total of 512 bits in first bit subset $B_{1,2}$ in row 1 and column 2 and first bit subset $B_{1,6}$ in row 1 and column 6; and a total of 512 bits in second bit subset $T_{1,6}$ in row 1 and column 6 and second bit subset $T_{1,7}$ in row 1 and column 7 are from a total of 512 bits in first bit subset $B_{1,3}$ in row 1 and column 3 and first bit subset $B_{1,7}$ in row 1 and column 7.

Figure 11D:
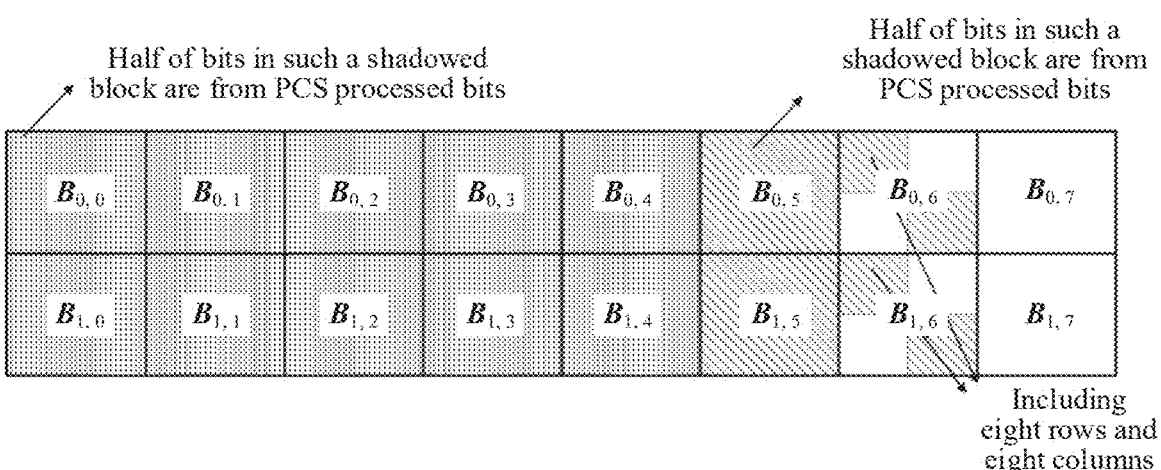
FIG. 11(d) is a diagram of other distribution of a plurality of first bit subsets according to an embodiment of this application.
Figure 11E:
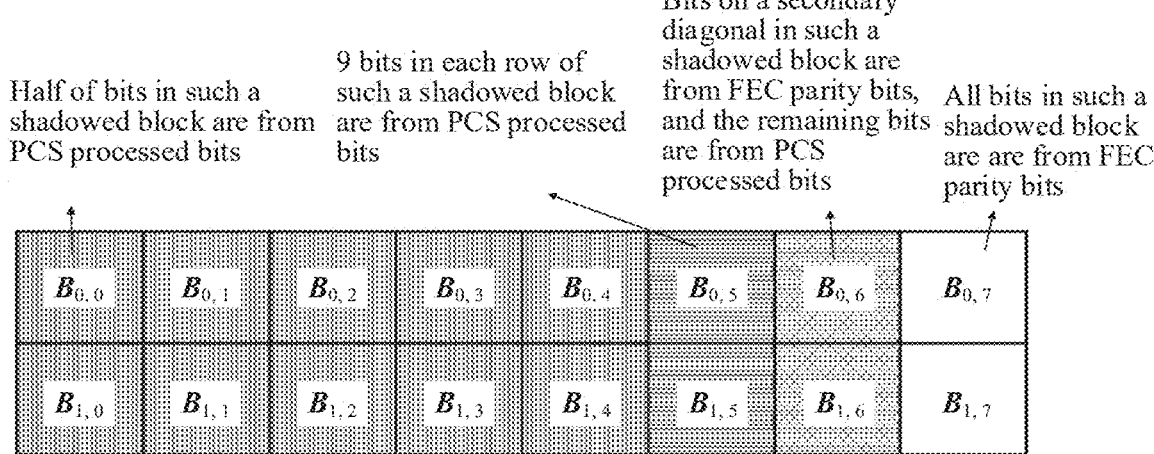
FIG. 11(e) is a diagram of other distribution of a plurality of first bit subsets according to an embodiment of this application.

FIG. 11($b$) is a diagram of other distribution of a plurality of first bit subsets according to an embodiment of this application. As shown in FIG. 11($b$), $m_0=16$ is used as an example. Eight square blocks $B_{0,0}$, $B_{0,1}$, $B_{0,4}$, $B_{0,5}$, $B_{1,0}$, $B_{1,1}$, $B_{1,4}$, and $B_{1,5}$ with shadow backgrounds are from 2048 bits in a second bit set, and eight square blocks $B_{0,2}$, $B_{0,3}$, $B_{0,6}$, $B_{0,7}$, $B_{1,2}$, $B_{1,3}$, $B_{1,6}$, and $B_{1,7}$ without shadow backgrounds are 1504 bits on which PCS processing is not performed and 544 OFEC parity bits. 16 square blocks B are considered as a whole, bit 0 to bit 31 and bit 64 to bit 95 in 128 bits in row $r_0$ are 64 bits in the 2048 bits in the second bit set, where $0 \leq r_0 < 32$.

Using FIG. 11($b$) as an example, a specific interleaving rule of the first interleaving processing is as follows: Bit $$\left( \left\lfloor \frac{\tilde{z}_0}{2} \right\rfloor \times 4 + \tilde{z}_0 \% 2 + (r_1 + 2)\%4 \right)\%128$$

in 128 bits in row $r_1$ of a fifth bit set (including $m_0$ square blocks T) is from 1 bit in bit 0 to bit 31 or bit 64 to bit 95 in row $r_0$ of a fourth bit set (including $m_0$ square blocks B), where $0 \leq \tilde{z}_0 < 64$. The following further provides several more specific examples.

Example 9: Bit $c_1$ in the 128 bits in row $r_1$ of the fifth bit set is from bit $c_0$ in 128 bits in row $r_0$ of the fourth bit set; and $$c_1 = (c\%\theta + (r_1 + 4 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( 1 - \left\lfloor \frac{c_0}{32} \right\rfloor \% 2 \right) \times 2 + \left\lfloor \frac{c_0}{64} \right\rfloor \times 64.$$

Example 10: Bit $c_1$ in the 128 bits in row $r_1$ of the fifth bit set is from bit $c_0$ in 128 bits in row $r_0$ of the fourth bit set; and $$c_1 = (c \% \theta + (r_1 + 2 + 4 * \Delta)\% \beta)\% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( \left\lfloor \frac{c_0}{32} \right\rfloor \% 2 \right) \times 2 + \left\lfloor \frac{c_0}{64} \right\rfloor \times 64.$$

Example 11: Bit $c_1$ in the 128 bits in row $r_1$ of the fifth bit set is from bit $c_0$ in 128 bits in row $r_0$ of the fourth bit set; and $$c_1 = (c \% \theta + (r_1 + 4 \times \Delta)\% \beta)\% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, 4 is an integer, $\beta$ is an integer multiple of 4, and $$c = \left\lfloor \frac{c_0 \% 8}{2} \right\rfloor \times 4 + c_0 \% 2 + \left( 1 - \left\lfloor \frac{c_0}{32} \right\rfloor \% 2 \right) \times 2 +$$
$$\left\lfloor \frac{c_0}{64} \right\rfloor \times 64 + \left\lfloor \frac{c_0 \% 16}{8} \right\rfloor \times 32 + \left( \left\lfloor \frac{c_0}{16} \right\rfloor \% 2 \right) \times 16.$$

Example 12: Bit $C_1$ in the 128 bits in row $r_1$ of the fifth bit set is from bit $c_0$ in 128 bits in row $r_0$ of the fourth bit set; and $$c_1 = (c \% \theta + (r_1 + 2 + 4 \times \Delta)\% \beta)\% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 4, and $$c = \left\lfloor \frac{c_0 \% 8}{2} \right\rfloor \times 4 + c_0 \% 2 + \left( \left\lfloor \frac{c_0}{32} \right\rfloor \% 2 \right) \times 2 +$$
$$\left\lfloor \frac{c_0}{64} \right\rfloor \times 64 + \left\lfloor \frac{c_0 \% 16}{8} \right\rfloor \times 32 + \left( \left\lfloor \frac{c_0}{16} \right\rfloor \% 2 \right) \times 16.$$

Using FIG. 11($b$) as an example, a specific interleaving rule of the first interleaving processing is as follows: Bit $(\tilde{c}_0 \times 2 - i_2 \% 2 + 1)$ in 128 bits in row $r_1$ of a fifth bit set (including $m_0$ square blocks T) is from 1 bit in bit 0 to bit 31 or bit 64 to bit 95 in row $r_0$ of a fourth bit set (including $m_0$ square blocks B), where $0 \leq \tilde{c}_0 < 64$. The following further provides several more specific examples.

Example 13: Bit $c_1$ in the 128 bits in row $r_1$ of the fifth bit set is from bit $c_0$ in 128 bits in row $r_0$ of the fourth bit set; and $$c_1 = (c \% \theta + (r_1 + 2 \times \Delta)\% \beta)\% \theta + \left\lfloor \frac{c}{\theta} \right\rfloor \times \theta,$$

where $0 \leq c_0 < 128$, $0 \leq c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% \ 32) \times 2 + \left(1 - \left(\left\lfloor \frac{c_0}{32} \right\rfloor \% \ 2\right)\right) + \left\lfloor \frac{c_0}{64} \right\rfloor \times 64.$$

Example 14: Bit $C_1$ in the 128 bits in row $r_1$ of the fifth bit set is from bit $c_0$ in 128 bits in row $r_0$ of the fourth bit set; and $$c_1 = (c \ \% \ \theta + (r_1 + 1 + 2 \times \Delta) \% \ \beta) \% \ \theta + \left\lfloor \frac{c}{\theta} \right\rfloor \times \theta,$$

where $0 \le c_0 < 128$, $0 \le c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% \ 32) \times 2 + \left(\left\lfloor \frac{c_0}{32} \right\rfloor \% \ 2\right) + \left\lfloor \frac{c_0}{64} \right\rfloor \times 64.$$

Example 15: Bit $C_1$ in the 128 bits in row $r_1$ of the fifth bit set is from bit $c_0$ in 128 bits in row $r_0$ of the fourth bit set; and $$c_1 = (c \ \% \ \theta + (r_1 + 2 \times \Delta) \% \ \beta) \% \ \theta + \left\lfloor \frac{c}{\theta} \right\rfloor \times \theta,$$

where $0 \le c_0 < 128$, $0 \le c_1 < 128$, $\theta$ is an integer multiple of 4 and $m_0 \times 8$ is exactly divisible by $\theta$, $\Delta$ is an integer, $\beta$ is an integer multiple of 2, and $$c = (c_0 \% \ 8) \times 2 + \left(1 - \left(\left\lfloor \frac{c_0}{32} \right\rfloor \% \ 2\right)\right) +$$
$$\left\lfloor \frac{c_0}{64} \right\rfloor \times 64 + \left\lfloor \frac{c_0 \% \ 16}{8} \right\rfloor \times 32 + \left(\left\lfloor \frac{c_0}{16} \right\rfloor \% \ 2\right) \times 16.$$

Example 16: Bit $C_1$ in the 128 bits in row $r_1$ of the fifth bit set is from bit $c_0$ in 128 bits in row $r_0$ of the fourth bit set; and $$c_1 = (c \ \% \ \theta + (r_1 + 1 + 2 \times \Delta) \% \ \beta) \% \ \theta + \left\lfloor \frac{c}{\theta} \right\rfloor \times \theta,$$

where $0 \le c_0 < 128$, $0 \le c_1 < 128$, $\theta$ is an integer multiple of 4 and $m_0 \times 8$ is exactly divisible by $\theta$, $\Delta$ is an integer, $\beta$ is an integer multiple of 2, and $$c =$$
$$(c_0 \% \ 8) * 2 + \left(\left\lfloor \frac{c_0}{32} \right\rfloor \% \ 2\right) + \left\lfloor \frac{c_0}{64} \right\rfloor * 64 + \left\lfloor \frac{c_0 \% \ 16}{8} \right\rfloor * 32 + \left(\left\lfloor \frac{c_0}{16} \right\rfloor \% \ 2\right) * 16.$$

FIG. 11(b) is used as an example. In a possible implementation, the following conditions are satisfied:

a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,2}$ in row 0 and column 2;

a total of 512 bits in second bit subset $T_{0,1}$ in row 0 and column 1 and second bit subset $T_{1,1}$ in row 1 and column 1 are from a total of 512 bits in first bit subset $B_{1,0}$ in row 1 and column 0 and first bit subset $B_{1,2}$ in row 1 and column 2;

a total of 512 bits in second bit subset $T_{0,2}$ in row 0 and column 2 and second bit subset $T_{1,2}$ in row 1 and column 2 are from a total of 512 bits in first bit subset $B_{0,1}$ in row 0 and column 1 and first bit subset $B_{0,3}$ in row 0 and column 3;

a total of 512 bits in second bit subset $T_{0,3}$ in row 0 and column 3 and second bit subset $T_{1,3}$ in row 1 and column 3 are from a total of 512 bits in first bit subset $B_{1,1}$ in row 1 and column 1 and first bit subset $B_{1,3}$ in row 1 and column 3;

a total of 512 bits in second bit subset $T_{0,4}$ in row 0 and column 4 and second bit subset $T_{1,4}$ in row 1 and column 4 are from a total of 512 bits in first bit subset $B_{0,4}$ in row 0 and column 4 and first bit subset $B_{0,6}$ in row 0 and column 6;

a total of 512 bits in second bit subset $T_{0,5}$ in row 0 and column 5 and second bit subset $T_{1,5}$ in row 1 and column 5 are from a total of 512 bits in first bit subset $B_{1,4}$ in row 1 and column 4 and first bit subset $B_{1,6}$ in row 1 and column 6;

a total of 512 bits in second bit subset $T_{0,6}$ in row 0 and column 6 and second bit subset $T_{1,6}$ in row 1 and column 6 are from a total of 512 bits in first bit subset $B_{0,5}$ in row 0 and column 5 and first bit subset $B_{0,7}$ in row 0 and column 7; and a total of 512 bits in second bit subset $T_{0,7}$ in row 0 and column 7 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

FIG. 11(b) is used as an example. In another possible implementation, the following conditions are satisfied:

a total of 512 bits in second bit subset $T_{0,0}$ in row 0 and column 0 and second bit subset $T_{1,0}$ in row 1 and column 0 are from a total of 512 bits in first bit subset $B_{0,0}$ in row 0 and column 0 and first bit subset $B_{0,2}$ in row 0 and column 2;

a total of 512 bits in second bit subset $T_{0,1}$ in row 0 and column 1 and second bit subset $T_{1,1}$ in row 1 and column 1 are from a total of 512 bits in first bit subset $B_{0,1}$ in row 0 and column 1 and first bit subset $B_{0,3}$ in row 0 and column 3;

a total of 512 bits in second bit subset $T_{0,2}$ in row 0 and column 2 and second bit subset $T_{1,2}$ in row 1 and column 2 are from a total of 512 bits in first bit subset $B_{0,4}$ in row 0 and column 4 and first bit subset $B_{0,6}$ in row 0 and column 6;

a total of 512 bits in second bit subset $T_{0,3}$ in row 0 and column 3 and second bit subset $T_{1,3}$ in row 1 and column 3 are from a total of 512 bits in first bit subset $B_{0,5}$ in row 0 and column 5 and first bit subset $B_{0,7}$ in row 0 and column 7;

a total of 512 bits in second bit subset $T_{0,4}$ in row 0 and column 4 and second bit subset $T_{1,4}$ in row 1 and column 4 are from a total of 512 bits in first bit subset $B_{1,0}$ in row 1 and column 0 and first bit subset $B_{1,2}$ in row 1 and column 2;

a total of 512 bits in second bit subset $T_{0,5}$ in row 0 and column 5 and second bit subset $T_{1,5}$ in row 1 and column 5 are from a total of 512 bits in first bit subset $B_{1,1}$ in row 1 and column 1 and first bit subset $B_{1,3}$ in row 1 and column 3;

a total of 512 bits in second bit subset $T_{0,6}$ in row 0 and column 6 and second bit subset $T_{1,6}$ in row 1 and column 6 are from a total of 512 bits in first bit subset $B_{1,4}$ in row 1 and column 4 and first bit subset $B_{1,6}$ in row 1 and column 6; and a total of 512 bits in second bit subset $T_{0,7}$ in row 0 and column 7 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

FIG. 11($b$) is used as an example. In still another possible implementation, the following conditions are satisfied:

a total of 512 bits in second bit subset $T_{0,0}$ in row 0 and column 0 and second bit subset $T_{0,1}$ in row 0 and column 1 are from a total of 512 bits in first bit subset $B_{0,0}$ in row 0 and column 0 and first bit subset $B_{0,2}$ in row 0 and column 2;

a total of 512 bits in second bit subset $T_{0,2}$ in row 0 and column 2 and second bit subset $T_{0,3}$ in row 0 and column 3 are from a total of 512 bits in first bit subset $B_{0,1}$ in row 0 and column 1 and first bit subset $B_{0,3}$ in row 0 and column 3;

a total of 512 bits in second bit subset $T_{0,4}$ in row 0 and column 4 and second bit subset $T_{0,5}$ in row 0 and column 5 are from a total of 512 bits in first bit subset $B_{0,4}$ in row 0 and column 4 and first bit subset $B_{0,6}$ in row 0 and column 6;

a total of 512 bits in second bit subset $T_{0,6}$ in row 0 and column 6 and second bit subset $T_{0,7}$ in row 0 and column 7 are from a total of 512 bits in first bit subset $B_{0,5}$ in row 0 and column 5 and first bit subset $B_{0,7}$ in row 0 and column 7;

a total of 512 bits in second bit subset $T_{1,0}$ in row 1 and column 0 and second bit subset $T_{1,1}$ in row 1 and column 1 are from a total of 512 bits in first bit subset $B_{1,0}$ in row 1 and column 0 and first bit subset $B_{1,2}$ in row 1 and column 2;

a total of 512 bits in second bit subset $T_{1,2}$ in row 1 and column 2 and second bit subset $T_{1,3}$ in row 1 and column 3 are from a total of 512 bits in first bit subset $B_{1,1}$ in row 1 and column 1 and first bit subset $B_{1,3}$ in row 1 and column 3;

a total of 512 bits in second bit subset $T_{1,4}$ in row 1 and column 4 and second bit subset $T_{1,5}$ in row 1 and column 5 are from a total of 512 bits in first bit subset $B_{1,4}$ in row 1 and column 4 and first bit subset $B_{1,6}$ in row 1 and column 6; and a total of 512 bits in second bit subset $T_{1,6}$ in row 1 and column 6 and second bit subset $T_{1,7}$ in row 1 and column 7 are from a total of 512 bits in first bit subset $B_{1,5}$ in row 1 and column 5 and first bit subset $B_{1,7}$ in row 1 and column 7.

It should be noted that, as shown in FIG. 11($b$), the eight square blocks $B_{0,0}$, $B_{0,1}$, $B_{0,4}$, $B_{0,5}$, $B_{1,0}$, $B_{1,1}$, $B_{1,4}$, and $B_{1,5}$ with the shadow backgrounds are from the 2048 bits in the second bit set. With reference to FIG. 5, as shown in FIG. 11($b$), positions of the 2048 bits in the second bit set in a codeword of the FEC encoding are non-consecutive. In this case, before the second bit set and the third bit set are sent to the FEC encoding, pre-encoding interleaving processing is further performed to disorder a sequence, so that a sequence of 3552 bits before the encoding is as follows: first 1024 consecutive bits from the second bit set, then 1024 consecutive bits from the third bit set, then 1024 consecutive bits from the second bit set, and finally 480 consecutive bits from the third bit set.

It should be noted that the pre-encoding interleaving processing is optional, but the first interleaving processing is indispensable. For example, as shown in FIG. 11($a$), the pre-encoding interleaving processing is not performed on the second bit set and the third bit set, but the encoded fourth bit set still needs to be sent to the first interleaving processing. For example, as shown in FIG. 11($b$), the pre-encoding interleaving processing is performed on the second bit set and the third bit set, and the encoded fourth bit set needs to be sent to the first interleaving processing to disorder a sequence.

It should be noted that, in some specific applications, the pre-encoding interleaving processing is performed on the second bit set and the third bit set, and the encoded fourth bit set is also sent to the first interleaving processing to disorder the sequence. When several first bit subsets in the encoded fourth bit set satisfy a pattern shown in FIG. 9($a$) or FIG. 9($b$), the first interleaving processing may be performed merely on remaining first bit subsets that do not satisfy the pattern shown in FIG. 9($a$) or FIG. 9($b$) to disorder a sequence, so that all second bit subsets in the fifth bit set obtained through the first interleaving processing on the encoded fourth bit set satisfy the pattern shown in FIG. 9($a$) or FIG. 9($b$). In other words, the first interleaving processing may be performed on some bits in the fourth bit set. This is not specifically limited herein. Optionally, in some scenarios, if several first bit subsets in the encoded fourth bit set satisfy the pattern shown in FIG. 9($a$) or FIG. 9($b$), the first interleaving processing may still be performed on all first bit subsets, provided that all second bit subsets in the fifth bit set obtained through the first interleaving processing satisfy the pattern shown in FIG. 9($a$) or FIG. 9($b$).

The following provides several implementation solutions of pre-encoding interleaving and corresponding first interleaving.

Figure 21:
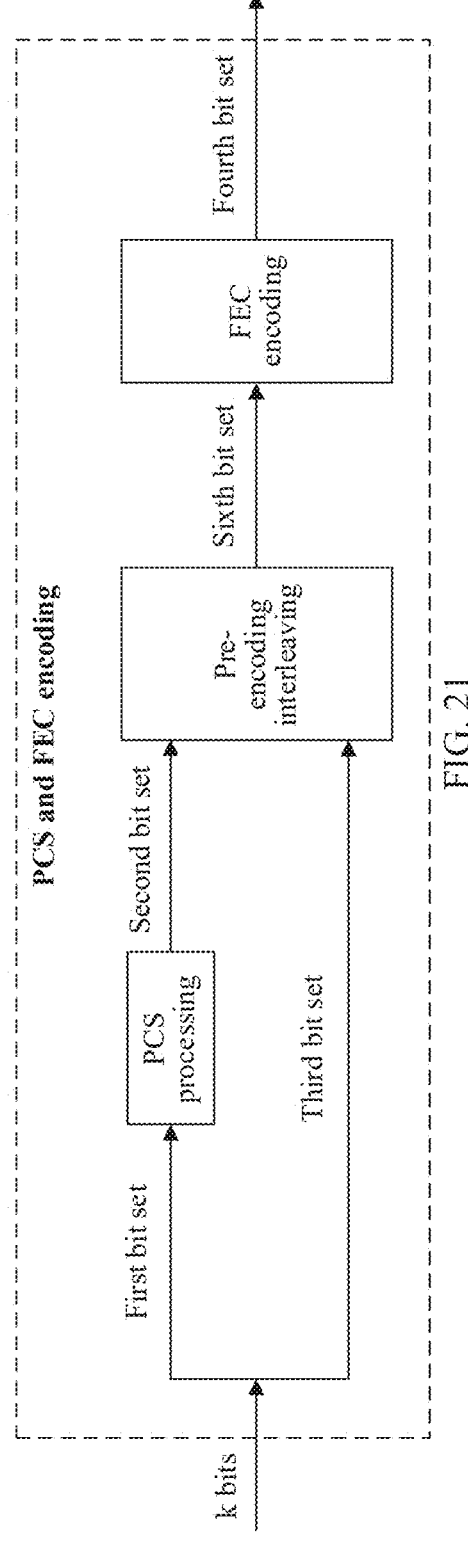
FIG. 21 is a diagram of another embodiment of PCS and FEC encoding according to an embodiment of this application.

FIG. 21 is a diagram of another embodiment of PCS and FEC encoding according to an embodiment of this application. As shown in FIG. 21, pre-encoding interleaving is performed on a second bit set and a third bit set to obtain a sixth bit set, and then FEC encoding is performed on the sixth bit set to obtain a fourth bit set, where the sixth bit set includes $m_3$ third bit subsets, and the $m_3$ third bit subsets are distributed in two rows and $m_4$ columns. $m_3 = 2 \times m_4$, and $m_3$ is an integer greater than 1 and less than $m_0$. Each third bit subset in some third bit subsets includes $F_0$ bits, each third bit subset in the other third bit subsets includes $F_2$ bits, and $F_2$ is an even number greater than 1 and less than $F_0$.

It should be understood that "the sixth bit set includes $m_3$ third bit subsets, and the $m_3$ third bit subsets are distributed in two rows and $m_4$ columns" above is merely a concept introduced for ease of description. In an actual application, the sixth bit set is an entirety, and there is no "two rows and $m_4$ columns" distribution, and each third bit subset may be considered as a plurality of bits in the sixth bit set.

Figure 22:
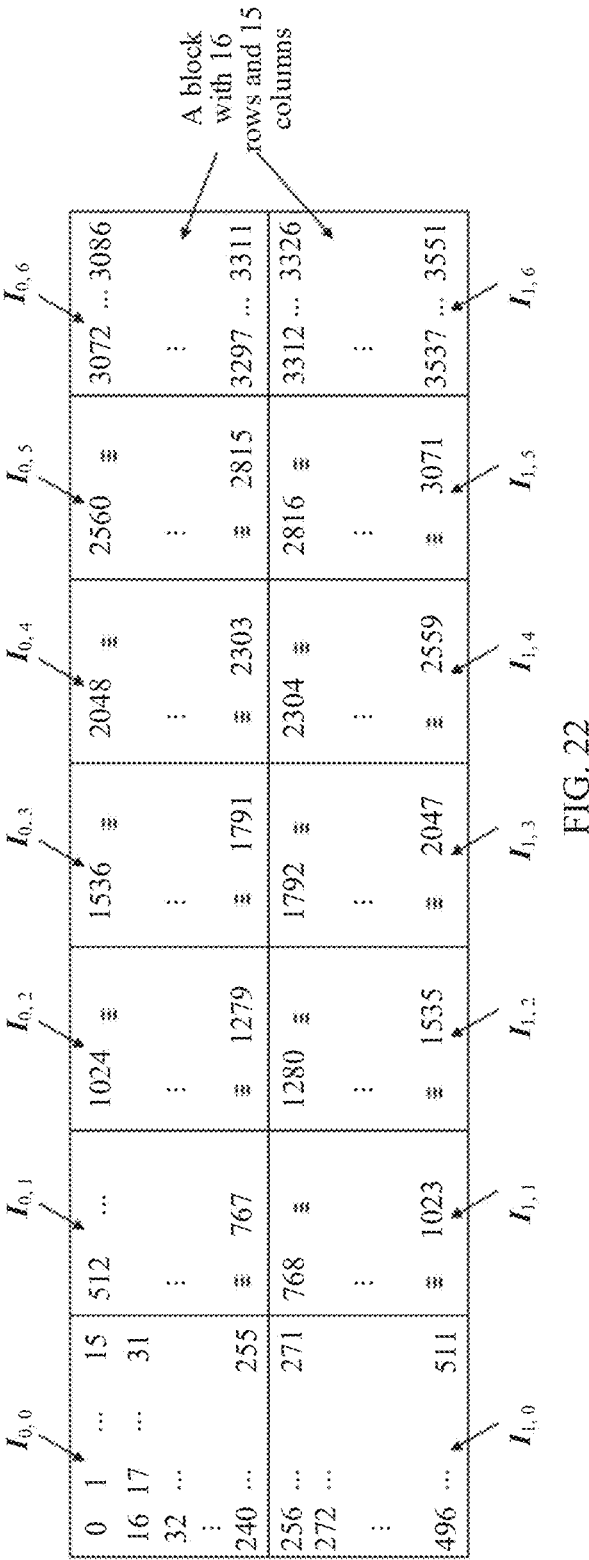
FIG. 22 is a diagram of a sixth bit set according to an embodiment of this application.

FIG. 22 is a diagram of a sixth bit set according to an embodiment of this application. In an example, the sixth bit set includes $m_3 = 14$ third bit subsets. In some application scenarios, the $m_3$ third bit subsets in the sixth bit set may be specifically presented in a form of a square block (square block). The square block may also be referred to as a block (block) for short, and each third bit subset may be referred to as a square block I. For example, as shown in FIG. 22, the $m_3 = 14$ square blocks I are distributed in two rows and seven columns. For ease of description, $I_{i_0,j_0}$ represents a square block I in row $i_0$ and column $j_0$ of the sixth bit set. When $0 \le i_0 < 2$ and $0 \le j_0 < 6$, $I_{i_0,j_0}$ includes $F_0 = 256$ bits and is arranged as 16 rows and 16 columns, and $I_{0,6}$ and $I_{1,6}$ each include $F_2 = 240$ bits and are arranged as 16 rows and 15 columns.

It should be understood that, in some specific scenarios, square blocks I in two rows and $m_4$ columns are also referred to as input blocks (input blocks) of the FEC encoding, where $m_3 = 2 \times m_4$. It should be further understood that the square blocks I in the two rows and the $m_4$ columns may also be considered as a bit matrix (matrix) of 32 rows and $m_3 \times 8-1$ columns, including 32 rows, and each row includes $m_3 \times 8-1$ bits. In this case, a bit in row $r_0$ and column $c_0$ of the bit matrix corresponds to a bit in row $i_1$ and column $j_1$ of square block $I_{i_0,j_0}$, where $i_0 = \lfloor r_0/16 \rfloor$, $j_0 = \lfloor c_0/16 \rfloor$, $i_1 = r_0 \% 16$, $j_1 = c_0 \% 16$, $0 < r_0 < 32$, $0 \leq c_0 < m_2 \times 8-1$, $0 \leq i_0 < 2$, $0 \leq j_0 < 7$, $0 \leq i_1 < 16$, and $0 \leq j_1 < 16$. In this application, in some cases, one row represents eight square blocks; in some cases, one row represents a total of 16 bits in one row of a square block; and in some cases, one row represents a total of $m_3 \times 8-1$ bits in one row in a set including $m_3$ square blocks. Specific cases may be distinguished based on context understanding.

In some specific applications, as shown in FIG. 22, block $I_{i_0,j_0}$ in row $i_0$ and column $j_0$ ($0 \leq i_0 < 2$ and $0 \leq j_0 < 6$) includes bit $512 \times j_0 + 256 \times i_0$ to bit $512 \times j_0 + 256 \times i_0 + 255$ in the sixth bit set. For example, block $I_{0,0}$ includes bit 0 to bit 255 in the sixth bit set. For another example, block $I_{1,0}$ includes bit 256 to bit 511 in the sixth bit set. Because block $I_{0,6}$ and block $I_{1,6}$ each are 16 rows and 15 columns, and therefore respectively include bit 3072 to bit 3311 in the sixth bit set and bit 3312 to bit 3551 in the sixth bit set.

FIG. 23($a$) is a diagram of first distribution of a sixth bit set according to an embodiment of this application. As shown in FIG. 23($a$), $m_2 = 14$ is used as an example. A total of 2048 bits in square blocks $I_{0,0}$, $I_{0,1}$, $I_{0,4}$, $I_{0,5}$, $I_{1,0}$, $I_{1,1}$, $I_{1,4}$, and $I_{1,5}$ in the sixth bit set are from a second bit set. All bits in square blocks $I_{0,2}$, $I_{0,3}$, $I_{0,6}$, $I_{1,2}$, $I_{1,3}$, and $I_{0,6}$ are from a third bit set. Then, a fourth bit set is obtained through FEC encoding on the sixth bit set. Corresponding distribution of the fourth bit set is shown in FIG. 11($b$). In this case, a fifth bit set may be obtained through the first interleaving according to any solution in Example 9 to Example 12, and any second bit subset in the fifth bit set is shown in FIG. 9($a$). Alternatively, a fifth bit set may be obtained through the first interleaving according to any solution in Example 13 to Example 16, and any second bit subset in the fifth bit set is shown in FIG. 9($b$).

FIG. 23($b$) is a diagram of second distribution of a sixth bit set according to an embodiment of this application. As shown in FIG. 23($b$), $m_2 = 14$ is used as an example. One half (128 bits) of bits in each of square blocks $I_{0,0}$, $I_{0,1}$, $I_{0,2}$, $I_{0,3}$, $I_{1,0}$, $I_{1,1}$, $I_{1,2}$, and $I_{1,3}$ in the sixth bit set are from a second bit set, and the other half of bits (128 bits) are from a third bit set on which PCS processing is not performed. All bits in square blocks $I_{0,4}$, $I_{0,5}$, $I_{1,4}$, and $I_{1,5}$ are from the second bit set. Square blocks $I_{0,6}$ and $I_{1,6}$ are from the third bit set on which the PCS processing is not performed.

FIG. 24($a$) is a diagram of a third bit subset according to an embodiment of this application. FIG. 24($b$) is another diagram of a third bit subset according to an embodiment of this application. Based on the sixth bit set shown in FIG. 23($b$), further, the square blocks $I_{0,0}$, $I_{0,1}$, $I_{0,2}$, $I_{0,3}$, $I_{1,0}$, $I_{1,1}$, $I_{1,2}$, and $I_{1,3}$ satisfy a pattern shown in FIG. 24($a$), in other words, a bit in row $i_1$ and column $$\left( \left\lfloor \frac{j_1}{2} \right\rfloor \times 4 + j_1 \ \%2 + 2 - i_1 \ \%2 \right)$$

in square block $I_{i_0,j_0}$ are from the third bit set on which the PCS processing is not performed, where $0 \leq i_0 < 2$, $0 \leq j_0 < 4$, $0 \leq i_1 < 16$, $0 \leq j_1 < 8$. Alternatively, the square blocks $I_{0,0}$, $I_{0,1}$, $I_{0,2}$, $I_{0,3}$, $I_{1,0}$, $I_{1,1}$, $I_{1,2}$, and $I_{1,3}$ satisfy a pattern shown in FIG. 24($b$), in other words, a bit in row $i_1$ and column ($j_1 \times 2$) of square block $I_{i_0,j_0}$ is from the second bit set, and remaining bits in square block $I_{i_0,j_0}$ are from the third bit set on which the PCS processing is not performed, where $0 \leq i_0 < 2$, $0 \leq j_0 < 4$, $0 \leq i_1 < 16$, $0 \leq j_1 < 8$.

FIG. 11($c$) is a diagram of other distribution of a plurality of first bit subsets according to an embodiment of this application. A fourth bit set is obtained through FEC encoding on the sixth bit set shown in FIG. 23($b$), and corresponding distribution of the fourth bit set is shown in FIG. 11($c$). Specifically, one half (128 bits) of bits in each of square blocks $B_{0,0}$, $B_{0,1}$, $B_{0,2}$, $B_{0,3}$, $B_{1,0}$, $B_{1,1}$, $B_{1,2}$, and $B_{1,3}$ are from the second bit set, and the other half (128 bits) of the bits are from the third bit set on which the PCS processing is not performed. All bits in square blocks $B_{0,4}$, $B_{0,5}$, $B_{1,4}$, and $B_{1,5}$ are from the second bit set. Square blocks $B_{0,6}$, $B_{0,7}$, $B_{1,6}$, and $B_{1,7}$ are from the third bit set on which the PCS processing is not performed and/or OFEC parity bits. Further, a bit arrangement manner of the square blocks $B_{0,0}$, $B_{0,1}$, $B_{0,2}$, $B_{0,3}$, $B_{1,0}$, $B_{1,1}$, $B_{1,2}$, and $B_{1,3}$ in the fourth bit set is shown in FIG. 9($a$) or FIG. 9($b$). Specifically, when the square blocks $I_{0,0}$, $I_{0,1}$, $I_{0,2}$, $I_{0,3}$, $I_{1,0}$, $I_{1,1}$, $I_{1,2}$, and $I_{1,3}$ in the sixth bit set are shown in FIG. 24($a$), the square blocks $B_{0,0}$, $B_{0,1}$, $B_{0,2}$, $B_{0,3}$, $B_{1,0}$, $B_{1,1}$, $B_{1,2}$, and $B_{1,3}$ in the fourth bit set are shown in FIG. 9($a$). When the square blocks $I_{0,0}$, $I_{0,1}$, $I_{0,2}$, $I_{0,3}$, $I_{1,0}$, $I_{1,1}$, $I_{1,2}$, and $I_{1,3}$ in the sixth bit set are shown in FIG. 24($b$), the square blocks $B_{0,0}$, $B_{0,1}$, $B_{0,2}$, $B_{0,3}$, $B_{1,0}$, $B_{1,1}$, $B_{1,2}$, and $B_{1,3}$ in the fourth bit set are shown in FIG. 9($b$). In this case, first interleaving needs to be performed only on a total of eight square blocks, namely, $B_{0,4}$, $B_{0,5}$, $B_{0,6}$, $B_{0,7}$, $B_{1,4}$, $B_{1,5}$, $B_{1,6}$, and $B_{1,7}$, in the fourth bit set, to obtain square blocks $T_{0,4}$, $T_{0,5}$, $T_{0,6}$, $T_{0,7}$, $T_{1,4}$, $T_{1,5}$, $T_{1,6}$, and $T_{1,7}$ in a fifth bit set, while $B_{0,0}$, $B_{0,1}$, $B_{0,2}$, $B_{0,3}$, $B_{1,0}$, $B_{1,1}$, $B_{1,2}$, and $B_{1,3}$ are output in an original sequence, to obtain square blocks $B_{0,0}$, $B_{0,1}$, $B_{0,2}$, $B_{0,3}$, $B_{1,0}$, $B_{1,1}$, $B_{1,2}$, and $B_{1,3}$ in the fifth bit set.

FIG. 11($c$) is used as an example, and the square blocks $B_{0,0}$, $B_{0,1}$, $B_{0,2}$, $B_{0,3}$, $B_{1,0}$, $B_{1,1}$, $B_{1,2}$, and $B_{1,3}$ in the fourth bit set are shown in FIG. 9($a$). A specific interleaving rule of the first interleaving processing is as follows: Bit 0 to bit 63 in 128 bits in row $r_1$ of the fifth bit set (including $m_0$ square blocks T) correspond one-to-one to bit 0 to bit 63 in row $r_0$ of the fourth bit set. In addition, bit $$64 + \left( \left\lfloor \frac{\tilde{c}_0}{2} \right\rfloor \times 4 + \tilde{c}_0 \ \%2 + (r_1 + 2) \ \%4 \right) \ \%64$$

in the 128 bits in row $r_1$ of the fifth bit set is from 1 bit in bit 64 to bit 95 in row $r_0$ of the fourth bit set (including $m_0$ square blocks B), where $0 \leq \tilde{c}_0 < 31$. The following further provides several more specific examples.

Example 17: When $0 \leq c_1 < 64$, bit $c_1$ in the 128 bits in row $r_1$ of the fifth bit set is from bit $c_1$ in 128 bits in row $r_0$ of the fourth bit set. When $64 \leq c_1 < 128$, bit $c_1$ in the 128 bits in row $r_1$ of the fifth bit set is from bit $c_0$ in 128 bits in row $r_0$ of the fourth bit set.

$$c_1 = (c \ \% \ \theta + (r_1 + 4 \times \Delta) \ \% \ \beta) \ \% \ \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \ \%32}{2} \right\rfloor \times 4 + c_0 \ \%2 + \left(1 - \left\lfloor \frac{c_0}{32} \right\rfloor \ \%2\right) \times 2 + 64.$$

Example 18: When $0 \leq c_1 < 64$, bit $c_1$ in the 128 bits in row 1 of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set.

$$c_1 = (c \% \theta + (r_1 + 2 + 4*\Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 32}{2} \right\rfloor \times 4 + c_0 \% 2 + \left( \left\lfloor \frac{c_0}{32} \right\rfloor \% 2 \right) \times 2 + 64.$$

Example 19: When $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set.

$$c_1 = (c \% \theta + (r_1 + 4 \times \Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, $\Delta$ is an integer, $\beta$ is an integer multiple of 4, and $$c = \left\lfloor \frac{c_0 \% 8}{2} \right\rfloor \times 4 + c_0 \% 2 + \left( 1 - \left\lfloor \frac{c_0}{32} \right\rfloor \% 2 \right) \times 2 + 64 + \left\lfloor \frac{c_0 \% 16}{8} \right\rfloor \times 32 + \left( \left\lfloor \frac{c_0}{16} \right\rfloor \% 2 \right) \times 16.$$

Example 20: When $0 \leq c_1 < 64$, bit $c_1$ in the 128 bits in row $r_1$ of the fifth bit set is from bit $c_1$ in 128 bits in row $r_0$ of the fourth bit set; or when $64 \leq c_1 < 128$, bit $c_1$ in the 128 bits in row $r_1$ of the fifth bit set is from bit $c_0$ in 128 bits in row $r_0$ of the fourth bit set.

$$c_1 = (c \% \theta + (r_1 + 2 + 4 \times \Delta) \% \beta) \% \theta + \left\lfloor \frac{c}{\theta} \right\rfloor \times \theta,$$

where $64 \leq c_0 < 128$, $64 \leq c_1 < 128$, $\theta$ is an integer multiple of 4 and $m_0 \times 4$ is exactly divisible by $\theta$, 4 is an integer, $\beta$ is an integer multiple of 4, and $$c = \left\lfloor \frac{c_0 \% 8}{2} \right\rfloor \times 4 + c_0 \% 2 + \left( \left\lfloor \frac{c_0}{32} \right\rfloor \% 2 \right) \times 2 + 64 + \left\lfloor \frac{c_0 \% 16}{8} \right\rfloor \times 32 + \left( \left\lfloor \frac{c_0}{16} \right\rfloor \% 2 \right) \times 16.$$

Figures 23A, 23B, 23C, 23D:
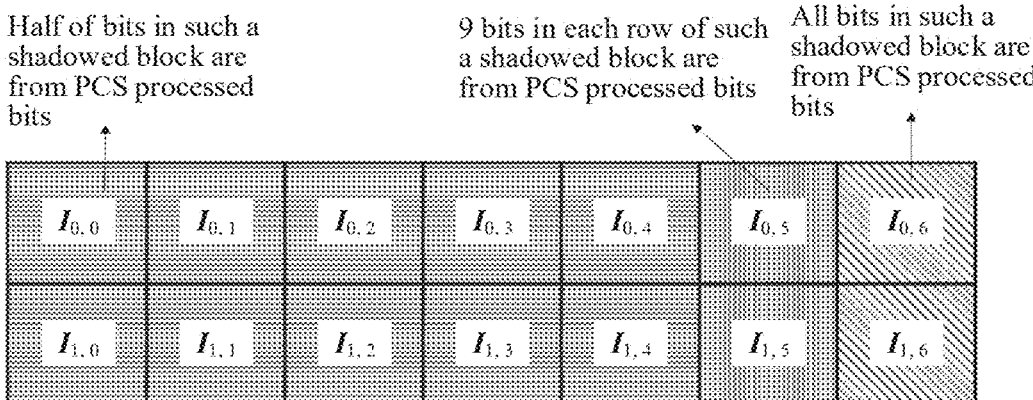
FIG. 23(a) is a diagram of first distribution of a sixth bit set according to an embodiment of this application.
FIG. 23(b) is a diagram of second distribution of a sixth bit set according to an embodiment of this application.
FIG. 23(c) is a diagram of third distribution of a sixth bit set according to an embodiment of this application.
FIG. 23(d) is a diagram of fourth distribution of a sixth bit set according to an embodiment of this application.

FIG. 23(c) is a diagram of third distribution of a sixth bit set according to an embodiment of this application. As shown in FIG. 23(c), one half (128 bits) of bits in each of square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ in the sixth bit set are from a second bit set, and the other half (128 bits) of the bits are from a third bit set on which PCS processing is not performed. All bits of square block $I_{0,5}$, square block $I_{1,5}$, column 0 to column 7 of square block $I_{0,6}$, and column 0 to column 7 of square block $I_{1,6}$ are from the second bit set. Bits of column 8 to column 14 of square block $I_{0,6}$ and column 8 to column 14 of square block $I_{1,6}$ are from the third bit set on which the PCS processing is not performed. Further, the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ satisfy the pattern shown in FIG. 24(a), in other words, a bit in row $i_1$ and column $$\left( \left\lfloor \frac{j_1}{2} \right\rfloor \times 4 + j_1 \% 2 + 2 - i_1 \% 2 \right)$$

of square block $I_{i_0, j_0}$ is from the second bit set, and remaining bits in square block $I_{i_0, j_0}$ are from the third bit set on which the PCS processing is not performed, where $0 \leq i_0 < 2$, $0 \leq j_0 < 5$, $0 \leq i_1 < 16$, and $0 \leq j_1 < 8$. Alternatively, the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ satisfy the pattern shown in FIG. 24(b), in other words, a bit in row $i_1$ and column $(j_1 \times 2)$ of square block $I_{i_0, j_0}$ is from the second bit set, and remaining bits in square block $I_{i_0, j_0}$ are from the third bit set on which the PCS processing is not performed, where $0 \leq i_0 < 2$, $0 \leq j_0 < 5$, $0 \leq i_1 < 16$, and $0 \leq j_1 < 8$.

FIG. 11(d) is a diagram of other distribution of a plurality of first bit subsets according to an embodiment of this application. A fourth bit set is obtained through FEC encoding on the sixth bit set shown in FIG. 23(c), and corresponding distribution of the fourth bit set is shown in FIG. 11(d). Specifically, one half (128 bits) of bits in each of square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are from the second bit set, and the other half (128 bits) of the bits are from the third bit set on which the PCS processing is not performed. All bits in shadow parts of square block $B_{0,5}$, square block $B_{1,5}$, square block $B_{0,6}$, and square block $B_{1,6}$ are from the second bit set. Bits in non-shaded parts of square block $B_{0,6}$ and square block $B_{0,6}$, and all bits in square block $B_{0,7}$ and square block $B_{1,7}$ are from the third bit set on which the PCS processing is not performed and/or OFEC parity bits. Further, an arrangement manner of the bits from the second bit set and the bits from the third bit set on which the PCS processing is not performed in the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set is shown in FIG. 9(a) or FIG. 9(b). Specifically, when the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ in the sixth bit set are shown in FIG. 24(a), the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are shown in FIG. 9(a). When the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ in the sixth bit set are shown in FIG. 24(b), the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are shown in FIG. 9(b). In this case, the first interleaving needs to be performed only on a total of six square blocks, namely, $B_{0,5}$, $B_{0,6}$, $B_{0,7}$, $B_{1,5}$, $B_{1,6}$, and $B_{1,7}$, in the fourth bit set, to obtain square blocks $T_{0,5}$, $T_{0,6}$, $T_{0,7}$, $T_{1,5}$, $T_{1,6}$, and $T_{1,7}$ in a fifth bit set, while $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ are output in an original sequence, to obtain square blocks $T_{0,0}$, $T_{0,1}$, $T_{0,2}$, $B_{0,3}$, $T_{0,4}$, $T_{1,0}$, $T_{1,1}$, $T_{1,2}$, $T_{1,3}$, and $T_{1,4}$ in the fifth bit set.

FIG. 11(d) is used as an example, and the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are shown in FIG. 9(a). A specific interleaving rule of the first interleaving processing is as follows: Bit 0 to bit 79 in 128 bits in row r of the fifth bit set (including $m_0$ square blocks T) correspond one-to-one to bit 0 to bit 79 in row $r_0$ of the fourth bit set (including $m_0$ square blocks B). When $$0 \le \left\lfloor \frac{r_0}{16} \right\rfloor < 8,$$

bit $$80 + \left( \left\lfloor \frac{\tilde{c}_0}{2} \right\rfloor \times 4 + \tilde{c}_0 \; \%2 + (r_1 + 2) \; \%4 \right) \%48$$

in the 128 bits in row $r_1$ of the fifth bit set (including the $m_0$ square blocks T) is from any 1 bit in bit 80 to bit 103 in row $r_0$ of the fourth bit set (including the $m_0$ square blocks B). When $$8 \le \left\lfloor \frac{r_0}{16} \right\rfloor < 16,$$

bit $$80 + \left( \left\lfloor \frac{\tilde{c}_0}{2} \right\rfloor \times 4 + \tilde{c}_0 \; \%2 + (r_1 + 2) \; \%4 \right) \%48$$

in the 128 bits in row $r_1$ of the fifth bit set (including the $m_0$ square blocks T) is from any 1 bit in bit 80 to bit 95 and bit 104 to bit 111 in row $r_0$ of the fourth bit set (including the $m_0$ square blocks B), where $0 \le \tilde{c}_0 < 24$. The following further provides several more specific examples.

Example 21: When $0 \le c_1 < 80$, bit $c_1$ in the 128 bits in row $r_1$ of the fifth bit set is from bit $c_1$ in 128 bits in row $r_0$ of the fourth bit set; or When $80 \le c_1 < 128$, bit $c_1$ in the 128 bits in row $r_1$ of the fifth bit set is from bit $80 + c_0$ in 128 bits in row $r_0$ of the fourth bit set $$c_1 = 80 + (c\%\theta + (r_1 + 4 \times \Delta)\%\beta)\%\theta + \left\lfloor \frac{c}{\theta} \right\rfloor \times \theta,$$

where $0 \le c_0 < 48$, $80 \le c_1 < 128$, $\theta$ is an integer multiple of 4 and 48 is exactly divisible by $\theta$, $\Delta$ is an integer, $\beta$ is an integer multiple of 4, and $$c = \left\lfloor \frac{c_2 \%24}{2} \right\rfloor \times 4 + c_2 \%2 + \left( 1 - \left\lfloor \frac{c_2}{24} \right\rfloor \right) \times 2, \; c_2 = (r_0 \%16)^{\wedge} c_0.$$

Example 22: When $0 \le c_1 < 80$, bit $c_1$ in the 128 bits in row 1 of the fifth bit set is from bit $c_1$ in 128 bits in row $r_0$ of the fourth bit set; or when $80 \le c_1 < 128$, bit $c_1$ in the 128 bits in row $r_1$ of the fifth bit set is from bit $80 + c_0$ in 128 bits in row $r_0$ of the fourth bit set $$c_1 = 80 + (c\%\theta + (r_1 + 2 + 4 \times \Delta)\%\beta)\%\theta + \left\lfloor \frac{c}{\theta} \right\rfloor \times \theta$$

where $0 \le c_0 < 48$, $80 \le c_1 < 128$, $\theta$ is an integer multiple of 4 and 48 is exactly divisible by $\theta$, $\Delta$ is an integer, $\beta$ is an integer multiple or 4, and $$c = \left\lfloor \frac{c_2 \%24}{2} \right\rfloor \times 4 + c_2 \%2 + \left( \left\lfloor \frac{c_2}{24} \right\rfloor \right) \times 2, \; c_2 = (r_0 \%16)^{\wedge} c_0.$$

FIG. 23($d$) is a diagram of fourth distribution of a sixth bit set according to an embodiment of this application. As shown in FIG. 23($d$), one half (128 bits) of bits in each of square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ in the sixth bit set are from a second bit set, and the other half (128 bits) of the bits are from a third bit set on which PCS processing is not performed. 9 bits in each row of square blocks $I_{0,5}$ and $I_{1,5}$ are from the PCS processed second bit set, and the other 7 bits in each row are from the third bit set on which the PCS processing is not performed. All bits in square blocks $I_{0,6}$ and $I_{1,6}$ are from the PCS processed second bit set.

FIG. 11($e$) is a diagram of other distribution of a plurality of first bit subsets according to an embodiment of this application. A fourth bit set is obtained through FEC encoding on the sixth bit set shown in FIG. 23($d$), and corresponding distribution of the fourth bit set is shown in FIG. 11($e$). Specifically, one half (128 bits) of bits in each of square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are from a second bit set, and the other half (128 bits) of the bits are from a third bit set on which PCS processing is not performed. 9 bits in each row of square blocks $B_{0,5}$ and $B_{1,5}$ are from the PCS processed second bit set, and the other 7 bits in each row are from the third bit set on which the PCS processing is not performed. A bit in row $i_1$ and column 15-1 of each of square blocks $B_{0,6}$ and $B_{1,6}$ is from OFEC parity bits, where $0 \le i_{1 \le 15}$; in other words, bits located on a secondary diagonal in the square blocks $B_{0,6}$ and $B_{1,6}$ are from the OFEC parity bits, and the remaining bits are from the PCS processed second bit set. All bits in square blocks $B_{0,7}$ and $B_{1,7}$ are from the OFEC parity bits.

Further, an arrangement manner of the bits from the second bit set and the bits from the third bit set in the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set shown in FIG. 11($e$) is shown in FIG. 9($a$) or FIG. 9($b$). An arrangement manner of bits from the second bit set and bits from the third bit set in column 0 to column C−1 of each of square blocks $B_{0,5}$ and $B_{1,5}$ shown in FIG. 11($e$) is shown in column 0 to column C−1 in FIG. 9($a$) or column 0 to column C−1 in FIG. 9($b$). In this case, first interleaving is performed on column C to column 15 of $B_{0,5}$, and columns C to columns 15 of $B_{0,6}$, $B_{0,7}$, and $B_{1,5}$, and $B_{1,6}$ and $B_{1,7}$ in the fourth bit set, to obtain column C to column 15 of $T_{0,5}$, and columns C to columns 15 of $T_{0,6}$, $T_{0,7}$, and $T_{1,5}$, and $T_{1,6}$ and $T_{1,7}$ in a fifth bit set, where $0 \le C \le 15$. The following describes several specific first interleaving solutions.

In a possible implementation, based on the sixth bit set shown in FIG. 23($d$), if the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, $I_{1,4}$ in the sixth bit set are shown in FIG. 24($a$), the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are shown in FIG. 9($a$). If the square blocks $I_{0,5}$ and $I_{1,5}$ in the sixth bit set are shown in FIG. 29($a$), the square blocks $B_{0,5}$ and $B_{1,5}$ in the fourth bit set are shown in FIG. 30($a$). Four shadow parts marked in FIG. 29($a$) are all 4×4 square blocks, 3 bits in each row of each 4×4 square block are from the PCS processed second bit set, and one remaining bit in each row is from the third bit set on which the PCS processing is not performed. A shadow part marked in FIG. 30($a$) is a square block of 16 rows and four columns from column 12 to column 15, 3 bits in each row of the square block of 16 rows and four columns are from the PCS processed second bit set, and one remaining bit in each row is from the third bit set on which the PCS processing is not performed.

Further, if the square blocks $I_{0,5}$ and $I_{1,5}$ in the sixth bit set are shown in FIG. 29(b), FIG. 29(c), FIG. 29(d), or FIG. 29(e), the square blocks $B_{0,5}$ and $B_{1,5}$ in the fourth bit set are sequentially corresponding to those shown in FIG. 30(b), FIG. 30(c), FIG. 30(d), or FIG. 30(e).

In the foregoing case, first interleaving is performed on column 12 to column 15 of $B_{0,5}$, columns 12 to columns 15 of $B_{0,6}$, $B_{0,7}$, and $B_{1,5}$, and $B_{1,6}$ and $B_{1,7}$ in the fourth bit set, to obtain column 12 to column 15 of $T_{0,5}$, columns 12 to columns 15 of $T_{0,6}$, $T_{0,7}$, and $T_{1,5}$, and $T_{1,6}$ and $T_{1,7}$ in a fifth bit set. However, $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are output in an original sequence, to obtain $T_{0,0}$, $T_{0,1}$, $T_{0,2}$, $B_{0,3}$, $T_{0,4}$, $T_{1,0}$, $T_{1,1}$, $T_{1,2}$, $T_{1,3}$, and $T_{1,4}$ in the fifth bit set. Column 0 to column 11 of square block $B_{0,5}$ and column 0 to column 11 of square block $B_{1,5}$ in the fourth bit set are output in an original sequence, to obtain column 0 to column 11 of square block $T_{0,5}$ and column 0 to column 11 of square block $T_{1,5}$ in the fifth bit set. Each square block in the fifth bit set obtained through the first interleaving is shown in FIG. 9(a), in other words, a bit in row $i_2$ and column $$\left(\left\lfloor \frac{j_2}{2}\right\rfloor \times 4 + j_2\%2 + i_2 + 2\right)\%16$$

of each square block in the fifth bit set is from the second bit set, where $0 \leq i_2 < 16$ and $0 \leq j_2 < 8$. In this case, a specific corresponding interleaving rule of the first interleaving is as follows: Bit 92 to bit 127 in 128 bits in row $r_1$ of the fifth bit set including $m_0$ square blocks T are from bit 92 to bit 127 in row $r_0$ of the fourth bit set including $m_0$ square blocks B. In addition, there are a plurality of specific interleaving rules of the first interleaving, which are not listed one by one herein.

Figure 30F:
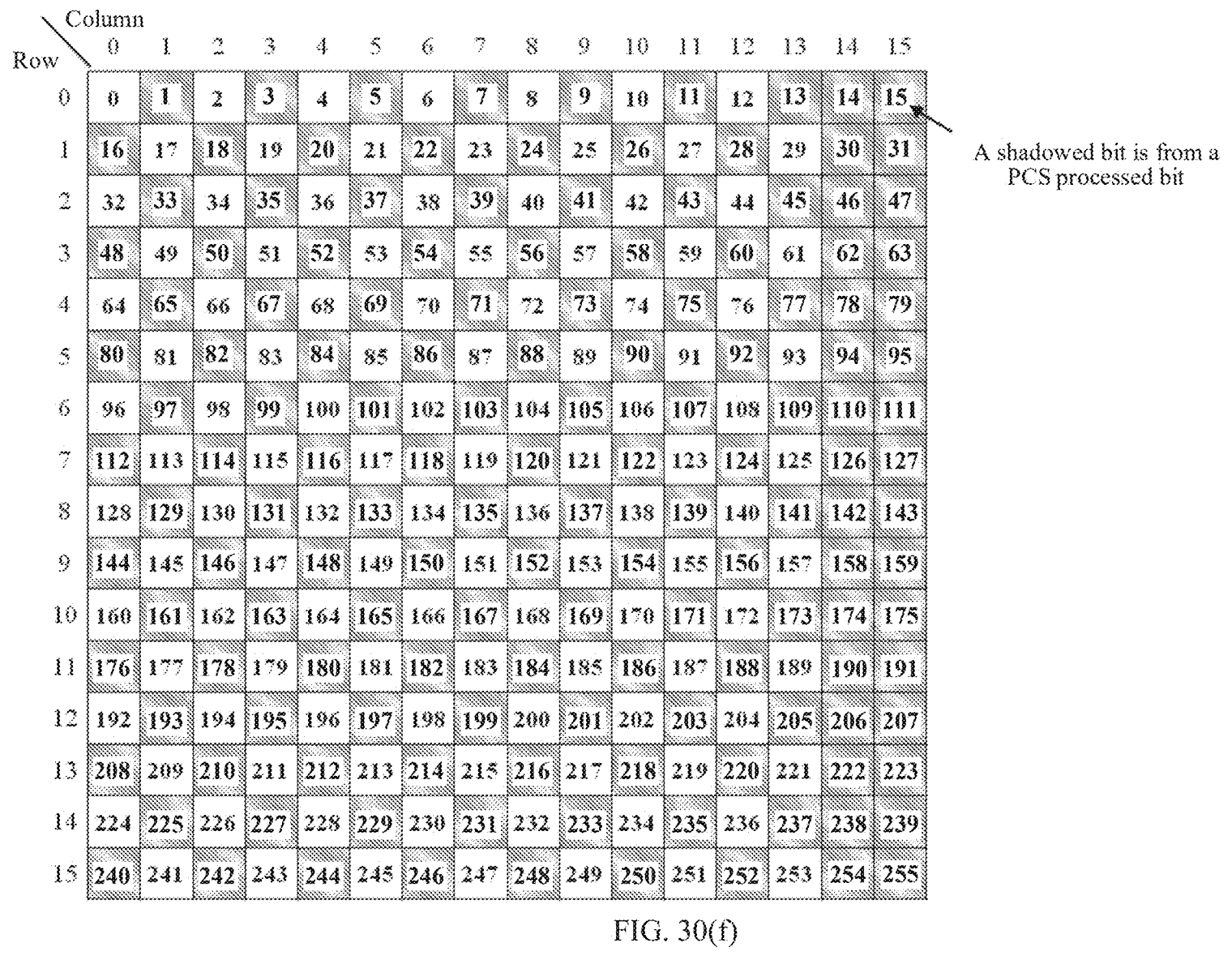

In another possible implementation, based on the sixth bit set shown in FIG. 23(d), if the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$ in the sixth bit set are shown in FIG. 24(b), the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are shown in FIG. 9(b). If the square blocks $I_{0,5}$ and $I_{1,5}$ in the sixth bit set are shown in FIG. 29(f), the square blocks $B_{0,5}$ and $B_{1,5}$ in the fourth bit set are shown in FIG. 30(f). In this case, first interleaving is performed on column 14 and column 15 of $B_{0,5}$, columns 14 and columns 15 of $B_{0,6}$, $B_{0,7}$, and $B_{1,5}$, and $B_{1,6}$ and $B_{1,7}$ in the fourth bit set, to obtain column 14 and column 15 of $T_{0,5}$, columns 14 and columns 15 of $T_{0,6}$, $T_{0,7}$, and $T_{1,5}$, and $T_{1,6}$ and $T_{1,7}$ in a fifth bit set. However, $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ in the fourth bit set are output in an original sequence, to obtain square blocks $T_{0,0}$, $T_{0,1}$, $T_{0,2}$, $B_{0,3}$, $T_{0,4}$, $T_{1,0}$, $T_{1,1}$, $T_{1,2}$, $T_{1,3}$, and $T_{1,4}$ in the fifth bit set. Column 0 to column 13 of square block $B_{0,5}$ and column 0 to column 13 of square block $B_{1,5}$ in the fourth bit set are output in an original sequence, to obtain column 0 to column 13 of square block $T_{0,5}$ and column 0 to column 13 of square block $T_{1,5}$ in the fifth bit set. Each square block in the fifth bit set obtained through the first interleaving is shown in FIG. 9(b), in other words, a bit in row $i_2$ and column $(j_2 \times 2 - i_2\% 2 + 1)$ of each square block in the fifth bit set is from the second bit set, where $0 \leq i_2 < 16$ and $0 \leq j_2 < 8$. In this case, a specific corresponding interleaving rule of the first interleaving is as follows: Bit 94 to bit 127 in 128 bits in row $r_1$ of the fifth bit set including $m_0$ square blocks T are from bit 94 to bit 127 in row $r_0$ of the fourth bit set including $m_0$ square blocks B.

In addition, there are a plurality of specific interleaving rules of the first interleaving, which are not listed one by one herein.

It should be noted that, in some specific scenarios, $r_0 = r_1$ may be satisfied.

Figure 12:
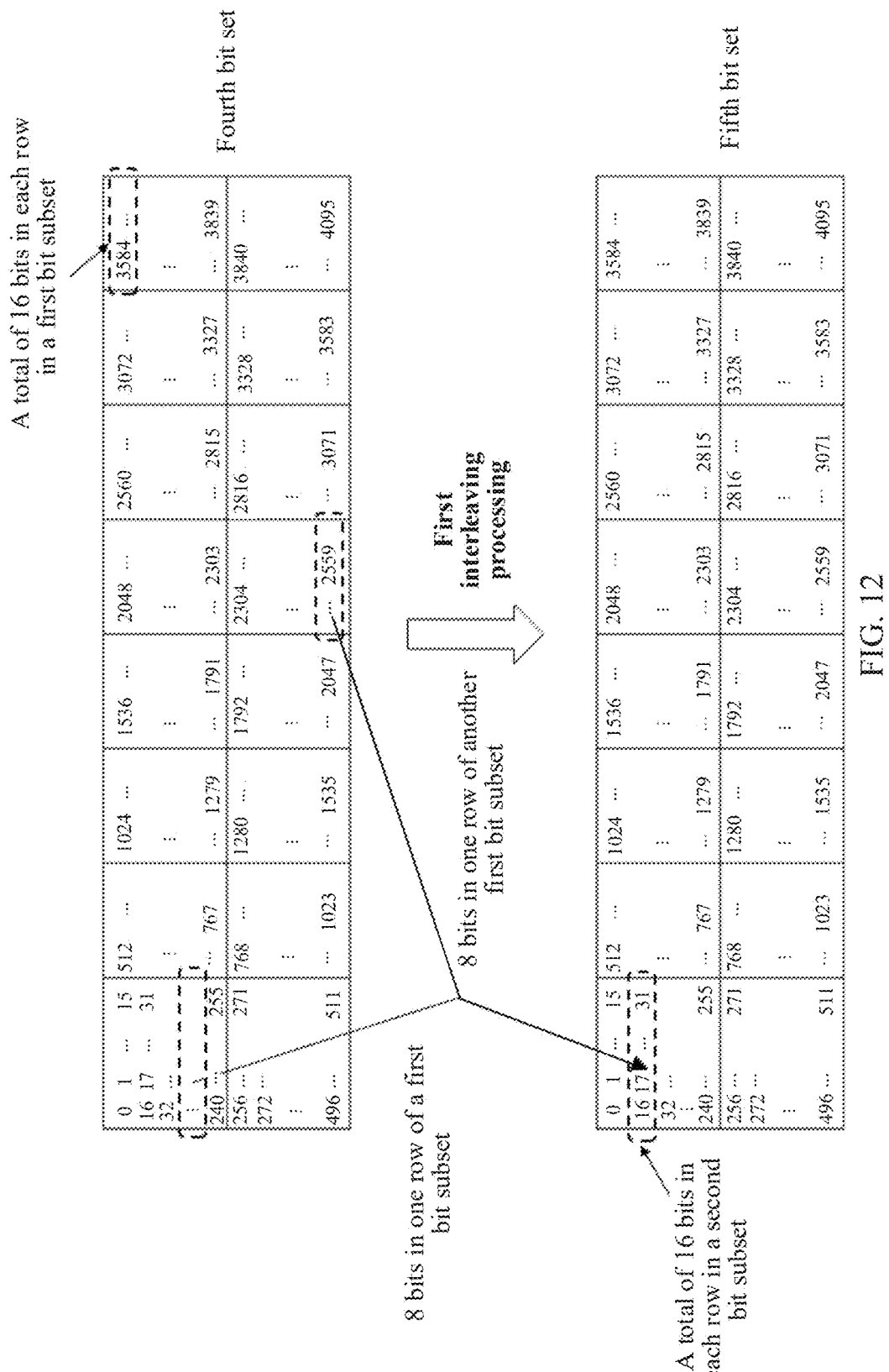
FIG. 12 is a diagram of a second implementation of first interleaving processing according to an embodiment of this application.

FIG. 12 is a diagram of a second implementation of first interleaving processing according to an embodiment of this application. As shown in FIG. 12, in a possible implementation, 16 bits in each row of a second bit subset are from two first bit subsets. Further, 8 bits of the 16 bits in each row of the second bit subset are from one row in one of the first bit subsets, and the other 8 bits of the 16 bits in each row of the second bit subset are from one row in the other one of the first bit subsets.

Figure 13:
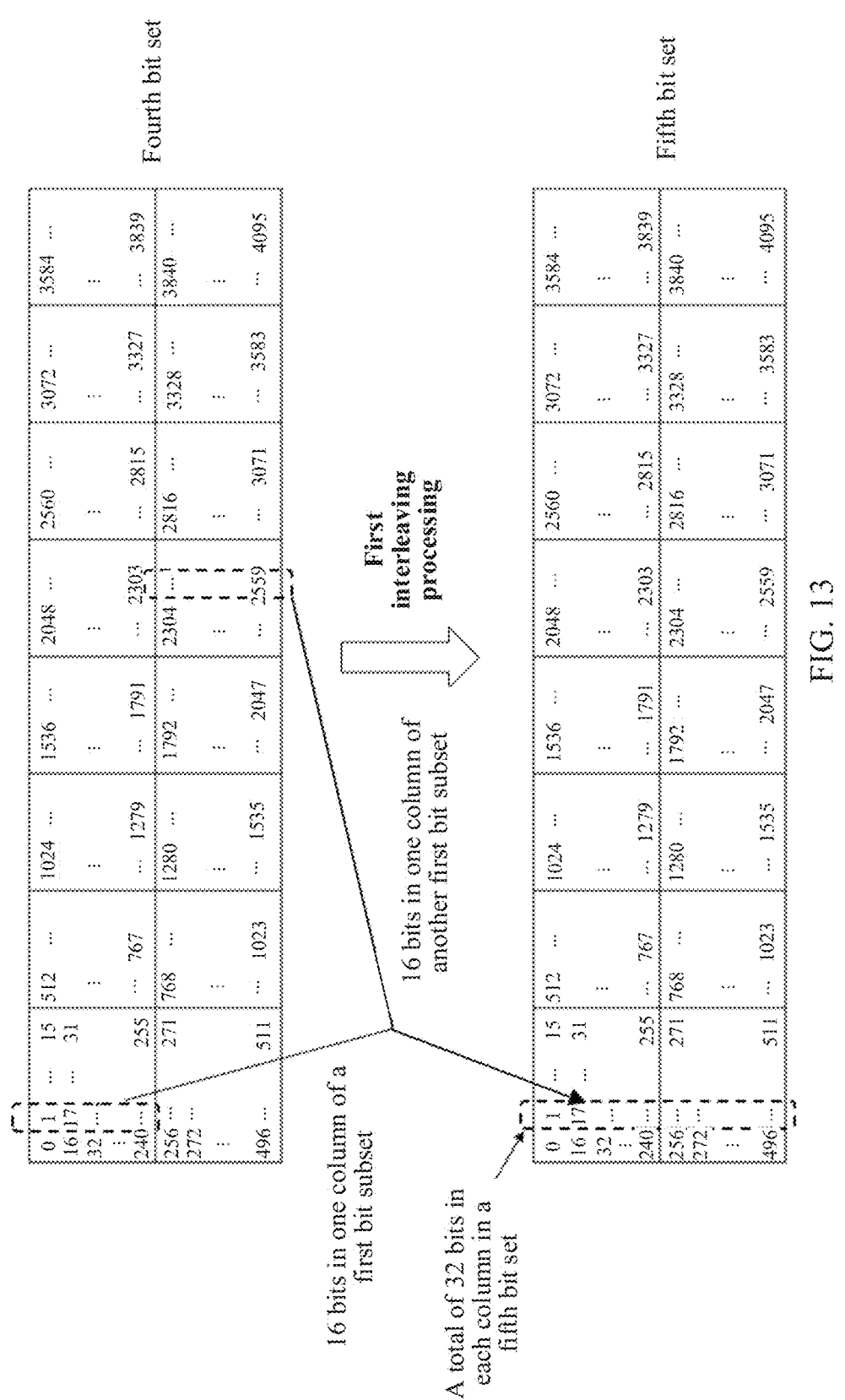
FIG. 13 is a diagram of a third implementation of first interleaving processing according to an embodiment of this application.

FIG. 13 is a diagram of a third implementation of first interleaving processing according to an embodiment of this application. As shown in FIG. 13, in a possible implementation, $m_0 \times 256$ bits in a fourth bit set are distributed in 32 rows and $m_0 \times 8$ columns, $m_0 \times 256$ bits in a fifth bit set are distributed in 32 rows and $m_0 \times 8$ columns, and 32 bits in each column of the fifth bit set are from two first bit subsets. More specifically, 16 bits in the 32 bits in each column of the fifth bit set are from one column of one of the first bit subsets, and the other 16 bits in the 32 bits in each column of the fifth bit set are from one column of the other one of the first bit subsets. Further, the 16 bits in the 32 bits in each column of the fifth bit set are from column $c_1\%$ 16 of one of the first bit subsets, and the other 16 bits in the 32 bits in each column of the fifth bit set are from column c % 16 of the other one of the first bit subsets, where $0 \leq c_1 < (m_0 \times 8)$.

(3) Second Interleaving Processing:

Specifically, that OFEC interleaving is used for the second interleaving processing is used as an example. An OFEC interleaver receives bits output by two first interleaver processors, and performs "intra-block interleaving" (intra-block interleaving) and "inter-block interleaving" (inter-block interleaving).

FIG. 14 is a diagram of intra-block interleaving according to an embodiment of this application. As shown in FIG. 14, an OFEC interleaver first performs "intra-block interleaving" (intra-block interleaving) on each received block, to be specific, performs interleaving on each input block of 16 rows and 16 columns according to an interleaving rule shown in FIG. 14 to disorder a sequence, so as to obtain an output block of 16 rows and 16 columns. In FIG. 14, an element in row $i_1$ and column $j_1$ ($0 \leq i_1 < 16$ and $0 \leq j_1 < 16$) is (a, b), indicating that a bit in row $i_1$ and column $j_1$ of the output block obtained through the "intra-block interleaving" is from a bit in row a and column b of the input block. For example, in FIG. 14, an element in row 1 and column 0 is (14, 15), indicating that a bit in row 1 and column 0 of the output block obtained through the "intra-block interleaving" is from a bit in row 14 and column 15 of the input block.

The "inter-block interleaving" (inter-block interleaving) is performed on "intra-block interleaved" bits, to improve overall anti-burst performance. The following describes operations of the inter-block interleaving.

Figure 15:
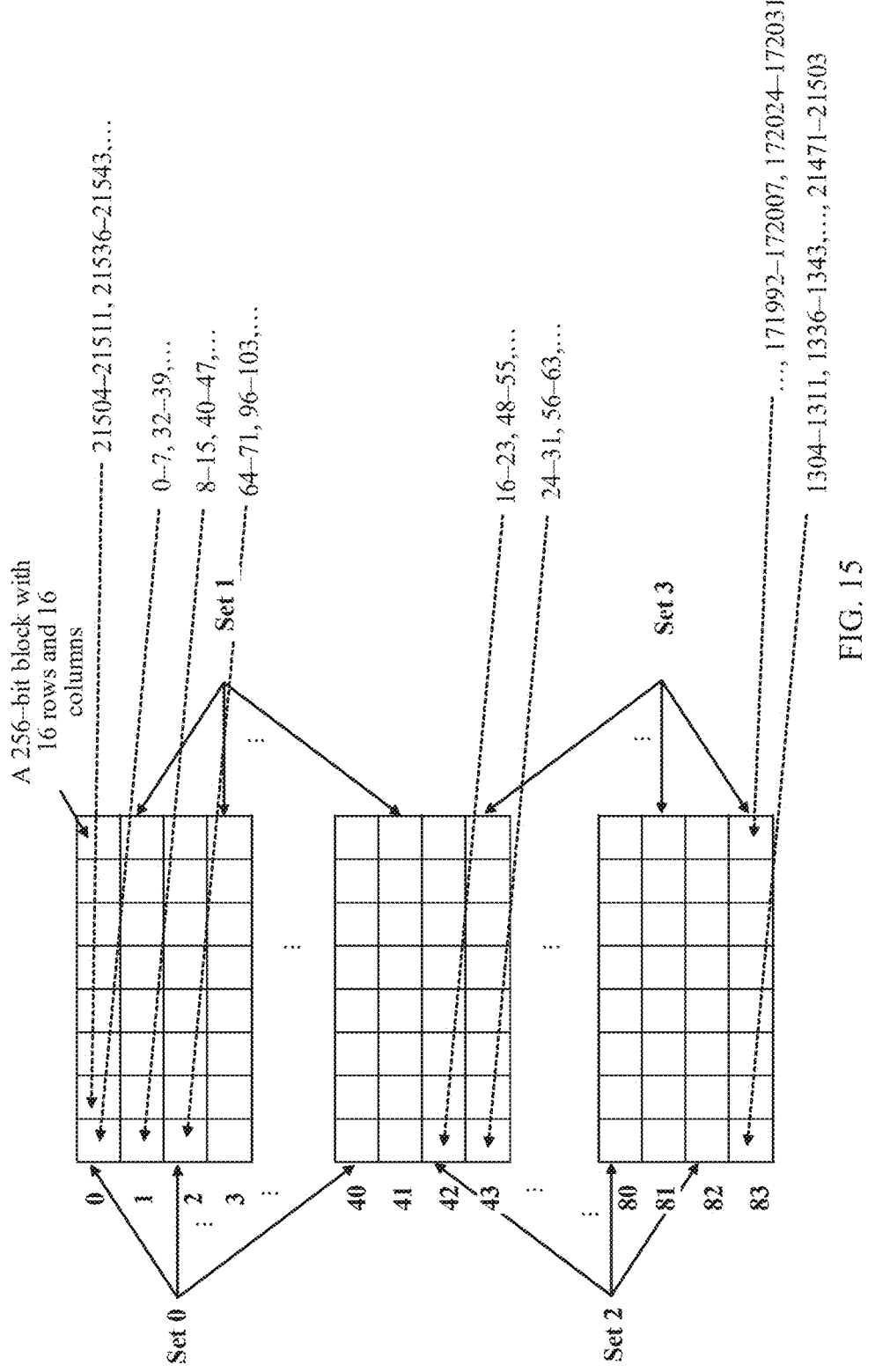
FIG. 15 is a diagram of inter-block interleaving according to an embodiment of this application.

FIG. 15 is a diagram of inter-block interleaving according to an embodiment of this application. As shown in FIG. 15, the inter-block interleaving includes an interleaver buffer (interleaver buffer) M of 84 rows and eight columns, each row includes eight blocks, and each block includes a total of 256 bits in 16 rows and 16 columns. A size of the interleaver buffer in the inter-block interleaving is $84 \times 8 \times 256 = 172032$ bits, and corresponds to output blocks of $172032/4096 = 42$ first interleaver processors, where 21 output blocks are from output blocks of one of the first interleaver processors and are located in even-numbered rows in the interleaver buffer M, and the other 21 output blocks are from output blocks of another one of the first interleaver processors and are located in odd-numbered rows in the interleaver buffer M. Herein, output blocks of each first interleaver processor are a total of 4096 bits in a block set of two rows and eight columns. The interleaver buffer M in the inter-block interleaving may be divided into four sets. As shown in FIG. 15, set 0 includes a total of 21×16×128=43008 bits in blocks in rows 0, 2, 4, . . . , and 40 in the interleaver buffer M, set 1 includes a total of 43008 bits in blocks in rows 1, 3, 5, . . . , and 41 in the interleaver buffer M, set 2 includes a total of 43008 bits in blocks in rows 42, 44, 46, . . . , and 82 in the interleaver buffer M, and set 3 includes a total of 43008 bits in blocks in rows 43, 45, 47, . . . , and 83 in the interleaver buffer M.

Bits in each column are read from each set in a round-robin fashion by using 8 bits as a granularity in the interleaver buffer M, and after all bits in each column are read, bits in a next column are read. First, first 8 bits in a group are read from top to bottom in set 0, and then first 8 bits are read from top to bottom in each of set 1, set 2, and set 3. A total of 32 bits are read in a cycle (cycle). Then, in a next cycle, 8 bits in a next group are read from top to bottom in each of set 0, set 1, set 2, and set 3. A total of 32 bits are read. After a total of 42 cycles, 1344 bits in a current column are read. Specific operations for reading bits in each column from each set are as follows:

First, 8 bits (bit rows 0 to 7 in blocks) are sequentially read from top to bottom in the blocks in row 0 in the interleaver buffer M, 8 bits (bit rows 0 to 7 in blocks) are sequentially read from top to bottom in the blocks in row 1 in the interleaver buffer M, 8 bits (bit rows 0 to 7 in blocks) are sequentially read from top to bottom in the blocks in row 42 in the interleaver buffer M, 8 bits (bit rows 0 to 7 in blocks) are sequentially read from top to bottom in the blocks in row 43 in the interleaver buffer M, 8 bits (bit rows 8 to 15 in the blocks) are sequentially read from top to bottom in the blocks in row 0 in the interleaver buffer M, 8 bits (bit rows 8 to 15 in the blocks) are sequentially read from top to bottom in the blocks in row 1 in the interleaver buffer M, 8 bits (bit rows 8 to 15 in the blocks) are sequentially read from top to bottom in the blocks in row 42 in the interleaver buffer M, 8 bits (bit rows 8 to 15 in the blocks) are sequentially read from top to bottom in the blocks in row 43 in the interleaver buffer M, then, 8 bits (bit rows 0 to 7 in blocks) are sequentially read from top to bottom in the blocks in row 2 in the interleaver buffer M, and . . . , until a total of 1344 bits in a current bit column in the interleaver buffer M are completely read out.

(4) Symbol Mapping and Polarization Distribution:

Bit data output through OFEC interleaving is sent to the symbol mapping and polarization distribution to obtain a dual-polarization symbol. As shown in FIG. 4, two OFEC interleavers, OFEC interleaver 0 and OFEC interleaver 1, send, in a round-robin fashion, bits to symbol mapping by using 8 bits as a group. When dual-polarization 16QAM modulation (DP-16QAM) is used, every 8 bits ($b_0$, $b_1$, $b_2$, $b_3$, $b_4$, $b_5$, $b_6$, $b_7$) are mapped to one DP-16QAM symbol in symbol mapping and polarization distribution. The following first symbol mapping scheme is considered: ($b_0$, $b_2$) is mapped to an I in-phase component (in-phase component) of X-polarization of the DP-16QAM symbol, denoted as XI; ($b_4$, $b_6$) is mapped to a Q component (quadrature-phase component) of the X-polarization of the DP-16QAM symbol, denoted as XQ; ($b_1$, $b_3$) is mapped to an I component (in-phase component) of Y-polarization of the DP-16QAM symbol, denoted as YI; and ($b_5$, $b_7$) is mapped to a Q component (quadrature-phase component) of the Y-polarization of the DP-16QAM symbol, denoted as YQ. In each signaling dimension (signaling dimension) XI/XQ/YI/YQ, 2 bits are mapped to corresponding symbol amplitude (symbol amplitude) in the following mapping manner:

$$(0, 0) \rightarrow -3, (0, 1) \rightarrow -1, (1, 1) \rightarrow +1, (1, 0) \rightarrow +3$$

In this case, $b_0$ and $b_4$ in the 8 bits ($b_0$, $b_1$, $b_2$, $b_3$, $b_4$, $b_5$, $b_6$, $b_7$) are two sign bits (sign bits) in 16QAM in the X polarization direction, and $b_2$ and $b_6$ are two amplitude bits (amplitude bits) in 16QAM in the X polarization direction; and $b_1$ and $b_5$ are two sign bits (sign bits) in 16QAM in the Y polarization direction, and $b_3$ and $b_7$ are two amplitude bits (amplitude bits) in 16QAM in the Y polarization direction.

It should be noted that, a bit in row $i_2$ and column $$\left( \left\lfloor \frac{j_2}{2} \right\rfloor \times 4 + j_2 \%2 + i_2 + 2 \right)\%16$$

(namely, a bit in a shadow background in FIG. 9($a$)) in any block $T_{i_0,j_0}$ including 256 bits in a square block set T, of two rows and eight columns, output through the first interleaving processing shown in FIG. 9($a$) is 1 bit in 2048 third bits obtained through PCS processing, where $0 \leq i_2 < 16$ and $0 \leq j_2 < 8$.

Figure 16:
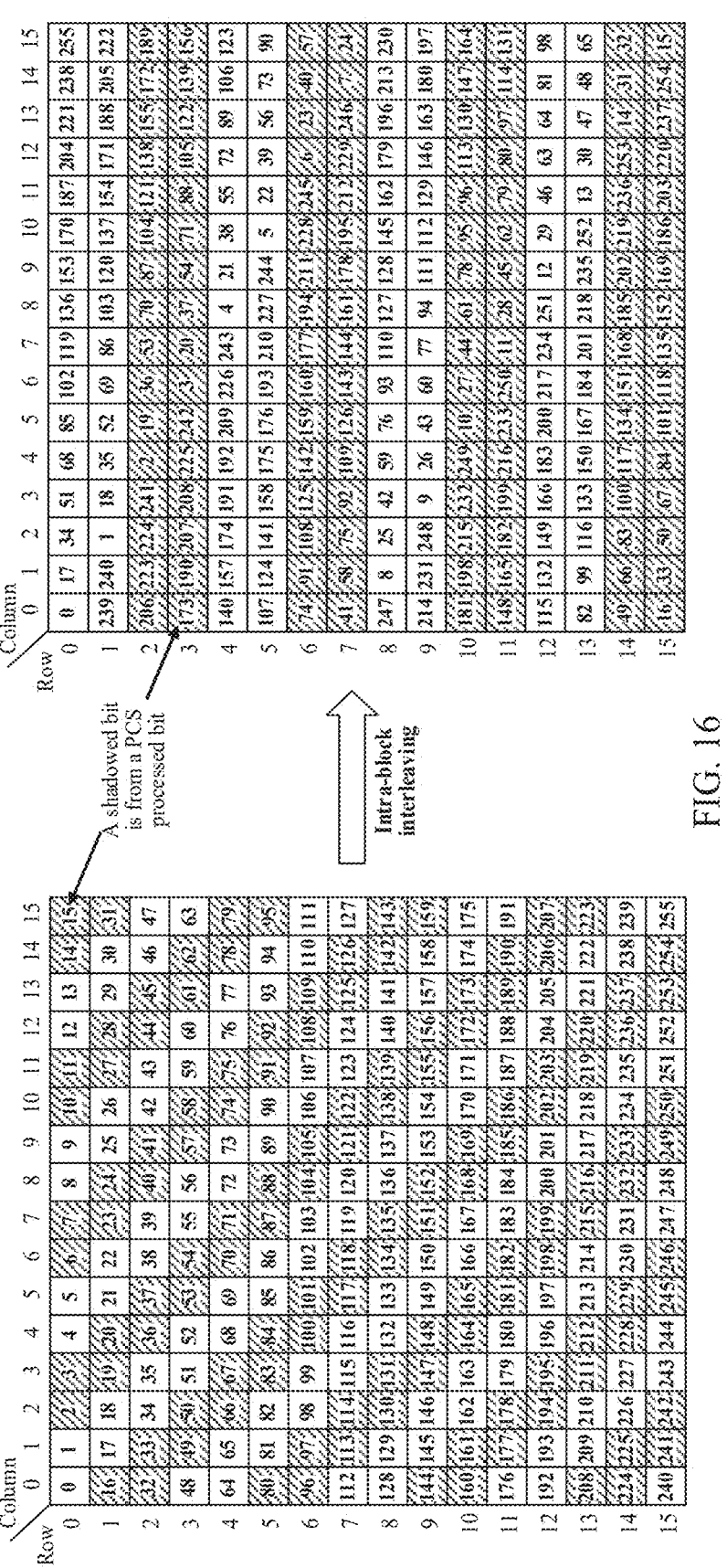
FIG. 16 is another diagram of intra-block interleaving according to an embodiment of this application.

FIG. 16 is another diagram of intra-block interleaving according to an embodiment of this application. FIG. 16 shows an intra-block interleaved block obtained through the "intra-block interleaving" on block $T_{i_0,j_0}$. After "intra-block interleaving" in OFEC interleaving is performed on any block, of 16 rows and 16 columns, output through first interleaving processing, 16 bits in each of row 2, row 3, row 6, row 7, row 10, row 11, row 14, and row 15 in any output block of 16 rows and 16 columns are all 16 bits in 2048 third bits obtained through PCS processing.

Because "inter-block interleaving" does not disorder a bit sequence in a block, after "inter-block interleaving" in OFEC interleaving, 16 bits in row 2, row 3, row 6, row 7, row 10, row 11, row 14, or row 15 in any output block of 16 rows and 16 columns are all 16 bits in 2048 third bits obtained through PCS processing. Further, by using the first symbol mapping and polarization distribution, an occurrence probability of a constellation point may be changed while a position of the constellation point remains unchanged, so that constellation points are not evenly distributed, to implement PCS to improve system transmission performance.

It should be noted that, in some specific embodiments, every 8 bits ($b_0$, $b_1$, $b_2$, $b_3$, $b_4$, $b_5$, $b_6$, $b_7$) are mapped to one DP-16QAM symbol in symbol mapping and polarization distribution. The following second symbol mapping scheme is considered: ($b_0$, $b_1$) is mapped to an I component (in-phase component) of X-polarization of the DP-16QAM symbol, denoted as XI; ($b_2$, $b_3$) is mapped to a Q component (quadrature-phase component) of the X-polarization of the DP-16QAM symbol, denoted as XQ; $(b_4, b_5)$ is mapped to an I (in-phase component) of Y-polarization of the DP-16QAM symbol, denoted as YI; and $(b_6, b_7)$ is mapped to a Q component (quadrature-phase component) of the Y-polarization of the DP-16QAM symbol, denoted as YQ. In each signaling dimension (signaling dimension) XI/XQ/YI/YQ, 2 bits are mapped to corresponding symbol amplitude (symbol amplitude) in the following mapping manner:

$$(0, 0) \rightarrow -3, (0, 1) \rightarrow -1, (1, 1) \rightarrow +1, (1, 0) \rightarrow +3$$

In this case, $b_0$ and $b_2$ in the 8 bits $(b_0, b_1, b_2, b_3, b_4, b_5, b_6, b_7)$ are two sign bits (sign bits) in 16QAM in the X polarization direction, and $b_1$ and $b_3$ are two amplitude bits (amplitude bits) in 16QAM in the X polarization direction; and $b_4$ and $b_6$ are two sign bits (sign bits) in 16QAM in the Y polarization direction, and b and $b_7$ are two amplitude bits (amplitude bits) in 16QAM in the Y polarization direction.

It should be noted that, a bit in row $i_2$ and column $(j_2 \times 2 - i_2\% \ 2+1)$ (namely, a bit in a shadow background in FIG. 9(b)) in any block $T_{i_0 j_0}$ including 256 bits in a square block set, of two rows and eight columns, output through the first interleaving processing shown in FIG. 9(b) is 1 bit in 2048 third bits obtained through PCS processing, where $0 \leq i_2 < 16$ and $0 \leq j_2 < 8$. Block $T_{i_0 j_0}$ is an intra-block interleaved block obtained through the "intra-block interleaving". After "intra-block interleaving" in OFEC interleaving is performed on any block, of 16 rows and 16 columns, output through first interleaving processing, 16 bits in each of row 1, row 3, row 5, row 7, row 9, row 11, row 13, and row 15 in any output block of 16 rows and 16 columns are all 16 bits in 2048 third bits obtained through PCS processing. Because "inter-block interleaving" does not disorder a bit sequence in a block, after "inter-block interleaving" in OFEC interleaving, 16 bits in row 1, row 3, row 5, row 7, row 9, row 11, row 13, or row 15 in any output block of 16 rows and 16 columns are all 16 bits in 2048 third bits obtained through PCS processing. Further, by using the second symbol mapping and polarization distribution, an occurrence probability of a constellation point may be changed while a position of the constellation point remains unchanged, so that constellation points are not evenly distributed, to implement PCS to improve system transmission performance.

(5) Dsp Framing:

DSP framing is performed by inserting FAWs, TSs, RESs, and PSs separately into X-polarization and Y-polarization symbols of a dual-polarization symbol stream obtained through symbol mapping and polarization distribution, to obtain a to-be-sent dual-polarization symbol stream.

In typical DSP framing, every 172032 dual-polarization symbols are framed to obtain 175104 dual-polarization symbols. The 175104 dual-polarization symbols are also referred to as one super-frame, and overhead of the super-frame is $\frac{1}{56}$.

It should be noted that, in some specific applications, the foregoing "Bit data output through OFEC interleaving is sent to the symbol mapping and polarization distribution to obtain a dual-polarization symbol; and DSP framing is performed by inserting FAWs, TSs, RESs, and PSs separately into X-polarization and Y-polarization symbols of a dual-polarization symbol stream obtained through symbol mapping and polarization distribution, to obtain a to-be-sent dual-polarization symbol stream" may be equivalent to the following operations: First, the bit data output through the OFEC interleaving is inserted into a bit sequence that corresponds to FAW frame alignment word symbols, TS training symbols, RES reserved symbols, and PS pilot symbols that are before modulation and mapping, and then symbol mapping and polarization distribution are performed to obtain the same to-be-sent dual-polarization symbol stream. A specific operation thereof is not specifically described in this application.

It should be noted that, given that a rate of a data frame is $W_{bit}$ Gbit/s, in first data processing, CRC check and/or pad (Pad) bit insertion are/is performed on r rows of data obtained from the data frame, and then scrambling (scrambling) is performed to obtain $10280 \times r_{Frame} + d_{CRC+PAD}$ scrambled bits, where a corresponding scrambled rate is $W \times (10280 \times r_{Frame} + d_{CP})/(10280 \times r_{Frame})$ Gbit/s. After second data processing including PCS and OFEC encoding, first interleaving processing, OFEC interleaving, 16QAM symbol mapping and polarization distribution, and DSP framing with overhead of $\frac{1}{56}$ is performed on the scrambled bit data, an obtained baud rate is $W_{baud} = W_{bit} \times (10280 \times r_{Frame} + d_{CP})/(10280 \times r_{Frame}) \times (4096/k) \times (57/56)/8$ Gbaud. Table 1 lists a plurality of data frame types and their corresponding nominal bit rates (nominal bit rates).

TABLE 1

| Data frame types | Nominal bit rate (Gbit/s) | OTN/Ethernet |
|---|---|---|
| FlexO-6e | ~603.7346 | Ethernet |
| FlexO-6 | $99.5328 \times 6 \times \frac{239}{226} \times \frac{4112}{4097} \approx 633.8611$ | OTN |
| FlexO-8e | ~804.9795 | Ethernet |
| FlexO-8 | $99.5328 \times 8 \times \frac{239}{226} \times \frac{4112}{4097} \approx 845.1481$ | OTN |

A maximum baud rate of a typical low power-consuming component in the industry is about 131 Gbaud. A case in which $W_{baud}$ is less than 132 Gbaud is considered herein. Table 2 and Table 3 show a plurality of parameter combinations obtained from a data frame each time, including a quantity of r of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and corresponding baud rates in the case of using data frame types FlexO-6e, FlexO-6, FlexO-8e, and FlexO-8. Table 2 shows any parameter combination, where a baud rate corresponding to at least one of data frame types FlexO-6e, FlexO-6, FlexO-8e, and FlexO-8 is less than 132 Gbaud, and overhead $OH_{CP}$ corresponding to CRC check and pad bit insertion is not greater than 0.1%, so that the overhead does not affect overall system transmission efficiency.

A quantity $d_{scr} = 10280 \times r_{Frame} + d_{CP}$ of scrambled bits output through the first data processing is an integer multiple of $4 \times k$, so that a specific hardware implementation of the overall data processing is simple and power consumption is low. The quantity $k_{PCS} = k - 1504$ of input bits corresponding to the PCS processing is an integer multiple of 2, so that the PCS processing is convenient for a hardware implementation and has good performance. In addition, $d_{scr}/k \times 4096$ OFEC-encoded bits are obtained by performing the PCS processing and the OFEC encoding on the $d_{scr}$ scrambled bits output through the first data processing, and $d_{scr}/k \times 4096$ is an integer multiple of a total size $172032 \times 2 = 344064$ of two OFEC interleavers, so that the specific hardware implementation of the overall data processing is simple, and power consumption is low.

It should be noted that, for a given parameter combination, namely, $r_{Frame}$, $d_{CP}$, and k in one row in the following Table 2 or Table 3, some of baud rates corresponding to the data frame types FlexO-6e, FlexO-6, FlexO-8e, and FlexO-8 may be greater than 132 Gbaud, indicating that the parameter combination is not applicable to the data frame type, and is marked with a background shadow in the table. It should be noted that, for a given parameter combination, namely, $r_{Frame}$, $d_{CP}$, and k in one row in the following Table 2, some of baud rates corresponding to the data frame types FlexO-6e, FlexO-6, FlexO-8e, and FlexO-8 may be less than 110 Gbaud, indicating that the parameter combination is also not applicable to the data frame type, and is marked with a background shadow in the table. For example, for a parameter combination $\{r_{Frame}=79, d_{CP}=328, \text{and } k=3224\}$ with sequence number 1, baud rates when the data frame types FlexO-6e, FlexO-6, FlexO-8e, and FlexO-8 are used are respectively 97.6 Gbaud, 103.5 Gbaud, 130.2 Gbaud, and 136.7 Gbaud, where that baud rates when data frame types FlexO-6e and FlexO-6 are used are less than 110 Gbaud indicates that the parameter combination is not applicable to the data frame types FlexO-6e and FlexO-6, and is marked with a background shadow in the table; that a baud rate when the data frame type FlexO-8 is used is greater than 132 Gbaud indicates that the parameter combination is not applicable to the data frame type FlexO-8, and is marked with a background shadow in the table; and that a baud rate when the data frame type FlexO-8e is greater than 110 Gbaud and less than 132 Gbaud indicates that the parameter combination is applicable to the data frame FlexO-8e. For another example, for a parameter combination $\{r_{Frame}=87, d_{CP}=72, \text{and } k=2662\}$ with a sequence number 4 in Table 2, baud rates when the data frame types FlexO-6e, FlexO-6, FlexO-8e, and FlexO-8 are used are respectively 118.2 Gbaud, 124.1 Gbaud, 157.6 Gbaud, and 165.5 Gbaud, where that baud rates when data frame types FlexO-8e and FlexO-8 are used are greater than 132 Gbaud indicates that the parameter combination is not applicable to the data frame types FlexO-8e and FlexO-8, and is marked with a background shadow in the table; and that baud rates when data frame types FlexO-6e and FlexO-6 are used is greater than 110 Gbaud and less than 132 Gbaud indicates that the parameter combination is applicable to the data frame types FlexO-6e and FlexO-6.

TABLE 2

| No. | $r_{Frame}$ | $d_{CP}$ | k | $k_{PCS}$ | $OH_{CP}$ | Baud rate Gbaud | | | |
| --- | --- | --- | --- | --- | --- | --- | --- | --- | --- |
| | | | | | | FlexO-6e | FlexO-6 | FlexO-8e | FlexO-8 |
| 1 | 79 | 328 | 3224 | 1720 | 0.040% | 97.6 | 102.5 | 130.2 | 136.7 |
| 2 | 83 | 32 | 3386 | 1882 | 0.004% | 92.9 | 97.6 | 123.9 | 130.1 |
| 3 | 83 | 536 | 3388 | 1884 | 0.063% | 92.9 | 97.6 | 123.9 | 130.1 |
| 4 | 87 | 72 | 2662 | 1158 | 0.008% | 118.2 | 124.1 | 157.6 | 165.5 |
| 5 | 87 | 744 | 2664 | 1160 | 0.083% | 118.2 | 124.1 | 157.6 | 165.5 |
| 6 | 105 | 504 | 3214 | 1710 | 0.047% | 97.9 | 102.8 | 130.6 | 137.1 |
| 7 | 109 | 40 | 2668 | 1164 | 0.004% | 117.9 | 123.8 | 157.2 | 165.1 |
| 8 | 109 | 880 | 2670 | 1166 | 0.079% | 117.9 | 123.8 | 157.2 | 165.1 |
| 9 | 110 | 176 | 3366 | 1862 | 0.016% | 93.5 | 98.2 | 124.7 | 130.9 |
| 10 | 110 | 848 | 3368 | 1864 | 0.075% | 93.5 | 98.2 | 124.7 | 130.9 |
| 11 | 111 | 648 | 3398 | 1894 | 0.057% | 92.6 | 97.3 | 123.5 | 129.7 |
| 12 | 131 | 8 | 2672 | 1168 | 0.001% | 117.8 | 123.6 | 157.0 | 164.8 |
| 13 | 131 | 1016 | 2674 | 1170 | 0.075% | 117.8 | 123.6 | 157.0 | 164.8 |
| 14 | 131 | 680 | 3208 | 1704 | 0.051% | 98.1 | 103.0 | 130.8 | 137.4 |
| 15 | 132 | 480 | 3232 | 1728 | 0.035% | 97.4 | 102.2 | 129.8 | 136.3 |
| 16 | 132 | 1320 | 3234 | 1730 | 0.097% | 97.4 | 102.2 | 129.8 | 136.3 |
| 17 | 137 | 320 | 3354 | 1850 | 0.023% | 93.8 | 98.5 | 125.1 | 131.3 |
| 18 | 137 | 1160 | 3356 | 1852 | 0.082% | 93.8 | 98.5 | 125.1 | 131.3 |
| 19 | 138 | 120 | 3378 | 1874 | 0.009% | 93.1 | 97.8 | 124.2 | 130.4 |
| 20 | 138 | 960 | 3380 | 1876 | 0.068% | 93.1 | 97.8 | 124.2 | 130.4 |
| 21 | 152 | 344 | 2658 | 1154 | 0.022% | 118.4 | 124.3 | 157.9 | 165.7 |
| 22 | 152 | 1520 | 2660 | 1156 | 0.097% | 118.4 | 124.3 | 157.9 | 165.7 |
| 23 | 153 | 648 | 2676 | 1172 | 0.041% | 117.6 | 123.5 | 156.8 | 164.7 |
| 24 | 157 | 856 | 3204 | 1700 | 0.053% | 98.3 | 103.2 | 131.0 | 137.5 |
| 25 | 158 | 656 | 3224 | 1720 | 0.040% | 97.6 | 102.5 | 130.2 | 136.7 |
| 26 | 165 | 264 | 3366 | 1862 | 0.016% | 93.5 | 98.2 | 124.7 | 130.9 |
| 27 | 165 | 1272 | 3368 | 1864 | 0.075% | 93.5 | 98.2 | 124.7 | 130.9 |
| 28 | 166 | 64 | 3386 | 1882 | 0.004% | 92.9 | 97.6 | 123.9 | 130.1 |
| 29 | 166 | 1072 | 3388 | 1884 | 0.063% | 92.9 | 97.6 | 123.9 | 130.1 |
| 30 | 174 | 144 | 2662 | 1158 | 0.008% | 118.2 | 124.1 | 157.6 | 165.5 |
| 31 | 174 | 1488 | 2664 | 1160 | 0.083% | 118.2 | 124.1 | 157.6 | 165.5 |
| 32 | 175 | 616 | 2678 | 1174 | 0.034% | 117.5 | 123.4 | 156.7 | 164.5 |
| 33 | 183 | 360 | 3200 | 1696 | 0.019% | 98.3 | 103.2 | 131.1 | 137.7 |
| 34 | 183 | 1536 | 3202 | 1698 | 0.082% | 98.3 | 103.2 | 131.1 | 137.7 |
| 35 | 184 | 664 | 3218 | 1714 | 0.035% | 97.8 | 102.7 | 130.4 | 136.9 |
| 36 | 184 | 1840 | 3220 | 1716 | 0.097% | 97.8 | 102.7 | 130.4 | 136.9 |
| 37 | 185 | 968 | 3236 | 1732 | 0.051% | 97.3 | 102.1 | 129.7 | 136.2 |
| 38 | 192 | 744 | 3358 | 1854 | 0.038% | 93.7 | 98.4 | 125.0 | 131.2 |
| 39 | 192 | 1920 | 3360 | 1856 | 0.097% | 93.7 | 98.4 | 125.0 | 131.2 |
| 40 | 193 | 1048 | 3376 | 1872 | 0.053% | 93.2 | 97.9 | 124.3 | 130.5 |
| 41 | 194 | 176 | 3392 | 1888 | 0.009% | 92.8 | 97.4 | 123.7 | 129.9 |
| 42 | 194 | 1352 | 3394 | 1890 | 0.068% | 92.8 | 97.4 | 123.7 | 129.9 |
| 43 | 196 | 616 | 2666 | 1162 | 0.031% | 118.1 | 123.9 | 157.4 | 165.3 |
| 44 | 209 | 536 | 3198 | 1694 | 0.025% | 98.4 | 103.3 | 131.2 | 137.8 |
| 45 | 209 | 1880 | 3200 | 1696 | 0.088% | 98.4 | 103.3 | 131.2 | 137.8 |

TABLE 2-continued

| | | | | | Baud rate Gbaud | | | |
|---|---|---|---|---|---|---|---|---|
| No. | $r_{Frame}$ | $d_{CP}$ | k | $k_{PCS}$ | $OH_{CP}$ | FlexO-6e | FlexO-6 | FlexO-8e | FlexO-8 |
| 46 | 210 | 1008 | 3214 | 1710 | 0.047% | 97.9 | 102.8 | 130.6 | 137.1 |
| 47 | 211 | 136 | 3228 | 1724 | 0.006% | 97.5 | 102.3 | 130.0 | 136.5 |
| 48 | 211 | 1480 | 3230 | 1726 | 0.068% | 97.5 | 102.3 | 130.0 | 136.5 |
| 49 | 217 | 280 | 2656 | 1152 | 0.013% | 118.5 | 124.4 | 158.0 | 165.9 |
| 50 | 217 | 1960 | 2658 | 1154 | 0.088% | 118.5 | 124.4 | 158.0 | 165.9 |
| 51 | 218 | 80 | 2668 | 1164 | 0.004% | 117.9 | 123.8 | 157.2 | 165.1 |
| 52 | 218 | 1760 | 2670 | 1166 | 0.079% | 117.9 | 123.8 | 157.2 | 165.1 |
| 53 | 219 | 1224 | 3352 | 1848 | 0.054% | 93.9 | 98.6 | 125.2 | 131.5 |
| 54 | 220 | 352 | 3366 | 1862 | 0.016% | 93.5 | 98.2 | 124.7 | 130.9 |
| 55 | 220 | 1696 | 3368 | 1864 | 0.075% | 93.5 | 98.2 | 124.7 | 130.9 |
| 56 | 221 | 824 | 3382 | 1878 | 0.036% | 93.1 | 97.7 | 124.1 | 130.3 |
| 57 | 221 | 2168 | 3384 | 1880 | 0.095% | 93.1 | 97.7 | 124.1 | 130.3 |
| 58 | 222 | 1296 | 3398 | 1894 | 0.057% | 92.6 | 97.3 | 123.5 | 129.7 |
| 59 | 235 | 376 | 3196 | 1692 | 0.016% | 98.5 | 103.4 | 131.3 | 137.8 |
| 60 | 235 | 1888 | 3198 | 1694 | 0.078% | 98.5 | 103.4 | 131.3 | 137.8 |
| 61 | 236 | 680 | 3210 | 1706 | 0.028% | 98.0 | 102.9 | 130.7 | 137.2 |
| 62 | 236 | 2192 | 3212 | 1708 | 0.090% | 98.0 | 102.9 | 130.7 | 137.2 |
| 63 | 237 | 984 | 3224 | 1720 | 0.040% | 97.6 | 102.5 | 130.2 | 136.7 |
| 64 | 238 | 1288 | 3238 | 1734 | 0.053% | 97.2 | 102.1 | 129.6 | 136.1 |
| 65 | 239 | 920 | 2660 | 1156 | 0.037% | 118.3 | 124.2 | 157.8 | 165.6 |
| 66 | 240 | 1728 | 2672 | 1168 | 0.070% | 117.8 | 123.7 | 157.1 | 165.0 |
| 67 | 247 | 1000 | 3360 | 1856 | 0.039% | 93.7 | 98.4 | 124.9 | 131.1 |
| 68 | 247 | 2512 | 3362 | 1858 | 0.099% | 93.7 | 98.4 | 124.9 | 131.1 |
| 69 | 248 | 1304 | 3374 | 1870 | 0.051% | 93.3 | 98.0 | 124.4 | 130.6 |
| 70 | 249 | 96 | 3386 | 1882 | 0.004% | 92.9 | 97.6 | 123.9 | 130.1 |
| 71 | 249 | 1608 | 3388 | 1884 | 0.063% | 92.9 | 97.6 | 123.9 | 130.1 |
| 72 | 250 | 400 | 3400 | 1896 | 0.016% | 92.6 | 97.2 | 123.4 | 129.6 |
| 73 | 250 | 1912 | 3402 | 1898 | 0.074% | 92.6 | 97.2 | 123.4 | 129.6 |

TABLE 3

| | | | | | | Baud rate Gbaud | | | |
|---|---|---|---|---|---|---|---|---|---|
| No. | $r_{Frame}$ | $d_{CP}$ | k | $k_{PCS}$ | $OH_{CP}$ | FlexO-6e | FlexO-6 | FlexO-8e | FlexO-8 |
| 1 | 261 | 216 | 2662 | 1158 | 0.008% | 118.203 | 124.102 | 157.604 | 165.469 |
| 2 | 261 | 2232 | 2664 | 1160 | 0.083% | 118.203 | 124.102 | 157.604 | 165.469 |
| 3 | 261 | 1560 | 3196 | 1692 | 0.058% | 98.503 | 103.418 | 131.337 | 137.891 |
| 4 | 262 | 16 | 2672 | 1168 | 0.001% | 117.752 | 123.628 | 157.003 | 164.837 |
| 5 | 262 | 2032 | 2674 | 1170 | 0.075% | 117.752 | 123.628 | 157.003 | 164.837 |
| 6 | 262 | 1360 | 3208 | 1704 | 0.051% | 98.127 | 103.023 | 130.836 | 137.364 |
| 7 | 263 | 1160 | 3220 | 1716 | 0.043% | 97.754 | 102.632 | 130.338 | 136.842 |
| 8 | 264 | 960 | 3232 | 1728 | 0.035% | 97.383 | 102.243 | 129.845 | 136.324 |
| 9 | 264 | 2640 | 3234 | 1730 | 0.097% | 97.383 | 102.243 | 129.845 | 136.324 |
| 10 | 274 | 640 | 3354 | 1850 | 0.023% | 93.829 | 98.511 | 125.106 | 131.349 |
| 11 | 274 | 2320 | 3356 | 1852 | 0.082% | 93.829 | 98.511 | 125.106 | 131.349 |
| 12 | 275 | 440 | 3366 | 1862 | 0.016% | 93.488 | 98.153 | 124.651 | 130.871 |
| 13 | 275 | 2120 | 3368 | 1864 | 0.075% | 93.488 | 98.153 | 124.651 | 130.871 |
| 14 | 276 | 240 | 3378 | 1874 | 0.009% | 93.149 | 97.798 | 124.199 | 130.397 |
| 15 | 276 | 1920 | 3380 | 1876 | 0.068% | 93.149 | 97.798 | 124.199 | 130.397 |
| 16 | 277 | 40 | 3390 | 1886 | 0.001% | 92.813 | 97.444 | 123.751 | 129.926 |
| 17 | 277 | 1720 | 3392 | 1888 | 0.060% | 92.813 | 97.444 | 123.751 | 129.926 |
| 18 | 283 | 2032 | 2666 | 1162 | 0.070% | 118.099 | 123.992 | 157.465 | 165.323 |
| 19 | 284 | 488 | 2674 | 1170 | 0.017% | 117.683 | 123.555 | 156.911 | 164.741 |
| 20 | 284 | 2672 | 2676 | 1172 | 0.092% | 117.683 | 123.555 | 156.911 | 164.741 |
| 21 | 287 | 896 | 3194 | 1690 | 0.030% | 98.537 | 103.454 | 131.383 | 137.939 |
| 22 | 287 | 2744 | 3196 | 1692 | 0.093% | 98.537 | 103.454 | 131.383 | 137.939 |
| 23 | 288 | 1704 | 3206 | 1702 | 0.058% | 98.195 | 103.095 | 130.927 | 137.460 |
| 24 | 289 | 664 | 3216 | 1712 | 0.022% | 97.855 | 102.738 | 130.474 | 136.984 |
| 25 | 289 | 2512 | 3218 | 1714 | 0.085% | 97.855 | 102.738 | 130.474 | 136.984 |
| 26 | 290 | 1472 | 3228 | 1724 | 0.049% | 97.518 | 102.384 | 130.024 | 136.512 |
| 27 | 291 | 432 | 3238 | 1734 | 0.014% | 97.183 | 102.032 | 129.577 | 136.043 |
| 28 | 291 | 2280 | 3240 | 1736 | 0.076% | 97.183 | 102.032 | 129.577 | 136.043 |
| 29 | 302 | 80 | 3360 | 1856 | 0.003% | 93.643 | 98.316 | 124.857 | 131.088 |
| 30 | 302 | 1928 | 3362 | 1858 | 0.062% | 93.643 | 98.316 | 124.857 | 131.088 |
| 31 | 303 | 888 | 3372 | 1868 | 0.029% | 93.334 | 97.991 | 124.445 | 130.655 |
| 32 | 303 | 2736 | 3374 | 1870 | 0.088% | 93.334 | 97.991 | 124.445 | 130.655 |
| 33 | 304 | 688 | 2658 | 1154 | 0.022% | 118.398 | 124.306 | 157.864 | 165.741 |
| 34 | 304 | 3040 | 2660 | 1156 | 0.097% | 118.398 | 124.306 | 157.864 | 165.741 |
| 35 | 304 | 1696 | 3384 | 1880 | 0.054% | 93.027 | 97.669 | 124.036 | 130.225 |
| 36 | 305 | 2168 | 2668 | 1164 | 0.069% | 118.010 | 123.898 | 157.346 | 165.198 |
| 37 | 305 | 656 | 3394 | 1890 | 0.021% | 92.722 | 97.349 | 123.629 | 129.798 |
| 38 | 305 | 2504 | 3396 | 1892 | 0.080% | 92.722 | 97.349 | 123.629 | 129.798 |

| No. | $r_{Frame}$ | $d_{CP}$ | k | $k_{PCS}$ | $OH_{CP}$ | Baud rate Gbaud | | | |
|---|---|---|---|---|---|---|---|---|---|
| | | | | | | FlexO-6e | FlexO-6 | FlexO-8e | FlexO-8 |
| 39 | 306 | 1296 | 2676 | 1172 | 0.041% | 117.624 | 123.493 | 156.832 | 164.658 |
| 40 | 313 | 1912 | 3194 | 1690 | 0.059% | 98.566 | 103.484 | 131.421 | 137.979 |
| 41 | 314 | 1712 | 3204 | 1700 | 0.053% | 98.252 | 103.155 | 131.002 | 137.539 |
| 42 | 315 | 1512 | 3214 | 1710 | 0.047% | 97.940 | 102.827 | 130.587 | 137.103 |
| 43 | 316 | 1312 | 3224 | 1720 | 0.040% | 97.630 | 102.502 | 130.173 | 136.669 |
| 44 | 317 | 1112 | 3234 | 1730 | 0.034% | 97.322 | 102.178 | 129.763 | 136.238 |
| 45 | 317 | 3128 | 3236 | 1732 | 0.096% | 97.322 | 102.178 | 129.763 | 136.238 |
| 46 | 326 | 320 | 2660 | 1156 | 0.010% | 118.294 | 124.197 | 157.725 | 165.596 |
| 47 | 326 | 2840 | 2662 | 1158 | 0.085% | 118.294 | 124.197 | 157.725 | 165.596 |
| 48 | 327 | 120 | 2668 | 1164 | 0.004% | 117.932 | 123.817 | 157.243 | 165.089 |
| 49 | 327 | 2640 | 2670 | 1166 | 0.079% | 117.932 | 123.817 | 157.243 | 165.089 |
| 50 | 328 | 2440 | 2678 | 1174 | 0.072% | 117.573 | 123.440 | 156.764 | 164.586 |
| 51 | 329 | 728 | 3356 | 1852 | 0.022% | 93.772 | 98.452 | 125.030 | 131.269 |
| 52 | 329 | 2744 | 3358 | 1854 | 0.081% | 93.772 | 98.452 | 125.030 | 131.269 |
| 53 | 330 | 528 | 3366 | 1862 | 0.016% | 93.488 | 98.153 | 124.651 | 130.871 |
| 54 | 330 | 2544 | 3368 | 1864 | 0.075% | 93.488 | 98.153 | 124.651 | 130.871 |
| 55 | 331 | 328 | 3376 | 1872 | 0.010% | 93.206 | 97.857 | 124.274 | 130.476 |
| 56 | 331 | 2344 | 3378 | 1874 | 0.069% | 93.206 | 97.857 | 124.274 | 130.476 |
| 57 | 332 | 128 | 3386 | 1882 | 0.004% | 92.925 | 97.562 | 123.900 | 130.083 |
| 58 | 332 | 2144 | 3388 | 1884 | 0.063% | 92.925 | 97.562 | 123.900 | 130.083 |
| 59 | 333 | 1944 | 3398 | 1894 | 0.057% | 92.646 | 97.269 | 123.528 | 129.692 |
| 60 | 339 | 744 | 3192 | 1688 | 0.021% | 98.590 | 103.510 | 131.453 | 138.013 |
| 61 | 339 | 2928 | 3194 | 1690 | 0.084% | 98.590 | 103.510 | 131.453 | 138.013 |
| 62 | 340 | 1384 | 3202 | 1698 | 0.040% | 98.300 | 103.205 | 131.067 | 137.607 |
| 63 | 341 | 2024 | 3212 | 1708 | 0.058% | 98.012 | 102.903 | 130.682 | 137.203 |
| 64 | 342 | 480 | 3220 | 1716 | 0.014% | 97.725 | 102.602 | 130.300 | 136.802 |
| 65 | 342 | 2664 | 3222 | 1718 | 0.076% | 97.725 | 102.602 | 130.300 | 136.802 |
| 66 | 343 | 1120 | 3230 | 1726 | 0.032% | 97.440 | 102.303 | 129.920 | 136.403 |
| 67 | 343 | 3304 | 3232 | 1728 | 0.094% | 97.440 | 102.303 | 129.920 | 136.403 |
| 68 | 344 | 1760 | 3240 | 1736 | 0.050% | 97.157 | 102.005 | 129.543 | 136.007 |
| 69 | 348 | 288 | 2662 | 1158 | 0.008% | 118.203 | 124.102 | 157.604 | 165.469 |
| 70 | 348 | 2976 | 2664 | 1160 | 0.083% | 118.203 | 124.102 | 157.604 | 165.469 |
| 71 | 349 | 760 | 2670 | 1166 | 0.021% | 117.865 | 123.746 | 157.153 | 164.995 |
| 72 | 349 | 3448 | 2672 | 1168 | 0.096% | 117.865 | 123.746 | 157.153 | 164.995 |
| 73 | 350 | 1232 | 2678 | 1174 | 0.034% | 117.528 | 123.393 | 156.704 | 164.523 |
| 74 | 356 | 704 | 3352 | 1848 | 0.019% | 93.882 | 98.567 | 125.176 | 131.422 |
| 75 | 356 | 2888 | 3354 | 1850 | 0.079% | 93.882 | 98.567 | 125.176 | 131.422 |
| 76 | 357 | 1344 | 3362 | 1858 | 0.037% | 93.619 | 98.291 | 124.825 | 131.054 |
| 77 | 357 | 3528 | 3364 | 1860 | 0.096% | 93.619 | 98.291 | 124.825 | 131.054 |
| 78 | 358 | 1984 | 3372 | 1868 | 0.054% | 93.358 | 98.016 | 124.477 | 130.688 |
| 79 | 359 | 440 | 3380 | 1876 | 0.012% | 93.097 | 97.743 | 124.130 | 130.324 |
| 80 | 359 | 2624 | 3382 | 1878 | 0.071% | 93.097 | 97.743 | 124.130 | 130.324 |
| 81 | 360 | 1080 | 3390 | 1886 | 0.029% | 92.839 | 97.472 | 123.785 | 129.962 |
| 82 | 360 | 3264 | 3392 | 1888 | 0.088% | 92.839 | 97.472 | 123.785 | 129.962 |
| 83 | 361 | 1720 | 3400 | 1896 | 0.046% | 92.582 | 97.202 | 123.442 | 129.602 |
| 84 | 365 | 1592 | 3192 | 1688 | 0.042% | 98.611 | 103.531 | 131.481 | 138.042 |
| 85 | 366 | 720 | 3200 | 1696 | 0.019% | 98.341 | 103.249 | 131.122 | 137.665 |
| 86 | 366 | 3072 | 3202 | 1698 | 0.082% | 98.341 | 103.249 | 131.122 | 137.665 |
| 87 | 367 | 2200 | 3210 | 1706 | 0.058% | 98.073 | 102.967 | 130.764 | 137.290 |
| 88 | 368 | 1328 | 3218 | 1714 | 0.035% | 97.807 | 102.687 | 130.409 | 136.917 |
| 89 | 368 | 3680 | 3220 | 1716 | 0.097% | 97.807 | 102.687 | 130.409 | 136.917 |
| 90 | 369 | 2304 | 2658 | 1154 | 0.061% | 118.444 | 124.354 | 157.925 | 165.805 |
| 91 | 369 | 456 | 3226 | 1722 | 0.012% | 97.542 | 102.409 | 130.056 | 136.546 |
| 92 | 369 | 2808 | 3228 | 1724 | 0.074% | 97.542 | 102.409 | 130.056 | 136.546 |
| 93 | 370 | 592 | 2664 | 1160 | 0.016% | 118.123 | 124.018 | 157.498 | 165.357 |
| 94 | 370 | 3448 | 2666 | 1162 | 0.091% | 118.123 | 124.018 | 157.498 | 165.357 |
| 95 | 370 | 1936 | 3236 | 1732 | 0.051% | 97.278 | 102.132 | 129.704 | 136.176 |
| 96 | 371 | 1736 | 2672 | 1168 | 0.046% | 117.805 | 123.684 | 157.073 | 164.911 |
| 97 | 384 | 1488 | 3358 | 1854 | 0.038% | 93.732 | 98.409 | 124.975 | 131.212 |
| 98 | 384 | 3840 | 3360 | 1856 | 0.097% | 93.732 | 98.409 | 124.975 | 131.212 |
| 99 | 385 | 616 | 3366 | 1862 | 0.016% | 93.488 | 98.153 | 124.651 | 130.871 |
| 100 | 385 | 2968 | 3368 | 1864 | 0.075% | 93.488 | 98.153 | 124.651 | 130.871 |
| 101 | 386 | 2096 | 3376 | 1872 | 0.053% | 93.246 | 97.899 | 124.328 | 130.532 |
| 102 | 387 | 1224 | 3384 | 1880 | 0.031% | 93.005 | 97.646 | 124.007 | 130.195 |
| 103 | 387 | 3576 | 3386 | 1882 | 0.090% | 93.005 | 97.646 | 124.007 | 130.195 |
| 104 | 388 | 352 | 3392 | 1888 | 0.009% | 92.765 | 97.394 | 123.687 | 129.859 |
| 105 | 388 | 2704 | 3394 | 1890 | 0.068% | 92.765 | 97.394 | 123.687 | 129.859 |
| 106 | 389 | 1832 | 3402 | 1898 | 0.046% | 92.527 | 97.144 | 123.369 | 129.525 |
| 107 | 391 | 2440 | 2660 | 1156 | 0.061% | 118.355 | 124.260 | 157.806 | 165.681 |
| 108 | 392 | 1232 | 2666 | 1162 | 0.031% | 118.053 | 123.943 | 157.403 | 165.258 |
| 109 | 392 | 2240 | 3200 | 1696 | 0.056% | 98.377 | 103.286 | 131.170 | 137.715 |
| 110 | 393 | 24 | 2672 | 1168 | 0.001% | 117.752 | 123.628 | 157.003 | 164.837 |
| 111 | 393 | 3048 | 2674 | 1170 | 0.075% | 117.752 | 123.628 | 157.003 | 164.837 |
| 112 | 393 | 2040 | 3208 | 1704 | 0.051% | 98.127 | 103.023 | 130.836 | 137.364 |
| 113 | 394 | 1840 | 3216 | 1712 | 0.045% | 97.878 | 102.762 | 130.504 | 137.016 |
| 114 | 395 | 1640 | 3224 | 1720 | 0.040% | 97.630 | 102.502 | 130.173 | 136.669 |

TABLE 3-continued

| No. | $r_{Frame}$ | $d_{CP}$ | k | $k_{PCS}$ | $OH_{CP}$ | Baud rate Gbaud | | | |
|---|---|---|---|---|---|---|---|---|---|
| | | | | | | FlexO-6e | FlexO-6 | FlexO-8e | FlexO-8 |
| 115 | 396 | 1440 | 3232 | 1728 | 0.035% | 97.383 | 102.243 | 129.845 | 136.324 |
| 116 | 396 | 3960 | 3234 | 1730 | 0.097% | 97.383 | 102.243 | 129.845 | 136.324 |
| 117 | 397 | 1240 | 3240 | 1736 | 0.030% | 97.138 | 101.985 | 129.518 | 135.980 |
| 118 | 397 | 3760 | 3242 | 1738 | 0.092% | 97.138 | 101.985 | 129.518 | 135.980 |
| 119 | 411 | 960 | 3354 | 1850 | 0.023% | 93.829 | 98.511 | 125.106 | 131.349 |
| 120 | 411 | 3480 | 3356 | 1852 | 0.082% | 93.829 | 98.511 | 125.106 | 131.349 |
| 121 | 412 | 760 | 3362 | 1858 | 0.018% | 93.602 | 98.272 | 124.802 | 131.030 |
| 122 | 412 | 3280 | 3364 | 1860 | 0.077% | 93.602 | 98.272 | 124.802 | 131.030 |
| 123 | 413 | 2912 | 2662 | 1158 | 0.069% | 118.275 | 124.177 | 157.700 | 165.569 |
| 124 | 413 | 560 | 3370 | 1866 | 0.013% | 93.375 | 98.034 | 124.500 | 130.712 |
| 125 | 413 | 3080 | 3372 | 1868 | 0.073% | 93.375 | 98.034 | 124.500 | 130.712 |
| 126 | 414 | 2208 | 2668 | 1164 | 0.052% | 117.989 | 123.877 | 157.319 | 165.169 |
| 127 | 414 | 360 | 3378 | 1874 | 0.009% | 93.149 | 97.798 | 124.199 | 130.397 |
| 128 | 414 | 2880 | 3380 | 1876 | 0.068% | 93.149 | 97.798 | 124.199 | 130.397 |
| 129 | 415 | 1504 | 2674 | 1170 | 0.035% | 117.705 | 123.578 | 156.940 | 164.771 |
| 130 | 415 | 160 | 3386 | 1882 | 0.004% | 92.925 | 97.562 | 123.900 | 130.083 |
| 131 | 415 | 2680 | 3388 | 1884 | 0.063% | 92.925 | 97.562 | 123.900 | 130.083 |
| 132 | 416 | 2480 | 3396 | 1892 | 0.058% | 92.702 | 97.327 | 123.602 | 129.770 |
| 133 | 418 | 1072 | 3198 | 1694 | 0.025% | 98.409 | 103.319 | 131.211 | 137.759 |
| 134 | 418 | 3760 | 3200 | 1696 | 0.088% | 98.409 | 103.319 | 131.211 | 137.759 |
| 135 | 419 | 1544 | 3206 | 1702 | 0.036% | 98.174 | 103.073 | 130.898 | 137.430 |
| 136 | 419 | 4232 | 3208 | 1704 | 0.098% | 98.174 | 103.073 | 130.898 | 137.430 |
| 137 | 420 | 2016 | 3214 | 1710 | 0.047% | 97.940 | 102.827 | 130.587 | 137.103 |
| 138 | 421 | 2488 | 3222 | 1718 | 0.058% | 97.707 | 102.583 | 130.276 | 136.777 |
| 139 | 422 | 272 | 3228 | 1724 | 0.006% | 97.476 | 102.340 | 129.968 | 136.453 |
| 140 | 422 | 2960 | 3230 | 1726 | 0.068% | 97.476 | 102.340 | 129.968 | 136.453 |
| 141 | 423 | 744 | 3236 | 1732 | 0.017% | 97.245 | 102.098 | 129.660 | 136.130 |
| 142 | 423 | 3432 | 3238 | 1734 | 0.079% | 97.245 | 102.098 | 129.660 | 136.130 |
| 143 | 434 | 560 | 2656 | 1152 | 0.013% | 118.476 | 124.388 | 157.968 | 165.850 |
| 144 | 434 | 3920 | 2658 | 1154 | 0.088% | 118.476 | 124.388 | 157.968 | 165.850 |
| 145 | 435 | 360 | 2662 | 1158 | 0.008% | 118.203 | 124.102 | 157.604 | 165.469 |
| 146 | 435 | 3720 | 2664 | 1160 | 0.083% | 118.203 | 124.102 | 157.604 | 165.469 |
| 147 | 436 | 160 | 2668 | 1164 | 0.004% | 117.932 | 123.817 | 157.243 | 165.089 |
| 148 | 436 | 3520 | 2670 | 1166 | 0.079% | 117.932 | 123.817 | 157.243 | 165.089 |
| 149 | 437 | 3320 | 2676 | 1172 | 0.074% | 117.662 | 123.534 | 156.883 | 164.712 |
| 150 | 438 | 2448 | 3352 | 1848 | 0.054% | 93.915 | 98.601 | 125.220 | 131.468 |
| 151 | 439 | 232 | 3358 | 1854 | 0.005% | 93.701 | 98.377 | 124.935 | 131.169 |
| 152 | 439 | 2920 | 3360 | 1856 | 0.065% | 93.701 | 98.377 | 124.935 | 131.169 |
| 153 | 440 | 704 | 3366 | 1862 | 0.016% | 93.488 | 98.153 | 124.651 | 130.871 |
| 154 | 440 | 3392 | 3368 | 1864 | 0.075% | 93.488 | 98.153 | 124.651 | 130.871 |
| 155 | 441 | 1176 | 3374 | 1870 | 0.026% | 93.276 | 97.931 | 124.368 | 130.574 |
| 156 | 441 | 3864 | 3376 | 1872 | 0.085% | 93.276 | 97.931 | 124.368 | 130.574 |
| 157 | 442 | 1648 | 3382 | 1878 | 0.036% | 93.065 | 97.709 | 124.087 | 130.279 |
| 158 | 442 | 4336 | 3384 | 1880 | 0.095% | 93.065 | 97.709 | 124.087 | 130.279 |
| 159 | 443 | 2120 | 3390 | 1886 | 0.047% | 92.855 | 97.488 | 123.807 | 129.985 |
| 160 | 444 | 2424 | 3198 | 1694 | 0.053% | 98.436 | 103.348 | 131.248 | 137.798 |
| 161 | 444 | 2592 | 3398 | 1894 | 0.057% | 92.646 | 97.269 | 123.528 | 129.692 |
| 162 | 445 | 712 | 3204 | 1700 | 0.016% | 98.215 | 103.116 | 130.953 | 137.488 |
| 163 | 445 | 3568 | 3206 | 1702 | 0.078% | 98.215 | 103.116 | 130.953 | 137.488 |
| 164 | 446 | 1856 | 3212 | 1708 | 0.041% | 97.995 | 102.885 | 130.660 | 137.180 |
| 165 | 447 | 144 | 3218 | 1714 | 0.003% | 97.776 | 102.655 | 130.367 | 136.873 |
| 166 | 447 | 3000 | 3220 | 1716 | 0.065% | 97.776 | 102.655 | 130.367 | 136.873 |
| 167 | 448 | 1288 | 3226 | 1722 | 0.028% | 97.557 | 102.425 | 130.076 | 136.567 |
| 168 | 448 | 4144 | 3228 | 1724 | 0.090% | 97.557 | 102.425 | 130.076 | 136.567 |
| 169 | 449 | 2432 | 3234 | 1730 | 0.053% | 97.340 | 102.197 | 129.787 | 136.263 |
| 170 | 456 | 1032 | 2658 | 1154 | 0.022% | 118.398 | 124.306 | 157.864 | 165.741 |
| 171 | 456 | 4560 | 2660 | 1156 | 0.097% | 118.398 | 124.306 | 157.864 | 165.741 |
| 172 | 457 | 1336 | 2664 | 1160 | 0.028% | 118.139 | 124.034 | 157.518 | 165.378 |
| 173 | 458 | 1640 | 2670 | 1166 | 0.035% | 117.881 | 123.763 | 157.174 | 165.017 |
| 174 | 459 | 1944 | 2676 | 1172 | 0.041% | 117.624 | 123.493 | 156.832 | 164.658 |
| 175 | 466 | 1888 | 3356 | 1852 | 0.039% | 93.789 | 98.469 | 125.052 | 131.292 |
| 176 | 466 | 4744 | 3358 | 1854 | 0.099% | 93.789 | 98.469 | 125.052 | 131.292 |
| 177 | 467 | 176 | 3362 | 1858 | 0.004% | 93.588 | 98.258 | 124.784 | 131.011 |
| 178 | 467 | 3032 | 3364 | 1860 | 0.063% | 93.588 | 98.258 | 124.784 | 131.011 |
| 179 | 468 | 1320 | 3370 | 1866 | 0.027% | 93.388 | 98.048 | 124.518 | 130.731 |
| 180 | 468 | 4176 | 3372 | 1868 | 0.087% | 93.388 | 98.048 | 124.518 | 130.731 |
| 181 | 469 | 2464 | 3378 | 1874 | 0.051% | 93.189 | 97.839 | 124.252 | 130.452 |
| 182 | 470 | 752 | 3196 | 1692 | 0.016% | 98.461 | 103.374 | 131.281 | 137.832 |
| 183 | 470 | 3776 | 3198 | 1694 | 0.078% | 98.461 | 103.374 | 131.281 | 137.832 |
| 184 | 470 | 752 | 3384 | 1880 | 0.016% | 92.991 | 97.631 | 123.988 | 130.175 |
| 185 | 470 | 3608 | 3386 | 1882 | 0.075% | 92.991 | 97.631 | 123.988 | 130.175 |
| 186 | 471 | 2568 | 3204 | 1700 | 0.053% | 98.252 | 103.155 | 131.002 | 137.539 |
| 187 | 471 | 1896 | 3392 | 1888 | 0.039% | 92.793 | 97.424 | 123.725 | 129.898 |
| 188 | 471 | 4752 | 3394 | 1890 | 0.098% | 92.793 | 97.424 | 123.725 | 129.898 |
| 189 | 472 | 1360 | 3210 | 1706 | 0.028% | 98.044 | 102.936 | 130.725 | 137.248 |
| 190 | 472 | 4384 | 3212 | 1708 | 0.090% | 98.044 | 102.936 | 130.725 | 137.248 |

TABLE 3-continued

| No. | $r_{Frame}$ | $d_{CP}$ | k | $k_{PCS}$ | $OH_{CP}$ | Baud rate Gbaud | | | |
|---|---|---|---|---|---|---|---|---|---|
| | | | | | | FlexO-6e | FlexO-6 | FlexO-8e | FlexO-8 |
| 191 | 472 | 184 | 3398 | 1894 | 0.004% | 92.597 | 97.217 | 123.462 | 129.623 |
| 192 | 472 | 3040 | 3400 | 1896 | 0.063% | 92.597 | 97.217 | 123.462 | 129.623 |
| 193 | 473 | 152 | 3216 | 1712 | 0.003% | 97.836 | 102.718 | 130.449 | 136.958 |
| 194 | 473 | 3176 | 3218 | 1714 | 0.065% | 97.836 | 102.718 | 130.449 | 136.958 |
| 195 | 474 | 1968 | 3224 | 1720 | 0.040% | 97.630 | 102.502 | 130.173 | 136.669 |
| 196 | 475 | 760 | 3230 | 1726 | 0.016% | 97.424 | 102.286 | 129.899 | 136.381 |
| 197 | 475 | 3784 | 3232 | 1728 | 0.078% | 97.424 | 102.286 | 129.899 | 136.381 |
| 198 | 476 | 2576 | 3238 | 1734 | 0.053% | 97.220 | 102.071 | 129.626 | 136.095 |
| 199 | 478 | 1840 | 2660 | 1156 | 0.037% | 118.327 | 124.232 | 157.769 | 165.642 |
| 200 | 479 | 2648 | 2666 | 1162 | 0.054% | 118.080 | 123.972 | 157.440 | 165.296 |
| 201 | 480 | 3456 | 2672 | 1168 | 0.070% | 117.834 | 123.714 | 157.112 | 164.952 |
| 202 | 481 | 568 | 2676 | 1172 | 0.012% | 117.589 | 123.457 | 156.785 | 164.609 |
| 203 | 481 | 4264 | 2678 | 1174 | 0.086% | 117.589 | 123.457 | 156.785 | 164.609 |
| 204 | 493 | 184 | 3352 | 1848 | 0.004% | 93.867 | 98.551 | 125.156 | 131.402 |
| 205 | 493 | 3208 | 3354 | 1850 | 0.063% | 93.867 | 98.551 | 125.156 | 131.402 |
| 206 | 494 | 2000 | 3360 | 1856 | 0.039% | 93.677 | 98.352 | 124.903 | 131.136 |
| 207 | 494 | 5024 | 3362 | 1858 | 0.099% | 93.677 | 98.352 | 124.903 | 131.136 |
| 208 | 495 | 792 | 3366 | 1862 | 0.016% | 93.488 | 98.153 | 124.651 | 130.871 |
| 209 | 495 | 3816 | 3368 | 1864 | 0.075% | 93.488 | 98.153 | 124.651 | 130.871 |
| 210 | 496 | 1936 | 3196 | 1692 | 0.038% | 98.483 | 103.397 | 131.311 | 137.863 |
| 211 | 496 | 2608 | 3374 | 1870 | 0.051% | 93.300 | 97.955 | 124.399 | 130.607 |
| 212 | 497 | 1232 | 3202 | 1698 | 0.024% | 98.285 | 103.189 | 131.046 | 137.586 |
| 213 | 497 | 4424 | 3204 | 1700 | 0.087% | 98.285 | 103.189 | 131.046 | 137.586 |
| 214 | 497 | 1400 | 3380 | 1876 | 0.027% | 93.112 | 97.758 | 124.149 | 130.344 |
| 215 | 497 | 4424 | 3382 | 1878 | 0.087% | 93.112 | 97.758 | 124.149 | 130.344 |
| 216 | 498 | 528 | 3208 | 1704 | 0.010% | 98.087 | 102.982 | 130.783 | 137.309 |
| 217 | 498 | 3720 | 3210 | 1706 | 0.073% | 98.087 | 102.982 | 130.783 | 137.309 |
| 218 | 498 | 192 | 3386 | 1882 | 0.004% | 92.925 | 97.562 | 123.900 | 130.083 |
| 219 | 498 | 3216 | 3388 | 1884 | 0.063% | 92.925 | 97.562 | 123.900 | 130.083 |
| 220 | 499 | 1672 | 2656 | 1152 | 0.033% | 118.499 | 124.413 | 157.999 | 165.883 |
| 221 | 499 | 3016 | 3216 | 1712 | 0.059% | 97.891 | 102.776 | 130.521 | 137.034 |
| 222 | 499 | 2008 | 3394 | 1890 | 0.039% | 92.739 | 97.366 | 123.652 | 129.822 |
| 223 | 499 | 5032 | 3396 | 1892 | 0.098% | 92.739 | 97.366 | 123.652 | 129.822 |
| 224 | 500 | 2984 | 2662 | 1158 | 0.058% | 118.262 | 124.164 | 157.683 | 165.552 |
| 225 | 500 | 2312 | 3222 | 1718 | 0.045% | 97.695 | 102.570 | 130.260 | 136.760 |
| 226 | 500 | 800 | 3400 | 1896 | 0.016% | 92.553 | 97.172 | 123.404 | 129.562 |
| 227 | 500 | 3824 | 3402 | 1898 | 0.074% | 92.553 | 97.172 | 123.404 | 129.562 |
| 228 | 501 | 432 | 2666 | 1162 | 0.008% | 118.026 | 123.916 | 157.369 | 165.221 |
| 229 | 501 | 4296 | 2668 | 1164 | 0.083% | 118.026 | 123.916 | 157.369 | 165.221 |
| 230 | 501 | 1608 | 3228 | 1724 | 0.031% | 97.500 | 102.365 | 130.000 | 136.487 |
| 231 | 501 | 4800 | 3230 | 1726 | 0.093% | 97.500 | 102.365 | 130.000 | 136.487 |
| 232 | 502 | 1744 | 2672 | 1168 | 0.034% | 117.791 | 123.669 | 157.055 | 164.892 |
| 233 | 502 | 904 | 3234 | 1730 | 0.018% | 97.306 | 102.161 | 129.741 | 136.215 |
| 234 | 502 | 4096 | 3236 | 1732 | 0.079% | 97.306 | 102.161 | 129.741 | 136.215 |
| 235 | 503 | 3056 | 2678 | 1174 | 0.059% | 117.557 | 123.423 | 156.743 | 164.564 |

It should be noted that, when $d_{scr}=336 \times k$, after the PCS processing, the OFEC encoding, and the first interleaving processing on the $d_{scr}$ scrambled bits, $$\frac{d_{scr}}{4 \times k} \times (4 \times 4096) = 1376256$$

bits obtained through the first interleaving processing are obtained, 172032 dual-polarization symbols are exactly obtained through DP-16QAM symbol mapping and polarization distribution on the bits, and one super-frame is exactly obtained through the DSP framing. In other words, when $d_{scr}=336 \times k$, one super-frame corresponds to r rows of data obtained from the data frame each time the first data processing is performed, to simplify data processing. When $d_{scr} \neq 336 \times k$, $F_{DSP}$ super-frames may be used as a combination, so that the $F_{DSP}$ super-frames correspond to $d_{scr} \times F_{Frame}$ bits output through $F_{Frame}$ first data processing. In this case, $d_{scr} \times F_{Frame}=336 \times k \times F_{DSP}$, where $F_{Frame}$ and $F_{DSP}$ are positive integers. RES reserved symbols inserted into each super-frame are designed, so that a receiver can identify the $F_{DSP}$ super-frames, to identify a boundary corresponding to the $d_{scr} \times F_{Frame}$ bits output through the $F_{Frame}$ first data processing.

It can be learned from the foregoing descriptions of the first data processing and the second data processing that, for future metro telecommunication transmission and metro DCI interconnection scenarios, FEC encoding is used in combination with a PCS technology to satisfy a requirement for a longer transmission distance. Due to introduction of PCS processing, during symbol mapping, sign bits (sign bits) being 0 and 1 mapped to one modulation symbol need to be equiprobable, and amplitude bits (amplitude bits) being 0 and 1 mapped to one modulation symbol need to be non-equiprobable. OFEC encoding is specifically used as an example for FEC encoding. To avoid impact on existing OFEC encoding and OFEC interleavers, a new interleaver needs to be introduced after OFEC encoding and before a symbol mapping operation, so that a PCS processed bit that is non-equiprobable in being 0 and 1 can be mapped to an amplitude bit of a modulation symbol. In this way, an occurrence probability of a constellation point is changed while a position of the constellation point remains unchanged, so that constellation points are not evenly distributed, to improve overall performance, so as to satisfy a requirement for a longer transmission distance in the future. In addition, due to introduction of the PCS processing, a length of information bits on which the PCS processing and the FEC encoding are performed is no longer 3552, but a smaller value. In this case, a quantity of rows of data obtained from a data frame needs to be redesigned, and CRC check and a quantity of inserted pad bits need to be redesigned, so that an overall data processing operation is simpler, complexity is lower, and power consumption is lower.

The following describes several specific embodiments with reference to the foregoing first data processing and second data processing.

Embodiment 1

In consideration of a data frame with a rate of 800G, one data frame includes 512 rows, and each row includes 10280 bits. Parameter combination 10 $\{r_{Frame}=110, d_{CP}=848,$ and $k=3368\}$ in Table 2 is considered. In first data processing, $r_{Frame}=110$ rows of data is obtained from the data frame, to obtain a total of $d_{in}=10280 \times r_{Frame}=1130800$ bits. $p=22$ is considered.

Figure 17A:
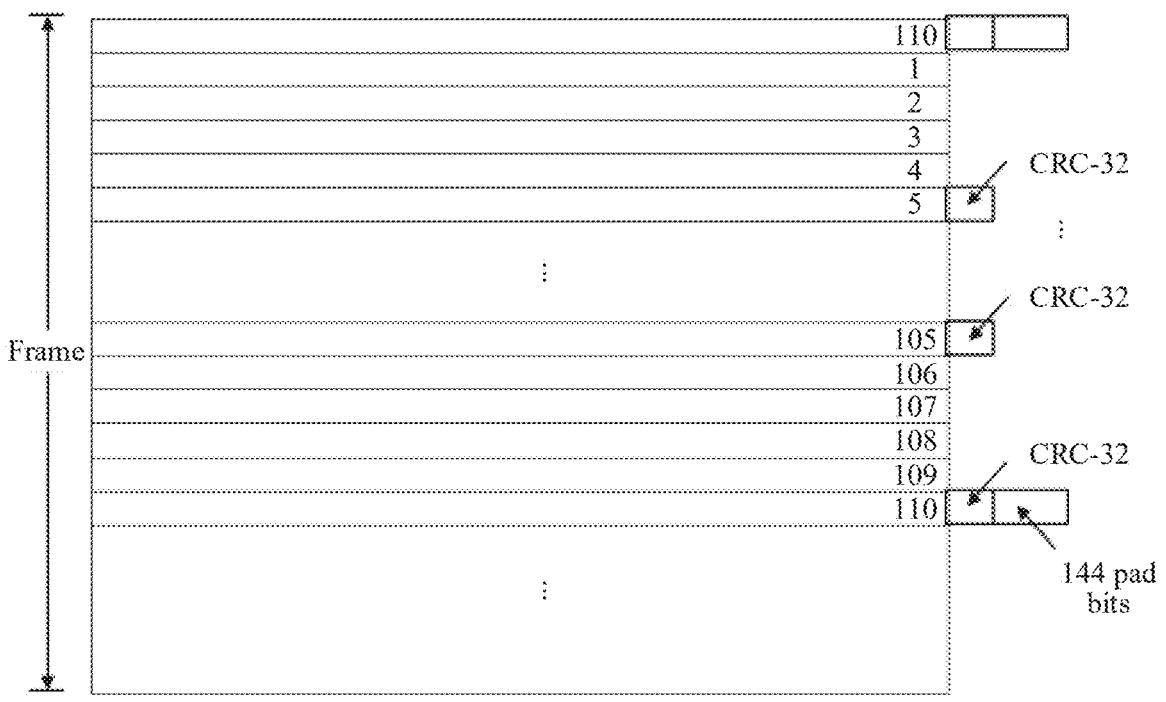
FIG. 17(a) is a diagram of an implementation of performing CRC on a data frame according to an embodiment of this application.

FIG. 17(a) is a diagram of an implementation of performing CRC on a data frame according to an embodiment of this application. As shown in FIG. 17(a), CRC-32 check is first performed on $$10280 \times \frac{r_{Frame}}{p} = 51400$$

bits in every $$\frac{r_{Frame}}{p} = \frac{110}{22} = 5 \text{ rows},$$

to add a total of $d_{CRC}=22 \times 32=704$ CRC parity bits. Then, $d_{PAD}=144$ pad (Pad) bits are inserted, and scrambling is performed, to obtain $d_{scr}=10280 \times r_{Frame}+d_{CRC}+d_{PAD}=1131648$ scrambled bits. Overhead corresponding to the CRC check and the pad bit insertion is $$OH_{CP} = \frac{d_{scr}}{d_{in}} - 1 = 0.075\%.$$

As shown in FIG. 4, in second data processing, a plurality of bits that are obtained from a bit data stream output through the first data processing are sent to L=4 PCS and OFEC encoding in a round-robin fashion for PCS processing and OFEC encoding. As shown in FIG. 5, in the PCS and OFEC encoding, $k_{PCS}=k-1504=1864$ bits in $k=3368$ input bits are sent to the PCS processing, to obtain 2048 bits. $k=3368$ bits include $k_{PCS}=k-1504=1864$ bits and 1504 bits.

In the PCS processing, an LUT lookup table is used, LUT mapping is performed on $k_{LUT}=233$ input bits each time to output corresponding $n_{LUT}=256$ bits, and after the LUT mapping is performed for eight consecutive times, namely, the LUT mapping is performed on a total of $k-1504=1864$ bits, corresponding 2048 bits are output.

The 2048 bits output through the PCS processing and 1504 bits, namely, a total of 2048+1504=3552 bits, are sent to the OFEC encoding for encoding to insert 544 OFEC parity bits, to obtain a total of 4096 OFEC-encoded bits, namely, a fourth bit set. The 4096 bits are represented by using a block set shown in FIG. 11(a), where the PCS processed 2048 bits correspond to the eight square blocks $B_{0,0}, B_{0,1}, B_{0,2}, B_{0,3}, B_{1,0}, B_{1,1}, B_{1,2},$ and $B_{1,3}$ shown in FIG. 11(a).

First interleaving processing is performed on the fourth bit set (4096 bits) to obtain an interleaved fifth bit set. Bit $C_1$ in 128 bits in row $r_1$ of the interleaved fifth bit set is from bit $c_0$ in 128 bits in row $r_0$ of the fourth bit set, and $$c_1 = (c\%\theta + (r_1 + 4 \times \Delta)\%\beta)\%\theta + \left\lfloor \frac{c}{\theta} \right\rfloor \times \theta,$$

where $0 \leq c_0 < 128$, $0 \leq c_1 < 128$, $\theta$ is an integer multiple of 4, $m_0 \times 8$ is exactly divisible by $\theta$, $\Delta$ is an integer, and $\beta$ is an integer multiple of 4, where $$c = \left\lfloor \frac{c_0\%(m_0 \times 4)}{2} \right\rfloor \times 4 + c_0\%2 + 2 \times \left(1 - \left\lfloor \frac{c_0}{(m_0 \times 4)} \right\rfloor\right).$$

Herein, $r_0=r_1$. A bit in row $i_2$ and column $$\left(\left\lfloor \frac{j_2}{2} \right\rfloor \times 4 + j_2\%2 + i_2 + 2\right)\%16$$

in any square block $T_{i_0 j_0}$ ($0 \leq i_0 < 2$ and $0 \leq j_0 < 8$) in the interleaved fifth bit set obtained through the first interleaving processing is 1 bit in a PCS processed second bit set (2048 bits), where $0 \leq i_2 < 16$ and $0 \leq j_2 < 8$.

The PCS processing, the OFEC encoding, and the first interleaving processing are performed on the $d_{ser}=1131648$ scrambled bits, to obtain $$\frac{d_{scr}}{4 \times k} \times (4 \times 4096) = 1376256$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 1376256 bits output through OFEC interleaving are sent to DP-16QAM symbol mapping and polarization distribution to obtain 172032 dual-polarization symbols, and DSP framing is performed, to be specific, FAWs, TSs, RESs, and PSs are inserted into symbols of X-polarization and Y-polarization to obtain a super-frame including 175104 dual-polarization symbols, and then the super-frame is sent.

If a rate of a given data frame is $W_{bit}$ Gbit/s, a corresponding baud rate is $W_{baud}=W_{bit} \times (10280 \times r_{Frame}+d_{CP})/(10280 \times r_{Frame}) \times (4096/k) \times (57/56)/8$ Gbaud. Baud rates corresponding to data frame types FlexO-8e and FlexO-8 are respectively 124.7 Gbaud and 130.9 Gbaud.

Embodiment 2

In consideration of a data frame with a rate of 600G, one data frame includes 384 rows, and each row includes 10280 bits. Parameter combination 5 $\{r_{Frame}=87, d_{CP}=744,$ and $k=2664\}$ in Table 2 is considered. In first data processing, r=87 rows of data is obtained from the data frame, to obtain a total of $d_{in}=10280 \times r_{Frame}=894360$ bits. p=3 is considered. CRC-32 check is first performed on $$10280 \times \frac{r_{Frame}}{p} = 298120$$

bits in every $$\frac{r_{Frame}}{p} = \frac{87}{3} = 29$$

rows, to add a total of $d_{CRC}=3\times32=96$ CRC parity bits. Then, $d_{PAD}=648$ pad (Pad) bits are inserted, and scrambling is performed, to obtain $d_{scr}=10280\times r+d_{CRC}+d_{PAD}=895104$ scrambled bits. Overhead corresponding to the CRC check and the pad bit insertion is $$OH_{CP} = \frac{d_{scr}}{d_{in}} - 1 = 0.083\%.$$

As shown in FIG. 4, in second data processing, a plurality of bits that are obtained from a bit data stream output through the first data processing are sent to L=4 PCS and OFEC encoding in a round-robin fashion for PCS processing and OFEC encoding. As shown in FIG. 5, in the PCS and OFEC encoding, $k_{PCS}=k-1504=1160$ bits in k=2664 input bits are sent to the PCS processing, to obtain 2048 bits. k=2664 bits include $k_{PCS}=k-1504=1160$ bits and 1504 bits.

In the PCS processing, an LUT lookup table is used, LUT mapping is performed on $k_{LUT}=145$ input bits each time to output corresponding $n_{LUT}=256$ bits, and after the LUT mapping is performed for eight consecutive times, namely, the LUT mapping is performed on a total of k−1504=1160 bits, corresponding 2048 bits are output.

The 2048 bits output through the PCS processing and 1504 bits, a total of 2048+1504=3552 bits, are sent to the OFEC encoding for encoding to insert 544 OFEC parity bits, to obtain a total of 4096 OFEC-encoded bits, namely, a fourth bit set. The 4096 bits are represented by using a block set shown in FIG. 11(*a*), where the PCS processed 2048 bits correspond to the eight square blocks $B_{0,0}$, $B_{0,1}$, $B_{0,2}$, $B_{0,3}$, $B_{1,0}$, $B_{1,1}$, $B_{1,2}$, and $B_{1,3}$ shown in FIG. 11(*a*).

First interleaving processing is performed on the fourth bit set to obtain an interleaved fifth bit set. Bit $c_1$ in 128 bits in row $r_1$ of the interleaved fifth bit set is from bit $c_0$ in 128 bits in row $r_0$ of the fourth bit set, and $$c_1 = (c\%\theta + (r_1 + 2 + 4\times\Delta)\%\beta)\%\theta + \left\lfloor\frac{c}{\theta}\right\rfloor\times\theta,$$

where $0\leq c_0<128$, $0\leq c_1<128$, $\theta$ is an integer multiple of 4, $m_0\times8$ is exactly divisible by $\theta$, $\Delta$ is an integer, and $\beta$ is an integer multiple of 4, where $$c = \left\lfloor\frac{c_0\%32}{2}\right\rfloor\times4 + c_0\%2 + \left(\left\lfloor\frac{c_0}{32}\right\rfloor\%2\right)\times2 + \left\lfloor\frac{c_0}{64}\right\rfloor\times64,$$

Herein, $r_0=r_1$. A bit in row $i_2$ and column $$\left(\left\lfloor\frac{j_2}{2}\right\rfloor\times4 + j_2\%2 + i_2 + 2\right)\%16$$

in any block $T_{i_0,j_0}$ ($0\leq i_0<2$ and $0\leq j_0<8$) in the fifth bit set obtained through the first interleaving processing is 1 bit in a PCS processed second bit set (2048 bits), where $0\leq i_2<16$ and $0\leq j_2<8$.

The PCS processing, the OFEC encoding, and the first interleaving processing are performed on the $d_{scr}=895104$ scrambled bits, to obtain $$\frac{d_{scr}}{4\times k}\times(4\times4096) = 1376256$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 1376256 bits output through OFEC interleaving are sent to DP-16QAM symbol mapping and polarization distribution to obtain 172032 dual-polarization symbols, and DSP framing is performed, to be specific, FAWs, TSs, RESs, and PSs are inserted into symbols of X-polarization and Y-polarization to obtain a super-frame including 175104 dual-polarization symbols, and then the super-frame is sent.

If a rate of a given data frame is $W_{bit}$ Gbit/s, a corresponding baud rate is $W_{baud}=W_{bit}\times(10280\times r_{Frame}+d_{CP})/(10280\times r_{Frame})\times(4096/k)\times(57/56)/8$ Gbaud. Baud rates corresponding to data frame types FlexO-6e and FlexO-6 are respectively 118.2 Gbaud and 124.1 Gbaud.

Embodiment 3

In consideration of a data frame with a rate of 600G, one data frame includes 384 rows, and each row includes 10280 bits. Parameter combination 6 {$r_{Frame}=105$, $d_{CP}=504$, and k=3214} in Table 2 is considered. In first data processing, $r_{Frame}=105$ rows of data is obtained from the data frame, to obtain a total of $d_{in}=10280\times r_{Frame}=1079400$ bits. p=15 is considered. CRC-32 check is first performed on $$10280 \times \frac{r_{Frame}}{p} = 71960$$

bits in every $$\frac{r_{Frame}}{p} = \frac{105}{15} = 7$$

rows, to add a total of $d_{CRC}=15\times32=480$ CRC parity bits. Then, $d_{PAD}=24$ pad (Pad) bits are inserted, and scrambling is performed, to obtain $d_{scr}=10280\times r_{Frame}+d_{CRC}+d_{PAD}=1079904$ bits. Overhead corresponding to the CRC check and the pad bit insertion is $$OH_{CP} = \frac{d_{scr}}{d_{in}} - 1 = 0.047\%.$$

As shown in FIG. 4, in second data processing, a plurality of bits that are obtained from a bit data stream output through the first data processing are sent to L=4 PCS and OFEC encoding in a round-robin fashion for PCS processing and OFEC encoding. As shown in FIG. 5, in the PCS and OFEC encoding, $k_{PCS}$=k−1504=1710 bits in k=3214 input bits are sent to the PCS processing, to obtain 2048 bits. k=3214 bits include $k_{PCS}$=k−1504=1710 bits and 1504 bits.

In the PCS processing, an LUT lookup table is used, LUT mapping is performed on $k_{LUT}$=855 input bits each time to output corresponding $n_{LUT}$=1024 bits, and after the LUT mapping is performed for two consecutive times, namely, the LUT mapping is performed on a total of k−1504=1710 bits, corresponding 2048 bits are output.

The 2048 bits output through the PCS processing and 1504 bits, a total of 2048+1504=3552 bits, are sent to the OFEC encoding for encoding to insert 544 OFEC parity bits, to obtain a total of 4096 OFEC-encoded bits, namely, a fourth bit set. The 4096 bits are represented by using a block set shown in FIG. 11(*b*), where the PCS processed 2048 bits correspond to the eight square blocks $B_{0,0}$, $B_{0,1}$, $B_{0,4}$, $B_{0,5}$, $B_{1,0}$, $B_{1,1}$, $B_{1,4}$, and $B_{1,5}$ shown in FIG. 11(*b*).

First interleaving processing is performed on the fourth bit set to obtain an interleaved fifth bit set. Bit $C_1$ in 128 bits in row $r_1$ of the interleaved fifth bit set is from bit $c_0$ in 128 bits in row $r_0$ of the fourth bit set, and $$c_1 = (c \% \theta + (r_1 + 4 \times \Delta) \% \beta)\%\theta + \left\lfloor \frac{c}{\theta} \right\rfloor \times \theta,$$

where $0 \le c_0 < 128$, $0 \le c_1 < 128$, $\theta$ is an integer multiple of 4, $m_0 \times 8$ is exactly divisible by $\theta$, $\Delta$ is an integer, and $\beta$ is an integer multiple of 4, where $$c = \left\lfloor \frac{c_0 \% 32}{2} \right\rfloor \times 4 + c_0 \% 2 + \left(1 - \left\lfloor \frac{c_0}{32} \right\rfloor \% 2\right) \times 2 + \left\lfloor \frac{c_0}{64} \right\rfloor \times 64,$$

Herein, $r_0 = r_1$. A bit in row $i_2$ and column $$\left(\left\lfloor \frac{j_2}{2} \right\rfloor \times 4 + j_2 \% 2 + i_2 + 2\right) \% 16$$

in any block $T_{i_0,j_0}$ ($0 \le i_0 < 2$ and $0 \le j_0 < 8$) in the interleaved block set obtained through the first interleaving processing is 1 bit in the PCS processed 2048 bits, where $0 \le i_2 < 16$ and $0 \le j_2 < 8$.

The PCS processing, the OFEC encoding, and the first interleaving processing are performed on the $d_{scr}$=1079904 scrambled bits, to obtain $$\frac{d_{scr}}{4 \times k} \times (4 \times 4096) = 1376256$$

bits obtained through the first interleaving processing. The bits are sent to an OFEC interleaver for "intra-block inter- leaving" and "inter-block interleaving". A block size of the OFEC interleaver is 172032 bits. A bit length obtained through the first interleaving processing is an integer mul- tiple of 172032. This facilitates a hardware implementation. 1376256 bits output through OFEC interleaving are sent to DP-16QAM symbol mapping and polarization distribution to obtain 172032 dual-polarization symbols, and DSP framing is performed, to be specific, FAWs, TSs, RESs, and PSs are inserted into symbols of X-polarization and Y-polariza- tion to obtain a super-frame including 175104 dual-polar- ization symbols, and then the super-frame is sent.

If a rate of a given data frame is $W_{bit}$ Gbit/s, a corre- sponding baud rate is $W_{baud}$=$W_{bit}$×(10280×$r_{Frame}$+$d_{CP}$)/ (10280× $r_{Frame}$)× (4096/k)× (57/56)/8 Gbaud. A baud rate corresponding to a data frame type FlexO-6e is 130.6 Gbaud.

Embodiment 4

In consideration of a data frame with a rate of 600G, one data frame includes 384 rows, and each row includes 10280 bits. Parameter combination 2 {$r_{Frame}$=261, $d_{CP}$=2232, and k=2664} in Table 3 is considered. In first data processing, $r_{Frame}$=261 rows of data is obtained from the data frame, to obtain a total of $d_{in}$=10280×$r_{Frame}$=2683080 bits. p=29 is considered. CRC-32 check is first performed on $$10280 \times \frac{r_{Frame}}{p} = 92520$$

bits in every $$\frac{r_{Frame}}{p} = \frac{261}{29} = 9$$

rows, to add a total of $d_{CRC}$=29×32=928 CRC parity bits. Then, $d_{PAD}$=1304 pad (Pad) bits are inserted, and scrambling is performed, to obtain $d_{scr}$=10280×$r_{Frame}$+$d_{CRC}$+ $d_{PAD}$=2685312 bits. Overhead corresponding to the CRC check and the pad bit insertion is $$OH_{CP} = \frac{d_{scr}}{d_{in}} - 1 = 0.083\%.$$

As shown in FIG. 4, in second data processing, a plurality of bits that are obtained from a bit data stream output through the first data processing are sent to L=4 PCS and OFEC encoding in a round-robin fashion for PCS processing and OFEC encoding. As shown in FIG. 5, in the PCS and OFEC encoding, $k_{PCS}$=k−1504=1160 bits in k=2664 input bits are sent to the PCS processing, to obtain 2048 bits. k=2664 bits include $k_{PCS}$=k−1504=1160 bits and 1504 bits.

In the PCS processing, an LUT lookup table is used, LUT mapping is performed on $k_{LUT}$=290 input bits each time to output corresponding $n_{LUT}$=512 bits, and after the LUT mapping is performed for four consecutive times, namely, the LUT mapping is performed on a total of k−1504=1160 bits, corresponding 2048 bits are output. It should be noted that, in some other specific embodiments, in the PCS pro- cessing, an LUT lookup table is used, LUT mapping is performed on $k_{LUT}$=145 input bits each time to output corresponding $n_{LUT}$=256 bits, and after the LUT mapping is performed for eight consecutive times, namely, the LUT mapping is performed on a total of k−1504=1160 bits, corresponding 2048 bits are output.

The 2048 bits output through the PCS processing and 1504 bits, a total of 2048+1504=3552 bits, are sent to the OFEC encoding for encoding to insert 544 OFEC parity bits, to obtain a total of 4096 OFEC-encoded bits, namely, a fourth bit set. The 4096 bits are represented by using a block set shown in FIG. 11(*b*), where the PCS processed 2048 bits correspond to the eight square blocks $B_{0,0}$, $B_{0,1}$, $B_{0,4}$, $B_{0,5}$, $B_{1,0}$, $B_{1,1}$, $B_{1,4}$, and $B_{1,5}$ shown in FIG. 11(*b*).

First interleaving processing is performed on the fourth bit set to obtain an interleaved fifth bit set. Bit $c_1$ in 128 bits in row $r_1$ of the interleaved fifth bit set is from bit $c_0$ in 128 bits in row $r_0$ of the fourth bit set, and $$c_1 = (c \% \theta + (r_1 + 4 \times \Delta)\% \beta)\% \theta + \left\lfloor \frac{c}{\theta} \right\rfloor \times \theta,$$

where $0 \le c_0 < 128$, $0 \le c_1 < 128$, $\theta$ is an integer multiple of 4, $m_0 \times 8$ is exactly divisible by $\theta$, $\Delta$ is an integer, and $\beta$ is an integer multiple of 4, where $$c = \left\lfloor \frac{c_0 \% 32}{2} \right\rfloor \times 4 + c_0 \% 2 + \left(1 - \left\lfloor \frac{c_0}{32} \right\rfloor \% 2\right) \times 2 + \left\lfloor \frac{c_0}{64} \right\rfloor \times 64.$$

Herein, $r_0 = r_1$. A bit in row $i_2$ and column $$\left(\left\lfloor \frac{j_2}{2} \right\rfloor \times 4 + j_2 \% 2 + i_2 + 2\right)\% 16$$

in any block $T_{i_0 j_0}$ ($0 \le i_0 < 2$ and $0 \le j_0 < 8$) in the interleaved block set obtained through the first interleaving processing is 1 bit in the PCS processed 2048 bits, where $0 \le i_2 < 16$ and $0 \le j_2 < 8$.

The PCS processing, the OFEC encoding, and the first interleaving processing are performed on the $d_{scr} = 2685312$ scrambled bits, to obtain $$\frac{d_{scr}}{4 \times k} \times (4 \times 4096) = 4128768$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 4128768 bits output through OFEC interleaving are sent to DP-16QAM symbol mapping and polarization distribution to obtain 516096=172032×3 dual-polarization symbols. DSP framing is performed on every 172032 dual-polarization symbols in the 516096=172032×3 dual-polarization symbols, to be specific, FAW frame alignment word symbols, TS training symbols, RES reserved symbols, and PS pilot symbols are inserted into X polarization symbol and Y polarization symbols to obtain one super-frame including 175104 dual-polarization symbols. A total of three super-frames are obtained, and then sent. Typically, the super-frame includes 74 RES reserved symbols.

It should be noted that, $d_{scr} \ne 336 \times k$, and $d_{scr} \times F_{Frame} = 336 \times k$ X $F_{DSP}$ is considered, where $F_{Frame} = 1$ and $F_{DSP} = 3$, the $F_{DSP} = 3$ super-frames may be used as a combination, so that the $F_{DSP}$ super-frames correspond to $d_{scr} \times F_{Frame} = 4128768$ bits output through $F_{Frame} = 1$ first data processing. RES reserved symbols inserted into each super-frame are designed, so that a receiver can identify the $F_{DSP} = 3$ super-frames, to identify a boundary corresponding to the $d_{scr} \times F_{Frame} = 4128768$ bits output through the $F_{Frame} = 1$ first data processing.

It should be noted that a specific implementation of the "RES reserved symbols inserted into each super-frame are designed" is as follows: For the $F_{DSP} = 3$ super-frames, 22 consecutive RES reserved symbols in super-frame 0 are a specific first marker sequence (which may also be referred to as a first marker symbol), 22 consecutive RES reserved symbols in super-frame 1 and super-frame 2 are a specific second marker sequence (which may also be referred to as a second marker symbol), and the first marker sequence is different from the second marker sequence. After performing DSP super-frame alignment, a receiver may obtain a boundary of a combination of the $F_{DSP} = 3$ super-frames by identifying the first marker sequence and the second marker sequence. The first marker and the second marker may also be referred to as $F_{DSP}$ super-frame alignment signals ($F_{DSP}$ super-frame alignment signals). In this case, a remaining RES reserved symbol after the first marker or the second marker is removed is also referred to as a fixed stuff (Fixed Stuff, FS). In some specific implementations, specific values of the first marker sequence and the second marker sequence are shown in Table 4, and 16QAM symbols in two polarization directions corresponding to the first marker sequence and the second marker sequence may be obtained through 16QAM symbol mapping on the sequences.

TABLE 4

| No. | First marker sequence | | Second marker sequence | |
| --- | X polarization | Y polarization | X polarization | Y polarization |
| 0 | 1000 | 0110 | 0001 | 0000 |
| 1 | 1101 | 1110 | 1010 | 1111 |
| 2 | 1011 | 1100 | 0110 | 1100 |
| 3 | 1000 | 1101 | 1100 | 0100 |
| 4 | 1111 | 1110 | 0100 | 0111 |
| 5 | 0001 | 1110 | 0000 | 1111 |
| 6 | 1100 | 1101 | 1011 | 0110 |
| 7 | 0010 | 1011 | 1110 | 1101 |
| 8 | 0100 | 0010 | 0011 | 1101 |
| 9 | 0000 | 1100 | 0111 | 0010 |
| 10 | 1010 | 0000 | 1001 | 0000 |
| 11 | 1001 | 1000 | 1001 | 1100 |
| 12 | 0011 | 0001 | 1110 | 1010 |
| 13 | 0101 | 0111 | 1000 | 1000 |
| 14 | 0111 | 0000 | 1111 | 1001 |
| 15 | 0010 | 0110 | 0001 | 0011 |
| 16 | 0011 | 1110 | 1110 | 0100 |
| 17 | 0100 | 1011 | 1010 | 0110 |
| 18 | 1111 | 0101 | 0100 | 0010 |
| 19 | 1111 | 1110 | 0101 | 0001 |
| 20 | 1000 | 0001 | 1011 | 0110 |
| 21 | 0101 | 1110 | 1101 | 0111 |

If a rate of a given data frame is $W_{bit}$ Gbit/s, a corresponding baud rate is $W_{baud} = W_{bit} \times (10280 \times r_{Frame} + d_{CP}) / (10280 \times r_{Frame}) \times (4096/k) \times (57/56)/8$ Gbaud. A baud rate corresponding to a data frame type FlexO-6e is 118.203 Gbaud. A baud rate corresponding to a data frame type FlexO-6 is 124.102 Gbaud.

It should be noted that, in some specific scenarios, a super-frame including 172032 dual-polarization symbols is also referred to as a multi-frame (multi-frame), and $F_{DSP} = 3$ multi-frames including 172032×3 dual-polarization symbols are also referred to as one super-frame.

Embodiment 5

In consideration of a data frame with a rate of 800G, one data frame includes 512 rows, and each row includes 10280 bits. Parameter combination 3 {$r_{Frame} = 261$, $d_{CP} = 1560$, and k=3196} in Table 3 is considered. In first data processing, $r_{Frame}=261$ rows of data is obtained from the data frame, to obtain a total of $d_{in}=10280 \times r_{Frame}=2683080$ bits.

$p=29$ is considered. CRC-32 check is first performed on $$10280 \times \frac{r_{Frame}}{p} = 92520$$

bits in every $$\frac{r_{Frame}}{p} = \frac{261}{29} = 9$$

rows, to add a total of $d_{CRC}=29 \times 32=928$ CRC parity bits. Then, $d_{PAD}=632$ pad (Pad) bits are inserted, and scrambling is performed, to obtain $d_{scr}=10280 \times r_{Frame}+d_{CRC}+d_{PAD}=2684640$ bits. Overhead corresponding to the CRC check and the pad bit insertion is $$OH_{CP} = \frac{d_{scr}}{d_{in}} - 1 = 0.058\%.$$

As shown in FIG. 4, in second data processing, a plurality of bits that are obtained from a bit data stream output through the first data processing are sent to L=4 PCS and OFEC encoding in a round-robin fashion for PCS processing and OFEC encoding. As shown in FIG. 5, in the PCS and OFEC encoding, $k_{PCS}=k-1504=1692$ bits in k=3196 input bits are sent to the PCS processing, to obtain 2048 bits. k=3196 bits include $k_{PCS}=k-1504=1692$ bits and 1504 bits.

In the PCS processing, an LUT lookup table is used, LUT mapping is performed on $k_{LUT}=423$ input bits each time to output corresponding $n_{LUT}=512$ bits, and after the LUT mapping is performed for four consecutive times, namely, the LUT mapping is performed on a total of k−1504=1692 bits, corresponding 2048 bits are output.

The 2048 bits output through the PCS processing and 1504 bits, a total of 2048+1504=3552 bits, are sent to the OFEC encoding for encoding to insert 544 OFEC parity bits, to obtain a total of 4096 OFEC-encoded bits, namely, a fourth bit set. The 4096 bits are represented by using a block set shown in FIG. 11(a), where the PCS processed 2048 bits correspond to the eight square blocks $B_{0,0}$, $B_{0,1}$, $B_{0,2}$, $B_{0,3}$, $B_{1,0}$, $B_{1,1}$, $B_{1,2}$, and $B_{1,3}$ shown in FIG. 11(a).

First interleaving processing is performed on the fourth bit set (4096 bits) to obtain an interleaved fifth bit set. Bit $C_1$ in 128 bits in row $r_1$ of the interleaved fifth bit set is from bit $c_0$ in 128 bits in row $r_0$ of the fourth bit set, and $$c_1 = (c \ \% \ \theta + (r_1 + 4 \times \Delta)\% \ \beta)\% \ \theta + \left\lfloor \frac{c}{\theta} \right\rfloor \times \theta,$$

where $0 \le c_0 < 128$, $0 \le c_1 < 128$, $\theta$ is an integer multiple of 4, $m_0 \times 8$ is exactly divisible by $\theta$, $\Delta$ is an integer, and $\beta$ is an integer multiple of 4, where $$c = \left\lfloor \frac{c_0 \ \%(m_0 \times 4)}{2} \right\rfloor \times 4 + c_0 \ \%2 + 2 \times \left(1 - \left\lfloor \frac{c_0}{(m_0 \times 4)} \right\rfloor\right),$$

Herein, $r_0=r_1$. A bit in row $i_2$ and column $$\left(\left\lfloor \frac{j_2}{2} \right\rfloor \times 4 + j_2 \ \%2 + i_2 + 2\right)\%16$$

in any square block $T_{i_0 j_0}$ ($0 \le i_0 < 2$ and $0 \le j_0 < 8$) in the interleaved fifth bit set obtained through the first interleaving processing is 1 bit in a PCS processed second bit set (2048 bits), where $0 \le 12 < 16$ and $0 \le j_2 < 8$.

The PCS processing, the OFEC encoding, and the first interleaving processing are performed on the $d_{scr}=2684640$ scrambled bits, to obtain $$\frac{d_{scr}}{4 \times k} \times (4 \times 4096) = 3440640$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 3440640 bits output through OFEC interleaving are sent to DP-16QAM symbol mapping and polarization distribution to obtain 430080 dual-polarization symbols.

It should be noted that $d_{scr} \ne 336 \times k$, and $d_{scr} \times F_{Frame}=336 \times k \times F_{DSP}$ is considered, where $F_{Frame}=2$ and $F_{DSP}=5$. In other words, $d_{scr} \times F_{Frame}=5369280$ bits output through $F_{Frame}=2$ first data processing correspond to 860160 dual-polarization symbols. DSP framing is performed on every 172032 dual-polarization symbols in the 860160=172032×5 dual-polarization symbols, to be specific, FAW frame alignment word symbols, TS training symbols, RES reserved symbols, and PS pilot symbols are inserted into X polarization symbol and Y polarization symbols to obtain one super-frame including 175104 dual-polarization symbols. A total of 5 super-frames are obtained, and then sent. Typically, the super-frame includes 74 RES reserved symbols.

The $F_{DSP}=5$ super-frames are used as a combination, so that the $F_{DSP}=5$ super-frames correspond to the $d_{scr} \times F_{Frame}=5369280$ bits output through the $F_{Frame}=2$ first data processing. RES reserved symbols inserted into each super-frame are designed, so that a receiver can identify the $F_{DSP}=5$ super-frames, to identify a boundary corresponding to the $d_{scr} \times F_{Frame}=5369280$ bits output through the $F_{Frame}=2$ first data processing.

It should be noted that a specific implementation of the "RES reserved symbols inserted into each super-frame are designed" is as follows: For the $F_{DSP}=5$ super-frames, 22 consecutive RES reserved symbols in super-frame 0 are a specific first marker sequence, 22 consecutive RES reserved symbols in super-frame 1 and super-frame 4 are a specific second marker sequence, and the first marker sequence is different from the second marker sequence. After performing DSP super-frame alignment, a receiver may obtain a boundary of a combination of the $F_{DSP}=5$ super-frames by identifying the first marker sequence and the second marker sequence. A specific implementation of the "RES reserved symbols inserted into each super-frame are designed" is as follows: For the $F_{DSP}=5$ super-frames, 22 consecutive RES reserved symbols in super-frame 0 and super-frame 1 are a specific first marker sequence (which may also be referred to as a first marker symbol), 22 consecutive RES reserved symbols in super-frame 2 to super-frame 4 are a specific second marker sequence (which may also be referred to as a second marker symbol), and the first marker sequence is different from the second marker sequence. After performing DSP super-frame alignment, a receiver may obtain a boundary of a combination of the $F_{DSP}=5$ super-frames by identifying the first marker sequence and the second marker sequence. The first marker and the second marker may also be referred to as $F_{DSP}$ super-frame alignment markers ($F_{DSP}$ superframe alignment signals). In this case, a remaining RES reserved symbol after the first marker or the second marker is removed is also referred to as a fixed stuff (Fixed Stuff, FS). In some specific implementations, specific values of the first marker symbol and the second marker symbol are shown in Table 5.

TABLE 5

| No. | First marker symbol | | Second marker symbol | |
| | X polarization | Y polarization | X polarization | Y polarization |
|---|---|---|---|---|
| 0 | 3 − 3j | −1 + 3j | −3 − 1j | −3 − 3j |
| 1 | 1 − 1j | 1 + 3j | 3 + 3j | 1 + 1j |
| 2 | 3 + 1j | 1 − 3j | −1 + 3j | 1 − 3j |
| 3 | 3 − 3j | 1 − 1j | 1 − 3j | −1 − 3j |
| 4 | 1 + 1j | 1 + 3j | −1 − 3j | −1 + 1j |
| 5 | −3 − 1j | 1 + 3j | −3 − 3j | 1 + 1j |
| 6 | 1 − 3j | 1 − 1j | 3 + 1j | −1 + 3j |
| 7 | −3 + 3j | 3 + 1j | 1 + 3j | 1 − 1j |
| 8 | −1 − 3j | −3 + 3j | −3 + 1j | 1 − 1j |
| 9 | −3 − 3j | 1 − 3j | −1 + 1j | −3 + 3j |
| 10 | 3 + 3j | −3 − 3j | 3 − 1j | −3 − 3j |
| 11 | 3 − 1j | 3 − 3j | 3 − 1j | 1 − 3j |
| 12 | −3 + 1j | −3 − 1j | 1 + 3j | 3 + 3j |
| 13 | −1 − 1j | −1 + 1j | 3 − 3j | 3 − 3j |
| 14 | −1 + 1j | −3 − 3j | 1 + 1j | 3 − 1j |
| 15 | −3 + 3j | −1 + 3j | −3 − 1j | −3 + 1j |
| 16 | −3 + 1j | 1 + 3j | 1 + 3j | −1 − 3j |
| 17 | −1 − 3j | 3 + 1j | 3 + 3j | −1 + 3j |
| 18 | 1 + 1j | −1 − 1j | −1 − 3j | −3 + 3j |
| 19 | 1 + 1j | 1 + 3j | −1 − 1j | −3 − 1j |
| 20 | 3 − 3j | −3 − 1j | 3 + 1j | −1 + 3j |
| 21 | −1 − 1j | 1 + 3j | 1 − 1j | −1 + 1j |

If a rate of a given data frame is $W_{bit}$ Gbit/s, a corresponding baud rate is $W_{baud}=W_{bit}\times(10280\times r_{Frame}+d_{CP})/(10280\times r_{Frame})\times(4096/k)\times(57/56)/8$ Gbaud. A baud rate corresponding to a data frame type FlexO-8e is 131.337 Gbaud.

It should be noted that, in some specific scenarios, a super-frame including 175104 dual-polarization symbols is also referred to as a multi-frame (multi-frame), and $F_{DSP}=5$ multi-frames including 175104×5 dual-polarization symbols are also referred to as one super-frame.

Embodiment 6

In consideration of a data frame with a rate of 600G, each row of one data frame includes q bits. In first data processing, $r_{Frame}$ rows of data is obtained from the data frame, to obtain a total of $d_{in}=q\times r_{Frame}$ bits. Then, CRC and/or pad bit insertion are/is performed on first data, to obtain second data. $d_{CRC}$ CRC parity bits are added in the CRC operation, and $d_{PAD}$ pad (Pad) bits are inserted in the pad insertion operation. Further, the second data is scrambled to obtain third data, where a quantity of bits of the third data is $d_{scr}=q\times r_{Frame}+d_{CP}$ scrambled bits, where $d_{CP}=d_{CRC}+d_{PAD}$. PCS and OFEC encoding, first interleaving processing, OFEC interleaving, and 16QAM symbol mapping and polarization distribution are performed on the scrambled bit data to obtain 172032 dual-polarization symbols, and DSP framing with overhead 1/56 is performed to obtain one super-frame including 175104 dual-polarization symbols, where a formula 1 is as follows:

$$d_{scr} = q \times r_{Frame} + d_{CP} = 336 \times k$$

A baud rate corresponding to the data processing is $W_{baud}=W_{bit}\times(q\times r_{Frame}+d_{CP})/(q\times r_{Frame})\times(4096/k)\times(57/56)/8$ Gbaud, where $W_{bit}$ is a specific bit rate value corresponding to the 600G data frame. In this embodiment, in the 600G rate scenario in which a PCS is used, a corresponding baud rate $W_{baud}$ is the same as that in a baud rate scenario of the existing 800 G ZR, and a formula 2 is as follows:

$$3 \times \frac{q \times r_{Frame} + d_{CP}}{q \times r_{Frame}} \times \left(\frac{4096}{k}\right) = 4 \times \frac{116 \times 10280 + 992}{116 \times 10280} \times \left(\frac{4096}{3552}\right)$$

With reference to the formula 1 and the formula 2, $$3 \times \frac{336 \times k}{q \times r_{Frame}} \times \left(\frac{4096}{k}\right) = 4 \times \frac{116 \times 10280 + 992}{116 \times 10280} \times \left(\frac{4096}{3552}\right)$$

In other words, a formula 3 is as follows:

$$q \times r_{Frame} = \frac{3 \times 336 \times 116 \times 10280 \times 3552}{4 \times (116 \times 10280 + 992)} = 894360$$

It is considered that one data frame at the rate of 600G includes 512 rows, and each row includes q=10280 bits. In this case, $$r_{Frame} = \frac{894360}{q} = 87$$

It should be noted that, in this embodiment, the first data of $d_{in}=q\times r_{Frame}=894360$ bits is obtained from the data frame through the first data processing, where the first data includes $$r_{Frame} = \frac{894360}{q}$$

rows in the data frame, and each row includes q bits. In this embodiment, an example in which each row includes q=10280 bits is used. The used value of q may alternatively be another integer that is an integer multiple of 257, for example, q=2056. When q=2056, $$r_{Frame} = \frac{894360}{q} = 435.$$

It is considered that overhead corresponding to the CRC check and the pad bit insertion is $$OH_{CP} = \frac{d_{scr}}{d_{in}} - 1 > 0,$$

and $q \times r_{Frame} + d_{CP} > q \times r_{Frame}$. With reference to the formula 1 and the formula 3, $336 \times k > 894360$, in other words, the integer $k \geq 2662$.

In PCS processing, input $k_{LUT}$ bits are mapped by using a lookup table (lookup table, LUT), to output corresponding $n_{LUT}$ bits. The quantity $n_{LUT}$ of output bits of the PCS processing cannot be excessively small. Otherwise, performance of the overall PCS processing is deteriorated. The quantity $n_{LUT}$ of output bits of the PCS processing also cannot be too large. Otherwise, it is not conducive to a hardware implementation. Typically, $n_{LUT}=128$ or 256. When $n_{LUT}=128$, in the PCS processing, after LUT mapping is performed for $2048/128=16$ consecutive times, namely, the LUT mapping is performed on a total of $k-1504$ bits (a first bit set), corresponding 2048 bits (corresponding to a second bit set) are output, where the integer $k-1504$ is an integer multiple of 16. When $n_{LUT}=256$, in the PCS processing, after LUT mapping is performed for $2048/256=8$ consecutive times, namely, the LUT mapping is performed on a total of $k-1504$ bits (a first bit set), corresponding 2048 bits (corresponding to a second bit set) are output, where the integer $k-1504$ is an integer multiple of 8. Therefore, the integer $k-1504$ is an integer multiple of 8.

Because the overhead is $$OH_{CP} = \frac{d_{scr}}{d_{in}} - 1 = \frac{336 \times k}{894360} - 1,$$

a larger integer $k$ indicates larger overhead $OH_{CP}$. Typically, a value of the overhead $OH_{CP}$ is small, to improve system availability. Further, because the integer $k \geq 2662$ and the integer $k-1504$ is an integer multiple of 8, a typical value of the integer $k$ may be 2664 or 2672. A corresponding typical parameter combination is shown in Table 6.

It should be noted that, when a parameter combination $\{r_{Frame}=87, d_{CP}=744,$ and $k=2664\}$ with a sequence number 1 in Table 6 is used, a smallest value of the quantity $n_{LUT}$ of bits output using the lookup table in the PCS processing is 256, and the overhead of the CRC and the PAD is $OH_{CP}=0.083\%$. When a parameter combination $\{r_{Frame}=87, d_{CP}=3432,$ and $k=2672\}$ with a sequence number 2 in Table 6 is used, a smallest value of the quantity $n_{LUT}$ of bits output using the lookup table in the PCS processing is 128, and the overhead of the CRC and the PAD is $OH_{CP}=0.384\%$. In the two parameter combinations, specific implementation complexity of the lookup table in the PCS processing corresponding to the sequence number 1 is high, but the overhead $OH_{CP}$ of the CRC and the PAD is small; and specific implementation complexity of the PCS lookup table corresponding to the sequence number 2 is low, but the overhead $OH_{CP}$ of the CRC and the PAD is large. The parameter combination with the sequence number 1 or the sequence number 2 may be selected based on a specific application scenario for implementation.

TABLE 6

| No. | $r_{Frame}$ | $d_{CP}$ | k | $k_{PCS}$ | $OH_{CP}$ | Baud rate Gbaud | |
| | | | | | | FlexO-6e | FlexO-6 |
| --- | --- | --- | --- | --- | --- | --- | --- |
| 1 | 87 | 744 | 2664 | 1160 | 0.083% | 118.203 | 124.102 |
| 2 | 87 | 3432 | 2672 | 1168 | 0.384% | 118.203 | 124.102 |

It should be noted that, for the parameter combination $\{r_{Frame}=87, d_{CP}=3432,$ and $k=2672\}$ with the sequence number 2 in Table 6, a parameter $p=29$ is selected. Correspondingly, in first data processing, $r_{Frame}=87$ rows of data is obtained from a data frame, to obtain a total of $d_{in}=10280 \times r_{Frame}=894360$ bits. CRC-32 check is first performed on $$10280 \times \frac{r_{Frame}}{p} = 30840$$

bits in every $$\frac{r_{Frame}}{p} = \frac{87}{29} = 3$$

rows, to add a total of $d_{CRC}=29 \times 32=928$ CRC parity bits. Then, $d_{PAD}=2504$ pad (Pad) bits are inserted, and scrambling is performed, to obtain $d_{scr}=10280 \times r_{Frame}+d_{CRC}+d_{PAD}=897792$ scrambled bits.

As shown in FIG. 4, in second data processing, a plurality of bits that are obtained from a bit data stream output through the first data processing are sent to $L=4$ PCS and OFEC encoding in a round-robin fashion for PCS processing and OFEC encoding. As shown in FIG. 5, in the PCS and OFEC encoding, $k_{PCS}=k-1504=1168$ bits in $k=2672$ input bits are sent to the PCS processing, to obtain 2048 bits. $k=2672$ bits include the $k_{PCS}=k-1504=1168$ bits sent to the PCS processing and remaining 1504 bits.

In the PCS processing, an LUT lookup table is used, LUT mapping is performed on $k_{LUT}=73$ input bits each time to output corresponding $n_{LUT}=128$ bits, and after the LUT mapping is performed for 16 consecutive times, namely, the LUT mapping is performed on a total of $k-1504=1168$ bits, corresponding 2048 bits are output.

The 2048 bits output through the PCS processing and 1504 bits, a total of $2048+1504=3552$ bits, are sent to the OFEC encoding for encoding to insert 544 OFEC parity bits, to obtain a total of 4096 OFEC-encoded bits, namely, a fourth bit set. The 4096 bits are represented by using a block set shown in FIG. 11($b$), where the PCS processed 2048 bits correspond to the eight square blocks $B_{0,0}, B_{0,1}, B_{0,4}, B_{0,5}, B_{1,0}, B_{1,1}, B_{1,4},$ and $B_{1,5}$ shown in FIG. 11($b$).

Positions of the 2048 bits in the second bit set in a codeword of the FEC encoding are non-consecutive. In this case, when the second bit set and a third bit set are sent to the FEC encoding, pre-encoding interleaving processing is further performed to disorder a sequence, so that a sequence of 3552 bits before the encoding is as follows: first 1024 consecutive bits from the second bit set, then 1024 consecutive bits from the third bit set, then 1024 consecutive bits from the second bit set, and finally 480 consecutive bits from the third bit set.

First interleaving processing is performed on the fourth bit set to obtain an interleaved fifth bit set. Bit $C_1$ in 128 bits in row $r_1$ of the interleaved fifth bit set is from bit $c_0$ in 128 bits in row $r_0$ of the fourth bit set, and $$c_1 = (c \% \theta + (r_1 + 4 \times \Delta) \% \beta) \% \theta + \left\lfloor \frac{c}{\theta} \right\rfloor \times \theta,$$

where $0 \leq c_0 < 128$, $0 < < < 128$, $\theta$ is an integer multiple of 4, $m_0 \times 8$ is exactly divisible by $\theta$, $\Delta$ is an integer, and $\beta$ is an integer multiple of 4, where $$c = \left\lfloor \frac{c_0 \% 32}{2} \right\rfloor \times 4 + c_0 \% 2 + \left(1 - \left\lfloor \frac{c_0}{32} \right\rfloor \% 2\right) \times 2 + \left\lfloor \frac{c_0}{64} \right\rfloor \times 64.$$

Herein, $r_0 = r_1$. A bit in row $i_2$ and column $$\left(\left\lfloor \frac{j_2}{2} \right\rfloor \times 4 + j_2 \% 2 + i_2 + 2\right) \% 16$$

in any block $T_{i_0,j_0}$ ($0 \le i_0 < 2$ and $0 \le j_0 < 8$) in the interleaved block set obtained through the first interleaving processing is 1 bit in the PCS processed 2048 bits, where $0 \le i_2 < 16$ and $0 \le j_2 < 8$.

The PCS processing, the OFEC encoding, and the first interleaving processing are performed on the $d_{scr} = 897792$ scrambled bits, to obtain $$\frac{d_{scr}}{4 \times k} \times (4 \times 4096) = 1376256$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 1376256 bits output through OFEC interleaving are sent to DP-16QAM symbol mapping and polarization distribution to obtain 172032 dual-polarization symbols, and DSP framing is performed, to be specific, FAWs, TSs, RESs, and PSs are inserted into symbols of X-polarization and Y-polarization to obtain a super-frame including 175104 dual-polarization symbols, and then the super-frame is sent.

If a rate of a given data frame is $W_{bit}$ Gbit/s, a corresponding baud rate is $W_{baud} = W_{bit} \times (10280 \times r_{Frame} + d_{CP})/(10280 \times r_{Frame}) \times (4096/k) \times (57/56)/8$ Gbaud. A baud rate corresponding to a data frame type FlexO-6e is 118.203 Gbaud, which is the same as that in 800ZR.

Embodiment 7

Figure 17B:
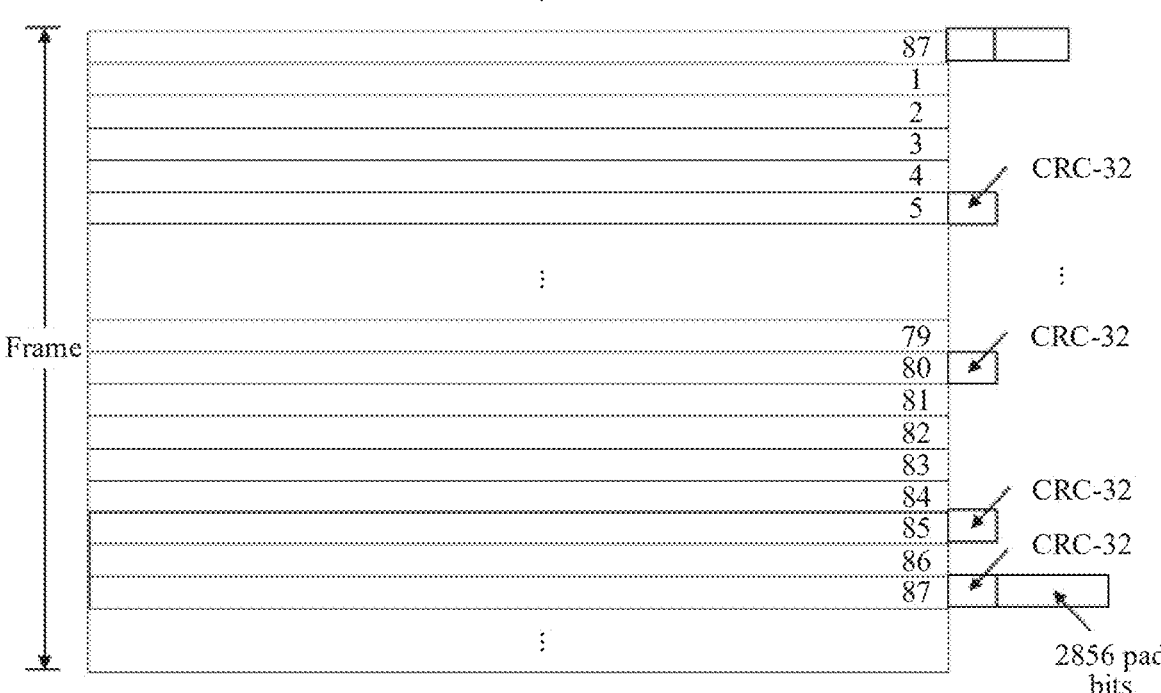
FIG. 17(b) is a diagram of another implementation of performing CRC on a data frame according to an embodiment of this application.

FIG. 17(b) is a diagram of another implementation of performing CRC on a data frame according to an embodiment of this application. Based on Embodiment 6, the parameter combination $\{r_{Frame} = 87, d_{CP} = 3432, \text{and } k = 2672\}$ with the sequence number 2 in Table 6 is considered, and a parameter $p = 18$ is selected. FIG. 17(b) is referred for understanding. Correspondingly, in first data processing, $r_{Frame} = 87$ rows of data is obtained from the data frame, to obtain a total of $d_{in} = 10280 \times r_{Frame} = 894360$ bits. An integer $r_{F0} = \lfloor r_{Frame}/p \rfloor + 1 = 5$ and an integer $r_{F1} = r_{Frame} - F_0 \times (p-1) = 87 - 5 \times 17 = 2$ are considered. For the $r_{Frame} = 87$ rows of data obtained from the data frame, CRC-32 is performed on a total of $10280 \times r_{F0} = 51400$ bits in every $r_{F0} = 5$ rows in first $r_{F0} \times (p-1) = 85$ rows to add 32 parity bits, to obtain a total of $32 \times (p-1) = 544$ CRC parity bits, and CRC-32 is performed on a total of $10280 \times r_{F1} = 20560$ bits of last $r_{F1} = \text{two}$ rows to add 32 parity bits, to obtain a total of $d_{CRC} = 32 \times p = 576$ CRC parity bits. Then, $d_{PAD} = 2856$ pad (Pad) bits are inserted, and scrambling is performed, to obtain $d_{scr} = 10280 \times r_{Frame} + d_{CRC} + d_{PAD} = 897792$ scrambled bits.

Embodiment 8

Figure 17C:
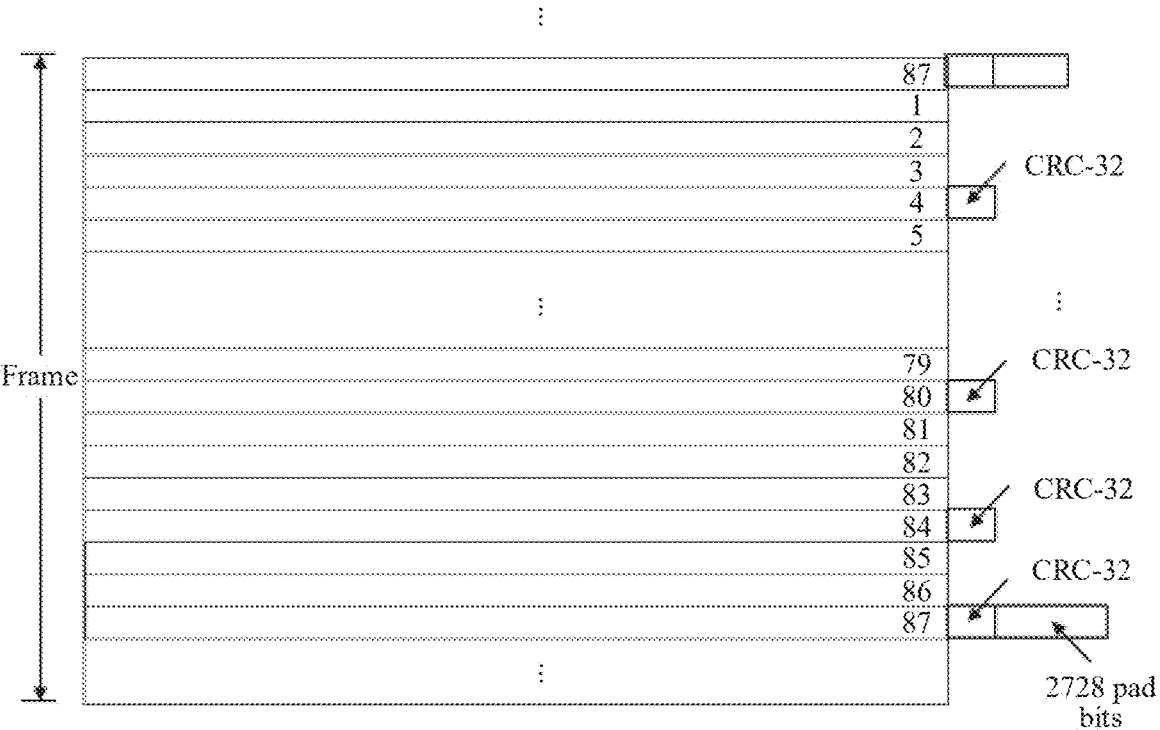
FIG. 17(c) is a diagram of another implementation of performing CRC on a data frame according to an embodiment of this application.

FIG. 17(c) is a diagram of another implementation of performing CRC on a data frame according to an embodiment of this application. Based on Embodiment 6, the parameter combination $\{r_{Frame} = 87, d_{CP} = 3432, \text{and } k = 2672\}$ with the sequence number 2 in Table 6 is considered, and a parameter $p = 22$ is selected. FIG. 17(c) is referred for understanding. Correspondingly, in first data processing, $r_{Frame} = 87$ rows of data is obtained from the data frame, to obtain a total of $d_{in} = 10280 \times r_{Frame} = 894360$ bits. An integer $r_{F0} = \lfloor r_{Frame}/p \rfloor + 1 = 4$ and an integer $r_{F1} = r_{Frame} - r_{F0} \times (p-1) = 87 - 4 \times 21 = 3$ are considered. For the $r_{Frame} = 87$ rows of data obtained from the data frame, CRC-32 is performed on a total of $10280 \times r_{F0} = 41120$ bits in every $r_{F0} = 4$ rows in first $r_{F0} \times (p-1) = 84$ rows to add 32 parity bits, to obtain a total of $32 \times (p-1) = 672$ CRC parity bits, and CRC-32 is performed on a total of $10280 \times r_{F1} = 30840$ bits of last $r_{F1} = 3$ rows to add 32 parity bits, to obtain a total of $d_{CRC} = 32 \times p = 704$ CRC parity bits. Then, $d_{PAD} = 2728$ pad (Pad) bits are inserted, and scrambling is performed, to obtain $d_{scr} = 10280 \times r_{Frame} + d_{CRC} + d_{PAD} = 897792$ scrambled bits. It should be noted that, the CRC-32 is performed on the total of $q \times r_{F0} = 41120$ bits in every $r_{F0} = 4$ rows in the first $r_{F0} \times (p-1) = 84$ rows of the $r_{Frame} = 87$ rows of data. Operations in CRC-32 in the existing 800G ZR may be directly used as encoding and detection operations in the CRC-32, where the operations in the CRC-32 are performed on data of a total of $4 \times 10280 = 41120$ bits in four rows and 10280 columns in the existing 800G ZR.

It should be noted that, in the foregoing scenario, it is considered that each row of the data frame includes $q = 10280$ bits. In some other possible scenarios, each row of the data frame includes $q = 2056$ bits. In an example, a parameter combination $\{q = 2056, r_{Frame} = 435, d_{CP} = 3432, \text{and } k = 2672\}$ is considered, and a parameter $p = 22$ is selected. In this case, in first data processing, $r_{Frame} = 435$ rows of data is obtained from the data frame, to obtain a total of $d_{in} = q \times r_{Frame} = 894360$ bits. An integer $r_{F0} = \lfloor r_{Frame}/p \rfloor + 1 = 20$ and an integer $r_{F1} = r_{Frame} - r_{F0} \times (p-1) = 435 - 20 \times 21 = 15$ are considered. For the $r_{Frame} = 435$ rows of data obtained from the data frame, CRC-32 is performed on a total of $q \times r_{F0} = 41120$ bits in every $r_{F0} = 20$ rows in first $r_{F0} \times (p-1) = 420$ rows to add 32 parity bits, to obtain a total of $32 \times (p-1) = 672$ CRC parity bits, and CRC-32 is performed on a total of $q \times r_{F1} = 30840$ bits of last $r_{F1} = 15$ rows to add 32 parity bits, to obtain a total of $d_{CRC} = 32 \times p = 704$ CRC parity bits. Then, $d_{PAD} = 2728$ pad (Pad) bits are inserted, and scrambling is performed, to obtain $d_{scr} = q \times r_{Frame} + d_{CRC} + d_{PAD} = 897792$ scrambled bits.

It should be noted that the parameter combination $\{r_{Frame} = 87, d_{CP} = 744, \text{and } k = 2664\}$ with the sequence number 1 in Table 6 is applied to a scenario in which each row of the data frame includes $q = 10280$ bits. For a scenario applicable to a case each row of the data frame includes $q = 2056$ bits, a parameter combination $\{q = 2056, r_{Frame} = 435, d_{CP} = 744, \text{and } k = 2664\}$ is considered, and a parameter $p = 22$ is selected. In this case, in first data processing, $r_{Frame} = 435$ rows of data is obtained from the data frame, to obtain a total of $d_{in} = q \times r_{Frame} = 894360$ bits. An integer $r_{F0} = \lfloor r_{Frame}/p \rfloor + 1 = 20$ and an integer $r_{F1} = r_{Frame} - r_{F0} \times (p-1) = 435 - 20 \times 21 = 15$ are considered. For the $r_{Frame} = 435$ rows of data obtained from the data frame, CRC-32 is performed on a total of $q \times r_{F0} = 41120$ bits in every $r_{F0} = 20$ rows in first $r_{F0} \times (p-1) = 420$ rows to add 32 parity bits, to obtain a total of $32 \times (p-1) = 672$ CRC parity bits, and CRC-32 is performed on a total of $q \times r_{F1} = 30840$ bits of last $r_{F1} = 15$ rows to add 32 parity bits, to obtain a total of $d_{CRC} = 32 \times p = 704$ CRC parity bits. Then, $d_{PAD} = 40$ pad (Pad) bits are inserted, and scrambling is performed, to obtain $d_{scr} = q \times r_{Frame} + d_{CRC} + d_{PAD} = 895104$ scrambled bits.

It should be noted that, in the scenario in which operations in the CRC-32 are performed on the total of $q \times r_{F0}=41120$ bits in every $r_{F0}=20$ rows in the first $r_{F0} \times (p-1)=420$ rows in the $r_{Frame}=435$ rows of data, operations in CRC-32 in the existing 800G ZR may be directly used as encoding and detection operations in the CRC-32, and a difference lies in that in the existing 800G ZR, the operations in the CRC-32 are performed on a total of $4 \times 10280=41120$ bits in four rows and 10280 columns. It should be understood that, in the scenario in which operations in the CRC-32 are performed on the total of $q \times r_{F1}=30840$ bits in the last $r_{F1}=15$ rows in the $r_{Frame}=435$ rows of data, encoding and detection operations in the CRC-32 may also use similar operations in the CRC-32 in 800G ZR, but quantities of input bits are different.

Embodiment 9

In consideration of a data frame with a rate of 800G, each row of one data frame includes $q=10280$ bits. In first data processing, $r_{Frame}$ rows of data is obtained from the data frame, to obtain a total of $d_{in}=q \times r_{Frame}$ bits. Then, CRC and/or pad bit insertion are/is performed on first data, to obtain second data. $d_{CRC}$ CRC parity bits are added in the CRC operation, and $d_{PAD}$ pad (Pad) bits are inserted in the pad insertion operation. Further, the second data is scrambled to obtain third data, where a quantity of bits of the third data is $d_{scr}=q \times r_{Frame}+d_{CP}$ scrambled bits, where $d_{CP}=d_{CRC}+d_{PAD}$. PCS and OFEC encoding, first interleaving processing, OFEC interleaving, and 16QAM symbol mapping and polarization distribution are performed on the scrambled bit data to obtain 172032 dual-polarization symbols, and DSP framing with overhead $1/56$ is performed to obtain one super-frame including 175104 dual-polarization symbols:

$$d_{scr} = 10280 \times r_{Frame} + d_{CP} = 336 \times k$$

A baud rate corresponding to the data processing is $$W_{baud} = W_{bit} \times \frac{10280 \times r_{Frame} + d_{CP}}{10280 \times r_{Frame}} \times \left(\frac{4096}{k}\right) \times \frac{\frac{57}{56}}{8} Gbaud,$$

where $W_{bit}$ is a specific bit rate value corresponding to the 800G data frame. In this embodiment, a FlexO-8 data frame is considered, a bit rate of the FlexO-8 data frame is approximately $W_{bit} \approx 845.1481$ Gbit/s, and a baud rate $W_{baud}$ is approximately 131 GBaud. Because $$k \approx W_{bit} \times 4096 \times \frac{\frac{57}{56}}{8} \bigg/ (131G) \approx 3362$$

and an integer $k-1504$ is an integer multiple of 8, it is considered that a value of the integer k may be 3360, 3368, or 3376.

When $k=3360$, $d_{scr}=336 \times k=1128960$. Because $r_{Frame}=\lfloor 1128960/10280 \rfloor=109$, $d_{CP}=d_{scr}-10280 \times r_{Frame}=8440$. In this case, a specific value of the baud rate is $$W_{baud} =$$

-continued $$W_{bit} \times \frac{10280 \times r_{Frame} + d_{CP}}{10280 \times r_{Frame}} \times \left(\frac{4096}{k}\right) \times \frac{\frac{57}{56}}{8} Gbaud \approx 132.072 \ Gbaud.$$

A maximum baud rate corresponding to a typical low power-consuming component in the industry is about 131 Gbaud. Therefore, the value of $k=3360$ is not applicable to an application scenario requiring low power consumption.

When $k=3368$, $d_{scr}=336 \times k=1131648$. Because $r_{Frame}=\lfloor 1131648/10280 \rfloor=110$, $d_{CP}=d_{scr}-10280 \times r_{Frame}=1131648-1130800=848$. In this case, a specific value of the baud rate is $$W_{baud} =$$

$$W_{bit} \times \frac{10280 \times r_{Frame} + d_{CP}}{10280 \times r_{Frame}} \times \left(\frac{4096}{k}\right) \times \frac{\frac{57}{56}}{8} Gbaud \approx 130.871 \ Gbaud.$$

When $k=3376$, $d_{scr}=336 \times k=1134336$. Because $r_{Frame}=\lfloor 1134336/10280 \rfloor=110$, $d_{CP}=d_{scr}-10280 \times r_{Frame}=1134336-1130800=3536$. In this case, a specific value of the baud rate is $$W_{baud} =$$

$$W_{bit} \times \frac{10280 \times r_{Frame} + d_{CP}}{10280 \times r_{Frame}} \times \left(\frac{4096}{k}\right) \times \frac{\frac{57}{56}}{8} Gbaud \approx 130.871 \ Gbaud.$$

Therefore, a typical value of the integer k may be 3368 or 3376. A corresponding typical parameter combination is shown in Table 7.

It should be noted that, when a parameter combination $\{r_{Frame}=110, d_{CP}=848, \text{ and } k=3368\}$ with a sequence number 1 in Table 7 is used, a smallest value of a quantity $n_{LUT}$ of bits output using a lookup table in PCS processing is 256, and overhead of the CRC and the PAD is $OH_{CP}=0.075\%$. It should be noted that, when a parameter combination $\{r_{Frame}=110, d_{CP}=3536, \text{ and } k=3376\}$ with a sequence number 2 in Table 7 is used, a smallest value of a quantity $n_{LUT}$ of bits output using a lookup table in the PCS processing is 128, and overhead of the CRC and the PAD is $OH_{CP}=0.313\%$. In the two parameter combinations, specific implementation complexity of the PCS lookup table corresponding to the sequence number 1 is high, but the overhead $OH_{CP}$ of the CRC and the PAD is small; and specific implementation complexity of the PCS lookup table corresponding to the sequence number 2 is low, but the overhead $OH_{CP}$ of the CRC and the PAD is large. The parameter combination with the sequence number 1 or the sequence number 2 may be selected based on a specific application scenario for implementation.

TABLE 7

| No. | $r_{Frame}$ | $d_{CP}$ | k | $k_{PCS}$ | $OH_{CP}$ | FlexO-8 baud rate Gbaud |
|-----|-------------|----------|------|-----------|-----------|--------------------------|
| 1 | 110 | 848 | 3368 | 1864 | 0.075% | 130.871 |
| 2 | 110 | 3536 | 3376 | 1872 | 0.313% | 130.871 |

It should be noted that, for the parameter combination $\{r_{Frame}=110, d_{CP}=848, \text{ and } k=3368\}$ with the sequence number 1 in Table 7, a parameter $p=22$ is selected. For a specific implementation, refer to Embodiment 1. For the parameter combination $\{r_{Frame}=110, d_{CP}=3536,$ and $k=3376\}$ with the sequence number 1 in Table 7, the parameter $p=22$ is selected. Correspondingly, in first data processing, $r_{Frame}=110$ rows of data is obtained from the data frame, to obtain a total of $d_{in}=10280\times r_{Frame}=1130800$ bits. CRC-32 check is first performed on $$10280 \times \frac{r_{Frame}}{p} = 51400$$

bits in every $$\frac{r_{Frame}}{p} = \frac{110}{22} = 5$$

rows, to add a total of $d_{CRC}=22\times32=704$ CRC parity bits. Then, $d_{PAD}=2832$ pad (Pad) bits are inserted, and scrambling is performed, to obtain $d_{scr}=10280\times r_{Frame}+d_{CRC}+d_{PAD}=1134336$ scrambled bits.

Embodiment 10

Based on Embodiment 9, a FlexO-8e data frame is considered, a bit rate of the FlexO-8 data frame is approximately $W_{bit}\approx804.9795$ Gbit/s, and a baud rate $W_{baud}$ is approximately 131 GBaud. Because $$k \approx W_{bit} \times 4096 \times \frac{\frac{57}{56}}{8} \bigg/ (131G) \approx 3202$$

and an integer $k-1504$ is an integer multiple of 8, it is considered that a value of the integer k may be 3184, 3192, 3200, 3208, or 3216.

When $k=3184$, $d_{scr}=336\times k=1069824$. Because $r_{Frame}=\lfloor1069824/10280\rfloor=104$, $d_{CP}=d_{scr}-10280\times r_{Frame}=1069824-1069120=704$. In this case, overhead of CRC and PAD is 0.066%, and a specific value of the baud rate is $$W_{baud} =$$

$$W_{bit} \times \frac{10280 \times r_{Frame} + d_{CP}}{10280 \times r_{Frame}} \times \left(\frac{4096}{k}\right) \times \frac{\frac{57}{56}}{8} Gbaud \approx 131.842\ Gbaud.$$

When $k=3192$, $d_{scr}=336\times k=1072512$. Because $r_{Frame}=\lfloor1072512/10280\rfloor=104$, $d_{CP}=d_{scr}-10280\times r_{Frame}=1072512-1069120=3392$. In this case, overhead of CRC and PAD is 0.317%, and a specific value of the baud rate $$W_{baud} =$$

$$W_{bit} \times \frac{10280 \times r_{Frame} + d_{CP}}{10280 \times r_{Frame}} \times \left(\frac{4096}{k}\right) \times \frac{\frac{57}{56}}{8} Gbaud \approx 131.842\ Gbaud.$$

When $k=3200$, $d_{scr}=336\times k=1075200$. Because $r_{Frame}=\lfloor1075200/10280\rfloor=104$, $d_{CP}=d_{scr}-10280\times$ $r_{Frame}=1077888-1069120=6080$. In this case, overhead of CRC and PAD is 0.569%, and the overhead is large.

When $k=3208$, $d_{scr}=336\times k=1077888$. Because $r_{Frame}=\lfloor1131648/10280\rfloor=104$, $d_{CP}=d_{scr}-10280\times r_{Frame}=1077888-1069120=8768$. In this case, overhead of CRC and PAD is 0.82%, and the overhead is large.

When $k=3216$, $d_{scr}=336\times k=1080576$. Because $r_{Frame}=\lfloor1080576/10280\rfloor=105$, $d_{CP}=d_{scr}-10280\times r_{Frame}=1080576-1079400=1176$. In this case, overhead of CRC and PAD is 0.109%, and a specific value of the baud rate is $$W_{baud} =$$

$$W_{bit} \times \frac{10280 \times r_{Frame} + d_{CP}}{10280 \times r_{Frame}} \times \left(\frac{4096}{k}\right) \times \frac{\frac{57}{56}}{8} Gbaud \approx 130.587\ Gbaud.$$

Therefore, a typical value of the integer k may be 3184, 3192, or 3216. A corresponding typical parameter combination is shown in Table 8.

TABLE 8

| No. | $r_{Frame}$ | $d_{CP}$ | k | $k_{PCS}$ | $OH_{CP}$ | FlexO-8e baud rate Gbaud |
|-----|-------------|----------|-----|-----------|-----------|--------------------------|
| 1 | 104 | 704 | 3184 | 1680 | 0.066% | 131.842 |
| 2 | 104 | 3392 | 3192 | 1688 | 0.317% | 131.842 |
| 3 | 105 | 1176 | 3216 | 1712 | 0.109% | 130.587 |

It should be noted that, when a parameter combination $\{r_{Frame}=104, d_{CP}=704,$ and $k=3184\}$ with a sequence number 1 in Table 8 is used, a smallest value of a quantity $n_{LUT}$ of bits output using a lookup table in PCS processing is 128, and overhead of CRC and PAD is $OH_{CP}=0.066\%$. A parameter $p=13$ may be selected. Correspondingly, in first data processing, $r_{Frame}=104$ rows of data is obtained from the data frame, to obtain a total of $d_{in}=10280\times r_{Frame}=1069120$ bits. CRC-32 check is first performed on $$10280 \times \frac{r_{Frame}}{p} = 82240$$

bits in every $$\frac{r_{Frame}}{p} = \frac{104}{13} = 8$$

rows, to add a total of $d_{CRC}=13\times32=416$ CRC parity bits. Then, $d_{PAD}=288$ pad (Pad) bits are inserted, and scrambling is performed, to obtain $d_{scr}=10280\times r_{Frame}+d_{CRC}+d_{PAD}=1069824$ scrambled bits.

When a parameter combination $\{r_{Frame}=104, d_{CP}=3392,$ and $k=3192\}$ with a sequence number 2 in Table 8 is used, a smallest value of a quantity $n_{LUT}$ of bits output using a lookup table in PCS processing is 256. Specific implementation complexity of the PCS lookup table is high, and overhead $OH_{CP}$ of CRC and PAD is high. Therefore, the parameter combination with the sequence number 1 is preferentially selected at a baud rate of 131.842 GBaud.

When a parameter combination $\{r_{Frame}=105, d_{CP}=1176,$ and $k=3216\}$ with a sequence number 3 in Table 8 is used, a smallest value of a quantity $n_{LUT}$ of bits output using a lookup table in PCS processing is 128, and overhead of CRC and PAD is $OH_{CP}=0.109\%$. Corresponding specific implementation complexity of the PCS lookup table is low. In addition, a parameter $p=21$ is selected. Correspondingly, in first data processing, $r_{Frame}=105$ rows of data is obtained from the data frame, to obtain a total of $d_{in}=10280\times r_{Frame}=1079400$ bits. CRC-32 check is first performed on $$10280 \times \frac{r_{Frame}}{p} = 51400$$

bits in every $$\frac{r_{Frame}}{p} = \frac{105}{21} = 5$$

rows, to add a total of $d_{CRC}=21\times32=672$ CRC parity bits. Then, $d_{PAD}=504$ pad (Pad) bits are inserted, and scrambling is performed, to obtain $d_{scr}=10280\times r_{Frame}+d_{CRC}+d_{PAD}=1080576$ scrambled bits.

Embodiment 11

In consideration of a data frame with a rate of 800G, one data frame includes 512 rows, and each row includes 10280 bits. Parameter combination 10 $\{r_{Frame}=110, d_{CP}=848,$ and $k=3368\}$ in Table 2 is considered. In first data processing, $r_{Frame}=110$ rows of data is obtained from the data frame, to obtain a total of $d_{in}=10280\times r_{Frame}=1130800$ bits. $p=22$ is considered.

FIG. 17($a$) is a diagram of an implementation of performing CRC on a data frame according to an embodiment of this application. As shown in FIG. 17($a$), CRC-32 check is first performed on $$10280 \times \frac{r_{Frame}}{p} = 51400$$

bits in every $$\frac{r_{Frame}}{p} = \frac{110}{22} = 5$$

rows, to add a total of $d_{CRC}=22\times32=704$ CRC parity bits. Then, $d_{PAD}=144$ pad (Pad) bits are inserted, and scrambling is performed, to obtain $d_{scr}=10280\times r_{Frame}+d_{CRC}+d_{PAD}=1131648$ scrambled bits. Overhead corresponding to the CRC check and the pad bit insertion is $$OH_{CP} = \frac{d_{scr}}{d_{in}} - 1 = 0.075\%.$$

As shown in FIG. 4, in second data processing, a plurality of bits that are obtained from a bit data stream output through the first data processing are sent to $L=4$ PCS and OFEC encoding in a round-robin fashion for PCS processing and OFEC encoding. As shown in FIG. 5, $k_{PCS}=k-1504=1864$ bits in $k=3368$ input bits are sent to PCS processing, to obtain 2048 bits. $k=3368$ bits include 1504 bits on which the PCS processing is not performed and $k_{PCS}=k-1504=1864$ bits.

In the PCS processing, an LUT lookup table is used, LUT mapping is performed on $k_{LUT}=233$ input bits each time to output corresponding $n_{LUT}=256$ bits, and after the LUT mapping is performed for eight consecutive times, namely, the LUT mapping is performed on a total of $k-1504=1864$ bits, corresponding 2048 bits are output.

The 2048 bits output through the PCS processing and the 1504 bits on which the PCS processing is not performed, a total of $2048+1504=3552$ bits, are sent to pre-encoding interleaving, to obtain a sixth bit set, where the sixth bit set includes 3552 bits. The sixth bit set is represented by using the block set shown in FIG. 23($b$), and a bit in row $i_1$ and column $$\left( \left\lfloor \frac{j_1}{2} \right\rfloor \times 4 + j_1 \% 2 + 2 - i_1 \% 2 \right)$$

($0 \leq i_1 < 16$ and $0 \leq j_1 < 8$) of each of the square blocks $I_{0,0}$, $I_{0,1}$, $I_{0,2}$, $I_{0,3}$, $I_{1,0}$, $I_{1,1}$, $I_{1,2}$, and $I_{1,3}$, and a total of 2048 bits in square blocks $I_{0,4}$, $I_{0,5}$, $I_{1,4}$, and $I_{1,5}$ are from a PCS processed second bit set. After the OFEC encoding is performed on the sixth bit set, 544 OFEC parity bits are inserted into the sixth bit set, to obtain a total of 4096 OFEC-encoded bits, namely, a fourth bit set. Bits of the fourth bit set are represented by using the block set shown in FIG. 11($c$), and a bit in row $i_1$ and column $$\left( \left\lfloor \frac{j_1}{2} \right\rfloor \times 4 + j_1 \% 2 + 2 + i_1 \right) \% 16$$

($0 \leq i_1 < 16$ and $0 \leq j_1 < 8$) of each of the square blocks $B_{0,0}$, $B_{0,1}$, $B_{0,2}$, $B_{0,3}$, $B_{1,0}$, $B_{1,1}$, $B_{1,2}$, and $B_{1,3}$, and a total of 2048 bits in square blocks $B_{0,4}$, $B_{0,5}$, $B_{1,4}$, and $B_{1,5}$ are from the PCS processed second bit set.

First interleaving processing is performed on square blocks $B_{0,4}$, $B_{0,5}$, $B_{0,6}$, $B_{0,7}$, $B_{1,4}$, $B_{1,5}$, $B_{1,6}$, and $B_{1,7}$ in the fourth bit set to obtain square blocks $T_{0,4}$, $T_{0,5}$, $T_{0,6}$, $T_{0,7}$, $T_{1,4}$, $T_{1,5}$, $T_{1,6}$, and $B_{1,7}$ in a fifth bit set, and the square blocks $B_{0,0}$, $B_{0,1}$, $B_{0,2}$, $B_{0,3}$, $B_{1,0}$, $B_{1,1}$, $B_{1,2}$, and $B_{1,3}$ are directly output to obtain square blocks $T_{0,0}$, $T_{0,1}$, $T_{0,2}$, $T_{0,3}$, $T_{1,0}$, $T_{1,1}$, $T_{1,2}$, and $T_{1,3}$ in the fifth bit set respectively. After the first interleaving, when $0 \leq c_1 < 64$, bit $c_1$ in 128 bits in row $r_1$ of the fifth bit set is from bit $c_1$ in 128 bits in row $r_0$ of the fourth bit set; or when $64 \leq c_1 < 128$, bit $c_1$ in 128 bits in row $r_1$ of the fifth bit set is from bit $c_0$ in 128 bits in row $r_0$ of the fourth bit set.

$$c_1 = (c \% \theta + (r_1 + 4 \times \Delta) \% \beta) \% \theta + \left\lfloor \frac{c}{\theta} \right\rfloor \times \theta$$

where $64 \leq c_0 < 128$, $64 \leq c_1 < 128$, $\theta$ is an integer multiple of 4 and $m_0 \times 4$ is exactly divisible by $\theta$, $\Delta$ is an integer, B is an integer multiple of 4, and $$c = \left\lfloor \frac{c_0 \% 32}{2} \right\rfloor \times 4 + c_0 \% 2 + \left(1 - \left\lfloor \frac{c_0}{32} \right\rfloor \% 2\right) \times 2 + \left\lfloor \frac{c_0}{64} \right\rfloor \times 64.$$

Herein, $r_0 = r_1$. A bit in row $i_2$ and column $$\left( \left\lfloor \frac{j_2}{2} \right\rfloor \times 4 + j_2 \% 2 + i_2 + 2 \right) \% 16$$

in any square block $T_{i_0,j_0}$ ($0 \le i_0 < 2$ and $0 \le j_0 < 8$) in the interleaved fifth bit set obtained through the pre-encoding interleaving and the first interleaving processing is 1 bit in the PCS processed second bit set (2048 bits), where $0 \le i_2 < 16$ and $0 \le j_2 < 8$.

The PCS processing, the pre-encoding interleaving, the OFEC encoding, and the first interleaving processing are performed on the $d_{scr}$=1131648 scrambled bits, to obtain $$\frac{d_{scr}}{4 \times k} \times (4 \times 4096) = 1376256$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 1376256 bits output through OFEC interleaving are sent to DP-16QAM symbol mapping and polarization distribution to obtain 172032 dual-polarization symbols, and DSP framing is performed, to be specific, FAWs, TSs, RESs, and PSs are inserted into symbols of X-polarization and Y-polarization to obtain a super-frame including 175104 dual-polarization symbols, and then the super-frame is sent.

If a rate of a given data frame is $W_{bit}$ Gbit/s, a corresponding baud rate is $W_{baud}=W_{bit} \times (10280 \times r_{Frame}+d_{CP})/(10280 \times r_{Frame}) \times (4096/k) \times (57/56)/8$ Gbaud. Baud rates corresponding to data frame types FlexO-8e and FlexO-8 are respectively 124.7 Gbaud and 130.9 Gbaud.

Embodiment 12

In consideration of a data frame with a rate of 800G, one data frame includes 512 rows, and each row includes 10280 bits. Parameter combination 3 {$r_{Frame}$=261, $d_{CP}$=1560, and k=3196} in Table 3 is considered. In first data processing, $r_{Frame}$=261 rows of data is obtained from the data frame, to obtain a total of $d_{in}$=10280×$F_{Frame}$=2683080 bits.

p=29 is considered. CRC-32 check is first performed on $$10280 \times \frac{r_{Frame}}{p} = 92520$$

bits in every $$\frac{r_{Frame}}{p} = \frac{261}{29} = 9$$

rows, to add a total of $d_{CRC}$=29×32=928 CRC parity bits. Then, $d_{PAD}$=632 pad (Pad) bits are inserted, and scrambling is performed, to obtain $d_{scr}$=10280×$r_{Frame}$+$d_{CRC}$+$d_{PAD}$=2684640 bits. Overhead corresponding to the CRC check and the pad bit insertion is $$OH_{CP} = \frac{d_{scr}}{d_{in}} - 1 = 0.058\%.$$

As shown in FIG. 4, in second data processing, a plurality of bits that are obtained from a bit data stream output through the first data processing are sent to L=4 PCS and OFEC encoding in a round-robin fashion for PCS processing and OFEC encoding. As shown in FIG. 5, in the PCS and OFEC encoding, $k_{PCS}$=k−1504=1692 bits in k=3196 input bits are sent to the PCS processing, to obtain 2048 bits. k=3196 bits include $k_{PCS}$=k−1504=1692 bits and 1504 bits.

In the PCS processing, an LUT lookup table is used, LUT mapping is performed on $k_{LUT}$=423 input bits each time to output corresponding $n_{LUT}$=512 bits, and after the LUT mapping is performed for four consecutive times, namely, the LUT mapping is performed on a total of k−1504=1692 bits, corresponding 2048 bits are output.

The 2048 bits output through the PCS processing and the 1504 bits on which the PCS processing is not performed, a total of 2048+1504=3552 bits, are sent to pre-encoding interleaving, to obtain a sixth bit set, where the sixth bit set includes 3552 bits. The sixth bit set is represented by using the block set shown in FIG. 23(b), and a bit ($0 \le i_1 < 16$ and $0 \le j_1 < 8$) in row $i_1$ and column $$\left( \left\lfloor \frac{j_1}{2} \right\rfloor \times 4 + j_1 \% 2 + 2 - i_1 \% 2 \right)$$

of each of the square blocks $I_{0,0}$, $I_{0,1}$, $I_{0,2}$, $I_{0,3}$, $I_{0,4}$, $I_{1,0}$, $I_{1,1}$, $I_{1,2}$, $I_{1,3}$, and $I_{1,4}$, and a total of 2048 bits in square blocks $I_{0,5}$ and $I_{1,5}$, column 0 to column 7 of square block $I_{0,6}$, and column 0 to column 7 of square block $I_{1,6}$ are from a PCS processed second bit set. After the OFEC encoding is performed on the sixth bit set, 544 OFEC parity bits are inserted into the sixth bit set, to obtain a total of 4096 OFEC-encoded bits, namely, a fourth bit set. Bits of the fourth bit set are represented by using the block set shown in FIG. 11(c), and a bit in row $i_1$ and column $$\left( \left\lfloor \frac{j_1}{2} \right\rfloor \times 4 + j_1 \% 2 + 2 + i_1 \right) \% 16$$

($0 \le i_1 < 16$ and $0 \le j_1 < 8$) of each of the square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$, and a total of 2048 bits in square blocks $B_{0,5}$ and $B_{1,5}$, bits in the shadow part of square block $B_{0,6}$, and bits in the shadow part of square block $B_{1,6}$ are from the PCS processed second bit set.

First interleaving processing is performed on square blocks $B_{0,5}$, $B_{0,6}$, $B_{0,7}$, $B_{1,5}$, $B_{1,6}$, and $B_{1,7}$ in the fourth bit set to obtain square blocks $T_{0,5}$, $T_{0,6}$, $T_{0,7}$, $T_{1,5}$, $T_{1,6}$, and $B_{1,7}$ in a fifth bit set. Square blocks $B_{0,0}$, $B_{0,1}$, $B_{0,2}$, $B_{0,3}$, $B_{0,4}$, $B_{1,0}$, $B_{1,1}$, $B_{1,2}$, $B_{1,3}$, and $B_{1,4}$ are directly output to obtain square blocks $T_{0,0}$, $T_{0,1}$, $T_{0,2}$, $T_{0,3}$, $T_{0,4}$, $T_{1,0}$, $T_{1,1}$, $T_{1,2}$, $T_{1,3}$, and $T_{1,4}$ in the fifth bit set respectively. After the first interleaving, when $0 \le c_1 < 80$, bit $c_1$ in the 128 bits in row $r_1$ of the fifth bit set is from bit $C_1$ in 128 bits in row $r_0$ of the fourth bit set; or when $80 \le c_1 < 128$, bit $c_1$ in the 128 bits in row $r_1$ of the fifth bit set is from bit $80+c_0$ in 128 bits in row $r_0$ of the fourth bit set $$c_1 = 80 + (c \% \theta + (r_1 + 2 + 4 \times \Delta) \% \beta) \% \theta + \left\lfloor \frac{c}{\theta} \right\rfloor \times \theta,$$

where $0 \leq c_0 < 48$, $80 \leq c_1 < 128$, $\theta$ is an integer multiple of 4 and 48 is exactly divisible by $\theta$, $\Delta$ is an integer, $\beta$ is an integer multiple of 4, and $$c = \left\lfloor \frac{c_2 \% 24}{2} \right\rfloor \times 4 + c_2 \% 2 + \left\lfloor \frac{c_2}{24} \right\rfloor \times 2,$$

$c_2 = (r_0 \% 16)^{\wedge} c_0$.

Herein, $r_0 = 11$. A bit in row $i_2$ and column $$\left( \left\lfloor \frac{j_2}{2} \right\rfloor \times 4 + j_2 \% 2 + i_2 + 2 \right) \% 16$$

in any square block $T_{i_0 j_0}$ ($0 \leq i_0 < 2$ and $0 \leq j_0 < 8$) in the interleaved fifth bit set obtained through the pre-encoding interleaving and the first interleaving processing is 1 bit in the PCS processed second bit set (2048 bits), where $0 \leq i_2 < 16$ and $0 \leq j_2 < 8$.

The PCS processing, the pre-encoding interleaving, the OFEC encoding, and the first interleaving processing are performed on the $d_{scr} = 1131648$ scrambled bits, to obtain $$\frac{d_{scr}}{4 \times k} \times (4 \times 4096) = 1376256$$

bits obtained through the first interleaving processing. The bits are sent to an OFEC interleaver for "intra-block interleaving" and "inter-block interleaving". A block size of the OFEC interleaver is 172032 bits. A bit length obtained through the first interleaving processing is an integer multiple of 172032. This facilitates a hardware implementation. 1376256 bits output through OFEC interleaving are sent to DP-16QAM symbol mapping and polarization distribution to obtain 172032 dual-polarization symbols, and DSP framing is performed, to be specific, FAWs, TSs, RESs, and PSs are inserted into symbols of X-polarization and Y-polarization to obtain a super-frame including 175104 dual-polarization symbols, and then the super-frame is sent.

If a rate of a given data frame is $W_{bit}$ Gbit/s, a corresponding baud rate is $W_{baud} = W_{bit} \times (10280 \times r_{Frame} + d_{CP})/(10280 \times r_{Frame}) \times (4096/k) \times (57/56)/8$ Gbaud. Baud rates corresponding to data frame types FlexO-8e and FlexO-8 are respectively 124.7 Gbaud and 130.9 Gbaud.

It should be noted that, Table 2 and Table 3 show some parameter combinations when q=10280 bits are included in each row in a structure of a data frame, including a quantity $r_{Frame}$ of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and corresponding baud rates when data frame types FlexO-6e, FlexO-6, FlexO-8e, and FlexO-8 are used, obtained from the data frame each time. Some possible parameter combinations used when each row includes q=2056 bits in a structure of a data frame are considered below.

For the data frame type FlexO-8, Table 9 below shows some parameter combinations when q=2056 bits are included in each row in a structure of a data frame, including a quantity $r_{Frame}$ of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and a corresponding baud rate when the data frame type FlexO-8 is used, obtained from the data frame each time.

TABLE 9

| No. | $r_{Frame}$ | $d_{CP}$ | k | $k_{PCS}$ | $OH_{CP}$ | FlexO-8 baud rate Gbaud |
|---|---|---|---|---|---|---|
| 1 | 546 | 1008 | 3344 | 1840 | 0.09% | 131.8297 |
| 2 | 546 | 3696 | 3352 | 1848 | 0.33% | 131.8297 |
| 3 | 547 | 1640 | 3352 | 1848 | 0.15% | 131.5887 |
| 4 | 547 | 4328 | 3360 | 1856 | 0.38% | 131.5887 |
| 5 | 548 | 2272 | 3360 | 1856 | 0.20% | 131.3485 |
| 6 | 548 | 4960 | 3368 | 1864 | 0.44% | 131.3485 |
| 7 | 549 | 216 | 3360 | 1856 | 0.02% | 131.1093 |
| 8 | 549 | 2904 | 3368 | 1864 | 0.26% | 131.1093 |
| 9 | 549 | 5592 | 3376 | 1872 | 0.50% | 131.1093 |
| 10 | 550 | 848 | 3368 | 1864 | 0.08% | 130.8709 |
| 11 | 550 | 3536 | 3376 | 1872 | 0.31% | 130.8709 |
| 12 | 551 | 1480 | 3376 | 1872 | 0.13% | 130.6334 |
| 13 | 551 | 4168 | 3384 | 1880 | 0.37% | 130.6334 |
| 14 | 552 | 2112 | 3384 | 1880 | 0.19% | 130.3967 |
| 15 | 552 | 4800 | 3392 | 1888 | 0.42% | 130.3967 |
| 16 | 553 | 56 | 3384 | 1880 | 0.00% | 130.1609 |
| 17 | 553 | 2744 | 3392 | 1888 | 0.24% | 130.1609 |
| 18 | 553 | 5432 | 3400 | 1896 | 0.48% | 130.1609 |
| 19 | 554 | 688 | 3392 | 1888 | 0.06% | 129.9260 |
| 20 | 554 | 3376 | 3400 | 1896 | 0.30% | 129.9260 |
| 21 | 555 | 1320 | 3400 | 1896 | 0.12% | 129.6919 |
| 22 | 555 | 4008 | 3408 | 1904 | 0.35% | 129.6919 |
| 23 | 556 | 1952 | 3408 | 1904 | 0.17% | 129.4586 |
| 24 | 556 | 4640 | 3416 | 1912 | 0.41% | 129.4586 |
| 25 | 557 | 2584 | 3416 | 1912 | 0.23% | 129.2262 |
| 26 | 557 | 5272 | 3424 | 1920 | 0.46% | 129.2262 |
| 27 | 558 | 528 | 3416 | 1912 | 0.05% | 128.9946 |
| 28 | 558 | 3216 | 3424 | 1920 | 0.28% | 128.9946 |
| 29 | 559 | 1160 | 3424 | 1920 | 0.10% | 128.7639 |
| 30 | 559 | 3848 | 3432 | 1928 | 0.33% | 128.7639 |
| 31 | 560 | 1792 | 3432 | 1928 | 0.16% | 128.5339 |
| 32 | 560 | 4480 | 3440 | 1936 | 0.39% | 128.5339 |
| 33 | 561 | 2424 | 3440 | 1936 | 0.21% | 128.3048 |
| 34 | 561 | 5112 | 3448 | 1944 | 0.44% | 128.3048 |
| 35 | 562 | 368 | 3440 | 1936 | 0.03% | 128.0765 |
| 36 | 562 | 3056 | 3448 | 1944 | 0.26% | 128.0765 |
| 37 | 562 | 5744 | 3456 | 1952 | 0.50% | 128.0765 |

For the data frame type FlexO-8e, Table 10 below shows some parameter combinations when q=2056 bits are included in each row in a structure of a data frame, including a quantity $r_{Frame}$ of rows of data, a total quantity $d_{CP}$ of bits for CRC check and pad bit insertion, a quantity k of input bits for PCS processing and OFEC encoding, a quantity $k_{PCS}$ of input bits for PCS processing, overhead $OH_{CP}$ corresponding to the CRC check and the pad bit insertion, and a corresponding baud rate when the data frame type FlexO-8e is used, obtained from the data frame each time.

TABLE 10

| No. | $r_{Frame}$ | $d_{CP}$ | k | $k_{PCS}$ | $OH_{CP}$ | FlexO-8e baud rate Gbaud |
|---|---|---|---|---|---|---|
| 1 | 520 | 704 | 3184 | 1680 | 0.07% | 131.8422 |
| 2 | 520 | 3392 | 3192 | 1688 | 0.32% | 131.8422 |
| 3 | 520 | 6080 | 3200 | 1696 | 0.57% | 131.8422 |
| 4 | 521 | 1336 | 3192 | 1688 | 0.12% | 131.5891 |
| 5 | 521 | 4024 | 3200 | 1696 | 0.38% | 131.5891 |
| 6 | 522 | 1968 | 3200 | 1696 | 0.18% | 131.3371 |
| 7 | 522 | 4656 | 3208 | 1704 | 0.43% | 131.3371 |
| 8 | 523 | 2600 | 3208 | 1704 | 0.24% | 131.0859 |
| 9 | 523 | 5288 | 3216 | 1712 | 0.49% | 131.0859 |
| 10 | 524 | 544 | 3208 | 1704 | 0.05% | 130.8358 |
| 11 | 524 | 3232 | 3216 | 1712 | 0.30% | 130.8358 |
| 12 | 525 | 1176 | 3216 | 1712 | 0.11% | 130.5866 |
| 13 | 525 | 3864 | 3224 | 1720 | 0.36% | 130.5866 |
| 14 | 526 | 1808 | 3224 | 1720 | 0.17% | 130.3383 |

TABLE 10-continued

| No. | $r_{Frame}$ | $d_{CP}$ | k | $k_{PCS}$ | $OH_{CP}$ | FlexO-8e baud rate Gbaud |
|---|---|---|---|---|---|---|
| 15 | 526 | 4496 | 3232 | 1728 | 0.42% | 130.3383 |
| 16 | 527 | 2440 | 3232 | 1728 | 0.23% | 130.0910 |
| 17 | 527 | 5128 | 3240 | 1736 | 0.47% | 130.0910 |
| 18 | 528 | 384 | 3232 | 1728 | 0.04% | 129.8446 |
| 19 | 528 | 3072 | 3240 | 1736 | 0.28% | 129.8446 |
| 20 | 528 | 5760 | 3248 | 1744 | 0.53% | 129.8446 |
| 21 | 529 | 1016 | 3240 | 1736 | 0.09% | 129.5991 |
| 22 | 529 | 3704 | 3248 | 1744 | 0.34% | 129.5991 |
| 23 | 530 | 1648 | 3248 | 1744 | 0.15% | 129.3546 |
| 24 | 530 | 4336 | 3256 | 1752 | 0.40% | 129.3546 |
| 25 | 531 | 2280 | 3256 | 1752 | 0.21% | 129.1110 |
| 26 | 531 | 4968 | 3264 | 1760 | 0.46% | 129.1110 |
| 27 | 532 | 2912 | 3264 | 1760 | 0.27% | 128.8683 |
| 28 | 532 | 224 | 3256 | 1752 | 0.02% | 128.8683 |
| 29 | 533 | 856 | 3264 | 1760 | 0.08% | 128.6265 |
| 30 | 533 | 3544 | 3272 | 1768 | 0.32% | 128.6265 |
| 31 | 534 | 1488 | 3272 | 1768 | 0.14% | 128.3857 |
| 32 | 534 | 4176 | 3280 | 1776 | 0.38% | 128.3857 |
| 33 | 535 | 2120 | 3280 | 1776 | 0.19% | 128.1457 |
| 34 | 535 | 4808 | 3288 | 1784 | 0.44% | 128.1457 |

Embodiment 13

In some specific application scenarios, when values of a FlexO-8 baud rate and a FlexO-8e baud rate are close, a same component or similar components may be used for implementation. With reference to the foregoing Table 9 and Table 10, it can be learned that when the FlexO-8 baud rate 131.5887 Gbaud and the FlexO-8e baud rate 131.5891 Gbaud are used, a difference value divided by the FlexO-8 or FlexO-8e baud rate is only 3.7237E-6, which corresponds to 3.7237 ppm, and the difference value is small. Table 11 shows specific parameter combinations.

TABLE 11

| No. | $r_{Frame}$ | $d_{CP}$ | k | $k_{PCS}$ | $OH_{CP}$ | Baud rate Gbaud | Data frame type |
|---|---|---|---|---|---|---|---|
| 1 | 547 | 1640 | 3352 | 1848 | 0.15% | 131.5887 | FlexO-8 |
| 2 | 547 | 4328 | 3360 | 1856 | 0.38% | 131.5887 | |
| 3 | 521 | 1336 | 3192 | 1688 | 0.12% | 131.5891 | FlexO-8e |
| 4 | 521 | 4024 | 3200 | 1696 | 0.38% | 131.5891 | |

In some specific applications, for a data frame type FlexO-8, a parameter combination $\{r_{Frame}=547, d_{CP}=1640,$ and k=3352$\}$ is considered. In first data processing, $r_{Frame}=547$ rows of data is obtained from a data frame, to obtain a total of $d_{in}=q \times r_{Frame}=2056 \times 547=1124632$ bits. A parameter p=28 is selected. An integer $$r_{F0} = \left\lfloor \frac{r_{Frame}}{p} \right\rfloor + 1 = 20$$

and an integer $r_{F1}=r_{Frame}-r_{F0} \times (p-1)=547-20 \times 27=7$ are considered. For the $r_{Frame}=547$ rows of data obtained from the data frame, CRC-32 is performed on a total of $q \times r_{F0}=41120$ bits in every $r_{F0}=20$ rows in first $r_{F0} \times (p-1)=540$ rows to add 32 parity bits, to obtain a total of $32 \times (p-1)=864$ CRC parity bits, and CRC-32 is performed on a total of $q \times r_{F1}=14392$ bits of last $r_{F1}=7$ rows to add 32 parity bits, to obtain a total of $d_{CRC}=32 \times p=896$ CRC parity bits. Then, $d_{PAD}=744$ pad (Pad) bits are inserted, and scrambling is performed, to obtain $d_{scr}=q \times r_{Frame}+d_{CRC}+d_{PAD}=1126272$ scrambled bits. It should be noted that, operations in CRC- 32 in the existing 800G ZR may be directly used as encoding and detection operations in the CRC-32, and a difference lies in that the operations in the CRC-32 are performed on data of a total of $4 \times 10280=41120$ bits in four rows and 10280 columns in the existing 800G ZR. Correspondingly, a quantity of input bits corresponding to PCS processing is $k_{PCS}=k-1504=1848$. Generally, in PCS processing, input $k_{LUT}$ bits are mapped by using a lookup table (lookup table, LUT), to output corresponding $n_{LUT}$ bits. Herein, a smallest value of the quantity of bits $n_{LUT}$ output through the lookup table in the PCS processing is 256, and specific implementation complexity of the corresponding PCS lookup table is high, but overhead $OH_{CP}=0.15\%$ of the CRC and the PAD is low.

In some other specific applications, for a data frame type FlexO-8, a parameter combination $\{r_{Frame}=547, d_{CP}=4328,$ and k=3360$\}$ is considered. In first data processing, $r_{Frame}=547$ rows of data is obtained from a data frame, to obtain a total of $d_{in}=q \times r_{Frame}=2056 \times 547=1124632$ bits. A parameter p=28 is selected. An integer $$r_{F0} = \left\lfloor \frac{r_{Frame}}{p} \right\rfloor + 1 = 20$$

and an integer $r_{F1}=r_{Frame}-r_{F0} \times (p-1)=547-20 \times 27=7$ are considered. For the $r_{Frame}=547$ rows of data obtained from the data frame, CRC-32 is performed on a total of $q \times r_{F0}=41120$ bits in every $r_{F0}=20$ rows in first $r_{F0} \times (p-1)=540$ rows to add 32 parity bits, to obtain $32 \times (p-1)=864$ CRC parity bits, and CRC-32 is performed on a total of $q \times r_{F1}=14392$ bits of last $r_{F1}=7$ rows to add 32 parity bits, to obtain a total of $d_{CRC}=32 \times p=896$ CRC parity bits. Then, $d_{PAD}=3432$ (Pad) bits are inserted, and scrambling is performed, to obtain $d_{scr}=q \times r_{Frame}+d_{CRC}+d_{PAD}=1128960$ scrambled bits. It should be noted that, operations in CRC-32 in the existing 800G ZR may be directly used as encoding and detection operations in the CRC-32, and a difference lies in that the operations in the CRC-32 are performed on data of a total of $4 \times 10280=41120$ bits in four rows and 10280 columns in the existing 800G ZR. Correspondingly, a quantity of input bits corresponding to PCS processing is $k_{PCS}=k-1504=1856$. Generally, in PCS processing, input $k_{LUT}$ bits are mapped by using a lookup table (lookup table, LUT), to output corresponding $n_{LUT}$ bits. Herein, a smallest value of the quantity of bits $n_{LUT}$ output through the lookup table in the PCS processing is 128, and specific implementation complexity of the corresponding PCS lookup table is low, but overhead $OH_{CP}=0.38\%$ of the CRC and the PAD is high. It should be noted that, in this embodiment, the quantity of input bits corresponding to the PCS processing is $k_{PCS}=k-1504=1856$, a total quantity of output bits corresponding to the PCS processing is 2048, and every 116 bits in the 1856 input bits are processed by using the lookup table LUT to obtain 128 bits. In some specific applications, the lookup table LUT may be implemented by including a plurality of lookup subtables, and quantities of input bits of the lookup subtables may be different and quantities of output bits of the lookup subtables may also be different. For example, the lookup table is implemented by using 12 lookup subtables. Every 9 input bits are processed by using four lookup subtables to obtain 10 output bits, and every 10 input bits are processed by using remaining eight lookup subtables to obtain 11 output bits. In this application, a specific implementation of the lookup table is not limited.

In some specific applications, for a data frame type FlexO-8e, a parameter combination $\{r_{Frame}=521, d_{CP}=1336,$ and $k=3192\}$ is considered. In first data processing, $r_{Frame}=521$ rows of data is obtained from a data frame, to obtain a total of $d_{in}=q\times r_{Frame}=2056\times521=1071176$ bits. A parameter p=27 is selected. An integer $$r_{F0} = \left\lfloor \frac{r_{Frame}}{p} \right\rfloor + 1 = 20$$

and an integer $r_{F1}=r_{Frame}-r_{F0}\times(p-1)=521-20\times26=1$ are considered. For the $r_{Frame}=521$ rows of data obtained from the data frame, CRC-32 is performed on a total of $q\times r_{F0}=41120$ bits in every $r_{F0}=20$ rows in first $r_{F0}\times(p-1)=520$ rows to add 32 parity bits, to obtain $32\times (p-1)=832$ CRC parity bits, and CRC-32 is performed on a total of $q\times r_{F1}=2056$ bits of last $r_{F1}=1$ rows to add 32 parity bits, to obtain a total of $d_{CRC}=32\times p=864$ CRC parity bits. Then, $d_{PAD}=472$ pad (Pad) bits are inserted, and scrambling is performed, to obtain $d_{scr}=q\times r_{Frame}+d_{CRC}+d_{PAD}=1072512$ scrambled bits. It should be noted that, operations in CRC-32 in the existing 800G ZR may be directly used as encoding and detection operations in the CRC-32, and a difference lies in that the operations in the CRC-32 are performed on data of a total of $4\times10280=41120$ bits in four rows and 10280 columns in the existing 800G ZR. Correspondingly, a quantity of input bits corresponding to PCS processing is $k_{PCS}=k-1504=1688$. Generally, in PCS processing, input $k_{LUT}$ bits are mapped by using a lookup table (lookup table, LUT), to output corresponding $n_{LUT}$ bits. Herein, a smallest value of the quantity of bits $n_{LUT}$ output through the lookup table in the PCS processing is 256, and specific implementation complexity of the corresponding PCS lookup table is high, but overhead $OH_{CP}=0.12\%$ of the CRC and the PAD is low.

In some other specific applications, for a data frame type FlexO-8e, a parameter combination $\{r_{Frame}=521, d_{CP}=4024,$ and $k=3200\}$ is considered. In first data processing, $r_{Frame}=521$ rows of data is obtained from a data frame, to obtain a total of $d_{in}=q\times r_{Frame}=2056\times521=1071176$ bits. A parameter p=27 is selected. An integer $$r_{F0} = \left\lfloor \frac{r_{Frame}}{p} \right\rfloor + 1 = 20$$

and an integer $r_{F1}=r_{Frame}-r_{F0}\times(p-1)=521-20\times26=1$ are considered. For the $r_{Frame}=521$ rows of data obtained from the data frame, CRC-32 is performed on a total of $q\times r_{F0}=41120$ bits in every $r_{F0}=20$ rows in first $r_{F0}\times(p-1)=520$ rows to add 32 parity bits, to obtain $32\times(p-1)=832$ CRC parity bits, and CRC-32 is performed on a total of $q\times r_{F1}=2056$ bits of last $r_{F1}=1$ rows to add 32 parity bits, to obtain a total of $d_{CRC}=32\times p=864$ CRC parity bits. Then, $d_{PAD}=3160$ pad (Pad) bits are inserted, and scrambling is performed, to obtain $d_{scr}=q\times r_{Frame}+d_{CRC}+d_{PAD}=1075200$ scrambled bits. It should be noted that, operations in CRC-32 in the existing 800G ZR may be directly used as encoding and detection operations in the CRC-32, and a difference lies in that the operations in the CRC-32 are performed on data of a total of $4\times10280=41120$ bits in four rows and 10280 columns in the existing 800G ZR. Correspondingly, a quantity of input bits corresponding to PCS processing is $k_{PCS}=k-1504=1696$. Generally, in PCS processing, input $k_{LUT}$ bits are mapped by using a lookup table (lookup table, LUT), to output corresponding $n_{LUT}$ bits. Herein, a smallest value of the quantity of bits $n_{LUT}$ output through the lookup table in the PCS processing is 128, and specific implementation complexity of the corresponding PCS lookup table is low, but overhead $OH_{CP}=0.38\%$ of the CRC and the PAD is high.

Embodiment 14

In some specific application scenarios, hitless (hitless) rate switching is considered, and a same baud rate is usually used for different rates. For example, a baud rate corresponding to a data frame type FlexO-8 is the same as a baud rate corresponding to a data frame type FlexO-6. For example, a baud rate corresponding to a data frame type FlexO-8e is the same as a baud rate corresponding to a data frame type FlexO-6e, to support hitless rate switching. For ease of a hardware implementation of an overall solution, a value $r_{Frame-8}$ of $r_{Frame}$ when the data frame type FlexO-8 is used is an integer multiple of 8, and a value $r_{Frame-6}$ of $r_{Frame}$ when the data frame type FlexO-6 is used is an integer multiple of 6, and $$\frac{r_{Frame-8}}{8} = \frac{r_{Frame-6}}{6}.$$

Table 12 shows parameter combinations, when data frame types FlexO-8 and FlexO-6 are used, whose corresponding baud rates are of a same value 130.3967 Gbaud, including a quantity $r_{Frame}$ of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and baud rates, obtained from a data frame each time. It can be learned that a value $r_{Frame-8}$ of $r_{Frame}$ when the data frame type FlexO-8 is used is an integer multiple of 8, a value $r_{Frame-6}$ of $r_{Frame}$ when the data frame type FlexO-6 is used is an integer multiple of 6, and $$\frac{r_{Frame-8}}{8} = \frac{r_{Frame-6}}{6}.$$

This facilitates an implementation of hitless (hitless) rate switching.

TABLE 12

| No. | $r_{Frame}$ | $d_{CP}$ | k | $k_{PCS}$ | $OH_{CP}$ | Baud rate Gbaud | Notes |
|---|---|---|---|---|---|---|---|
| 1 | 552 | 2112 | 3384 | 1880 | 0.19% | 130.3967 | FlexO-8 |
| 2 | 552 | 4800 | 3392 | 1888 | 0.42% | 130.3967 | |
| 3 | 414 | 912 | 2536 | 1032 | 0.11% | 130.3967 | FlexO-6 |
| 4 | 414 | 3600 | 2544 | 1040 | 0.42% | 130.3967 | |

Table 13 shows parameter combinations, when data frame types FlexO-8 and FlexO-6 are used, whose corresponding baud rates are of a same value 128.5339 Gbaud, including a quantity $r_{Frame}$ of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and baud rates, obtained from a data frame each time. It can be learned that a value $r_{Frame-8}$ of $r_{Frame}$ when the data frame type FlexO-8 is used is an integer multiple of 8, a value $r_{Frame-6}$ of $r_{Frame}$ when the data frame type FlexO-6 is used is an integer multiple of 6, and $$\frac{r_{Frame-8}}{8} = \frac{r_{Frame-6}}{6}.$$

This facilitates an implementation of hitless (hitless) rate switching.

TABLE 13

| No. | $r_{Frame}$ | $d_{CP}$ | k | $k_{PCS}$ | $OH_{CP}$ | Baud rate Gbaud | Notes |
|-----|-------------|----------|-----|-----------|-----------|------------------|---------|
| 1 | 560 | 1792 | 3432 | 1928 | 0.16% | 128.5339 | FlexO-8 |
| 2 | 560 | 4480 | 3440 | 1936 | 0.39% | 128.5339 | |
| 3 | 420 | 2016 | 2576 | 1072 | 0.23% | 128.5339 | FlexO-6 |
| 4 | 420 | 4704 | 2584 | 1080 | 0.54% | 128.5339 | |

Embodiment 15

Based on Embodiment 14, a FlexO-8e data frame and a FlexO-6e data frame are considered. Table 14 shows parameter combinations, when data frame types FlexO-8e and FlexO-6e are used, whose corresponding baud rates are of a same value 131.8422 Gbaud, including a quantity Frame of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and baud rates, obtained from a data frame each time. It can be learned that a value $r_{Frame-8e}$ of $r_{Frame}$ when the data frame type FlexO-8e is used is an integer multiple of 8, a value $r_{Frame-6e}$ of $r_{Frame}$ when the data frame type FlexO-6e is used is an integer multiple of 6, and $$\frac{r_{Frame-8e}}{8} = \frac{r_{Frame-6e}}{6}.$$

This facilitates an implementation of hitless (hitless) rate switching.

TABLE 14

| No. | $r_{Frame}$ | $d_{CP}$ | k | $k_{PCS}$ | $OH_{CP}$ | Baud rate Gbaud | Notes |
|-----|-------------|----------|-----|-----------|-----------|------------------|----------|
| 1 | 520 | 704 | 3184 | 1680 | 0.07% | 131.8422 | FlexO-8e |
| 2 | 520 | 3392 | 3192 | 1688 | 0.32% | 131.8422 | |
| 3 | 520 | 6080 | 3200 | 1696 | 0.57% | 131.8422 | |
| 4 | 390 | 1872 | 2392 | 888 | 0.23% | 131.8422 | FlexO-6e |
| 5 | 390 | 4560 | 2400 | 896 | 0.57% | 131.8422 | |

Table 15 shows parameter combinations, when data frame types FlexO-8e and FlexO-6e are used, whose corresponding baud rates are of a same value 129.8446 Gbaud, including a quantity $r_{Frame}$ of rows of data, a total quantity $d_{CP}$ of bits for CRC check and pad bit insertion, a quantity k of input bits for PCS processing and OFEC encoding, a quantity $k_{PCS}$ of input bits for the PCS processing, overhead $OH_{CP}$ corresponding to the CRC check and the pad bit insertion, and baud rates, obtained from a data frame each time. It can be learned that a value $r_{Frame-8e}$ of $r_{Frame}$ when the data frame type FlexO-8e is used is an integer multiple of 8, a value $r_{Frame-6e}$ of $r_{Frame}$ when the data frame type FlexO-6e is used is an integer multiple of 6, and $$\frac{r_{Frame-8e}}{8} = \frac{r_{Frame-6e}}{6}.$$

This facilitates an implementation of hitless (hitless) rate switching.

TABLE 15

| No. | $r_{Frame}$ | $d_{CP}$ | k | $k_{PCS}$ | $OH_{CP}$ | Baud rate Gbaud | Notes |
|-----|-------------|----------|------|-----------|-----------|------------------|----------|
| 1 | 528 | 384 | 3232 | 1728 | 0.04% | 129.8446 | FlexO-8e |
| 2 | 528 | 3072 | 3240 | 1736 | 0.28% | 129.8446 | |
| 3 | 528 | 5760 | 3248 | 1744 | 0.53% | 129.8446 | |
| 4 | 396 | 288 | 2424 | 920 | 0.04% | 129.8446 | FlexO-6e |
| 5 | 396 | 2976 | 2432 | 928 | 0.37% | 129.8446 | |

Figure 18:
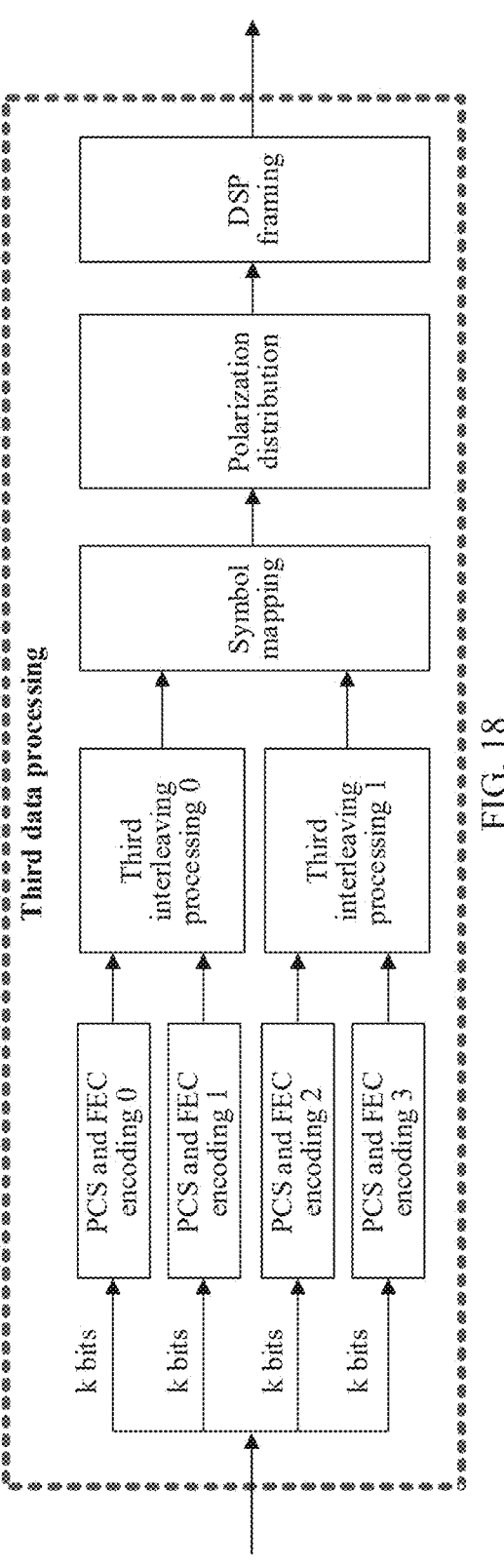
FIG. 18 is a diagram of an embodiment of third data processing in embodiments of this application.

FIG. 18 is a diagram of an embodiment of third data processing according to an embodiment of this application. As shown in FIG. 18, different from the second data processing described in the embodiment shown in FIG. 4, in the third data processing, only third interleaving processing needs to be performed after PCS and FEC encoding, and first interleaving processing and second interleaving processing in second data processing do not need to be performed. The third interleaving processing in the third data processing is different from the first interleaving processing and the second interleaving processing, and may be specifically FEC interleaving including "intra-block interleaving" and "optimized inter-block interleaving". The following describes in detail the third data processing.

It should be noted that the PCS and FEC encoding in the third data processing and the PCS and FEC encoding in the second data processing are similar operations. For details, refer to the related descriptions in the embodiment shown in FIG. 4. Details are not described herein again. It should be further noted that DSP framing in the third data processing and the DSP framing in the second data processing are similar operations. For details, refer to the related descriptions in the embodiment shown in FIG. 4. Details are not described herein again.

As shown in FIG. 18, outputs of every two FEC encoders are sent to a third interleaver for processing, and the third interleaving processing includes 2 operations: "intra-block interleaving" and "optimized inter-block interleaving". The "intra-block interleaving" operation herein is similar to the "intra-block interleaving" operation in the second data processing. For details, refer to the related descriptions in the embodiment shown in FIG. 14, where bit interleaving is performed on each square block of 16 rows and 16 columns.

In an example, two bit sets input into the third interleaver are respectively denoted as bit set 0 and bit set 1. Bit set 0 is an output obtained through PCS and FEC encoding 0, and bit set 1 is an output obtained through PCS and FEC encoding 1. Bit set 0 includes $m_0$ square blocks 0, and each square block 0 includes a total of 256 bits distributed in 16 rows and 16 columns. Bit set 1 includes $m_0$ square blocks 1, and each square block 1 includes a total of 256 bits distributed in 16 rows and 16 columns. The third interleaver includes an interleaver buffer. A specific operation of the "optimized inter-block interleaving" includes: inputting 21 bit sets 0 and 21 bit sets 1 into the interleaver buffer, and reading bits from the interleaver buffer according to a specific rule to perform symbol mapping and polarization distribution.

The interleaver buffer includes a total of $84 \times m_1$ buffer units distributed in 84 rows and $m_1$ columns, $m_0 = 2 \times m_1$, each of the buffer units is configured to buffer a total of 256 bits in 16 rows and 16 columns. $2 \times m_1$ square blocks 0 are input into even-numbered rows of the interleaver buffer, and $42 \times m_1$ square blocks 1 are input into odd-numbered rows of the interleaver buffer. The interleaver buffer includes a first buffer subset and a second buffer subset, where the first buffer subset includes $42 \times m_1$ buffer units, and the second buffer subset includes $42 \times m_1$ buffer units. Bits input into the first buffer subset are from bits output through PCS and FEC encoding 0 and bits output through PCS and FEC encoding 1. Bits input into the second buffer subset are from bits on which PCS processing is not performed and FEC parity bits in PCS and FEC encoding 0 and bits on which PCS processing is not performed and FEC parity bits in PCS and FEC encoding 1.

Further, symbol mapping and polarization distribution are performed on every 8 bits in the interleaver buffer to obtain one dual-polarization DP-16QAM symbol, where 2 amplitude bits in 4 bits corresponding to a 16QAM symbol of the DP-16QAM symbol in a target polarization direction are from one column in a first buffer unit of the first buffer subset; and 2 sign bits in the 4 bits corresponding to the 16QAM symbol of the DP-16QAM symbol in the target polarization direction are from one column in a second buffer unit of the second buffer subset. More specifically, 4 of the every 8 bits on which the symbol mapping and polarization distribution are performed are from one column in the first buffer unit of the first buffer subset, and the other 4 of the 8 bits are from one column in the second buffer unit of the second buffer subset.

In a possible implementation, this application is specifically described by using $m_0 = 16$ as an example. To be specific, the interleaver buffer includes 672 buffer units distributed in 84 rows and eight columns, and a total of 172032 bits can be buffered. The first buffer subset includes 336 buffer units, and the second buffer subset includes 336 buffer units.

Figure 19:
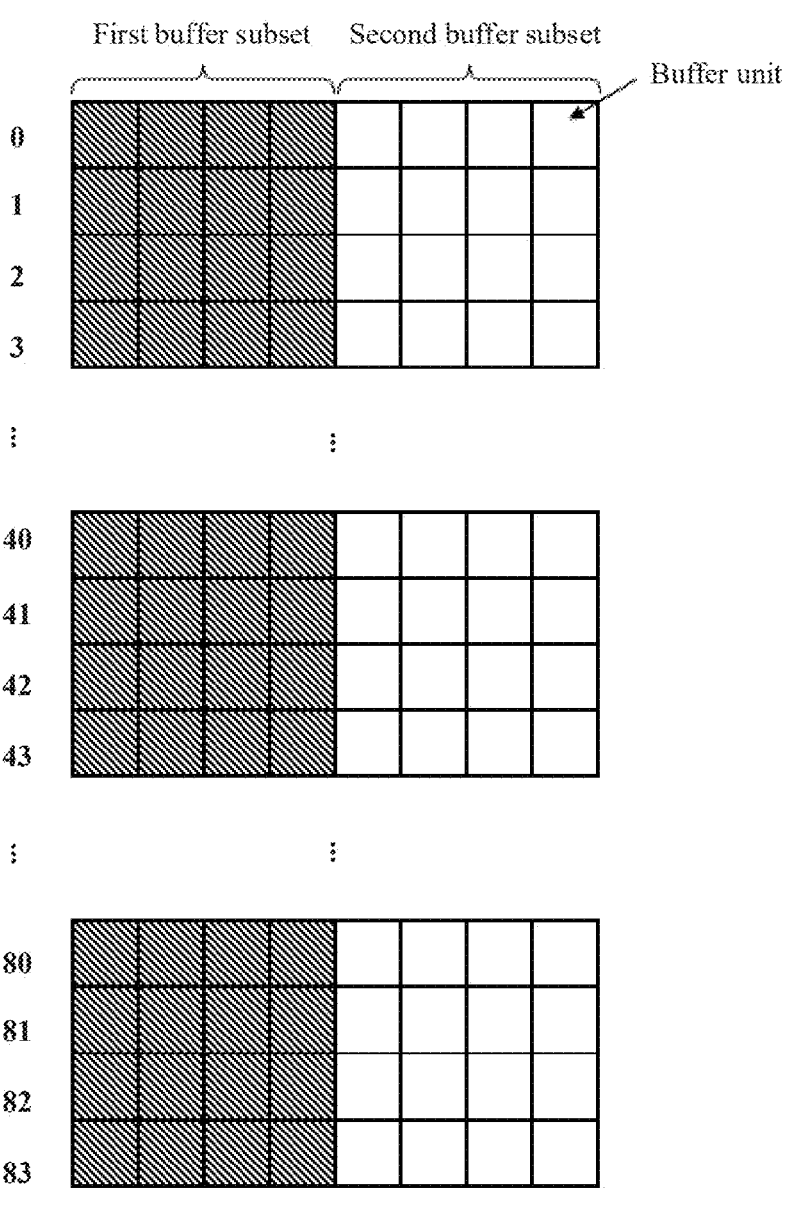
FIG. 19 is a diagram of distribution of an interleaver buffer according to an embodiment of this application.

FIG. 19 is a diagram of distribution of an interleaver buffer according to an embodiment of this application. It should be understood that the distribution of the interleaver buffer shown in FIG. 19 is designed on the basis that a square block is in the distribution manner shown in FIG. 11(a). In an example, $m_0 = 16$ in FIG. 19, a first buffer subset includes a total of 336 buffer units in column 0, column 1, column 2, and column 3 in the interleaver buffer, and a second buffer subset includes a total of 336 buffer units in column 4, column 5, column 6, and column 7 in the interleaver buffer.

In an example, $m_0 = 12$, a first buffer subset includes a total of 252 buffer units in column 0, column 1, and column 2 in the interleaver buffer, and a second buffer subset includes a total of 252 buffer units in column 3, column 4, and column 5 in the interleaver buffer.

Figure 20:
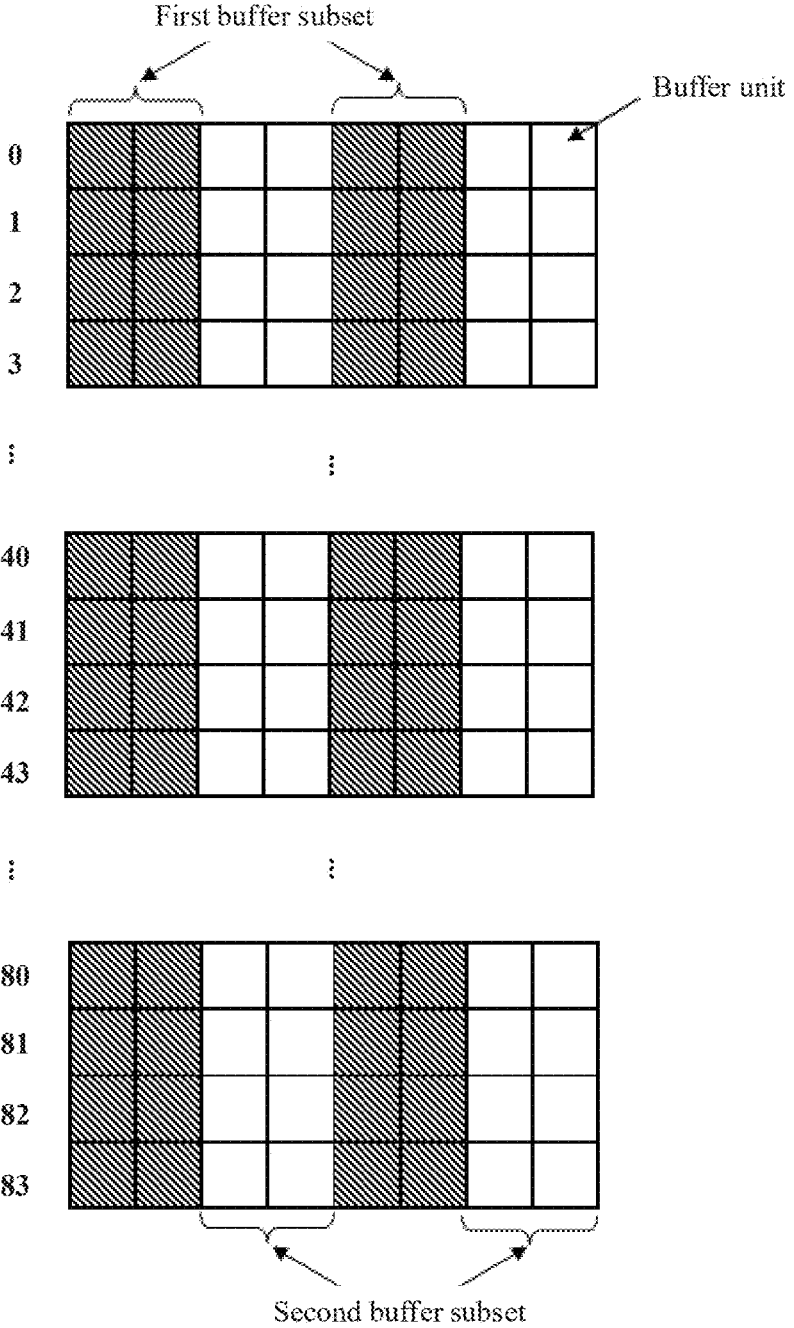
FIG. 20 is a diagram of other distribution of an interleaver buffer according to an embodiment of this application.

FIG. 20 is a diagram of other distribution of an interleaver buffer according to an embodiment of this application. It should be understood that the distribution of the interleaver buffer shown in FIG. 20 is designed on the basis that a square block is in the distribution manner shown in FIG. 11(b). In an example, $m_0 = 16$ in FIG. 20, a first buffer subset includes a total of 336 buffer units in column 0, column 1, column 4, and column 5 in the interleaver buffer, and a second buffer subset includes a total of 336 buffer units in column 2, column 3, column 6, and column 7 in the interleaver buffer.

It can be learned from the foregoing description that, in comparison between the second data processing and the third data processing provided in this application, buffer sizes used for the third interleaving processing and the second interleaving processing are similar or the same. It is equivalent to that the third interleaving processing replaces the first interleaving processing and the second interleaving processing in the first aspect, and achieves an effect similar to that in the first aspect, to allow a PCS process bit that is non-equiprobable in being 0 and 1 may be mapped to an amplitude bit of a modulation symbol. In this way, an occurrence probability of a constellation point is changed while a position of the constellation point remains unchanged, so that constellation points are not evenly distributed, and overall performance is improved to satisfy a requirement for a longer transmission distance in the future. In addition, the third data processing has lower complexity.

The following describes the data processing apparatus provided in embodiments of this application.

Figure 25:
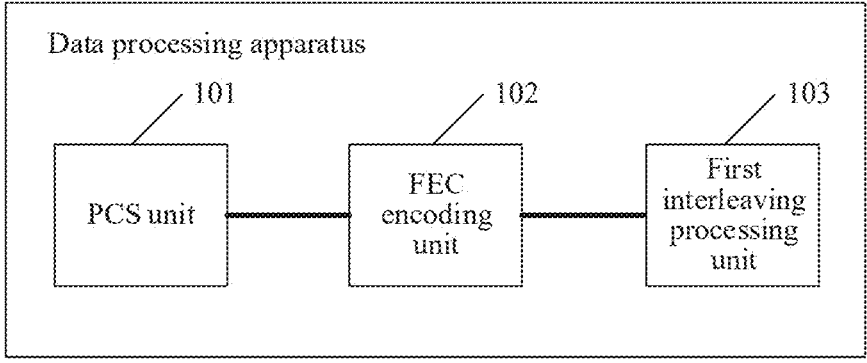
FIG. 25 is a diagram of a first structure of a data processing apparatus according to an embodiment of this application.

FIG. 25 is a diagram of a first structure of a data processing apparatus according to an embodiment of this application. As shown in FIG. 25, the data processing apparatus includes a PCS unit 101, an FEC encoding unit 102, and a first interleaving processing unit 103. The PCS unit 101 is configured to perform the PCS processing described in the embodiment shown in FIG. 5. The FEC encoding unit 102 is configured to perform the FEC encoding described in the embodiment shown in FIG. 5. The first interleaving processing unit 103 is configured to perform the first interleaving processing described in the embodiment shown in FIG. 4. For specific operations of the PCS unit 101, the FEC encoding unit 102, and the first interleaving processing unit 103, refer to the related descriptions of the embodiments shown in FIG. 4 and FIG. 5. Details are not described herein again.

In some possible implementations, the data processing apparatus shown in FIG. 25 may further include a second interleaving processing unit, a symbol mapping unit, a polarization distribution unit, and a DSP framing unit. The second interleaving processing unit, the symbol mapping unit, the polarization distribution unit, and the DSP framing unit are respectively configured to perform the second interleaving processing, the symbol mapping, the polarization distribution, and the DSP framing in the second data processing described in the embodiment shown in FIG. 4. For specific operations, refer to the related descriptions of the embodiment shown in FIG. 4. Details are not described herein again.

In some possible implementations, the data processing apparatus shown in FIG. 25 may further include a pre-encoding interleaving unit. The pre-encoding interleaving unit is configured to perform the pre-encoding interleaving processing described in the embodiment shown in FIG. 21. For a specific operation, refer to the related descriptions of the embodiment shown in FIG. 21. Details are not described herein again.

Figure 26:
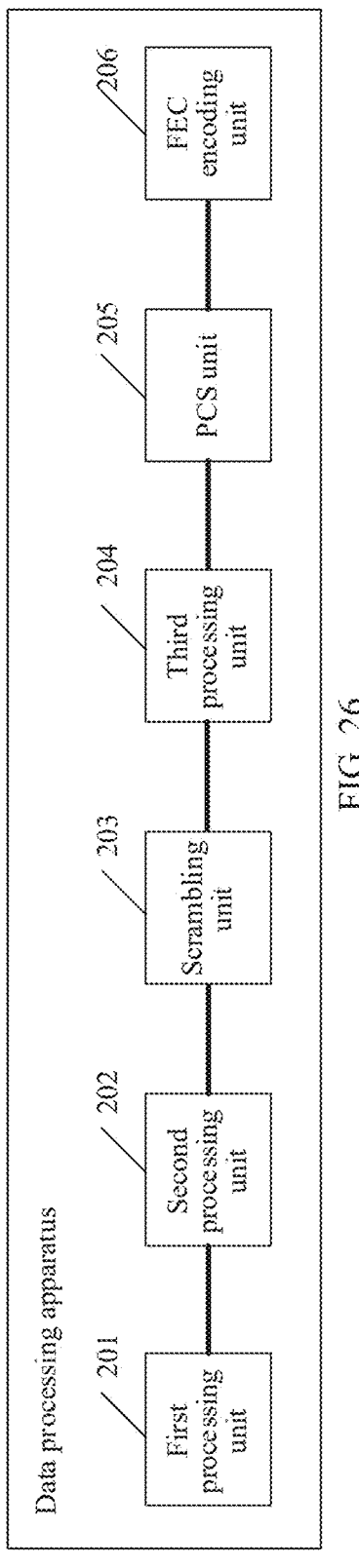
FIG. 26 is a diagram of a second structure of a data processing apparatus according to an embodiment of this application.

FIG. 26 is a diagram of a second structure of a data processing apparatus according to an embodiment of this application. As shown in FIG. 26, the data processing apparatus includes a first processing unit 201, a second processing unit 202, a scrambling unit 203, a third processing unit 204, a PCS unit 205, and an FEC encoding unit 206. The first processing unit 201 is configured to obtain, from a data frame, first data including bits in r rows and q columns.

The second processing unit 202 is configured to perform CRC check and/or pad bit insertion in the first data processing on the first data, to obtain second data. The scrambling unit 203 is configured to perform a scrambling operation in the first data processing on the second data, to obtain third data. The third processing unit 204 is configured to obtain k bits from the third data. The PCS unit 205 is configured to perform the PCS processing described in the embodiment shown in FIG. 5. The FEC encoding unit 206 is configured to perform the FEC encoding described in the embodiment shown in FIG. 5. It should be understood that for a specific operation of the data processing apparatus, refer to the related descriptions of the embodiments shown in FIG. 3 to FIG. 5. Details are not described herein again.

In some possible implementations, the data processing apparatus shown in FIG. 26 may further include a first interleaving unit, a second interleaving unit, a symbol mapping unit, a polarization distribution unit, and a DSP framing unit. The first interleaving unit, the second interleaving processing unit, the symbol mapping unit, the polarization distribution unit, and the DSP framing unit are respectively configured to perform the first interleaving processing, the second interleaving processing, the symbol mapping, the polarization distribution, and the DSP framing in the second data processing described in the embodiment shown in FIG. 4. For specific operations, refer to the related descriptions of the embodiment shown in FIG. 4. Details are not described herein again.

In some possible implementations, the data processing apparatus shown in FIG. 26 may further include a pre-encoding interleaving unit. The pre-encoding interleaving unit is configured to perform the pre-encoding interleaving processing described in the embodiment shown in FIG. 21. For a specific operation, refer to the related descriptions of the embodiment shown in FIG. 21. Details are not described herein again.

Figure 27:
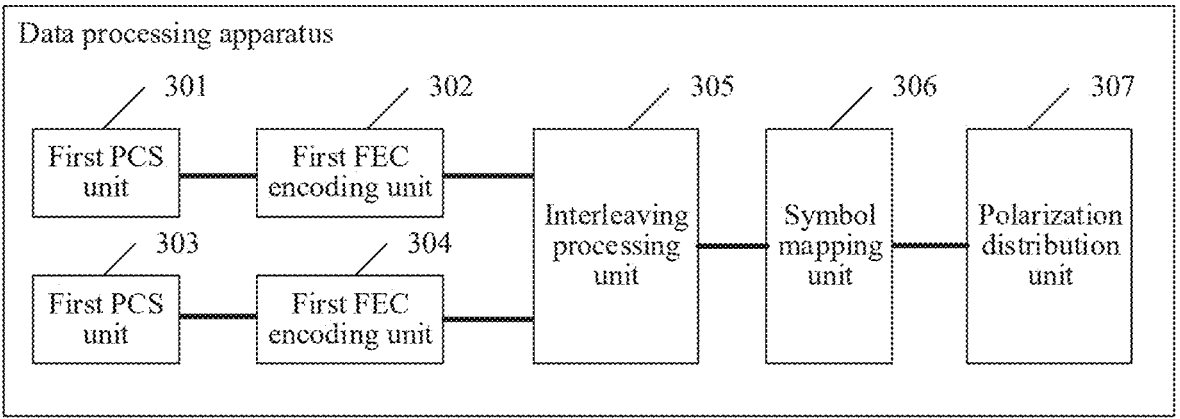
FIG. 27 is a diagram of a third structure of a data processing apparatus according to an embodiment of this application.

FIG. 27 is a diagram of a third structure of a data processing apparatus according to an embodiment of this application. As shown in FIG. 27, the data processing apparatus includes a first PCS unit 301, a first FEC encoding unit 302, a second PCS unit 303, a second FEC unit 304, an interleaving processing unit 305, a symbol mapping unit 306, and a polarization distribution unit 307. Both the first PCS unit 301 and the second PCS unit 303 are configured to perform the PCS processing described in the embodiment shown in FIG. 5. Both the first FEC encoding unit 302 and the second FEC unit 304 are configured to perform the FEC encoding described in the embodiment shown in FIG. 5. The interleaving processing unit 305 is configured to perform the third FEC interleaving processing described in the embodiment shown in FIG. 18. The symbol mapping unit 306 and the polarization distribution unit 307 are configured to perform symbol mapping and polarization distribution described in the embodiment shown in FIG. 18.

It should be understood that the apparatus provided in this application may alternatively be implemented in another manner. For example, the unit division of the foregoing apparatus is merely logical function division and may be other division during actual implementation. For example, a plurality of units or components may be combined or integrated into another system. In addition, the functional units in embodiments of this application may be integrated into one processing unit, each of the functional units may be an independent physical unit, or two or more functional units may be integrated into one processing unit. The integrated unit may be implemented in a form of hardware, or may be implemented in a form of a software functional unit.

Figure 28:
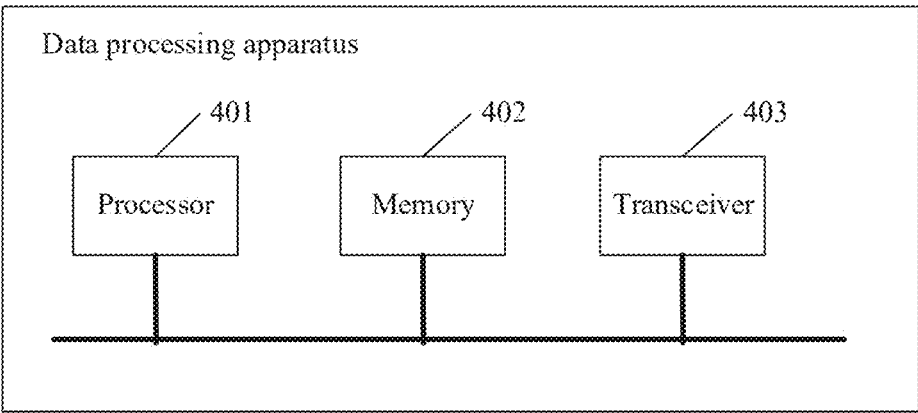
FIG. 28 is a diagram of a fourth structure of a data processing apparatus according to an embodiment of this application.

FIG. 28 is a diagram of a fourth structure of a data processing apparatus according to an embodiment of this application. As shown in FIG. 28, the data processing apparatus includes a processor 401, a memory 402, and a transceiver 403. The processor 401, the memory 402, and the transceiver 403 are connected through a line. The memory 402 is configured to store program instructions and data. Specifically, the processor 401 is configured to perform a data processing operation, and the transceiver 403 is configured to perform data sending and receiving operations. In a possible implementation, the processor 401 may include the PCS unit 101, the FEC encoding unit 102, and the first interleaving processing unit 103 that are shown in FIG. 25. In another possible implementation, the processor 401 may include the first processing unit 201, the second processing unit 202, the scrambling unit 203, the third processing unit 204, the PCS unit 205, and the FEC encoding unit 206 that are shown in FIG. 26. In still another possible implementation, the processor 401 may include the first PCS unit 301, the first FEC encoding unit 302, the second PCS unit 303, the second FEC unit 304, the interleaving processing unit 305, the symbol mapping unit 306, and the polarization distribution unit 307 that are shown in FIG. 27.

It should be noted that the processor shown in FIG. 28 may use a general-purpose central processing unit (Central Processing Unit, CPU), a general-purpose processor, a digital signal processor (DSP), an application-specific integrated circuit (ASIC), a field programmable gate array (FPGA) or another programmable logic device, a transistor logic device, a hardware component, or any combination thereof. The memory shown in FIG. 28 may store an operating system and another application program. When the technical solutions provided in embodiments of this application are implemented by using software or firmware, program code used to implement the technical solutions provided in embodiments of this application is stored in the memory, and is executed by the processor. In an embodiment, the processor may include the memory inside. In another embodiment, the processor and the memory are two independent structures.

A person skilled in the art can clearly understand that, for a purpose of convenient and brief description, for detailed working processes of the foregoing system, apparatus, and unit, refer to corresponding processes in the foregoing method embodiments. Details are not described herein again.

A person of ordinary skill in the art may understand that all or some of the steps in the foregoing embodiments may be implemented through hardware or a program instructing related hardware. The program may be stored in a computer-readable storage medium. The storage medium mentioned above may be a read-only memory, a random access memory, or the like. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the functions, all or some of the method steps described in the foregoing embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semi-conductor medium (for example, a solid-state drive Solid-State Drive (SSD)), or the like.

The invention claimed is:

1. A data processing method, comprising:

performing probabilistic constellation shaping (PCS) processing on a first bit set in k bits, to obtain a second bit set, wherein k is an integer greater than 1;

performing forward error correction (FEC) encoding on the second bit set and a third bit set in the k bits excluding the first bit set, to obtain a fourth bit set, wherein the fourth bit set comprises $m_0$ first bit subsets, each of the first bit subsets comprises $F_0$ bits, $m_0$ is an integer greater than 1, $m_0=12$ or 16, and $F_0$ is an even number greater than 1; and performing first interleaving processing on the fourth bit set to obtain a fifth bit set, wherein the fifth bit set comprises $m_0$ second bit subsets, each of the second bit subsets comprises $F_0$ bits, $$\frac{F_0}{2}$$

bits in each of the second bit subsets are from the second bit set, and the other $$\frac{F_0}{2}$$

bits in each of the second bit subsets are from at least one of the third bit set or parity bits of the FEC encoding.

2. The method according to claim 1, wherein the fifth bit set comprises $m_0 \times F_0$ bits, and each of the second bit subsets comprises $F_0$ consecutive bits.

3. The method according to claim 1, wherein each of the second bit subsets is presented as a square block.

4. The method according to claim 1, wherein the $F_0$ bits in each of the second bit subsets are distributed in $F_1$ rows and $F_1$ columns $$\frac{F_1}{2}$$

bits of $F_1$ bits in each row of each of the second bit subsets are from the second bit set, the second bit set comprises $$m_0 \times \frac{F_0}{2}$$

bits, and the other $$\frac{F_1}{2}$$

bits of the $F_1$ bits in each row of each of the second bit subsets are from at least one of the third bit set or the parity bits of the FEC encoding.

5. The method according to claim 4, wherein $F_0=256$ and $F_1=16$.

6. The method according to claim 4, wherein $F_0=256$, $F_1=16$, and a bit in row $i_2$ and column $$\left( \left\lfloor \frac{j_2}{2} \right\rfloor \times 4 + j_2 \% 2 + i_2 + 2 \right) \% 16$$

of each of the second bit subsets is from the second bit set, wherein $0 \le i_2 < 16$ and $0 \le j_2 < 8$; or a bit in row $i_2$ and column $(j_2 \times 2 - i_2 \% 2 + 1)$ of each of the second bit subsets is from the second bit set, wherein $0 \le i_2 < 16$ and $0 \le j_2 < 8$, wherein:

$\lfloor a \rfloor$ represents performing a floor operation on a, and b % c represents b modulo c.

7. The method according to claim 4, wherein $F_0=256$, $F_1=16$, and bits in each of the second bit subsets satisfies one or more of the following:

bits in row 0 and columns 2, 3, 6, 7, 10, 11, 14, and 15 of each of the second bit subsets are from the second bit set;

bits in row 1 and columns 0, 3, 4, 7, 8, 11, 12, and 15 of each of the second bit subsets are from the second bit set;

bits in row 2 and columns 0, 1, 4, 5, 8, 9, 12, and 13 of each of the second bit subsets are from the second bit set;

bits in row 3 and columns 1, 2, 5, 6, 9, 10, 13, and 14 of each of the second bit subsets are from the second bit set;

bits in row 4 and columns 2, 3, 6, 7, 10, 11, 14, and 15 of each of the second bit subsets are from the second bit set;

bits in row 5 and columns 0, 3, 4, 7, 8, 11, 12, and 15 of each of the second bit subsets are from the second bit set;

bits in row 6 and columns 0, 1, 4, 5, 8, 9, 12, and 13 of each of the second bit subsets are from the second bit set;

bits in row 7 and columns 1, 2, 5, 6, 9, 10, 13, and 14 of each of the second bit subsets are from the second bit set;

bits in row 8 and columns 2, 3, 6, 7, 10, 11, 14, and 15 of each of the second bit subsets are from the second bit set;

bits in row 9 and columns 0, 3, 4, 7, 8, 11, 12, and 15 of each of the second bit subsets are from the second bit set;

bits in row 10 and columns 0, 1, 4, 5, 8, 9, 12, and 13 of each of the second bit subsets are from the second bit set;

bits in row 11 and columns 1, 2, 5, 6, 9, 10, 13, and 14 of each of the second bit subsets are from the second bit set;

bits in row 12 and columns 2, 3, 6, 7, 10, 11, 14, and 15 of each of the second bit subsets are from the second bit set;

bits in row 13 and columns 0, 3, 4, 7, 8, 11, 12, and 15 of each of the second bit subsets are from the second bit set;

bits in row 14 and columns 0, 1, 4, 5, 8, 9, 12, and 13 of each of the second bit subsets are from the second bit set; or bits in row 15 and columns 1, 2, 5, 6, 9, 10, 13, and 14 of each of the second bit subsets are from the second bit set.

8. The method according to claim 1, wherein $F_0$=256, and a total of $m_1 \times 256$ bits in $m_1$ first bit subsets in the fourth bit set are from the second bit set, wherein $m_0 = m_1 \times 2$.

9. The method according to claim 1, wherein $F_0$=256, $m_0 \times 256$ bits in the fourth bit set are distributed in 32 rows and $m_0 \times 8$ columns, $m_0 \times 256$ bits in the fifth bit set are distributed in 32 rows and $m_0 \times 8$ columns, and $m_0 \times 8$ bits in row $r_1$ in the fifth bit set are from $m_0 \times 8$ bits in row $r_0$ in the fourth bit set, wherein $0 \le r_0 < 32$ and $0 \le r_1 < 32$.

10. The method according to claim 9, wherein $r_0 = r_1$.

11. The method according to claim 1, wherein the performing FEC encoding on the second bit set and a third bit set in the k bits excluding the first bit set, to obtain a fourth bit set comprises:

performing pre-encoding interleaving processing on the second bit set and the third bit set to obtain a sixth bit set, wherein a quantity of bits in the sixth bit set is equal to a sum of a quantity of bits in the second bit set and a quantity of bits in the third bit set, the sixth bit set comprises $m_3$ third bit subsets, the $m_3$ third bit subsets are distributed in two rows and $m_4$ columns, $m_3 = 2 \times m_4$, and $m_3$ is an integer greater than 1 and less than $m_0$, wherein some third bit subsets each comprises $F_0$ bits, the other third bit subsets each comprises $F_2$ bits, and $F_2$ is an even number greater than 1 and less than $F_0$; and performing FEC encoding on the sixth bit set to obtain the fourth bit set.

12. The method according to claim 11, wherein $m_3$=14, $m_4$=7, $F_0$=256, $F_2$=240, each third bit subset in column 0 to column 5 comprises bits in 16 rows and 16 columns, each third bit subset in column 6 comprises bits in 16 rows and 15 columns, $$\frac{F_0}{2}$$

bits in each third bit subset in column 0 to column 4 are from the second bit set, the other $$\frac{F_0}{2}$$

bits in each third bit subset in column 0 to column 4 are from the third bit set, 9 bits in each row of each third bit subset in column 5 are from the second bit set, the other 7 bits in each row of each third bit subset in column 5 are from the third bit set, and $F_2$ bits in each third bit subset in column 6 are from the second bit set.

13. The method according to claim 1, wherein after the performing interleaving processing on the fourth bit set to obtain a fifth bit set, the method further comprises:

performing second interleaving processing on every two first bit streams in L first bit streams to obtain a total of L/2 second bit streams, wherein each first bit stream comprises a plurality of fifth bit sets, and L is an even number greater than 0;

performing symbol mapping and polarization distribution on the L/2 second bit streams to obtain one dual-polarization symbol stream, wherein t bits are mapped to one dual-polarization symbol through the symbol mapping and the polarization distribution, and t is an integer greater than 0; and performing digital signal processing (DSP) framing on the dual-polarization symbol stream.

14. The method according to claim 13, wherein an amplitude bit in the dual-polarization symbol is from the second bit set.

15. The method according to claim 14, wherein t=8, and the dual-polarization symbol is a dual-polarization DP-16QAM symbol.

16. The method according to claim 15, wherein the performing DSP framing on the dual-polarization symbol stream comprises:

performing framing processing on every 172032 dual-polarization DP-16QAM symbols to obtain one DSP super-frame, wherein the DSP super-frame comprises 175104 dual-polarization symbols.

17. The method according to claim 1, wherein a quantity of bits in the first bit set is an integer multiple of 2, 4, 8, or 16, the second bit set comprises 2048 bits, the third bit set comprises 1504 bits, and the fourth bit set comprises 4096 bits.

18. A data processing apparatus, comprising at least one processor and a transceiver, wherein the transceiver is configured to perform data sending and receiving operations, and the at least one processor is configured to:

perform probabilistic constellation shaping (PCS) processing on a first bit set in k bits, to obtain a second bit set, wherein k is an integer greater than 1;

perform forward error correction (FEC) encoding on the second bit set and a third bit set in the k bits excluding the first bit set, to obtain a fourth bit set, wherein the fourth bit set comprises $m_0$ first bit subsets, each of the first bit subsets comprises $F_0$ bits, $m_0$ is an integer greater than 1, $m_0$=12 or 16, and $F_0$ is an even number greater than 1; and perform first interleaving processing on the fourth bit set to obtain a fifth bit set, wherein the fifth bit set comprises $m_0$ second bit subsets, each of the second bit subsets comprises $F_0$ bits, $$\frac{F_0}{2}$$

bits in each of the second bit subsets are from the second bit set, and the other $$\frac{F_0}{2}$$

bits in each of the second bit subsets are from at least one of the third bit set or parity bits of the FEC encoding.

19. The apparatus according to claim 18, wherein the fifth bit set comprises $m_0 \times F_0$ bits, and each of the second bit subsets comprises $F_0$ consecutive bits.

20. The apparatus according to claim 18, wherein each of the second bit subsets is presented as a square block.

21. The apparatus according to claim 18, wherein $F_0$ bits in each of the second bit subsets are distributed in $F_1$ rows and $F_1$ columns, $$\frac{F_1}{2}$$

bits of $F_1$ bits in each row of each of the second bit subsets are from the second bit set, the second bit set comprises $$m_0 \times \frac{F_0}{2}$$

bits, and the other $$\frac{F_1}{2}$$

bits of the $F_1$ bits in each row of each of the second bit subsets are from at least one of the third bit set or the parity bits of the FEC encoding.

22. The apparatus according to claim 21, wherein $F_0=256$ and $F_1=16$.

23. The apparatus according to claim 21, wherein $F_0=256$, $F_1=16$, and a bit in row $i_2$ and column $$\left( \left\lfloor \frac{j_2}{2} \right\rfloor \times 4 + j_2 \% 2 + i_2 + 2 \right) \% 16$$

of each of the second bit subsets is from the second bit set, wherein $0 \le i_2 < 16$ and $0 \le j_2 < 8$; or a bit in row $i_2$ and column $(j_2 \times 2 - i_2 \% 2 + 1)$ of each of the second bit subsets is from the second bit set, wherein $0 \le i_2 < 16$ and $0 \le j_2 < 8$, wherein:

$\lfloor a \rfloor$ represents performing a floor operation on a, and b % c represents b modulo c.

24. The apparatus according to claim 21, wherein $F_0=256$, $F_1=16$, and bits in each of the second bit subsets satisfies one or more of the following:

bits in row 0 and columns 2, 3, 6, 7, 10, 11, 14, and 15 of each of the second bit subsets are from the second bit set;

bits in row 1 and columns 0, 3, 4, 7, 8, 11, 12, and 15 of each of the second bit subsets are from the second bit set;

bits in row 2 and columns 0, 1, 4, 5, 8, 9, 12, and 13 of each of the second bit subsets are from the second bit set;

bits in row 3 and columns 1, 2, 5, 6, 9, 10, 13, and 14 of each of the second bit subsets are from the second bit set;

bits in row 4 and columns 2, 3, 6, 7, 10, 11, 14, and 15 of each of the second bit subsets are from the second bit set;

bits in row 5 and columns 0, 3, 4, 7, 8, 11, 12, and 15 of each of the second bit subsets are from the second bit set;

bits in row 6 and columns 0, 1, 4, 5, 8, 9, 12, and 13 of each of the second bit subsets are from the second bit set;

bits in row 7 and columns 1, 2, 5, 6, 9, 10, 13, and 14 of each of the second bit subsets are from the second bit set;

bits in row 8 and columns 2, 3, 6, 7, 10, 11, 14, and 15 of each of the second bit subsets are from the second bit set;

bits in row 9 and columns 0, 3, 4, 7, 8, 11, 12, and 15 of each of the second bit subsets are from the second bit set;

bits in row 10 and columns 0, 1, 4, 5, 8, 9, 12, and 13 of each of the second bit subsets are from the second bit set;

bits in row 11 and columns 1, 2, 5, 6, 9, 10, 13, and 14 of each of the second bit subsets are from the second bit set;

bits in row 12 and columns 2, 3, 6, 7, 10, 11, 14, and 15 of each of the second bit subsets are from the second bit set;

bits in row 13 and columns 0, 3, 4, 7, 8, 11, 12, and 15 of each of the second bit subsets are from the second bit set;

bits in row 14 and columns 0, 1, 4, 5, 8, 9, 12, and 13 of each of the second bit subsets are from the second bit set; or bits in row 15 and columns 1, 2, 5, 6, 9, 10, 13, and 14 of each of the second bit subsets are from the second bit set.

25. The apparatus according to claim 18, wherein $F_0=256$, and a total of $m_1 \times 256$ bits in $m_1$ first bit subsets in the fourth bit set are from the second bit set, wherein $m_0=m_1 \times 2$.

26. The apparatus according to claim 18, wherein $F_0=256$, $m_0 \times 256$ bits in the fourth bit set are distributed in 32 rows and $m_0 \times 8$ columns, $m_0 \times 256$ bits in the fifth bit set are distributed in 32 rows and $m_0 \times 8$ columns, and $m_0 \times 8$ bits in row $r_1$ in the fifth bit set are from $m_0 \times 8$ bits in row $r_0$ in the fourth bit set, wherein $0 \le r_0 < 32$ and $0 \le r_1 < 32$.

27. The apparatus according to claim 18, wherein the processor is configured to:

perform pre-encoding interleaving processing on the second bit set and the third bit set to obtain a sixth bit set, wherein a quantity of bits in the sixth bit set is equal to a sum of a quantity of bits in the second bit set and a quantity of bits in the third bit set, the sixth bit set comprises $m_3$ third bit subsets, the $m_3$ third bit subsets are distributed in two rows and $m_4$ columns, $m_3=2 \times m_4$, and $m_3$ is an integer greater than 1 and less than $m_0$, wherein some third bit subsets each comprises $F_0$ bits, the other third bit subsets each comprises $F_2$ bits, and $F_2$ is an even number greater than 1 and less than $F_0$; and perform FEC encoding on the sixth bit set to obtain the fourth bit set.

28. The apparatus according to claim 27, wherein $m_3=14$, $m_4=7$, $F_0=256$, $F_2=240$, each third bit subset in column 0 to column 5 comprises bits in 16 rows and 16 columns, each third bit subset in column 6 comprises bits in 16 rows and 15 columns, $$\frac{F_0}{2}$$

bits in each third bit subset in column 0 to column 4 are from the second bit set, the other bits in each of the second bit subsets are from the second bit set, and the other $$\frac{F_0}{2}$$

$$\frac{F_0}{2}$$

bits in each of the second bit subsets are from at least one of the third bit set or parity bits of the FEC encoding; and send a data stream to the receiver data processing apparatus.

bits in each third bit subset in column 0 to column 4 are from the third bit set, 9 bits in each row of each third bit subset in column 5 are from the second bit set, the other 7 bits in each row of each third bit subset in column 5 are from the third bit set, and $F_2$ bits in each third bit subset in column 6 are from the second bit set.

30. A data processing apparatus, comprising at least one processor, wherein the at least one processor is configured to:

perform probabilistic constellation shaping (PCS) processing on a first bit set in k bits, to obtain a second bit set, wherein k is an integer greater than 1;

perform forward error correction (FEC) encoding on the second bit set and a third bit set in the k bits excluding the first bit set, to obtain a fourth bit set, wherein the fourth bit set comprises $m_0$ first bit subsets, each of the first bit subsets comprises $F_0$ bits, $m_0$ is an integer greater than 1, $m_0=12$ or 16, and $F_0$ is an even number greater than 1; and perform first interleaving processing on the fourth bit set to obtain a fifth bit set, wherein the fifth bit set comprises $m_0$ second bit subsets, each of the second bit subsets comprises $F_0$ bits,

29. A communication system, comprising a transmitter data processing apparatus and a receiver data processing apparatus, wherein the transmitter data processing apparatus is configured to:

perform probabilistic constellation shaping (PCS) processing on a first bit set in k bits, to obtain a second bit set, wherein k is an integer greater than 1;

perform forward error correction (FEC) encoding on the second bit set and a third bit set in the k bits excluding the first bit set, to obtain a fourth bit set, wherein the fourth bit set comprises $m_0$ first bit subsets, each of the first bit subsets comprises $F_0$ bits, $m_0$ is an integer greater than 1, $m_0=12$ or 16, and $F_0$ is an even number greater than 1;

perform first interleaving processing on the fourth bit set to obtain a fifth bit set, wherein the fifth bit set comprises $m_0$ second bit subsets, each of the second bit subsets comprises $F_0$ bits, $$\frac{F_0}{2}$$

bits in each of the second bit subsets are from the second bit set, and the other $$\frac{F_0}{2}$$

$$\frac{F_0}{2}$$

bits in each of the second bit subsets are from at least one of the third bit set or parity bits of the FEC encoding.

* * * * *